US012008629B2

(12) United States Patent
Isaacson et al.

(10) Patent No.: US 12,008,629 B2
(45) Date of Patent: *Jun. 11, 2024

(54) SYSTEM AND METHOD FOR PROVIDING A SOCIAL MEDIA SHOPPING EXPERIENCE

(71) Applicant: Monticello Enterprises LLC, Huntingtown, MD (US)

(72) Inventors: Thomas M. Isaacson, Huntingtown, MD (US); Ryan Connell Durham, Anchorage, AK (US)

(73) Assignee: MONTICELLO ENTERPRISES LLC, Huntingtown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,039

(22) Filed: Jul. 12, 2023

(65) Prior Publication Data

US 2023/0351474 A1    Nov. 2, 2023

Related U.S. Application Data

(63) Continuation of application No. 17/391,481, filed on Aug. 2, 2021, now Pat. No. 11,842,380, which is a
(Continued)

(51) Int. Cl.
*G06Q 30/00* (2023.01)
*G06Q 30/0601* (2023.01)

(52) U.S. Cl.
CPC ..... *G06Q 30/0633* (2013.01); *G06Q 30/0625* (2013.01); *G06Q 30/0635* (2013.01); *G06Q 30/0641* (2013.01)

(58) Field of Classification Search
CPC .... G06Q 30/00; G06Q 30/06; G06Q 30/0601; G06Q 30/0623; G06Q 30/0625; G06Q 30/0633; G06Q 30/0641
See application file for complete search history.

(56) References Cited

U.S. PATENT DOCUMENTS 4,837,842 A    6/1989   Holt
4,912,654 A    3/1990   Wood
(Continued)

FOREIGN PATENT DOCUMENTS

WO    WO 2012/075304    6/2012

OTHER PUBLICATIONS

Anderson, Matt, et al. "Turning "Like" to "Buy" social media emerges as a commerce channel." Booz & Company Inc 2.1 (2011): 102-128. (Year: 2011).*
(Continued)

*Primary Examiner* — Christopher B Seibert

(57) ABSTRACT

Disclosed are a system and process of providing social networking purchasing processes. A method includes receiving, from a posting entity and at the social networking entity, a posting or a submission of a text, an image or a video. When the submission is associated with a product within a product catalog of the posting entity, the social networking entity presents in a newsfeed of users or otherwise on the social networking entity, the text, image or video with an associated option to buy. The option to buy might be presented through a messenger application or as the user browses the posting. When there is a correlation between the posting and the product catalog, and when the user makes a purchase of the product, the user is not transitioned away from the social networking entity. Initiating a payment process occurs within the social networking entity.

19 Claims, 64 Drawing Sheets

Related U.S. Application Data continuation of application No. 16/884,416, filed on Jul. 14, 2020, now Pat. No. 11,080,777, which is a continuation of application No. 16/849,219, filed on Apr. 15, 2020, now Pat. No. 10,825,079, which is a continuation of application No. 16/721,970, filed on Dec. 20, 2019, now Pat. No. 10,650,441, which is a continuation of application No. 16/753,411, filed on Sep. 17, 2019, now Pat. No. 11,244,377, which is a continuation of application No. 16/445,297, filed on Jun. 19, 2019, now Pat. No. 10,511,580, which is a continuation of application No. 16/279,685, filed on Feb. 19, 2019, now Pat. No. 10,643,266, which is a continuation-in-part of application No. 16/126,541, filed on Sep. 10, 2018, now Pat. No. 10,832,310, which is a continuation-in-part of application No. 15/947,395, filed on Apr. 6, 2018, now Pat. No. 10,152,756, which is a continuation-in-part of application No. 15/720,878, filed on Sep. 29, 2017, now Pat. No. 10,497,037, which is a continuation-in-part of application No. 15/678,664, filed on Aug. 16, 2017, now abandoned, which is a continuation of application No. 15/678,378, filed on Aug. 16, 2017, now Pat. No. 10,621,653, which is a continuation-in-part of application No. 15/602,868, filed on May 23, 2017, now Pat. No. 9,922,381, which is a continuation of application No. 15/600,599, filed on May 19, 2017, now Pat. No. 9,922,380, which is a continuation of application No. 15/600,388, filed on May 19, 2017, now Pat. No. 10,504,193, which is a continuation-in-part of application No. 15/586,999, filed on May 4, 2017, now Pat. No. 10,121,186, which is a continuation-in-part of application No. 15/269,451, filed on Sep. 19, 2016, now Pat. No. 9,767,520, which is a continuation of application No. 15/263,066, filed on Sep. 12, 2016, now Pat. No. 10,002,396, which is a continuation of application No. 15/018,954, filed on Feb. 9, 2016, now Pat. No. 9,734,526, which is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, and a continuation-in-part of application No. 14/230,864, filed on Mar. 31, 2014, now Pat. No. 9,430,794, said application No. 15/720,878 is a continuation-in-part of application No. 15/263,057, filed on Sep. 12, 2016, now Pat. No. 9,824,408, which is a continuation of application No. 15/018,954, filed on Feb. 9, 2016, now Pat. No. 9,734,526, said application No. 16/279,685 is a continuation-in-part of application No. 15/018,939, filed on Feb. 9, 2016, now Pat. No. 10,332,170, which is a continuation of application No. 14/853,579, filed on Sep. 14, 2015, now Pat. No. 9,396,491, said application No. 16/884,416 is a continuation of application No. 16/420,785, filed on May 23, 2019, now Pat. No. 10,726,472, which is a continuation-in-part of application No. 16/176,425, filed on Oct. 31, 2018, now Pat. No. 11,004,139, said application No. 16/420,785 is a continuation-in-part of application No. 16/279,685, filed on Feb. 19, 2019, now Pat. No. 10,643,266, said application No. 17/391,481 is a continuation of application No. 16/801,513, filed on Feb. 26, 2020, now Pat. No. 10,769,717, which is a continuation of application No. 16/675,341, filed on Nov. 6, 2019, now Pat. No. 10,650,443, which is a continuation of application No. 16/573,411, filed on Sep. 17, 2019, now Pat. No. 11,244,377.

(60) Provisional application No. 61/973,287, filed on Apr. 1, 2014, provisional application No. 62/812,153, filed on Feb. 28, 2019, provisional application No. 62/809,170, filed on Feb. 22, 2019, provisional application No. 62/725,855, filed on Aug. 31, 2018, provisional application No. 62/569,841, filed on Oct. 9, 2017, provisional application No. 62/560,261, filed on Sep. 19, 2017, provisional application No. 62/475,578, filed on Mar. 23, 2017, provisional application No. 62/450,900, filed on Jan. 26, 2017, provisional application No. 62/399,761, filed on Sep. 26, 2016, provisional application No. 61/972,890, filed on Mar. 31, 2014, provisional application No. 61/972,861, filed on Mar. 31, 2014, provisional application No. 61/972,843, filed on Mar. 31, 2014, provisional application No. 61/972,879, filed on Mar. 31, 2014, provisional application No. 61/973,834, filed on Mar. 31, 2014, provisional application No. 61/972,865, filed on Mar. 31, 2014, provisional application No. 61/972,878, filed on Mar. 31, 2014, provisional application No. 61/972,892, filed on Mar. 31, 2014, provisional application No. 61/972,848, filed on Mar. 31, 2014, provisional application No. 62/818,440, filed on Mar. 14, 2019.

(56) References Cited

U.S. PATENT DOCUMENTS

| | | |
|---|---|---|
| 4,933,872 A | 6/1990 | Vandenberg |
| 5,524,182 A | 6/1996 | Chari |
| 5,608,819 A | 3/1997 | Ikeuchi |
| 5,644,656 A | 7/1997 | Akra |
| 5,678,677 A | 10/1997 | Baudat |
| 5,696,838 A | 12/1997 | Chiu |
| 5,818,978 A | 10/1998 | Al-Hussein |
| 5,859,925 A | 1/1999 | Yaeger |
| 5,892,843 A | 4/1999 | Zhou |
| 5,960,411 A | 9/1999 | Hartman |
| 6,360,216 B1 | 3/2002 | Hennessey |
| 6,615,408 B1 | 9/2003 | Kaiser |
| 6,731,788 B1* | 5/2004 | Agnihotri ............ G11B 27/28 382/165 |
| 6,978,035 B2 | 12/2005 | Kawaguchi |
| 7,014,107 B2* | 3/2006 | Singer .................. G06Q 20/32 705/64 |
| 7,028,020 B1 | 4/2006 | Keskar |
| 7,197,479 B1 | 3/2007 | Franciscus de Heer |
| 7,206,434 B2 | 4/2007 | Overton |
| 7,230,653 B1 | 6/2007 | Overton |
| 7,327,885 B2 | 2/2008 | Divakaran |
| 7,328,176 B2 | 2/2008 | Tarvydas |
| 7,400,768 B1 | 7/2008 | Mayzlin |
| 7,668,823 B2 | 2/2010 | Oldham |
| 7,769,771 B2 | 8/2010 | Ikeda |
| 7,778,994 B2 | 8/2010 | Raman |
| 7,792,705 B2 | 9/2010 | Bezos |
| 7,801,358 B2 | 9/2010 | Furmaniak |
| 7,853,583 B2 | 12/2010 | Schachter |
| 7,860,872 B2 | 12/2010 | Serjeantson |
| 8,020,188 B2 | 9/2011 | Terasaki |
| 8,077,930 B2 | 12/2011 | Hauke |
| 8,086,495 B2 | 12/2011 | Ansari |
| 8,135,707 B2 | 3/2012 | Mika |
| 8,190,601 B2 | 5/2012 | Ahari |
| 8,218,892 B2 | 7/2012 | Bober |
| 8,219,553 B2 | 7/2012 | Bedingfield, Sr. |

(56) References Cited

U.S. PATENT DOCUMENTS

| | | | |
|---|---|---|---|
| 8,224,851 B2 | 7/2012 | Banda | |
| 8,239,370 B2 | 8/2012 | Wong | |
| 8,255,323 B1* | 8/2012 | Casey | G06Q 20/42 |
| | | | 705/42 |
| 8,296,196 B2 | 10/2012 | Martine | |
| 8,296,280 B2 | 10/2012 | Mo | |
| 8,301,632 B2 | 10/2012 | Bovenschulte | |
| 8,311,957 B2 | 11/2012 | Kirshenbaum | |
| 8,320,681 B2 | 11/2012 | Kim | |
| 8,341,036 B2 | 12/2012 | Hartman | |
| 8,352,320 B2 | 1/2013 | MacDonald | |
| 8,352,464 B2 | 1/2013 | Fotev | |
| 8,355,997 B2 | 1/2013 | Kirshenbaum | |
| 8,370,319 B1 | 2/2013 | Krynski | |
| 8,370,330 B2 | 2/2013 | Priyadarshan | |
| 8,373,904 B2 | 2/2013 | Yano | |
| 8,375,325 B2 | 2/2013 | Wuttke | |
| 8,380,570 B2 | 2/2013 | Agarwal | |
| 8,406,528 B1 | 3/2013 | Hatwich | |
| 8,406,792 B2 | 3/2013 | Aaltonen | |
| 8,417,226 B2 | 4/2013 | Ahtisaari | |
| 8,423,568 B2 | 4/2013 | Fuxman | |
| 8,458,053 B1* | 6/2013 | Buron | H04N 21/4316 |
| | | | 705/26.1 |
| 8,478,240 B2 | 7/2013 | Aaltonen | |
| 8,489,582 B2 | 7/2013 | Jain | |
| 8,504,419 B2 | 8/2013 | Priyadarshan | |
| 8,510,309 B2 | 8/2013 | Priyadarshan | |
| 8,510,658 B2 | 8/2013 | Priyadarshan | |
| 8,515,966 B2 | 8/2013 | Jammalamadaka | |
| 8,548,872 B1 | 10/2013 | Gupta | |
| 8,560,405 B1* | 10/2013 | Buron | G06Q 30/0241 |
| | | | 705/26.61 |
| 8,577,813 B2 | 11/2013 | Weiss | |
| 8,595,203 B2 | 11/2013 | Monahan | |
| 8,595,851 B2 | 11/2013 | Aaltonen | |
| 8,631,122 B2 | 1/2014 | Kadam | |
| 8,635,227 B2 | 1/2014 | Sankhla | |
| 8,639,567 B2 | 1/2014 | Winters | |
| 8,639,778 B2 | 1/2014 | Madanes | |
| 8,640,032 B2 | 1/2014 | Priyadarshan | |
| 8,650,173 B2 | 2/2014 | McDonald | |
| 8,655,146 B2 | 2/2014 | Bennett | |
| 8,655,736 B2 | 2/2014 | Bharadwaj | |
| 8,660,912 B1* | 2/2014 | Dandekar | G06Q 30/02 |
| | | | 705/26.1 |
| 8,670,652 B2 | 3/2014 | Yai | |
| 8,676,682 B2 | 3/2014 | Kalliola | |
| 8,712,382 B2 | 4/2014 | Aaltonen | |
| 8,713,003 B2 | 4/2014 | Fotev | |
| 8,719,091 B2 | 5/2014 | Kirley | |
| 8,738,418 B2 | 5/2014 | Winters | |
| 8,762,475 B2 | 6/2014 | Cheung et al. | |
| 8,762,484 B2 | 6/2014 | Ravichandran | |
| 8,763,068 B2 | 6/2014 | Gu | |
| 8,775,273 B2 | 7/2014 | Mengerink | |
| 8,793,260 B2 | 7/2014 | Haykal | |
| 8,856,539 B2 | 10/2014 | Weiss | |
| 8,880,498 B2 | 11/2014 | Rubanovich | |
| 8,898,217 B2 | 11/2014 | Grigorovici | |
| 8,903,800 B2 | 12/2014 | Kakade | |
| 8,935,340 B2 | 1/2015 | Aaltonen | |
| 8,949,342 B2 | 2/2015 | Ahopelto | |
| 8,949,889 B1 | 2/2015 | Erdmann | |
| 8,959,022 B2 | 2/2015 | Cheng | |
| 8,972,600 B2 | 3/2015 | Malaby | |
| 8,977,554 B1* | 3/2015 | Hertschuh | G06Q 30/0623 |
| | | | 704/270 |
| 8,977,625 B2 | 3/2015 | Buehrer | |
| 8,983,978 B2 | 3/2015 | Priyadarshan | |
| 9,031,927 B2 | 5/2015 | Kaushal | |
| 9,038,000 B2 | 5/2015 | Haynes, II | |
| 9,064,281 B2 | 6/2015 | Ballard | |
| 9,066,130 B1 | 6/2015 | Buron | |
| 9,092,289 B2 | 7/2015 | Bouthillier | |
| 9,100,826 B2 | 8/2015 | Weiss | |
| 9,113,214 B2 | 8/2015 | Andrews, II | |
| 9,137,576 B2 | 9/2015 | McRae | |
| 9,141,504 B2 | 9/2015 | Greenzeiger | |
| 9,146,665 B2 | 9/2015 | Gandhi | |
| 9,148,771 B2 | 9/2015 | Zentner | |
| 9,182,243 B2 | 11/2015 | Van Os | |
| 9,183,280 B2 | 11/2015 | Achuthan | |
| 9,183,588 B2 | 11/2015 | Yankovich | |
| 9,189,549 B2 | 11/2015 | Rubinstein | |
| 9,218,419 B2 | 12/2015 | Wu | |
| 9,224,167 B2* | 12/2015 | Lampert | G06Q 30/0633 |
| 9,251,144 B2 | 2/2016 | Du | |
| 9,256,795 B1 | 2/2016 | Gray | |
| 9,275,334 B2 | 3/2016 | Sharma | |
| 9,276,991 B2 | 3/2016 | DeRoller | |
| 9,277,022 B2 | 3/2016 | Lee | |
| 9,292,871 B2 | 3/2016 | Isaacson | |
| 9,329,692 B2 | 5/2016 | Bai | |
| 9,332,302 B2 | 5/2016 | Briggs | |
| 9,338,327 B2 | 5/2016 | Miyata | |
| 9,342,835 B2 | 5/2016 | Fordyce, III | |
| 9,342,930 B1 | 5/2016 | Kraft | |
| 9,348,935 B2 | 5/2016 | Doig | |
| 9,374,431 B2 | 6/2016 | Kannan | |
| 9,383,815 B2 | 7/2016 | Kim | |
| 9,412,127 B2 | 8/2016 | Dumon | |
| 9,418,672 B2 | 8/2016 | Pylappan | |
| 9,424,002 B2 | 8/2016 | Bruno | |
| 9,424,598 B1 | 8/2016 | Kraft | |
| 9,430,766 B1 | 8/2016 | Kraft | |
| 9,430,794 B2 | 8/2016 | Isaacson | |
| 9,443,017 B2 | 9/2016 | Borisovich | |
| 9,451,010 B2 | 9/2016 | Spitz | |
| 9,477,985 B2 | 10/2016 | Poon | |
| 9,483,755 B2 | 11/2016 | Lemay | |
| 9,495,699 B2 | 11/2016 | Mangaru | |
| 9,501,750 B2 | 11/2016 | Fujioka | |
| 9,508,006 B2 | 11/2016 | Shamir | |
| 9,516,304 B2 | 12/2016 | Friel | |
| 9,519,715 B2 | 12/2016 | Dedhia | |
| 9,529,926 B2 | 12/2016 | Wu | |
| 9,535,990 B2 | 1/2017 | Skolicki | |
| 9,536,161 B1 | 1/2017 | Lish | |
| 9,557,891 B2 | 1/2017 | Iwabuchi | |
| 9,558,272 B2 | 1/2017 | Kalinina | |
| 9,560,415 B2 | 1/2017 | Good | |
| 9,576,251 B2 | 2/2017 | Forman | |
| 9,578,358 B1 | 2/2017 | Skolicki | |
| 9,589,059 B2 | 3/2017 | Levens | |
| 9,607,330 B2 | 3/2017 | Spitz | |
| 9,613,160 B2* | 4/2017 | Houle | G06F 40/143 |
| 9,658,931 B2 | 5/2017 | Simons | |
| 9,659,067 B2 | 5/2017 | De Sousa | |
| 9,665,895 B2 | 5/2017 | Alston | |
| 9,684,741 B2 | 6/2017 | Li | |
| 9,704,180 B2 | 7/2017 | Kobayashi | |
| 9,736,028 B2 | 8/2017 | Ansari | |
| 9,754,174 B2 | 9/2017 | Sugiyama | |
| 9,767,520 B2 | 9/2017 | Isaacson | |
| 9,799,046 B2 | 10/2017 | Stoll | |
| 9,800,727 B1 | 10/2017 | Chakrabarty | |
| 9,830,137 B2 | 11/2017 | Matthew | |
| 9,832,519 B2 | 11/2017 | Avedissian | |
| 9,841,282 B2 | 12/2017 | VonDerheide | |
| 9,852,400 B2 | 12/2017 | Ruan | |
| 9,858,297 B2 | 1/2018 | Park | |
| 9,858,340 B1 | 1/2018 | Frey | |
| 9,870,131 B2 | 1/2018 | Kulikov | |
| 9,875,489 B2 | 1/2018 | Spitz | |
| 9,881,083 B2 | 1/2018 | Kalinina | |
| 9,883,008 B2 | 1/2018 | Ravichandran | |
| 9,898,162 B2 | 2/2018 | Jisrawi | |
| 9,899,063 B2 | 2/2018 | Avedissian | |
| 9,922,381 B2 | 3/2018 | Isaacson | |
| 9,924,235 B2 | 3/2018 | Ansari | |
| 9,959,872 B2 | 5/2018 | Barreira | |
| 9,965,604 B2 | 5/2018 | Smith | |

(56) References Cited

U.S. PATENT DOCUMENTS

| | | |
|---|---|---|
| 9,966,649 B2 | 5/2018 | Christie |
| 9,996,602 B2 | 6/2018 | Chong |
| 10,019,430 B2 | 7/2018 | Rossi |
| 10,037,582 B2 | 7/2018 | Carey |
| 10,042,514 B2 | 8/2018 | Delacroix |
| 10,055,768 B2 | 8/2018 | Briggs |
| 10,069,940 B2 | 9/2018 | Smith |
| 10,070,185 B1 | 9/2018 | Ho |
| 10,073,794 B2 | 9/2018 | Thomas |
| 10,078,621 B2 | 9/2018 | Luo |
| 10,083,369 B2 | 9/2018 | Tosic |
| 10,089,412 B2 | 10/2018 | Kosarev |
| 10,121,186 B2 | 11/2018 | Isaacson |
| 10,127,531 B2 | 11/2018 | Fu |
| 10,127,595 B1 | 11/2018 | Hipschman |
| 10,152,756 B2 | 12/2018 | Isaacson |
| 10,175,860 B2 | 1/2019 | Marantz |
| 10,176,506 B2 | 1/2019 | Ohara |
| 10,181,147 B2 | 1/2019 | Stoll |
| 10,185,972 B2 | 1/2019 | Churchill |
| 10,198,753 B2 | 2/2019 | Niepert |
| 10,210,559 B2 | 2/2019 | Stoll |
| 10,231,076 B1 | 3/2019 | Stuart |
| 10,235,714 B2 | 3/2019 | Paulrajan |
| 10,242,398 B2 | 3/2019 | Woo |
| 10,248,967 B2 | 4/2019 | Liu |
| 10,268,994 B2 | 4/2019 | Spitz |
| 10,269,021 B2 | 4/2019 | Levy |
| 10,311,499 B1 | 6/2019 | Kim |
| 10,319,013 B2 | 6/2019 | Moring |
| 10,346,895 B2 | 7/2019 | Stoll |
| 10,360,619 B2 | 7/2019 | Nichols |
| 10,373,383 B1 | 8/2019 | Werner |
| 10,380,166 B2 | 8/2019 | Lee |
| 10,380,673 B2 | 8/2019 | Beach |
| 10,395,293 B1 | 8/2019 | Mangtani |
| 10,397,326 B2 | 8/2019 | Thomas |
| 10,402,886 B2 | 9/2019 | Naito |
| 10,402,889 B1 | 9/2019 | Mukherjee |
| 10,403,394 B2 | 9/2019 | Ansari |
| 10,410,234 B1 | 9/2019 | Madden |
| 10,410,272 B1 | 9/2019 | Johnson |
| 10,430,849 B1 | 10/2019 | Hipschman |
| 10,459,919 B2 | 10/2019 | Zhong |
| 10,460,085 B2 | 10/2019 | Fujioka |
| 10,467,287 B2 | 11/2019 | Hume |
| 10,497,037 B2 | 12/2019 | Isaacson |
| 10,503,796 B2 | 12/2019 | Stein |
| 10,504,126 B2 | 12/2019 | Kulkarni |
| 10,506,278 B2 | 12/2019 | Avedissian |
| 10,509,823 B2 | 12/2019 | Murata |
| 10,511,580 B2 | 12/2019 | Isaacson |
| 10,521,837 B1 | 12/2019 | Mossoba |
| 10,534,511 B2 | 1/2020 | Garcia |
| 10,536,414 B2 | 1/2020 | Dye |
| 10,565,562 B2 | 2/2020 | Saha |
| 10,579,602 B2 | 3/2020 | Wang |
| 10,580,049 B2 | 3/2020 | Graylin |
| 10,580,056 B2 | 3/2020 | Stoll |
| 10,594,870 B2 | 3/2020 | Satyavolu |
| 10,614,313 B2 | 4/2020 | Catalano |
| 10,621,653 B2 | 4/2020 | Isaacson |
| 10,643,266 B2 | 5/2020 | Isaacson |
| 10,650,358 B1 | 5/2020 | Edwards |
| 10,664,793 B1 | 5/2020 | Rehn |
| 10,671,931 B2 | 6/2020 | Bansal |
| 10,678,878 B2 | 6/2020 | Li |
| 10,679,269 B2 | 6/2020 | Wang |
| 10,701,127 B2 | 6/2020 | Spitz |
| 10,706,456 B2 | 7/2020 | Goodwin |
| 10,726,472 B2 | 7/2020 | Isaacson |
| 10,748,206 B1 | 8/2020 | Cooper |
| 10,775,254 B2 | 8/2020 | Hipschman |
| 10,776,847 B1 | 9/2020 | Comar |
| 10,789,631 B2 | 9/2020 | Spitz |
| 10,803,506 B2 | 10/2020 | Kim |
| 10,832,310 B2 | 11/2020 | Isaacson |
| 10,846,112 B2 | 11/2020 | Smith, III |
| 10,852,151 B2 | 12/2020 | Butts, III |
| 10,860,949 B2 | 12/2020 | Shamsi |
| 10,866,646 B2 | 12/2020 | Thomas-Brigden |
| 10,872,193 B2 | 12/2020 | Lu |
| 10,885,496 B2 | 1/2021 | Sonone |
| 10,909,586 B2 | 2/2021 | Avedisssian |
| 10,922,737 B2 | 2/2021 | Guo |
| 10,963,915 B2 | 3/2021 | Madden |
| 10,977,319 B2 | 4/2021 | Bright |
| 11,004,092 B2 | 5/2021 | MacIlwaine |
| 11,004,096 B2 | 5/2021 | Thomas |
| 11,004,139 B2 | 5/2021 | Isaacson |
| 11,017,163 B2 | 5/2021 | Wang |
| 11,030,633 B2 | 6/2021 | Reid |
| 11,042,898 B2 | 6/2021 | Mehanian |
| 11,049,164 B2 | 6/2021 | Agrawal |
| 11,068,892 B2 | 7/2021 | Buis |
| 11,068,969 B2 | 7/2021 | Wilson |
| 11,080,777 B2 | 8/2021 | Isaacson |
| 11,087,356 B2 | 8/2021 | Blom |
| 11,113,082 B2 | 9/2021 | Redin |
| 11,132,749 B1 | 9/2021 | Konson |
| 11,138,375 B2 | 10/2021 | Avedissian |
| 11,144,906 B2 | 10/2021 | Girish |
| 11,151,507 B2 | 10/2021 | Kang |
| 11,170,003 B2 | 11/2021 | Wu |
| 11,205,207 B2 | 12/2021 | Jain |
| 11,227,315 B2 | 1/2022 | Briggs |
| 11,250,493 B2 | 2/2022 | Isaacson |
| 11,265,912 B2 | 2/2022 | Hopen |
| 11,269,905 B2 | 3/2022 | Fitzpatrick |
| 11,270,064 B2 | 3/2022 | Collart |
| 11,270,323 B2 | 3/2022 | Gerard |
| 11,282,131 B2 | 3/2022 | Isaacson |
| 11,308,544 B2 | 4/2022 | Akbarpour |
| 11,314,746 B2 | 4/2022 | Kadam |
| 11,315,174 B2 | 4/2022 | Walker |
| 11,316,688 B2 | 4/2022 | Ansari |
| 11,317,159 B2 | 4/2022 | Crossley |
| 11,363,106 B2 | 6/2022 | Nelluri |
| 11,367,282 B2 | 6/2022 | Wang |
| 11,386,452 B1 | 7/2022 | Ostrover |
| 11,386,454 B1 | 7/2022 | Ripper |
| 11,423,463 B2 | 8/2022 | Belcher |
| 11,435,873 B1 | 9/2022 | Sharma |
| 11,436,654 B2 | 9/2022 | Coldwell |
| 2002/0128981 A1 | 9/2002 | Kawan |
| 2003/0055723 A1 | 3/2003 | English |
| 2004/0103197 A1 | 5/2004 | Benson |
| 2004/0254891 A1 | 12/2004 | Blinn |
| 2005/0212752 A1* | 9/2005 | Marvit ............... G06F 3/0346 |
| | | 345/156 |
| 2006/0041485 A1 | 2/2006 | Tarvydas |
| 2006/0064411 A1 | 3/2006 | Gross |
| 2006/0143094 A1 | 6/2006 | Kohout |
| 2006/0224973 A1* | 10/2006 | Albrecht ............. G06F 9/451 |
| | | 715/760 |
| 2007/0050406 A1* | 3/2007 | Byers ................. G06F 16/48 |
| 2007/0073599 A1 | 3/2007 | Perry |
| 2007/0106570 A1* | 5/2007 | Hartman ......... G06Q 30/0605 |
| | | 705/26.8 |
| 2007/0112647 A1* | 5/2007 | Borders ........... G06Q 30/016 |
| | | 705/26.81 |
| 2007/0294240 A1* | 12/2007 | Steele ............... G06F 16/338 |
| | | 707/999.005 |
| 2008/0005118 A1 | 1/2008 | Shakib |
| 2008/0071763 A1 | 3/2008 | Ferrenq |
| 2008/0103879 A1 | 5/2008 | Armstrong |
| 2008/0140523 A1 | 6/2008 | Mahoney |
| 2008/0167946 A1 | 7/2008 | Bezos |
| 2008/0201304 A1 | 8/2008 | Sue |
| 2008/0240490 A1 | 10/2008 | Finkelstein |
| 2008/0244721 A1* | 10/2008 | Barrus ............. G06F 21/6254 |
| | | 726/9 |
| 2009/0006375 A1 | 1/2009 | Lax |

(56) References Cited

U.S. PATENT DOCUMENTS

| | | | |
|---|---|---|---|
| 2009/0037284 A1* | 2/2009 | Lewis | G06Q 20/202 705/16 |
| 2009/0037291 A1* | 2/2009 | Dawson | G06Q 30/0603 705/27.2 |
| 2009/0089260 A1 | 4/2009 | Chong | |
| 2009/0094104 A1 | 4/2009 | Anuar | |
| 2009/0132347 A1* | 5/2009 | Anderson | G06Q 30/02 705/30 |
| 2009/0157450 A1 | 6/2009 | Athsani | |
| 2009/0157479 A1* | 6/2009 | Caldwell | G06Q 30/0631 705/26.7 |
| 2009/0172746 A1 | 7/2009 | Aldrey | |
| 2009/0196465 A1 | 8/2009 | Menon | |
| 2009/0234849 A1 | 9/2009 | Erera | |
| 2009/0235196 A1 | 9/2009 | MacBeth | |
| 2009/0271735 A1 | 10/2009 | Anderson | |
| 2009/0300476 A1 | 12/2009 | Vogel et al. | |
| 2009/0307003 A1 | 12/2009 | Benyamin | |
| 2010/0114654 A1* | 5/2010 | Lukose | G06Q 30/00 705/14.54 |
| 2010/0131347 A1* | 5/2010 | Sartipi | G06Q 20/02 705/17 |
| 2010/0145861 A1 | 6/2010 | Law | |
| 2010/0280909 A1 | 11/2010 | Zhang | |
| 2010/0309512 A1 | 12/2010 | Onoda | |
| 2011/0282785 A1* | 11/2011 | Chin | G06Q 20/108 705/42 |
| 2011/0289598 A1 | 11/2011 | Chastagnol | |
| 2012/0136756 A1* | 5/2012 | Jitkoff | G06F 16/9577 715/224 |
| 2012/0191569 A1* | 7/2012 | Shah | G06Q 30/0613 705/26.41 |
| 2012/0203776 A1 | 8/2012 | Nissan | |
| 2012/0221437 A1* | 8/2012 | Yoo | G06Q 20/209 705/26.41 |
| 2012/0233020 A1* | 9/2012 | Eberstadt | G06Q 30/06 705/26.1 |
| 2012/0233170 A1 | 9/2012 | Musgrove et al. | |
| 2012/0284130 A1 | 11/2012 | Lewis | |
| 2012/0310738 A1* | 12/2012 | Mesaros | G06Q 50/01 705/14.57 |
| 2013/0006733 A1* | 1/2013 | Fisher | G06Q 50/01 705/14.12 |
| 2013/0006816 A1* | 1/2013 | Nuzzi | G06Q 50/01 705/27.1 |
| 2013/0013427 A1* | 1/2013 | Gonsalves | G06Q 30/02 705/27.1 |
| 2013/0066987 A1* | 3/2013 | Levinson | G06Q 10/10 709/206 |
| 2013/0066988 A1* | 3/2013 | Levinson | G06Q 10/107 709/206 |
| 2013/0076788 A1* | 3/2013 | Ben Zvi | G06F 16/5854 345/633 |
| 2013/0110582 A1* | 5/2013 | Starkman | G06F 16/335 705/7.29 |
| 2013/0151311 A1* | 6/2013 | Smallwood | G06Q 50/01 705/7.31 |
| 2013/0231969 A1 | 9/2013 | Van Pelt | |
| 2013/0262315 A1 | 10/2013 | Hruska | |
| 2013/0290149 A1* | 10/2013 | Rashwan | G06Q 30/0641 705/27.1 |
| 2013/0297425 A1 | 11/2013 | Wallaja | |
| 2013/0307765 A1* | 11/2013 | Li | G06F 3/017 345/156 |
| 2013/0316647 A1 | 11/2013 | Leica | |
| 2013/0325980 A1 | 12/2013 | Ohayon | H04L 51/066 709/206 |
| 2013/0339229 A1* | 12/2013 | Li | H04L 12/1453 705/40 |
| 2013/0345959 A1 | 12/2013 | Van Os | |
| 2014/0006129 A1* | 1/2014 | Heath | G06Q 30/02 705/14.23 |
| 2014/0019367 A1* | 1/2014 | Khan | G06Q 20/425 705/16 |
| 2014/0025521 A1* | 1/2014 | Alsina | G06Q 30/0601 705/26.1 |
| 2014/0052683 A1* | 2/2014 | Kirkham | G06N 5/04 706/46 |
| 2014/0095583 A1* | 4/2014 | Houle | G06F 40/197 709/203 |
| 2014/0122367 A1* | 5/2014 | Godsey | G06Q 10/08 705/330 |
| 2014/0136334 A1* | 5/2014 | Lagassey | G06Q 30/0277 705/14.69 |
| 2014/0136990 A1* | 5/2014 | Gonnen | H04L 51/18 715/752 |
| 2014/0189514 A1* | 7/2014 | Hilliard | G06Q 30/06 715/719 |
| 2014/0207462 A1 | 7/2014 | Bangalore | |
| 2014/0229339 A1 | 8/2014 | Massiere | |
| 2014/0249968 A1 | 9/2014 | MacKinnon | |
| 2014/0279266 A1* | 9/2014 | Lampert | G06Q 30/0629 705/26.64 |
| 2014/0285435 A1* | 9/2014 | Bezos | G06F 1/1626 345/156 |
| 2014/0297362 A1* | 10/2014 | Kumar | G06Q 30/0253 705/7.29 |
| 2014/0297537 A1* | 10/2014 | Kassemi | G06Q 20/3674 705/67 |
| 2015/0052061 A1* | 2/2015 | Anderson | G06Q 20/409 705/44 |
| 2015/0058191 A1 | 2/2015 | Khan et al. | |
| 2015/0088655 A1* | 3/2015 | Taylor | G06Q 30/0264 705/14.61 |
| 2015/0088686 A1* | 3/2015 | Glassberg | G06Q 50/01 705/26.8 |
| 2015/0095238 A1 | 4/2015 | Khan et al. | |
| 2015/0142640 A1* | 5/2015 | Kneen | G06Q 20/22 705/39 |
| 2015/0149168 A1* | 5/2015 | Stent | G10L 15/22 704/235 |
| 2015/0317698 A1* | 11/2015 | Kalyvas | G06Q 30/0214 705/14.66 |
| 2015/0324789 A1 | 11/2015 | Dvorak | |
| 2015/0348017 A1 | 12/2015 | Allmen | |
| 2016/0042362 A1 | 2/2016 | Rowe | |
| 2021/0241256 A1 | 8/2021 | Caldwell | |

OTHER PUBLICATIONS

Hutter, Katja, et al. "The impact of user interactions in social media on brand awareness and purchase intention: the case of MINI on Facebook." Journal of product & brand management 22.5/6 (2013): 342-351. (Year: 2013).*

U.S. Appl. No. 61/884,926, filed Sep. 30, 2013, Khan et al. (Corres. to 2015/0095238).

U.S. Appl. No. 61/989,107, filed May 6, 2014, Khan et al. (Corres. to 2015/0095238).

U.S. Appl. No. 62/002,721, filed May 23, 2014, Khan et al. (Corres. to 2015/0095238).

U.S. Appl. No. 62/004,182, filed May 28, 2014, Khan et al. (Corres. to 2015/0095238).

www.travelocity.com, [online], Mar. 21, 2012 [retrieved from archive.org on Aug. 26, 2014].

www.tripadvisor.com, [online], Mar. 15, 2012 [retrieved from archive.org on Aug. 26, 2014].

Van den Poel, D. and W. Buckinx, "Predicting online-purchasing behavior," Jul. 28, 2004 [online]. European Journal of Operational Research 166 pp. 557-575. Retrieved from www.sciencedirect.com.

Hudaib, Adam Ali Zare. "E-payment Security Analysis in Depth." International Journal of Computer Science and Security (IJCSS) 8.1 (2014): 14. (Year: 2014).

Luttge, Karsten, "E-charging api: outsource charging to a payment service provider", Intelligent Network Workshop, 2001, IEEE. (Year: 2001).

Kraft, Ben; Mannes, Eric; and Moldow, Jorday, "Security research of a social payment app.", 2014 (Year 2014).

(56) References Cited

OTHER PUBLICATIONS

Constantinides, Efthymios, "Foundations of Social Media Marketing", Procedia-Social and Behavioral Sciences, 148 (2014), pp. 40-57. (Year: 2014).

Malaga, Ross A. "Search engine optimization—black and white hat approaches." Advances in Computers, vol. 78, Elsevier, 2010, 1-29. (Year: 2010).

Naylor, Rebecca Walker, Cait Poynor Lamberton, and Patricia M. West. "Beyond the "like" button: The impact of mere virtual presence on band evaluations and purchase intentions in social media settings." Journal of Marketing, 76.6, (2012): 105-120. (Year: 2012).

Lopes, Christian T., et al., "Cytoscape Web: an interactive web-based network browser," Bioinformatics—Applications Note, vol. 26, No. 18, pp. 2347-2348, 2010.

Dogru, Tarik, et al., "Blockchain Technology & its Implications for the Hospitality Industry," Boston University, Winter 2018.

Miraz, Mahdi H., et al., "Analysis of Users' Behaviour and Adoption Trends of Social Media Payment Platforms," 2019 International Conference on Computing, Electronics & Communications Engineering (iCCECE), IEEE, 2019.

Google Wallet Make Your Phone Your Wallet by Google—YouTube, https://www.youtube.com/watch?v=qRVQTQIJV0g, 238 views—Feb. 18, 2013, retrieved on Feb. 11, 2022.

GV-R ISIS Mobile Payment Demo—YouTube, https://www.youtube.com/watch?v=VIfRHCDTzql, 913 views—Aug. 8, 2012, retrieved Feb. 11, 2022.

Introducing the Isis Mobile Wallet™—YouTube, https://www.youtube.com/watch?v=id_Wrt-lyFU, 326 views—Dec. 6, 2013, retrieved Feb. 11, 2022.

ISIS Mobile Wallet for Verizon—Wave to Pay (Hands-on Video)—YouTube, https://www.youtube.com/watch?v=djHgUhOqTYI, 21,654 views—Jan. 12, 2013, retrieved Feb. 11, 2022.

Dileep Kumar and Yeonseung Ryu, "A Brief Introduction of Biometrics and Fingerprint Payment Technology", International Journal of Advanced Science and Technology, vol. 4, Mar. 2009, pp. 25-28, (Year: 2009).

Nicholas Akinyokun and Vanessa Teague, "Security and Privacy Implications of NFC-enabled Contactless Payment Systems", Proceedings of the 12th International Conference on Availability, Reliability and Security, 10 pages, (Year: 2017).

Meng, Jian and Ye, Liang. "Secure mobile payment model based on WAP," 2008 4th International Conference on Wireless Communications, Networking and Mobile Computing, IEEE, 2008. (Year: 2008).

Spaid, Brian I., and Flint, Daniel J., "The meaning of shopping experiences augmented by mobile internet devices," Journal of Marketing Theory and Practice, vol. 22, No. 1, 2014, pp. 73-90. (Year: 2014).

https://www.facebook.com/business/news/Discover-and-Buy-Products-on-Facebook-Test, dated Jul. 17, 2014, downloaded Jun. 21, 2023.

https://www.nbcnews.com/tech/social-media/facebook-adds-buy-button-online-purchases-n158731, Facebook Adds 'Buy' Button for Online Purchases, Social Media, Source: Reuters, dated Jul. 17, 2014, downloaded Jun. 21, 2023.

Hutter, K et al., (2013). "The impact of user interactions in social media on brand awareness and purchase intention: The case of MINI on facebook." The Journal of Product and Brand Management, 22(5), 342-351. Doi:https://doi.org/10.1108/JPBM-05-2013-0299. (Year: 2013).

Gupta, Alok et al., "An empirical study of consumer switching from traditional to electronic channels: A purchase-decision process perspective." International Journal of Electronic Commerce, 8.3 (2004): 131-161. (Year: 2004).

Lipsman, Andrew et al., "The power of the "like": How brands reach (and influence) fans through social-media marketing", Journal of Advertising research, 52.1 (2012): 40-52. (Year: 2012).

Sawant, Ms Rupali, et al., "The RFID based smart shopping cart", International Journal of Engineering Research and General Science, 3.2 (2015): 275-280. (Year:2015).

Andzulis, James Mick, et al., "A review of social media and implications for the sales process," Journal of Personal Selling and Sales Management, 32.3 (2012): 305-316. (Year:2012).

Anderson, Matt, et al. "Turning "Like" to Buy social media emerges as a commerce channel", Booz and Company Inc., 2.1 (2011), 102-138. (Year: 2011).

Baek, Hyochan, et al., "A model for detecting cryptocurrency transactions with discernible purpose", 2019 Eleventh International Conference on Ubiquitous and Future Networks (ICUFN), IEEE, 2019. (Year: 2019).

Hajli, M. Nick. "A study of the impact of social media on consumers", International Journal of Market Research, 56.3 (2014) 387-404. (Year: 2014).

Ondrus, Jan and Yves Pigneur. "An assessment of NFC for future mobile payment systems." International Conference on the Management of Mobile Business (ICMB 2007). IEEE, 2007. (Year: 2007).

Lohse, Gerald L., and Peter Spiller. "Internet retail store design: How the user interface influences traffic and sales." Journal of Computer-Mediated Communication 5.2 (1999) (Year: 1999).

\* cited by examiner

1741 — TRANSMITTING, FROM THE FIRST SITE AND VIA A BROWSER SHOPPING CART APPLICATION PROGRAMMING INTERFACE ASSOCIATED WITH A BROWSER, FIRST DATA ASSOCIATED WITH A FIRST PRODUCT VIEWED BY A USER NAVIGATING ON THE FIRST SITE USING THE BROWSER, WHEREIN THE USER DID NOT PURCHASE THE PRODUCT ON THE FIRST SITE, WHEREIN THE BROWSER CAN MANAGE STORING THE FIRST DATA IS STORED SUCH THAT IT IS ACCESSIBLE TO THE BROWSER

1743 — AFTER THE USER NAVIGATES AWAY FROM THE FIRST SITE TO A SECOND SITE, RECEIVING A PACKAGE OF DATA FROM A BROWSER PAYMENT REQUEST APPLICATION PROGRAMMING INTERFACE FOR PROCESSING A PAYMENT OF THE FIRST PRODUCT, WHEREIN THE PACKAGE OF DATA IDENTIFIES THE FIRST PRODUCT AND COMPRISES PAYMENT DATA ASSOCIATED WITH THE USER FOR PROCESSING THE PAYMENT FOR THE FIRST PRODUCT, WHEREIN THE USER CONFIRMED PAYMENT FOR THE FIRST PRODUCT VIA AN INTERACTION WITH A BROWSER PAYMENT INTERFACE PRESENTED AS PART OF USING THE BROWSER APPLICATION PROGRAMMING INTERFACE TO MANAGE A PURCHASE OF A SECOND PRODUCT ON THE SECOND SITE

*FIG. 17M*

YOUR ORDERS

Orders | Open Orders | Digital Orders | canceled Orders —3502 | 🔍 search all orders | Search Orders 40 orders placed | in past 6 months ◁▷ | By Media | By List —3506 | By Merchant | Delivery Date —3504

ORDER PLACED: June 20, 2016
By: Google
TOTAL $23.26
Merchant: Joes Sporty Goods
SHIP TO: Thomas M. Isaacson ▽
ORDER # 102-5578980-8043447
Order Details  Invoice

—3508

Track package
Return or replace items
Leave package feedback
Write a product review
Archive order Delivered Wednesday
Your package was left in the mailbox.

2 of Crosman AirSoft 5,000 ct Bottle White Heavy AirSoft BBs (20grams)
Sold by: Hello.com LLC
$10.97
Buy it Again —3510

ORDER PLACED: June 4, 2016
By: Facebook
TOTAL $127.86
Merchant: Walmart
SHIP TO: Thomas M. Isaacson ▽
ORDER # 102-7086474-0013842
Order Details  Invoice Track package
Return or replace items
Leave package feedback
Write a product review
Archive order Delivered June 6, 2016
Package was left on an outside porch Umarex Walther 2262020 15 Rounds P99 Air Soft Pistol, 6mm Black
Sold by: Amazon.com LLC
$63.65
Buy it Again Crossman 12gm CO2 Powerlet (60-Count)
Sold by: Walmart.com LLC
$34.99
Buy it Again

SYSTEM AND METHOD FOR PROVIDING A SOCIAL MEDIA SHOPPING EXPERIENCE

PRIORITY CLAIM

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which is a continuation-in-part of U.S. patent application Ser. No. 15/678,664, filed Aug. 16, 2017, which is a continuation of U.S. patent application Ser. No. 15/678,378, filed Aug. 16, 2017, which is a continuation-in-part of U.S. patent application Ser. No. 15/602,868, filed May 23, 2017, which is a continuation of U.S. patent application Ser. No. 15/600,599, filed May 19, 2017, which is a continuation of U.S. patent application Ser. No. 15/600,388, filed May 19, 2017, which is a continuation-in-part of U.S. patent application Ser. No. 15/586,999, filed May 4, 2017, which is a continuation-in-part of U.S. patent application Ser. No. 15/269,451, filed Sep. 19, 2016, now U.S. Pat. No. 9,767,520, issued Sep. 19, 2017, which is a continuation of U.S. patent application Ser. No. 15/263,066, filed Sep. 12, 2016, which is a continuation of U.S. patent application Ser. No. 15/018,954, filed Feb. 9, 2016, now U.S. Pat. No. 9,734,526, issued Aug. 15, 2017, which is a continuation of U.S. patent application Ser. No. 14/853,579, filed Sep. 14, 2015, now U.S. Pat. No. 9,396,491, issued on Jul. 19, 2016, which is a continuation of U.S. patent application Ser. No. 14/822,368, filed Aug. 10, 2015, now U.S. Pat. No. 9,292,871, issued on Mar. 22, 2016, which is a continuation of U.S. patent application Ser. No. 14/672,876, filed Mar. 30, 2015, now U.S. Pat. No. 9,361,638, issued on Jun. 7, 2016, which claims priority to U.S. Provisional Patent Application No. 61/973,287, filed Apr. 1, 2014 and also is a continuation-in-part of U.S. patent application Ser. No. 14/230,864, filed 31 Mar. 2014, now U.S. Pat. No. 9,430,794, Issued on Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which is continuation-in-part of U.S. patent application Ser. No. 15/678,664, filed Aug. 16, 2017, which claims priority to U.S. Provisional Patent Application No. 62/475,578, filed Mar. 23, 2017, U.S. Provisional Patent Application No. 62/450,900, filed Jan. 26, 2017, U.S. Provisional Patent Application No. 62/399,761, filed Sep. 26, 2016.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which claims the benefit of U.S. Provisional Patent Application No. 62/560,261, filed Sep. 19, 2017, the contents of which are herein incorporated by reference in their entireties.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which is a continuation-in-part of U.S. patent application Ser. No. 15/263,057, filed Sep. 12, 2016, which is a continuation of U.S. patent application Ser. No. 15/018,954, filed Feb. 9, 2016, now U.S. Pat. No. 9,734,526, issued Aug. 15, 2017, which is a continuation of U.S. patent application Ser. No. 14/853,579, filed Sep. 14, 2015, now U.S. Pat. No. 9,396,491, Issued on Jul. 19, 2016, which is a continuation of U.S. patent application Ser. No. 14/822,368, filed Aug. 10, 2015, now U.S. Pat. No. 9,292,871, Issued on Mar. 22, 2016, which is a continuation of U.S. patent application Ser. No. 14/672,876, filed Mar. 30, 2015, now U.S. Pat. No. 9,361,638, Issued on Jun. 7, 2016, which claims priority to U.S. Provisional Patent Application No. 61/973,287, filed Apr. 1, 2014 and also is a continuation-in-part of U.S. patent application Ser.

No. 14/230,864, filed 31 Mar. 2014, now U.S. Pat. No. 9,430,794, Issued on Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which claims priority to U.S. Provisional Patent Application No. 62/569,841, filed Oct. 9, 2017, the contents of which are herein incorporated by reference in their entireties.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/849,219, filed Apr. 15, 2020, which is a continuation of U.S. patent application Ser. No. 16/721,970, filed Dec. 20, 2019, which is a continuation of U.S. patent application Ser. No. 16/573,411, filed Sep. 17, 2019, which is a continuation of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 15/018,939, filed Feb. 9, 2016, which is a continuation of U.S. patent application Ser. No. 14/853,579, Sep. 14, 2015, now U.S. Pat. No. 9,396,491, issued Jul. 19, 2016, the contents of each of which are incorporated herein by reference in their entirety.

This application is a continuation of U.S. patent application Ser. No. 17/391,481, which is a continuation of U.S. patent application Ser. No. 16/884,416, filed Jul. 14, 2020, which is a continuation of U.S. patent application Ser. No. 16/420,785, filed May 23, 2019, which is a continuation-in-part of U.S. patent application Ser. No. 16/176,425, filed Oct. 31, 2018, which claims the benefit of U.S. Patent Provisional Application No. 62/725,855, filed Aug. 31, 2018, the contents of which are incorporated herein by reference in their entirety.

This application is a continuation of U.S. patent application Ser. No. 17/391,481, which is a continuation of U.S. patent application Ser. No. 16/884,416, filed Jul. 14, 2020, which application is a continuation of U.S. patent application Ser. No. 16/420,785, filed May 23, 2019, which is a continuation-in-part of U.S. patent application Ser. No. 16/279,685, filed Feb. 19, 2019, and also claims the benefit of U.S. Provisional Application No. 62/809,170, filed Feb. 22, 2019, U.S. Provisional Application No. 62/812,153, filed Feb. 28, 2019, and U.S. Provisional Application No. 62/818,440, filed Mar. 14, 2019, the contents of which are herein incorporated by reference in their entireties.

This application is a continuation of U.S. patent application Ser. No. 17/391,481, which is also a continuation of U.S. patent application Ser. No. 16/801,513, filed Feb. 26, 2020, which is a continuation of U.S. patent application Ser. No. 16/675,341, filed Nov. 6, 2019, which is a continuation of Ser. No. 16/573,411, filed Sep. 17, 2019, the contents of each of which are herein incorporated by reference in their entireties.

RELATED APPLICATIONS

This application is related to U.S. patent application Ser. No. 14/853,545, filed Sep. 14, 2015, now U.S. Pat. No. 9,373,138, issued on Jun. 21, 2016, U.S. patent application Ser. No. 15/018,432, filed Feb. 8, 2016, now U.S. Pat. No. 9,449,338, issued on Sep. 20, 2016, U.S. patent application Ser. No. 15/018,457, filed Feb. 8, 2016, now U.S. Pat. No. 9,466,081, issued on Oct. 11, 2016, U.S. patent application Ser. No. 15/018,497, filed Feb. 8, 2016, now U.S. Pat. No. 9,436,957, issued on Sep. 6, 2016, U.S. patent application Ser. No. 15/018,514, filed Feb. 8, 2016, now U.S. Pat. No. 9,524,519, issued on Dec. 20, 2016, U.S. patent application Ser. No. 15/018,934, filed Feb. 9, 2016, U.S. patent application Ser. No. 15/018,923, filed Feb. 9, 2016, now U.S. Pat. No. 9,430,790, issued on Aug. 30, 2016, the contents of each of which are incorporated herein by reference in their entirety.

BACKGROUND

1. Technical Field

The present disclosure relates to systems and methods of providing a purchasing experience on a social networking entity in which when a posting, such as a posting transmitted through the social networking entity to followers of a posting entity or a posting otherwise presented in connection with the posting entity to viewers on the social networking entity site or application, has a correlation to a product database or catalog from the posting entity. An initiation of a purchasing process for a product in the posting occurs within the social networking entity and in some cases without transitioning the user to a posting entity site. The payment process can also occur for the product via a messenger application operated by the social networking entity and without transitioning the user to the posting entity site.

2. Introduction

This application addresses a number of issues related to simplifying and managing on-line purchases of products and navigation between sites on the Internet. Other issues addressed herein and covered in related patent applications are also discussed. This introduction should not be considered as admitting that any concept discussed in this section is prior art.

One problem experienced through on-line purchasing experiences include how to easily transition a user from a search engine or browser site to a destination site. For example, prior to the present application, advertisements presented in online environments, when interacted with, would transition users to a merchant site for browsing and for the selling process to occur. One effort to make this transition smoother was provided by the omnikey feature of Safari. Using the omnikey extension, Safari users type in an indicator of what alternate site they want to use for processing input. For example, in an input field, a user would type "amazon headphones" which would instruct the algorithm processing the input to search amazon.com for "headphones" and return the result. The problem with this approach is that it is likely easier to click on an amazon tab and type "headphones" in the Amazon search field than it is to type "amazon" at the beginning of the search. Further, to tell the search engine that the user is not wanting to transition to amazon, the user would have to begin the search with an exclamation point "!" which forces regular searches. Using such a feature where most user input is likely involving regular searches according to the default search engine, might require the user to often begin searches with "!". Thus, this effort at transitioning users to other sites is still problematic.

An additional issue relates to the long-standing problem of requiring users to enter payment data such as credit card information and a user address when making a purchase. Some sites like Amazon.com provide a "one-click" purchasing option but those simplifications are only available in the controlled Amazon.com environment. For all other merchants, users must enter payment data which is cumbersome. Mobile users outside of Amazon.com still need to include and enter in much information which reduces the number of conversions when making purchases on line either on the desktop or mobile devices. Thus, although the Internet and use of applications downloaded on user devices have been around for many years, there were still many instances of friction particularly in the context of a user being at one site or in one app and wanting to make a purchase or perform a task which was ultimately handled by a separate site or a separate application.

SUMMARY

The present disclosure provides a number of innovations to address the various issues as set forth above. What is needed in the art is an improved approach is to reducing friction particularly in the context of transitions from a search entity to a merchant site or from a social networking entity to a merchant site.

Disclosed are a number of different innovations which improve these types of transitions and interactions. The disclosure provides a number of solutions which reduce friction and enable users to perform operations such as entering in a product search at a generalized search entity and being able to purchase the product while remaining within the generalized search entity and without transitioning to a merchant site that does not store the user's payment data. Solutions disclosed include the ability of a social networking entity to receive a posting from a merchant related to a product and when a database of products from the merchant is correlated with the social networking entity, a user is enabled to purchase the product while remaining within the social network entity and without transitioning to the merchant site which again would not likely have stored the payment data for a user. New APIs and processes are introduced which can be built into browser's or software modules configured on user devices for interacting with downloaded applications which will reduce friction in these payment processes in new ways. Users now will be able to land on any merchant site that is programmed to interact with such APIs and make easy and frictionless purchases without even needing to share payment data with the respective sites. One benefit of this approach is that users do not need to spread their credit card data across multiple different sites each of which can be a security risk.

One disclosed solution involves handling payments on-line and in-apps. An example device related to providing an in-app solution can include a processor and a computer-readable storage device storing instructions which, when executed by the processor, cause the processor perform operations including receiving a request from an application operating on the device, at a software module configured to receive payment requests and manage the receipt and transmission of authorized payment data to the application through the use of an application programming interface that defines a protocol for communicating data between the application and the software module. The request can be associated with a payment to the application, or for any kind of data that one desires to send securely such as healthcare data, personal data, photos, media, blockchain-based data, cryptocurrency data, and so forth. The request can include information about the payment or the requested data. The software module transmits to the application, via the application programming interface, the authorized data. The software module can be configured access, based on the request, the authorized data for the potential purchase (in the purchase scenario) from the device or the software module and can also interact with a network-based entity to ultimately generate the authorized data transmitted to the application. The software module represents a novel approach to providing data to an application in ways the enable a simple and easy payment process without the user needing to manually enter payment data. The software module in the case of an app may or may not control or manage a user interface for viewing the application, but rather can be programmed to manage the flow of payment or other types of communications.

For an on-line approach, an example device includes a processor, a computer-readable storage device and a browser, the browser configured to operate on the device, and the browser including an application programming interface that defines a protocol for communicating data between a site and the browser. The device includes an authorization mechanism that receives authorization input from a user of the device in connection with a potential purchase on the site, wherein the browser, when operating via the processor, is configured to perform operations including receiving, from the site, a request associated with the potential purchase, wherein the request includes information about the potential purchase and transmitting, based at least in part on the authorization input from the user via the authorization mechanism and according to the protocol, authorized payment data to the site, wherein the authorized payment data for the potential purchase is from one of the browser, the computer-readable storage device or a network-based entity separate from the device. The authorization mechanism can include software for asking for a security code via a user interface or a component such as a fingerprint reader or facial recognition component as part of the device.

The term "browser" as used herein can also include a module that manages a user interface which can be any number of types of interfaces, such as for browsing the Internet, viewing an application, or a user interface used to manage a payment process, such as the interface shown in FIGS. 17G and 17K, for example. The interface in one aspect presents information for the user to interact with that is local and is not a window or interface to a URL of a network server, which would be used for authorization a payment on the network server.

Solutions disclosed herein also include how users can choose from among a number of different payment methods when making a purchase. Users often have different accounts, credit cards, debit cards, and so forth.

An aspect of this disclosure also relates to transitioning from a generalized search field to a product purchase and how an improved process can be implemented to achieve a shorter business value chain. Normally, users are transitioned via advertisements to merchant sites which can require payment credentials so ultimately make a payment. This disclosure includes several features to improve this process. For example, a method includes presenting an input field on a user interface of a generalized search entity, wherein the generalized search entity processes data using a generalized search engine that indexes and searches both merchant sites and non-merchant sites, receiving user input in the input field and determining, via a processor, whether the user input corresponds to a product in a product database or catalog to yield a determination. When the determination indicates that the user input does not correspond to the product in the product database or catalog, the method includes presenting a search result including a non-merchant site, receiving a search interaction associated with the non-merchant site and transitioning to the non-merchant site. When the determination indicates that the user input does correspond to the product in the product database or catalog, the method includes presenting a purchase-related search result, wherein the purchase-related search result is configured such that when a user interacts with the purchase-related search result and confirms a purchase associated with the purchase-related search result, the generalized search entity initiates a purchasing process for the product.

From a merchant site standpoint, the method can include providing a database of products from a merchant to a generalized search entity and receiving a payment for a product from the merchant. The product can have been purchased on-line by a user. In this scenario, the product is found and purchased by the user on-line by operations performed by the generalized search entity in which the operations include presenting an input field on a user interface, wherein the generalized search entity processes data using a generalized search engine that indexes and searches both merchant sites and non-merchant sites, receiving user input in the input field, and determining, via a processor, whether the user input corresponds to a product in the database of products to yield a determination. When the determination indicates that the user input does not correspond to the product in the database of products, the method includes presenting a search result including a non-merchant site, receiving a search interaction associated with the non-merchant site and transitioning to the non-merchant site. When the determination indicates that the user input does correspond to the product in the database of products, the method includes presenting a purchase-related search result for the product, wherein the purchase-related search result is configured such that when a user interacts with the purchase-related search result and confirms the payment associated with the product in the purchase-related search result, the generalized search entity initiates a purchasing process for the product.

Other improvements are disclosed herein as well for managing purchases. One method includes determining, at a site, whether a user accessing the site via a browser (1) is using one of a first browser or a second browser or (2) can make a purchase using a first account or a second account to yield a determination. Thus, the browser type used can be detected or the account type of the user can be detected.

When the determination indicates that the user is using either the first browser or can make the purchase using the first account, the method includes (1) presenting a dynamically modified first buy button which is associated with the first account, (2) transmitting, to the first browser and via a first browser payment request application programming interface that defines a protocol for communicating information about purchases between the site and the first browser, a first payment request having first information associated with the purchase from the site for the user and (3) receiving, from the first browser and via the first browser payment request application programming interface, first data associated with the first account, the first data being associated with processing the purchase.

When the determination indicates that the user is using either the second browser or can make the purchase using the second account, the method includes (1) presenting a dynamically modified second buy button which is associated with the second account, (2) transmitting, to the second browser and via a second browser payment request application programming interface that defines a protocol for communicating information about purchases between the site and the second browser, a second payment request having second information associated with the purchase from the site for the user and (3) receiving, from the second browser and via the second browser payment request application programming interface, second data associated with the second account, the second data being associated with processing the purchase. The first browser and the second browser can be different browser types.

In another aspect, the method disclosed includes determining whether a user interfacing with a site via a browser can make a payment via a first browser payment request application programming interface or a second browser payment request application programming interface to yield a selected browser and a selected browser payment request application programming interface, wherein the selected browser payment request application programming interface defines a protocol for communicating data between a site and the selected browser for managing payments, presenting a dynamically modified buy button that is associated with the selected browser or a user payment account enabled via the selected browser, transmitting, in connection with an interaction with the dynamically modified buy button, a payment request to the selected browser and via the selected browser payment request application programming interface and receiving, in response to the payment request, from the selected browser and via the selected browser payment request application programming interface, payment information at the site. The dynamically modified buy button can be associated with the user payment account. Thus, when a user goes to a site to make a purchase, the buy button can dynamically adjust for the payment service they use.

This case focuses on how to manage multiple accounts in a browser API context. The method includes, in this aspect, receiving, at a browser and via a browser payment request application programming interface that defines a protocol for communicating information about purchases between a site and the browser, a payment request having data associated with a purchase of a product from the site for a user, presenting via the browser or a browser interface, a choice between a first payment method and a second payment method for purchasing the product, wherein the first payment method and the second payment method each include or require one of payment data stored on a user device, payment data stored on a network server, and a payment service, receiving a selection of a payment method from the user of one of the first payment method and the second payment method to yield a selected payment method and, based on the selected payment method, and in response to the payment request, transmitting, from the browser and via the browser payment request application programming interface, data associated with the selected payment method to the site. This is from the standpoint of the browser. The concept can also be covered from the standpoint of the merchant site as well as from the standpoint of a payment processor.

Another solution relates to a credential management application programming interface which enables a site to request via the API user login credentials from either a browser or a network-based entity for simplifying the login process for the user. A method in this regard includes receiving, from a site, at a browser and via a browser credential management application programming interface that defines a protocol for communicating data between the site and the browser for enabling a user to login to the site, a request associated with a login credential required for the site, retrieving, based on the request, user data (from the browser and/or from a network entity) and transmitting, to the site, from the browser and via the browser credential management application programming interface, a response to the request. The response can include login credentials for the user, such as one or more of a username, a password, a code, a fingerprint, and iris scan, or any combination of this data which can enable the site to log the user in without the user needing to manually type in or enter such data. Embodiments of this credential management API can be from the standpoint of the browser, from the standpoint of the site, or the standpoint of a network entity which stores the user data. One or more APIs could also be used in combination to ultimately achieve the passing of login credentials to the site via an API.

Another solution disclosed herein relates to how to manage a payment process with a payment processor through multiple application programming interfaces with the browser. A method in this regard includes receiving input from a user indicating a desire to purchase a product from a merchant site (the input can be a click, voice input as part of a dialog, virtual reality input, or any kind of input) and receiving, based on the input, at a browser and via a first application programming interface that defines a first protocol between the browser and the merchant site, a payment request from the merchant site for payment data of the user for purchasing the product.

In response to the payment request, the method includes communicating, from the browser and via a second application programming interface that defines a second protocol for communicating payment information between the browser and a payment service, a payment request event to the payment service, wherein the payment service can process a payment for the product based on the payment request event. The method includes receiving, at the browser and from the payment service and via the second application programming interface, a confirmation of the payment for the product and communicating, from the browser and via the first application programming interface to the merchant site, the confirmation of the payment for the product. The payment service can be a service like Paypal or the like. The approach enables a common interface between the merchant and a payment service utilizing the browser and several APIs in a new manner.

The first application programming interface can define the first protocol for communicating at least one of payment data and address data between the browser and the merchant site. The second application programming interface can include the second protocol for communicating data associated with payment of the product between the browser and the payment service. The payment request further can include a request for an address of the user. Thus, the payment could be performed by the payment service provider and the address could be provided by the browser through the first API.

The method can further include, based on the payment request, transmitting from the browser and through the first application programming interface, the address of the user to the merchant site for use in delivering the product to the user. The first application programming interface can include a browser payment request application programming interface in that it involves a request from the merchant site for payment data and/or other data about the user. The second application programming interface can be called a payment handler application programming interface in that it more specifically involves payment handling by the payment processor. This aspect of the disclosure can also have embodiments from the standpoint of the merchant as well as from the standpoint of the payment processor.

Another solution disclosed herein relates to how to provide a product purchasing experience within a spoken dialog. An example method in this regard includes receiving, via a messenger application and as part of a dialog between a merchant site and a user, a spoken input from the user, presenting user text associated with the spoken input in the messenger application, responding, as part of the dialog and by the merchant site, to the spoken input with a spoken response, presenting response text associated with the spoken response in the messenger application, and identifying a product the user desires to purchase from the merchant site via the dialog. Based on a spoken buy interaction by the user via the dialog, the method includes receiving, at a browser and via a browser payment request application programming interface, a payment request, from the merchant site, for payment data of the user for purchasing the product and, in response to the payment request, communicating, from the browser and via the browser payment request application programming interface, payment information for the user, wherein the merchant site uses the payment information to process a payment for the product. In any place herein where a browser is described for web-based browsing of sites, the principles could also apply to a software module operating on a mobile device which can communicate with a downloaded application on the device. The appropriate APIs for managing communications and data flow are similar to the site to browser flow using a browser-based API.

The method can include receiving, at the browser and via the browser payment request application programing interface, an address request, from the merchant site, for address data for the user. In response to the address request, the method can include communicating, from the browser and via the browser payment request application programming interface, the address data for the user to the merchant site. The merchant site processes the payment using the payment information. The payment information can include payment account information for the user that the merchant site can use to process the payment for the product. A browser can present the messenger application to the user. The dialog could also be a text dialog as well and not a spoken dialog. The method could also be claimed from the standpoint of the merchant site.

Other innovations include transitioning techniques from a search field to a destination site using a number of solutions, applying a browser/user interface payment request API to turn any web site or app into a "one-click" or fewer click purchasing experience than was traditionally available, as well as other social media innovations address the various issues set forth above, and other issues as well.

Disclosed are a number of different solutions to Internet searching, surfing, and purchasing processes. One aspect of this disclosure applies to multi-site universal shopping carts and particularly presents a solution that is applicable using a modified version of the browser payment request application programming interface implemented by W3C. In one aspect, a method, system or computer readable storage device operates from the standpoint of the browser. The method includes receiving, via a browser shopping cart application programming interface associated with a browser, first data associated with a first product viewed by a user navigating on a first site using the browser, wherein the user did not purchase the product on the first site. The first data such that it is accessible to the browser. This storage can be with the browser, on a user device, or on a network device. The browsing can occur on a first device as well which can include a mobile device, desktop device, voice interface device, or any device that the user can use to search generally for content and make purchases. The method includes presenting a browser payment interface to the user for managing the purchase of the second product, the browser payment interface being associated with a browser payment request application programming interface in which payment data for the user is passed from the browser to the second site through the browser payment request application programming interface. The second site can also be accessed through a separate device which can be a mobile device, desktop device, voice interface device, or any kind of device. The network device can coordinate the universal shopping cart across the various devices used by the user. For example, a search entity can identify a first product put into the shopping cart from a first browser search on a mobile device and then identify the user using a voice instruction on a second device to identify a second product to put into the shopping cart. The user can then purchase both products on either device or at any time. The system can identify the user through voice identification or through other means to connect the items as being part of the same user shopping cart. The voice-based device can already be associated with a particular payment account or can adjust to different payment accounts based on voice identification. For example, a user at home might put a first product in a universal shopping cart from a desktop computer and then go to a friend's house. Through social networking data or speech/voice identification, the user could talk to the voice based device at their friends house, which could confirm their identity by asking "Is this Mary Smith?", at which point the user could add another item to the shopping cart via a voice command and make the purchase of all the items. Social media data or preferences could connect Mary to potentially using her friend's voice-based device for purchases. A separate biometric confirmation could be provided in these scenarios as well to confirm the purchase is from the proper person. In one example, when Mary goes to her friend's house, a voice-based device or other device can identify her through her mobile phone. Geo-location data can also be provided based on Mary's location. Based on this data, a voice-based device through a search entity can be configured to potentially expect that Mary may make a shopping request at her friend's home through the voice-based device. Speech recognition models, speaker identification models, or any other speech related pre-configurations that might need to occur can be initiated or transferred to the local voice-based device. Thus, when Mary says to the voice-based device, "Please add paper towels to my shopping cart," the system can recognize Mary's voice, interpret the speech using a tailored speech recognition model, and respond with "OK Mary, the paper towels are in your shopping cart with the salt and pepper shakers to added yesterday, do you want to check out?".

The method further includes presenting on the browser payment interface information about the first product and processing a payment of both the first product and the second product based on user interaction with the browser payment interface or managed through a search entity that has access to payment credentials. The processing of the payment of both the first product and the second product can occur using first communication between the browser/device and the first site via the browser payment request application programming interface and second communication between the browser/device and the second site via the browser payment request application programming interface. A network-based entity such as a search entity can also coordinate the payment to the various merchants or the single merchant if multiple products are from a single merchant. The difference is that the second site is already communicating with the browser for the payment process of the second product. The user, however, has navigated away from the first site, so a communication back to the first site must identify the product as well as providing payment and/or delivery data to the first site for "reminding" the first site of the previously searched-for product. Processing the payment of both the first product and the second product further can include transmitting, through the browser application programming interface a package of data which enables the first site to process the first purchase of the first product. The package of data can include payment data for the first site to process the payment for the first product and address information associated with the user for the first site to deliver the product. The method can also include receiving a confirmation from the user of the purchase of both the first product and the second product utilizing a same set of object interactions used for purchasing one product via the browser payment interface. In other words, since the user is already in the browser interface for processing the payment for the second product, the method can include utilizing the same "one-click" plus perhaps one fingerprint recognition or CVC code entry, or whatever few steps are utilized for the purchase of the second product, to also process the payment for the first product.

When a network-based entity manages the payment, such as a search entity, the various merchants can receive respective payments and instructions to deliver the products to the user at a specified address. The search entity can charge a fee for the service which can be apportioned to the different merchants if more than one merchant has products in the universal cart. The apportionment can be based on the relative cost of each product from the respective merchant.

Processing the payment for the first product and for the second can include communicating first information via the browser payment request application programming interface to the first site for completing the purchase and delivery of the first product from the first site and communicating second information via the browser payment request application programming interface to the second site for completing the purchase and delivery of the second product from the second site. Receiving the first data associated with a first product viewed by a user navigating on a first site using the browser further can include receiving the first data based on a threshold user interaction associated with the first product. For example, the user may need to put the first product in a shopping cart, or click on a button, or view the product for a period of time to indicate that there might be a purchasing interest.

The method from the standpoint of the first site can include transmitting, from the first site and via a browser shopping cart application programming interface associated with a browser, first data associated with a first product viewed by a user navigating on the first site using the browser, wherein the user did not purchase the product on the first site, wherein the browser can manage storing the first data such that it is accessible to the browser and, after the user navigates away from the first site to a second site, receiving a package of data from a browser payment request application programming interface for processing a payment of the first product, wherein the package of data identifies the first product and can include payment data associated with the user for processing the payment for the first product, wherein the user confirmed payment for the first product via an interaction with a browser payment interface presented as part of using the browser application programming interface to manage a purchase of a second product on the second site. The package of data received at the first site further can include address information for the user for delivery of the first product. The methods can include any communication needed from both the first site and the second site to identify payment methods, communicate shopping cart and payment capabilities of the browser, product data, session data associated with the user's search on the first site, user data, payment data, delivery data, size data, or any other data associated with processing a payment for the first product or aggregating the first product and the second product into the browser payment interface associated with the browser/user interface payment request API such that multiple products from different sites and/or apps can be purchased via a single shopping cart.

When a network-based entity manages the universal shopping cart, the merchants will typically register their products with the entity or register as merchants such that product search results from searches or voice requests via a search engine can be used by the user to put a product in the universal cart. Products can be placed in the cart across multiple devices and from multiple merchants. The search entity, or network-based entity can manage the payment process across the various merchants even when products are placed in the shopping cart from multiple different devices. The devices can all be coordinated as associated with the same account or shopping cart or individual. The coordination can also occur across multiple locations by identifying a user.

Disclosed also is an approach for managing a transition from the first site to a destination merchant site and a deep link state. A method aspect includes receiving an interaction from a user with an object associated with an advertisement for a product or any kind of notice, the advertisement or notice being presented via a first site presented within a browser, and transitioning the user from the first site to a destination merchant site in a deep link state. The transitioning process includes retrieving data from the browser and using the data from the browser to enable the user to transition from the first site to the destination merchant site in the deep link state. The deep link state enables the user to purchase the product via an interaction with a purchase object without manually entering payment account data or user address data. The deep link state can enable a "one click" purchasing experience after the transition from the first site. The data from the browser can be, in one aspect, retrieved via an API between the browser and the destination site or accessed directly. The data can be one or more of payment data, user data, one-click purchasing data, address information, browser settings, cryptocurrency data, and so forth.

The object can be a buy button. The object also can be presented with an advertisement in a newsfeed of the user on the first site, such as a Facebook or Instagram newsfeed. The first site can be any kind of site or application such as a search site, a gaming site, a virtual reality experience, a merchant site, a media site, an audio site, or a social networking site. The interaction with the purchase object on the destination merchant site can be a first interaction via the browser after the interaction with the object. Retrieving data from the browser can occur automatically via a browser payment request application programming interface between the destination merchant site and the browser. The user can continue to shop on the destination merchant site prior to providing the interaction with the purchase object to purchase a different product from the destination merchant site. The data from the browser can be one or more of: payment data, address data, one-click purchasing parameters, user name, login information, registration information, user settings and user profile data. Other data can be used as well to facilitate a one-click purchasing experience.

The disclosure addresses several other issues as well. For example, there is an issue of enabling users to learn more information about a product and ask follow-up questions about the product before completing a purchase. In some cases, a one-click purchase option or buy option may be for a product that requires some additional data such as a size or color or other parameter. The user may have other concerns about delivery, bad publicity, bad reviews, and so forth. In this scenario, a user can be transitioned, based on interacting with an object or otherwise, to a dialog application complete information, resolve user concerns and commit to the purchase. The transition can be within a single site such as Facebook (from an advertisement in a news feed to a messenger application) or it could span a number of sites. For example, transitioning to a Facebook Messenger application (or any dialog application) could help in completing any purchase if the user has questions or needs to make other choices about the product. Thus, the transition at any site and at any stage of the process to a dialog application can occur to help provide further data to the user about a purchase. One example method can include presenting an advertisement with a payment process initiation object. The payment process initiating object can include a link or transition to a dialog application in which the user engages in a dialog about the product/item of discussion and completes the purchase. The transition and discussion is configured such that an easy payment occurs once questions are answered or information is gathered. The browser API can be deployed in any context and at any stage where a purchase might occur. Any user interface, such as a messenger application, can be considered like a "browser" and can be configured to exchange communication with a site to enable the purchasing experience.

In this regard, an example method includes receiving a posting of an item through a social networking site, such that the social networking site receives and transmits posted items from posting entities to receiving entities. When the posting is not associated with a product for purchase in a product database, the method includes transmitting the posting through the social networking site without an option to buy. When the determination indicates that the posting references the product in the product database, and thus indicating a sale-related intent, the method includes transmitting the posting through the social networking site with a payment object or payment initiation object. A payment process initiation object is associated with the product and can include one of a button, a drop-down menu, or a hyperlink. The social networking site receives an interaction associated with the payment process initiation object, the interaction being performed by a user. Based on the purchase interaction, the method includes engaging in a dialog with the user regarding the product as part of a payment process such that at a conclusion of the dialog, the user can complete a purchase of the product. In another aspect separate from the dialog context, the system, based on the payment interaction, can transition the user to destination site in a deep link state, which can be achieved through accessing data stored within the browser. In another aspect, at the destination site, the user can click on a buy object in the destination site can use the browser API to request and retrieve payment information for processing a payment of the product. The product database or inventory can be provided to the social networking site such that the site can have access to product data and enable purchases of products on the social networking site that are found in postings or profiles and to manage the purchase process without leaving the social networking environment.

In yet another aspect of this disclosure, when the user engages in the purchasing interaction, the user can remain at the social networking site and not transition away. The social networking site can store payment data or receive payment data from an API as disclosed herein, and can at least initiate a payment process while on the social media site. This of course can be a social networking entity or social media entity as well such as an app downloaded on the user device. The social media entity can initiate and manage at least part of the payment process such that the merchant only needs to receive the payment and a confirmation of the purchase as well as identification information of the product and the buyer so that the product can be shipped to the buyer. This process reduces friction because the user can remain within the social media entity and not be transitioned away to the merchant site only to engage in a complicated payment process. The payment process can also include a cryptocurrency-based payment process from one participant in the social media entity to another participant in the social media entity. The method can be considered both from the standpoint of a social media entity as well as from the standpoint of the merchant who is selling products through postings to the social media entity.

When the user transitions to a dialogue as part of a payment process, the method can include, as part of the dialog, receiving a purchasing interaction from the user and processing the purchase of the product based on the purchase interaction. Processing the purchase occurs within one of the social networking site, via a payment agent or via an application programming interface between the social networking site and a merchant site selling the product, or between the browser and the merchant site. The social networking site, or the browser, can store payment data for the user to process the purchase. When the purchase occurs via the application programming interface between the social networking site, or the browser, and the merchant site, the social networking site, or the browser, can transmit payment data through the application programming interface such that the merchant site can process the purchase of the product.

The dialog can enable the user to select a parameter associated with the product. Example parameters include one or more of a color, a size, a shape, a configuration, and a technical characteristic. Delivery options, resolving any other concerns, gifting issues, discounts, coupons, and so forth can be managed within the dialog. The payment process initiation object can simply include a buy button or a notice "talk about and buy this item by clicking here". The dialog can be managed between the user and the merchant via a dialog application. Engaging in the dialog can be achieved in one aspect by transitioning to a dialog application that manages the dialog and the purchase of the product.

Another issue identified above addressed in the present disclosure uses objects that are presented when a search begins with a user input field on a first site. The new approach improves the mechanism of transferring the user to a second site. Disclosed is an approach for receiving, via a user interface of a browser, user input in an input field and presenting a first instance of an object in response to the user input. In other words, the object does not show on the user interface until a search or data is entered into the input field. This reduces clutter. The object is configured such that when a user interacts with the object, the user is transitioned to a second site associated with the object, and the user input is filled into a second site input field. The user input is processed at the second site as though the user entered the user input into the second site input field. There is no need for the user to type in "amazon" in the text field to indicate a search at the second site, for example. The input can be analyzed by a system to determine what object to present or can always present alternate search modes that the user can choose from. Referencing the omnikey feature explained previously, the user could add other second sites to transition to, each with its necessary key word that instructs the browser where to transition. The problem with this approach is that users would have to remember key words associated with specific websites. "Amazon" is easy to remember but it is a lot of letters to type in. Users could forget shortcuts (like "wild" for Wikipedia.org), or simply have too many. Thus, the solution disclosed herein eliminates the need to remember specific shortcuts and simplifies the process of transitioning user input from one site to another site through a simple click.

The present disclosure addresses other needs identified above as well. For example, the need to improve the purchasing experience of users on the Internet is addressed herein. Form filling shopping cart purchasing models require too much user input and interaction and reduce the number of conversions by users actually completing the process to make a purchase. Disclosed is an updated browser having a browser payment request application programming interface for communicating payment data between the browser and a site for processing payments of purchases and to reduce the number of user interactions needed for a purchasing process. The method includes receiving, via the user interface, an interaction by a user with an object associated with a site, the interaction indicating a user intent to make a purchase. The method includes receiving, based on the interaction and via an application programming interface, a request from the site for payment data in connection with the purchase and transmitting, to the site and via the application programming interface, the payment data. The payment data confirms the purchase or can be used to process or deliver a product associated with the purchase. The payment data can include any type of payment data necessary for processing the purchase. It can include an account number, a tokenized version of payment data, address information, preferences, shipping choices, other user data, and so forth.

This application includes the disclosure of buy buttons and APIs for enabling a "one-click" type of purchasing experience that eliminates the purchasing process from requiring overly burdensome form-filling. In another aspect of this disclosure, an API for communicating data between a browser or agent and a merchant site for pre-filling in fields to make a purchase is disclosed. The process can further be refined to not just include filling in pre-set fields but further streamlined to reduce the need for interactive steps for the user. The API approach can provide the merchant site with data that can be more advanced than merely automatically filling in a form that is the same form a user would manually have to input. A method includes presenting an input field on a user interface of a generalized search entity, such that the generalized search entity processes data using a generalized search engine. The search engine indexes and searches both merchant sites and non-merchant sites and receives user input in the input field. The user input includes a text-based query, and the search engine correlates the text-based query with a product database of products for sale from merchants to produce a correlation. Based on the correlation, a determination is made that the user input is associated with one of a search intent and a purchase intent. When the determination indicates the search intent, a search result is presented that includes a non-merchant site. A search interaction associated with the non-merchant site is received, and a transition to the non-merchant site is performed. When the determination indicates the purchase intent, a purchase-related search result including a buy option associated with the user input is presented. The purchase-related search result is configured such that when a user interacts with the purchase-related search result and confirms a purchase via interacting with the buy option, the generalized search engine (or some other payment service) participates in processing a purchase of an item, and receiving an interaction associated with the purchase-related search result.

The method can further include receiving an interaction with the buy option and managing the purchase of the item based on payment information stored at the generalized search entity (or some other payment service). Delivery of the item is handled via a merchant site separate from the generalized search entity. The generalized search engine (or browser) participates in processing the purchase of the item by receiving a request for payment data from a merchant site via an application programming interface and transmits the payment data to the merchant site such that the merchant site can process the purchase of the item. A browser, through the browser API, can also coordinate with a separate payment service that can generate tokens or perform some part of the process and provide information back to the browser, for communicating back to merchant site via the browser API.

In another aspect, a method includes presenting an input field on a user interface, such that the input field is associated with processing data using a generalized search engine. The search engine indexes and searches both merchant sites and non-merchant sites and receives user input in the input field The user input includes a text-based query and the search engine correlates the text-based query with a product database of products for sale from merchants. A correlation is made and the search engine determines, via a processor and based on the correlation, if the user input is associated with one of a search intent and a purchase intent. When the determination indicates the search intent, a search result is presented that includes a non-merchant site, a search interaction associated with the non-merchant site is received and transitioning to the non-merchant site is performed. When the determination indicates the purchase intent, a purchase-related search result associated with the user input is presented that is based on an interaction from a user with the purchase-related search result which results in a presentation of a buy button. A purchase of an item associated with the buy button is managed, at least in part, by receiving a request for payment data through an application programming interface. Based on the request, the payment data is transmitted via the application programming interface to a merchant site for processing the purchase of the item. The method can include transitioning to the merchant site associated with the buy button based on the interaction from the user, such that the merchant site processes the purchase of the item based on the payment data transmitted to the merchant site.

Yet another aspect relates to processing from the browser or search engine side when communicating payment data via an API to a merchant site. The method includes presenting, on a graphical user interface, a presentation, the presentation being received from a site over a network. It includes receiving, via the user interface and from a user, an interaction with the presentation and receiving, via an application programming interface, a request from the site for payment account data for the user. The method also includes transmitting, to the site and via the application programming interface, the payment account data, such that the payment account data can be used to populate payment fields for payment processing on the site, or perform more advanced processing using the payment data to simplify the user interaction. The presentation can include one of a product for purchase and a service. The method can include enabling the site to process a payment for an item or a service using the payment account data for the user to make the payment. The graphical user interface can be associated with a browser or an application. In one aspect, the API communicates data between the site (merchant site) and a browser that can store the payment account data for the user.

The method can further include updating the presentation to include a buy option which is configured, based on a confirmation from the user, to enable the site to utilize the payment account data received through the API to process a purchase of an item or service without a need of the user to fill in the payment fields on the site. The browser or other agent communicating via the API can also provide the graphic for a "pay now" type of button to integrate with site graphics. The payment account data can further include one or more of address data for the user, a payment account number, an expiration date, a security code, a cardholder name and shipping instructions for the user. In one aspect, the payment account data can include multiple methods of payment such as multiple credit cards, for example.

The request through the API can further include one or more of a supported payment method for the site, a total amount value for a purchase, items that may be displayed for purchase, shipping options, payment modifiers, a request for a user email address, a request for a user's phone number, and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface, and receiving, via the network and from a user, an interaction with the presentation. The method includes transmitting, to an application programming interface, a request for payment account data of the user, and receiving, at the site and via the application programming interface, the payment account data and populating payment data fields associated with a payment process with the payment account data for the user to yield populated payment data fields. The site can process a payment for an item or a service using the payment account data for the user. The payment data can be a tokenized packet of data for a one-time payment process. The API can coordinate data between the browser and the site such that the browser stores the payment account data for the user. Upon receiving a confirmation from the user to make a purchase of an item or service associated with the presentation, the method can include processing a payment for the product using the received data.

The method can further include, upon receiving the payment account data, updating the presentation to include a buy option which is configured, based on a confirmation from the user, to enable the site to utilize the payment account data to process a purchase of a product or service without a need of the user to manually fill in the payment data fields on the site. The payment account data can further include one or more of a token, an address data for the user, a payment account number, an expiration date, a security code, a cardholder name and shipping instructions for the user. The presentation can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network and receiving, via the user interface and from a user, an interaction with the presentation The method includes receiving, via an application programming interface, a request from the site for payment account data for the user, autopopulating a payment field associated with the presentation with the payment account data and transmitting, to the site and via the application programming interface, the payment account data. The site can process a payment based on the payment account data for the user. The method can also include receiving a confirmation from the user of a purchase after the payment field is autopopulated.

The present disclosure also addresses the problem of managing a user account of on-line purchases, such as is offered by amazon.com, but expanded to correlate purchases across multiple different venues such as google.com, facebook.com, amazon.com, and so forth. Disclosed is an API that is designed to communicate information to and from multiple different types of sites that currently manage purchases individually. For example, the API can receive conversion data about purchases made through the Google Buy Button (Purchases on Google), the Facebook Buy Button, the Pinterest Buy Button, Amazon.com purchases, and so forth. A purchase management engine receives the various pieces of data and correlates the data into a single user account that spans multiple purchasing platforms. The account can be stored on a blockchain as well. The present approach differs from the amazon.com user account because it is maintained only for purchases made at amazon.com and not for purchases from different types of sites such as google.com or facebook.com. However, the correlated data could be transmitted to an interface like amazon.com such that in addition to all of the advantages of managing purchases on amazon.com, the user account of amazon.com can also be populated with google.com, facebook.com, instagram.com, pinterest.com, youtube.com, and other site purchases. The complete correlated data can actually be presented at any of the traditional non-merchant sites, individual merchant sites (like walmart.com or widgets-.com) as well as amazon.com. The way the correlated data is presented is user-definable as it is with amazon.com with addition of features that are not contemplated by amazon-.com, such as which buy button site the purchase was made from. Thus, the user interface could present products purchased from google.com, followed by facebook.com, followed by amazon.com.

Thus, the concepts disclosed herein expand upon the "micro-moments" from involving just the moment when someone wants to make a purchase but expands the opportunity. The micro-moment a user may experience can perhaps be a desire to cancel a purchase made the previous day, or to buy another product like the one purchase yesterday. In this manner, through a drop-down menu on a site, or positioned near a buy option, the system can present a "user account" access option which enables the user to access their account and make further changes/modifications. Because of the correlation and the API, the modifications can easily be made across all platforms. Thus, on one user interface, the user could buy an extra widget in addition to the one purchased via Google's Buy Button the day before, as well as cancel the purchase made that morning via Facebook.

Because the purchases described above are often coordinated between a site (Google, Facebook, Apple Pay, Android Pay, Samsung Pay, etc.), the merchant (which may or may not handle the payment but typically handles the delivery) and a delivery service (Federal Express, UPS, etc.) the present API will interface with multiple different sites and service providers as necessary to coordinate whatever action needs to take place. Thus, one or more of the following actions can be divided up on either side of the API between the purchase management engine, a merchant, amazon.com (or the like), and the buy button site (Google, Facebook, Instagram, etc.): (1) processing an additional purchase; (2) canceling a purchase; (4) implementing a buy it again choice; (5) providing a return of the product; (6); writing a product review; (7); tracking a package; (8) altering a delivery schedule; (9) changing a payment method; (10) lodging a complaint; and (11) transmitting a notification of any action taken to one or more of the buyer, a recipient, a merchant, a delivery provider, a buy button site, and more.

The product management engine can coordinate the various actions that need to take place across the different platforms. Thus, if a user, via a Facebook site, goes to their user account and cancels a purchase, the product delivery engine can coordinate the various actions such as notifying the merchant, the site, the delivery service, and so forth, to implement the action.

In another aspect, knowledge and data that is gained through management of products via the product management engine can be provided further to advertisers who can then more intelligently provide advertisements or buy button options through any of the sites. Additionally, data can be shared with friends or associates through social networking sites if a user permits it. For example, data about what size or color of an item a particular person usually purchases for themselves can be shared for future gifting opportunities. Friends or associates on social networks can use the product management engine to determine if a user has purchased a particular item in the past to avoid duplicating an item as a gift. For example, a user can query the engine to determine if his friend Bob has purchased any Lego sets in the past year. A decision to purchase a Lego set as a gift for Bob can be made after the query results are received.

The "account button" from which a user can access the user account can also be presented creatively to the user. For example, when a buy button is presented as disclosed herein, a "manage purchases" or the like can be presented as well. Such a button can also be offered one or more layers into the process. For example, often when a buy option is interacted with, the user is presented with more details about a product, information about the merchant selling the product, and an opportunity to buy through the buy option (using purchase account information stored elsewhere from the merchant site as disclosed herein). At this stage (after interacting the buy option but before actually converting into a complete purchase), the "manage purchases" option can be presented as the user is known to be in the mode of considering a purchase and they may want to check/manage their purchase history. Information from their purchase account can also be used to perhaps tailor the advertisements or presentation of the response to their interaction with the buy option.

Other innovations disclosed herein include a cross site shopping cart that utilizes a browser API for storing shopping cart entries across multiple website for making aggregated purchases. This approach can reduce, for example, three different purchases across three different sites and/or apps, each of which might use a separate one-click purchasing approach via the browser/user interface payment request API, into an aggregated single one click purchasing process using a combination of a browser shopping cart API and the browser/user interface payment request API.

Yet another innovation includes applying the browser/user interface payment request API in other contexts such as virtual reality, media viewing, and so forth. Any user interface can be considered a browser and the basic structure and protocols of the browser/user interface payment request API can also be implemented in other scenarios such that one click purchasing opportunities can be made available.

It is noted that all the discussion herein about browser APIs for communicating with sites can also be applied in terms of the basic functionality to a software module that is programmed to interface with an application on a user device. In one aspect, the browser application programming interface provides communication between a browser and a site outside of the visual experience of using the browser. In other words, payment data or other data can be passed to the site without the user seeing an input field or typing the data in. In the app scenario, a browser might not be used to view the app as the visual aspects of the experience are built into the application itself. In that case, a software module that may or may not control some aspects of a visual experience with the application can be programmed to perform all of the functionality disclosed herein with respect to payments, clothing or body models, etc. The application communicates with the software module in the same or similar basic way as the site communicates with the browser in that scenario.

Any concept disclosed herein for passing payment information can also be applicable to any other type of information that one can authorize to be sent, such as health care information, body shape information, personal information, pictures, media, documents, and so forth. The payment mechanisms can be also utilized to authorize transmission of any kind of data from one device to any other device.

BRIEF DESCRIPTION OF THE DRAWINGS

FIG. 17M illustrates a method embodiment from the standpoint of a site;

FIG. 35 illustrates another example of an account interface for the purchase manager;

DETAILED DESCRIPTION

Figure 1:
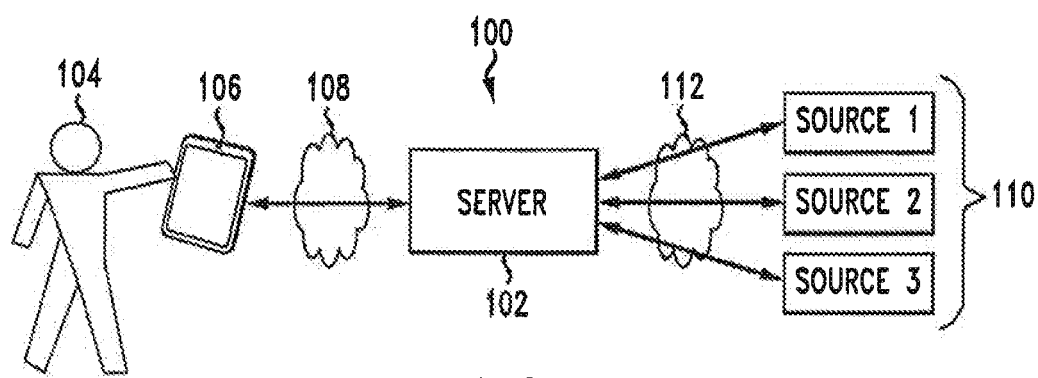
FIG. 1 illustrates a system architecture.

The following disclosure describes a number of different innovations related to simplifying online purchases, simplifying navigation on the Internet, providing a unified input search field, providing a browser payment request application programming interface for improved purchasing experiences, and improving social media networks, as well as other innovations. Accordingly, the disclosure will step from one innovation to another and any individual feature can be utilized in connection with any other feature or example.

Various examples of the disclosure are described in detail below. While specific implementations are described, it should be understood that this is done for illustration purposes only. Other components and configurations may be used without parting from the spirit and scope of the disclosure. When specific method examples are discussed, the various steps of the method examples can be implemented in different orders, combinations, or permutations, including additional steps, or excluding specific steps.

A first innovation that is discussed is the concept of a unified input search field which improves searching functionality on the Internet. A system, method and computer-readable storage devices are disclosed which unify access to multiple websites or other information sources such that a user only needs to visit one location, and utilize one input search field to achieve a number of different potential results such as performing a search or purchasing a product. That one location can be a web site, a search bar in a web browser, an application on a desktop, laptop, smartphone, tablet, or other mobile device, etc. Rather than navigating to a website to perform a search in the context of that website, a user can instead navigate to or open a generalized search field. The search field can provide access to a search engine that crawls and indexes other websites at a large scale, such as the search engines provided by Google™, Yahoo™, or Bing™. In one example, "at a large scale" can mean crawling and indexing at least 25,000 different domains. The search field can be applied to larger or smaller crawling domains. Thus, the generalized search engine can provide a primary function of serving results in response to search queries, while simultaneously providing a secondary function of identifying searches that may indicate a user's intent to make a purchase and providing quick and easy access for the user to act on that intent.

Via the generalized search field, the system can implicitly or explicitly process and analyze the input from the user and the resulting context. The system can also analyze, based on a corpus of existing context for the user, such as recently viewed or opened web pages and recent actions the user has performed on the computing device. Recent actions can include calendar information for the user, location data, recent purchases or other transactions, social networking data including posts, messages sent to friends, birthdays of friends, videos viewed on YouTube and so forth. The system can incorporate, as a data source, any information that can provide direct or indirect context for understanding or processing the input. For example, previous search history or purchasing history can provide direct context, while social media posts of friends of the user can provide indirect context.

Thus, the user goes to the website second, after the search is entered. This approach reduces the number of interactions, starting when the user opens a browser or application, to get to a webpage to make a purchase or a webpage of search results.

In another aspect, drop-down or drop "up" menus provide a much more rich opportunity for processing options such as one-click purchases or searching particular websites such as eBay® using the text input as search data. These drop-down or drop "up" menus can be based on the location of the search input box, a search button, or some other element in the user interface. Selectable objects can be presented in a first instance after users enter input, and the object can be presented anywhere on the user interface. In yet another aspect, the generalized search field can still provide 'traditional' search results from one or multiple search sources, but can present, in addition to the traditional search results, one-click actions that the user can use, for example, to make a purchase directly from the listing of search results.

In another aspect, the system can take into account such data as weather conditions, capability of delivery infrastructure to perform as expected, product availability, predictive analysis of delivery or other capabilities, and make decisions regarding how to present different types of advertisements. For example, if there is a snow storm and delivery is likely to be delayed, the system may be adjusted to not present one-click or any certain type of advertisement as the user experience may not be what is expected. When triggering or data point changes, the system can return to sending that advertisement type in response to user input. Dynamic algorithms can be applied to determine when to present a certain set of advertisements in response to a generalized search and that match or correlate to any number of factors.

The present disclosure overcomes the above-indicated deficiencies in current search implementations by providing a unified search field that enables a user to provide user input and achieve, in very few steps, one of a set of goals, such as completing a purchase, executing a search, executing a program, or interacting with an online service. The user can provide the user input as text, or in any other suitable form including multimodal input, gesture input, voice input, etc. When the disclosure refers to "input text" or "text" from the user, it is understood that the input can be provided as text or via some other input modality. The system can process the user input using traditional options such as a web search, but additionally, the system can process the user input to identify, present, and/or execute purchasing options or more focused searching options on other websites. The system can present these options in a tag cloud or drop-down or drop up or drop sideways menus as the flexibility of the processing of the user input expands. Purchase related search results might be partially presented with the user making selections to view more of the search results including tailored results which can be purchased without leaving the search engine environment or the search entity environment. In other words, the user is not transitioned to a merchant site but can view and purchase the in an advertisement all within a search entity environment using payment data stored with the search entity.

The basic concept according to a first example is illustrated below. Assume that an example website www.one-search.com includes a user interface with an input field or search field. The input field can be a text input field or can be a voice input field that utilizes speech recognition to populate the field with text from recognized speech, for example. The field can be a browser search field. The field is not just a search field but is a more generic input field from which multiple functions can be performed based on a determined intent of the input provided by the user. The search field is different from other search fields in how the www.one-search.com search field processes input. Usually, a person goes to a webpage, then searches, or chooses a search website, and then the search field is conditioned with a particular website context for searching. In this disclosure, the search context is open when the user enters data into the generalized input field. There is no presumption or setting that it will be a Google search, or an Amazon search. The resulting context will be dependent on an analysis of the input. The user interface can include a number of different search or processing buttons, each of which can expand the types of processing to perform on the input text. Different types of the buttons can include a Google search button, an Amazon search button, an Amazon one-click purchasing button, and an Apple.com purchasing button. The system can establish and provide the various button types in advance. Alternatively, a user can set up a collection of personalized buttons for tasks that the user desires or expects to perform with some regularity. The system can generate and present these buttons based on general search and activity trends of users, current promotions, advertisers paying for placement, and so forth. In place of or in addition to buttons, as the user types input into the field, the system can present "peeks" into various webpages which can be destinations for the users whether it is a search result, a purchase, an auction, or any other website destination. In this regard, rather than go to the website first, and then enter a search into a search field, this disclosure focuses on entering data in a general input field and then going to the website, or making the purchase, and different ways of processing that more improved input. In one aspect, an object is presented only after user starts to type in data in an input field. Introducing objects in the first instance, such as in a drop-down menu, after the user starts to type can reduce the clutter on the user interface and provide multiple options to be selected in a menu which would not be feasible to present on the user interface prior to the user entering input.

It is presumed, such as in the case of Amazon or an auction web site, that when the user navigates to one-search.com, that user information, debit/credit card information, address information, etc., is stored in a user profile and available, as in the case of a registered user at Amazon.com. For example, as part of a registration or enrollment process, the user can establish an account with one-search-.com, and authenticate or provide credentials to link the one-search.com account with accounts at other websites. So, as part of creating an account with one-search.com, the user can provide credentials for Google.com, Amazon.com, ebay.com, newegg.com, thinkgeek.com, and cheaperthandirt.com. Alternatively, the user can 'link' the accounts without providing credentials. For example, the user can authorize Amazon to share all or part of the user's information associated with his or her Amazon profile without providing the Amazon credentials to one-search.com. The link or correlation can also include a product inventory database from a merchant to the search entity for coordinating purchases from search inquiries while remaining within the search entity environment.

Then, when the user performs searches at one-search-.com, the system can use the existing linked accounts to generate one-click actions, or one-function (speech, gesture, multimodal input, etc.) actions. For example, one-search- .com can perform a purchasing action when the user interacts with a presented buy option. The user can then manage linked accounts via a user portal or user management interface, to link additional accounts, update credentials, remove linked accounts, or manage which portions of the linked accounts are shared with one-search.com. Some websites may not require a linked account, but can still be incorporated into the one-search.com search field. This can be accomplished by processing a payment for an item associated with that merchant via the one-search.com registered account and enabling the merchant to handle the delivery. Some e-commerce sites allow purchases with a guest account, in which case a one-search.com action can include navigating to the e-commerce site, adding a desired item to the cart, providing sufficient information about the user, such as payment information, a delivery address, etc., to complete the purchase. In another example, some websites, such as a search engine, can be enhanced when linked to an account, but do not require a linked account. In these situations, the user can decide whether to link an existing account with the search engine for processing purchases, or whether to use the search engine without a linked account.

The one-search.com website can inspect and use browser cookies from other sites to glean user data, glean search history, or any other information stored in or made available via cookies. User payment and address information, as well as any other type of data, can be stored in a browser or capable of being accessible by a browser. The system can, for example, use a session cookie to determine that a user has or had an active session with a particular website, and can use information in the session cookie to construct a URL for a one-click page to execute a purchase in response to user provided input. Alternatively, the system can use the live session to navigate the website, add a desired item to a shopping cart, populate payment and shipping information on behalf of the user, and present to the user the final stage in the checkout process so the user can simply click once on a "submit order" button, or hit "enter" in the one-search.com unified input field to complete the purchase. In this way, the number of steps from search to purchase (or from search to performing some other action), is drastically reduced. While many of the examples provided herein discuss making a purchase, the principles disclosed herein can be applied to other, non-purchase transactions as well. For instance, in much the same way that the system can navigate to a website, populate a shopping cart with an item, and fill in shipping and payment information on behalf of the user, the system can also navigate to some other web site for a result that requires a set of information to be provided. If the user enters the text "Why did my credit score just drop?" in the input field, the system can identify one of the major credit reporting bureaus, a third-party credit report aggregation service, or a free credit report site. The system can automatically provide the necessary information, on behalf of the user, to get to the credit score information, and present that page as a potential result or as an option in response to the user input. Another example can include a user inputting the text "blood sugar" in the input field. The system can automatically log in to an established healthcare related user account such as Microsoft HealthVault, and return blood sugar levels from recent lab reports to the user as a potential result in response to the user input. Many similar tasks on the World Wide Web require navigation from one page to the next to the next, and input in response to various questions. The one-search.com system can shorten or automate the input required from the user to navigate through these series of web pages to obtain a desired piece of information, a desired action, or a desired outcome.

FIG. 1 illustrates a system architecture 100 that enables a user 104 to input information into a one search system such that the time required for a user to navigate through a series of webpages to complete an online purchase is reduced. The user can interact with a one search server 102, or with a browser interface, via any computer or electronic device such as a smartphone 106. Once the user inputs information for searching via the device, the information is transmitted 108 to the one search server. The server can then transmit 112 the user input to a variety of websites 110, such as Amazon, Wal-mart and Target, for example. Each of the sources 110 can perform a query or lookup to search for the user input within its website and can return information related to the user input such as the price of an item, to the server. In a similar manner, the server can return information related to the input back to the user, so the user can make a quicker, more informed decision about a specific item to purchase, for example.

Figure 2A:
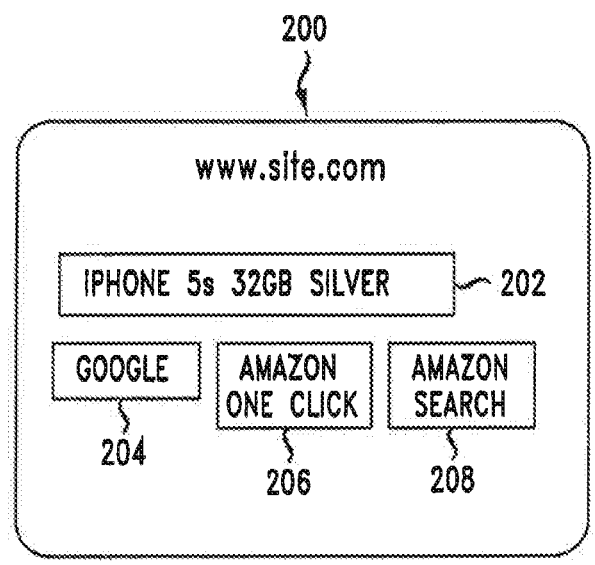
FIG. 2A illustrates an example search field.

FIG. 2A depicts an example search or input field. In this initial example, the user enters a term in the input field 202 of one-search.com 200, such as "iPhone 5S 32 GB silver." The search field can be on any site or can be a browser search field. At this point, the user can click on any number of options for processing the input, such as a Google search 204, an Amazon.com one-click purchase button 206, or an Amazon.com search button 208. In this example, the user clicks on the Amazon.com one-click purchasing button 206. Thus, from this field, the system receives that input, processes the input, and can execute a purchase, just as though the user had navigated through Amazon.com to an iPhone 5S, having 32 GB of storage, and a silver color, and had just clicked on the one-click purchase button. However, in this first example, the user did not need to navigate to Amazon.com but rather was able to make a one-click purchase from a separate website, namely the one-search.com website, or a browser interface. In one aspect, the user does not even need to click a particular button and can instead simply hit "enter" as the user would to execute a normal search request. From that, the system can analyze the text input to determine if a probability of the user desiring to make a one-click purchase is above a certainty threshold, and the system can then process an "enter" input as a request to execute a purchase.

The system can process the input according to the button clicked, as though the user entered the text into an input directly at Amazon.com or Google.com and simply clicked search. If the user clicked a Google search 204, then the system would return search results from Google, but could similarly provide search results from Bing, Yahoo, or some other search engine. In one aspect, the system can transfer the user to Google.com, cause a search to be performed using the user's search input, and present the results as though the user had initially done the search at Google.com. In another aspect, the system can generate a URL at google.com as if the user had performed the search using the user's search input, and open that URL at google.com for the user. If the user selects a one-click purchase 206, then the system processes a purchase and delivery of the item through Amazon.com as though the user had navigated via Amazon.com to the item and made the purchase. In other words, the functionality of the "enter" button can be modified (dynamically, and several times) based on an analysis of the user input. Based on a variety of factors, the initial default might be a purchase context, but after the user begins entering data, the context may change to a web search, and then finally when the user is finished entering input, the "enter" button may cause processing associated with mapping, or simply a purchase context.

Figure 18A:
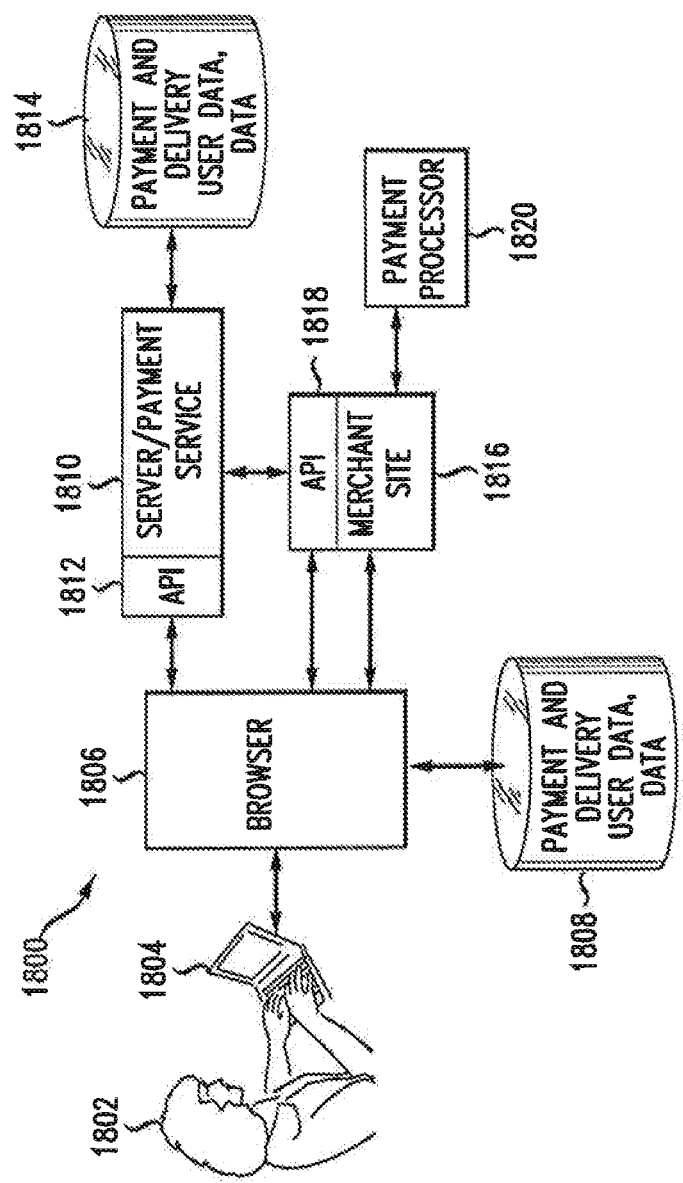
FIG. 18A illustrates an example architecture for pre-populating a merchant shopping cart and use of the browser API.

If the user selects an Amazon.com search 208, then the system returns a view of the search results on Amazon.com for that phrase. In other words, the user could be transferred to Amazon.com, logged into their account or joined into an existing session for the account, and presented with a screen which is the equivalent (or essentially or functionally equivalent) of the state as though the user had searched Amazon.com for "iPhone 5S 32 GB silver." In another aspect, the system will access data stored within the browser to facilitate the transition from the search field to Amazon.com in a deep link state, such that the user can simply click on the one click purchasing button and purchase the item. From that state, the user could peruse the returned list of items and then perhaps choose an item, at which point the user could "one-click" purchase an iPhone. Transitioning a user deep into a separate site preprocessed to a certain state can be called a deep link. This is where a user is not transferred to the top level, or home page, of a website (such as to www.amazon.com or www.merchant.com). Instead, the transition is preprocessed such that the user is taken to a deeper portion of the site such as a second or a third level of a website. One example of a transition to a lower level, or deeper portion in a website is www.merchant.com/products/hats/greenhat. The user is transitioned to a fourth level within the website instead of the top level, or home page. In this case, the user can more quickly complete a purchase. As is shown in FIG. 18A, data (payment data, user data, one-click settings, address data, registration data, etc.) from a browser 1806 can be accessed as part of the transition to enable the landing on the merchant site 1816 in the deep link state such that the next interaction can be a single click interaction.

Indeed, in one example, the system can redirect the user to Amazon.com (or navigate to Amazon.com on behalf of the user) in the same manner as if the user had started at Amazon.com and entered the search terms. In this case, the algorithm of one-search.com would receive the search input, receive the desired instruction from the user (by clicking on the Amazon.com search button) and transition the user to Amazon.com. User registration information or web browsing state information stored in a cookie or elsewhere or sent via XML can also be read or transferred such that the user is logged into their Amazon.com account in the transition. Data can be stored with one-search.com or with a browser or app. The result of this process is that when the user opens a browser to start browsing the Internet, the system enables the user to initiate any number of searches, purchases, or other actions via a single, unified input field that requires fewer clicks or user input to get to search results, or to make a purchase.

Further, the standpoint of a search field on a browser and how the system transitions the user from the browser search field to a destination site, the browser functionality can be native to the browser itself, or may be enhanced or enabled by a plug-in or extension developed in connection with the destination site. For example, Wikipedia, eBay, Amazon, a search engine, and so forth might develop in connection with the browser entity an extension in which through an API or some other means the browser communicates data to the destination site in order to facilitate the transition. For example, Amazon.com may provide an installable extension of an Amazon assistant which, when installed with a browser, enables the communication of user information to Amazon.com such that the functionality described herein can be achieved. The extension enhances the functionality of the browser and becomes part of the browser. The browser performs the process of receiving user input in an input field, and based on the user input, presents a drop-down menu (or object somewhere on the interface) in which a first instance of a selectable object is presented, the object being associated with a destination site. Upon receiving an interaction with the object from the user, the user is automatically transitioned to the destination site. The destination site is preconfigured to a state which is the equivalent of the user having entered the user input into a destination site input field. The user is transitioned to that resulting state at the destination site. In some cases, like with Amazon.com, information can be communicated to the destination sites if the user is also logged in to the destination site and if appropriate, the state can be configured such that a product associated with user input can be presented. The user can click on a "buy now" button and make a purchase without interrupting user interaction with the destination site. In another aspect, some interaction may be necessary in order to arrive at a purchasing state. The amount of interaction at this state is less than would typically be necessary to manually transition to the destination site, such as Amazon.com, entering the user input into the amazon.com input field, hitting enter, and continuing to interact with the site to arrive at a purchase opportunity.

Thus, in one aspect, the disclosure relates to a browser or browser functionality that is enhanced by an extension installed on the browser. Furthermore, the claims can address the functionality both from the standpoint of the browser as well as the standpoint of the destination site receiving the transition from the browser and preprocessing the user input so as to receive the transitioning user at the destination site in the proper state. This also applies to a software module and an app downloaded on a user device as well.

Another example simplifies the process even further. Typically, as described above, a website such as Google or Amazon has a single-purpose entry so that the user can click "enter" and the text is processed as a Google web search or as an Amazon product search. In this second example, the search field has multiple possible ways of processing the text in the input field. An algorithm analyzes and processes the input to determine or predict the meaning or user intent of the text input. Via such an analysis, the system determines what type of search or action the user wants. Thus, if the user types "Olympics" into a search field at one-search.com or on the browser, the system can determine via the algorithm that the user is unlikely to want to search Amazon.com or eBay for "Olympics" because the Olympics is not something available for purchase. However, if the user enters additional information, such as "Olympics windbreaker Sochi 2014," the system can revise the determination of intent, because the additional information input by the user is now directed to a specific item or category. Thus, the system can continuously evaluate or determine intent of the user based on the text or data provided. The system can instantaneously reevaluate intent as each character or word is input, for example. The system can anticipate intent and cache or pre-load results or actions for a number of anticipated intent scenarios based on context information for the user and the data provided so far. Thus, if the anticipated intent (i.e., Google search versus an Amazon purchase versus an Amazon search) turns out to be correct, the system already has the components in place or the pages fetched to service that intent. In this case, the user will receive results related to their input faster.

The system may utilize any type of data such as user profile data, one-click purchasing settings, social media data, historical data, time of year (holidays are coming, summer time, a friend or family member has a birthday in one week, etc.), to make this determination. In this example, the system may determine when the user clicks on "enter" that the user intended a Google search for that input. For example, if the user types "Paul Revere American revolution," the system can detect that the semantic content and the structure of the text is more closely aligned with an informational search instead of a product search and can route the search text through a search engine. In that case, the primary results as though the user had entered a Google search are presented. The one-search.com results screen could also provide alternates in case the user actually desired a Bing search or did want an Amazon.com search. If the user enters that information into a search field at one-search.com, the system can cause the browser to navigate to google.com, upon the user pressing enter, as if the user had searched at Google originally for the search string. Alternatively, the system can load the corresponding Google search page in an iframe or other embedded mechanism in a webpage, or as a new tab or window. The system can utilize any of a number of various transitions to present the Google search page to the user, even though the user initiated the search at the one-search.com page.

On the other hand, if the user enters "Revere tea kettle," the system can analyze the input text to determine that the user likely desires to make a purchase. Thus, when the user hits "enter," the system can route the search to Amazon or another suitable e-commerce site or can immediately execute a one-click purchase from Amazon based on the search. Upon determining that the user intent is a purchase, the system can perform an analysis of or rely on a previously performed analysis of the user's purchasing habits or other purchase related information such as lowest price, lowest price plus shipping, availability, shipping time or method, user membership in a shopping club, whether the user has an account with an online merchant, and so forth. Based on this analysis, the system can determine which retailers are above an intent threshold and provide the user with ways to easily access those retailers. The system can sort the retailers in an order of likelihood to be what the user desires and can restrict the list of retailers presented to the user. For example, the list can be restricted based on a price spread, available screen space to present options to the user, or other factors.

In an example of these principles, the user enters the text "large supreme pizza" into the one-search.com input field. The system can analyze the user's browser history, previous queries at one-search.com, user accounts at various pizza delivery places, a location of the user and nearby pizza delivery places, credit card transaction data of pizza purchases, and so forth. Based on this information, one-search.com can, before the user presses enter and/or mid-query, determine that Dominos, Papa Johns, and Pizza Hut are nearby, are open, and that the user has made purchases with them in the past 6 months. Then, the system can present a preview of each of these merchants so that the user can simply click once to place an order for a large supreme pizza. The payment data can be handled through a browser/user interface payment request API. The one-search.com system can display the logo of each pizza merchant, with a summary of the order that would be placed and the associated cost if the user clicks on the logo. For example, the system can display, below the Dominos logo, "16" large supreme pizza, $16.24, delivered to 123 Fake Street, Springfield, OH. Delivery by 6:15 pm." Then, the user can click on the Dominos logo to place the order, or the user can interact with the one-search.com page or Dominos webpage directly to modify various aspects of the order before placing the order. The one-search.com system can dynamically update the previews as the user types additional information in the search field. The one-search.com system can further provide an indication of a 'default' action that will be executed if the user presses "enter" on the keyboard. In this way, when the user is satisfied with the default result, or only one result remains after the user inputs the text, the user can simply press "enter" and the system can execute the action, such as placing an order for pizza.

In another example, the user enters the term "iPhone 5S 32 GB silver" into one-search.com. (Any reference to a "one-search.com" or similar site also can mean a browser user interface or any interface). The system can analyze the text to determine that this search is clearly directed to a product based on the specific amount of detail to identify one or a few items that could be purchased. Further, if the search is executed on December $8^{th}$, then the system can be especially tuned to be more sensitive to recognize purchase requests due to the gift giving atmosphere surrounding Christmas or other holidays. The algorithm can analyze previous searches for various iPhones to determine which, based on running the algorithm, would result in a threshold value being passed that there is a high likelihood that the user desires to purchase this product rather than just search for it. When the user hits "enter," the system processes that input as though the user was viewing the iPhone 5S 32 GB silver on Amazon.com with the option to make a "one-click" purchase. Here, by entering that data into the one-search.com field, and clicking "enter", the system can, on behalf of the user, implement the steps at Amazon.com as if the user had completed a purchase of the item. The system can perform these actions via HTTP requests, as if the user had navigated to the website and entered the information herself, or the system can communicate with the various web services via their established APIs. The system can notify the user that the order has been placed, and provide any shipping or order details to the user. Alternatively, the system can transition the user directly to an Amazon.com environment or present a user interface notifying them that the purchase is being processed by a website that processes via user profile data a purchase and delivery of the product as can be done at Amazon.com or by Apple.com, etc.

In one example, the user can confirm the order before the system places the order on behalf of the user. In another example, the system places the order automatically for the user, and the user can choose to accept the order by doing nothing or choose to reject or modify the order by providing some input, such as clicking a button or opening an order page in a new tab or new window. In one example, the system may have placed an order for a silver iPhone 5S, but the user changes his or her mind and wants to order a gold iPhone 5S. The user can modify the order directly at one-search.com, or one-search.com can redirect the user to Amazon.com to modify the order. Sellers can compete for the business of processing this input, and the system could report on who bid for the lowest price. The system can provide the user with an 'out' by cancelling the purchase within a certain amount of time. In a similar manner, the system can detect that a user has just placed an order for an iPhone 5S, and implement a 'cool-down' period, during which the system will not automatically order an additional iPhone on behalf of the user without some additional or explicit approval from the user.

The system can cap or confirm orders that appear to be erroneous or unintentional. For example, if a new user does not realize how the system works, he or she may search for an iPhone 5S 32 GB silver multiple times, and inadvertently order multiple telephones. The system can have a built-in mechanism to detect such potentially unintentional purchase patterns and incorporate some heightened level of user approval or confirmation before proceeding to make purchases on behalf of the user when such patterns are detected. The user can establish security measures or purchase limits on the account, so that a child or unauthorized person is unable to make purchases above a specific spending limit, or so that purchases above a threshold require authentication via email or text message or some other mechanism. If the system detects an unauthorized purchase, the system can temporarily stop or prevent purchase transactions altogether for the entire one-search.com account, or for specific log-in locations.

Using the "enter" button and processing the input based on a predicted intent can result in ambiguities. When a user searches via Amazon.com for a product, the user navigates to the right model with the desired size, color, carrier, and so forth. Then when the user makes an Amazon.com one-click purchase, the user knows all of the data about the product before making the purchase. In the model disclosed herein, the system can also deal with product ambiguity. Assume the user enters "iPhone 5S 32 GB" at one-search.com, and that the available colors are black, silver, and gold. The algorithm determines, based on the input text, that the user likely desires to make a purchase and processes the input text accordingly. The system can select the most popular color and fill in that unknown parameter accordingly. The system can select not only the most popular model based on popular size and color, but the system can incorporate demographics data to determine the most popular model for people similar to the user. For example, if the user enters "iPhone 5," the system can select a yellow 16 GB iPhone 5C for a teenage girl, or a black 64 GB iPhone 5S for her father. The system can further analyze past purchases of similar or related devices to determine likely user preferences for this purchase. If the user is already registered, and via the browser, application or website, the system knows who is doing the search, then user preferences, history, classification model based on previous searches across multiple websites, etc. can be applied to analyze the one-search input field. If the user has made electronics purchases in the past that are all silver, the system can assume that the user is likely to want a silver iPhone 5S, and populate the cart accordingly. Similarly, if the user has consistently purchased the largest storage capacity model in previous purchases of mobile devices, the system can automatically populate the cart with the iPhone 5S with the largest storage.

Returning to the above example, the user clicks "enter" and the system presents a user interface screen that states "You have purchased the black iPhone 5S 32 GB—if you want silver instead, hit enter." In other words, the system can choose the most popular color, and present an option to change a parameter such as the color via hitting "enter" again. This second hitting of "enter" cancels the previous order of the black iPhone and replaces it with a silver one, or the system can simply update the purchase request. At that point of time in the process, it is as though the user had been viewing a silver iPhone, with the right features, and hit the one-click purchase button such that no other action needs to be taken to have it charged and delivered. The system can integrate with the merchant via an API to place a hold on a particular item, such as the black iPhone 5S 32 GB, while waiting for a period of time to allow the user to modify the order before committing or completing the purchase.

The process can be repeated as well. The system can present to the user "You have now purchased the silver iPhone 5S 32 GB—if you want the gold one, hit enter." Hitting enter this time will cancel the order of the silver iPhone and replace it with the gold iPhone. If the user does nothing else at this stage, the system commits the order for the gold iPhone, and the merchant will execute the order so the user will receive the gold iPhone, and the merchant will charge the user for the order in the normal fashion. Of course, button clicks can be provided for the user to change the various parameters and change the order. The interface can say "you have purchased the iPhone 5S 32 GB black—to change any of these parameters click here." The system can present various options to change the storage size, model, carrier, color, shipping options, etc. However, if the user does nothing, the system arranges for and places the order with the merchant on behalf of the user using the predicted parameters. As can be appreciated, the process enables the user from the time a browser or an application is opened up, to successfully make a purchase of the desired product in less interactions or fewer steps than was previously required.

In another example, the system can include an autocorrect or autocomplete feature with one-click purchasing ability in the context of a single search or at Amazon.com, one-search.com, or any other website where a purchaser has registered data such as credit card, address, etc. A website search field can include an "autocomplete" such that when the user types in a search term, the autocomplete feature can either automatically complete the concept that user may desire, or present a list of suggested or recommended options based on the text input up to that point. The user can review the various autocomplete options and select one, thus alleviating the need to continue typing out the rest of the query. In this example, the system receives a partial user input (or full input) via an input field, and, when analyzing the input for producing autocomplete options, the system can include a "one-click" purchasing option in the listing of autocomplete options. The options can thus change from a default mode for a first portion of the text and a second mode for a second portion of the text. In other words, if the user enters the text "iPhone" as the partial user input, at that stage the system can identify and present "iPhone 5S 16 GB <one-click purchase>" as one of the "autocomplete" options. In that case, this modified listing of the autocomplete features reduces the number of clicks and the amount of text from the user in order to purchase the item. In other words, drop-down or drop up (or any other location on the user interface) features are not limited to the concept of seeking a standard autocomplete feature but rather blends autocomplete with purchasing options or other options such as jumps to other websites. Normally, the user would choose one of the autocomplete options, which would take the user to either an item or a listing of items, then the user has to click again to narrow down to one particular item, and then at that point the user is in position to "one-click" purchase the item. However, if the user clicks on the "one-click purchase" variation in the autocomplete listing, the system can place the order immediately. An object could be presented in a drop-down menu for transitioning to another site such as Wikipedia.org. Previous approaches required a user to type much more data into the input field to transition. For example, previous approaches on Safari requires the user to type "amazon camera lens", which indicated to the browser that the input was meant for amazon.com and to transition to amazon. However, requiring the extra letters to be typed in to provide the instruction to the browser likely required more input and steps then just manually transitioning to the second site. Thus, this disclosure provides for objects to be presented which can act on the exact text in the input field without the need of typing in key word instructions telling the browser where to transition. The objects can be presented anywhere and can by dynamic such that they are not visible or presented when no text is in an input field but are presented in a first instance after the user starts to type or after a first portion of the input is evaluated.

The system can present various one-click options via the input field listing. For example, if, at the stage of typing "iPhone" the most popular iPhone is the 5S, with 32 GB and a silver color, the system can place that option, with a one-click purchase option, high or first on the list of autocomplete options for purchase. The next most popular model might be the 16 GB iPhone in black, which the system can display next in the autocomplete listing. Competitors can also provide offers in the autocomplete listing for a one-click purchase. The position within the menu can also dynamically change as the user types and as one option becomes more likely to be the desired option. The option right under the input field can be the option offered when the user hits the "enter" key, i.e., without clicking on any object. A competitor can purchase the right to present an autocomplete one-click purchase option that is related, but does not include the searched-for text. For example, when a user is searching for "iPhone," the system can present an autocomplete entry to one-click purchase a "Samsung Galaxy S4." The system can further present promotional material in these autocomplete listings. However, because space is limited, the promotional material may be limited. One example of such a promotion is an autocomplete listing advertising "Samsung Galaxy S4-20% off <one-click purchase>" at Amazon.com. Companies can purchase advertising space under the autocomplete listing or can pay a premium to elevate their products in autocomplete listings for a specific keyword, specific product, brand, and so forth. However, the system can also use business intelligence or feedback from various merchants to include, in the autocomplete options, results based on what people searching for item X eventually end up purchasing, even if the autocomplete option does not include the searched-for text.

Similarly, the system can track users' behavior, and can price certain users' attention at a premium for advertisers. For example, if the user has been researching smartphones daily for several weeks, advertisers of flagship smartphones may pay a higher price premium to target an interested, engaged buyer with advertising in the form of autocomplete options because the user has been spending a lot of recent time researching smartphones and will likely make a purchase in the near future. Based on this history of navigation, the menu may present a related item higher in the menu as it may be more likely to represent the user's desired action.

The system can provide a "one-click" purchasing option in a drop-down list of autocomplete options. Additionally, the autocomplete can include a listing that, if selected by the user, places the user in the context of one step prior to a one-click purchase at the merchant site. In other words, if a user enters "iPhone 5S" on a website like Amazon.com, Amazon.com presents to the user a number of listings of items. The user has to click on one of those items to narrow the results down to a single item, at which point the counting of clicks begins in the context of a "one-click" purchase. While viewing that single item, the user is then presented with a "one-click" purchasing option. Such a context, including the user's successful login with Amazon.com, would be characterized as a "pre-one-click" web page where the user has navigated to a point where the item is identified and the context is such that the user can make a one-click purchase. The problem is that getting to the pre-one-click page takes too many clicks and interactions.

Thus, the autocomplete listing can provide a simple way for the user to jump immediately to the "pre-one-click" stage in the merchant's web site. The autocomplete listing can not only include a "one-click" purchasing option at that stage, but could also include an option to take the user to a "pre-one-click" purchasing page, at which point, typically, there is more information about the item, a larger picture, reviews, a rating, product details, and so forth, such that the user can make a more informed purchasing decision. For well-known products, the user can make a one-click decision to purchase directly from an autocomplete listing, but for other products, the user may want to verify that the product is suitable for an intended purpose or compatible with some other user needs. The previous result of clicking on an autocomplete option is to process that option as though it was a search entered into the input field. However, that returns a listing of search results and not a "pre-one-click" page with one item ready to purchase. Accordingly, this alternate feature reduces the number of interactions necessary to get to a pre-one-click purchase page.

The purchasing autocomplete type options could be presented on a drop "up" listing and the searching or traditional autocomplete options could be presented on a traditional drop "down" menu. Objects to select could be presented in any location on a user interface. Multimodal interaction could also occur to include audio, gesture or other possible interactive modes. In other words, the directionality of the listing can be indicative of the functionality of the items listed. The directionality can be side to side, or in some other direction or angle. For example, the various one-click purchase and pre-one-click autocomplete listings can all be drop "down" menus, but at opposing 45 degree angles. The system can also present options in a tag field or tag cloud arrangement, where most likely options are presented closest to the input field (where they would be the quickest and easiest to access from a mouse perspective) and with the largest icon, text, graphic or other visual cues for selection.

Figure 2B:
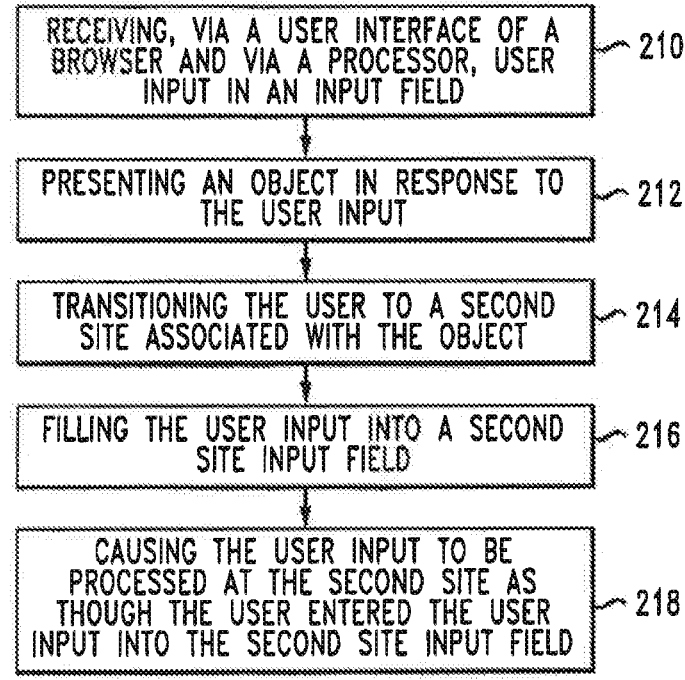
FIG. 2B illustrates an example method for processing user input.

As noted above, the browser or search engine could also be configured to transition the user to any second site and preprocess the user input in the input field as though the user had searched the second site and hit enter to process the input. The disclosure covers easily transitioning the user to a second site in a state as though the user had entered user input into the input field of the second site. In this regard, an example method, shown in FIG. 2B, includes receiving, via a user interface of a browser and via a processor, user input in an input field (210) and presenting an object in response to the user input (212). In one aspect, the object is not presented on the interface when no input is in the input field. The first instance of the object can be after some input is provided or when the system identifies based on the user input that the object should be presented. This will reduce clutter on the interface. The object is configured such that when a user interacts with the object, the method includes transitioning the user to a second site associated with the object (214), filling the user input into a second site input field (216) and causing the user input to be processed at the second site as though the user entered the user input into the second site input field (218). The object can be presented with an image indicating where the input will be processed and where the browser will transition the user to. The interface can present one or a plurality of objects, each object of the plurality of objects including a different one-click search engine to which the user will transition when the user interacts with each respect object. In this regard, the "one-click search engine" can include any second site to which the user will transition, such as yahoo.com, bing.com, amazon.com (i.e., any merchant site), ebay.com, Wikipedia.org, and so forth. Any second site having an input field can be transitioned to according to this concept. Users can select a listing of target sites that will show up as part of a drop-down menu or items presented in response to user input in the first site input field. The steps can include transitioning, filling and causing steps result in a transition of the user to the second site in a state as though the user had entered the user input into the second site input field and the second site processed the user input. To distinguish from prior approaches which required the user to type in key words like "wiki" or "amazon" to signal to the browser the second site, the present concept does not require such signaling and provides objects which the user can click on or interact with to process the exact user input in the second site and transition to the second site. Further, prior approaches, if a regular search was desired (such as specifically on "amazon camera lens"), the user was required to key into the input field a symbol like "!". Clearly the extra steps required for this approach were not ideal. The present disclosure reduces the numbers of keystrokes and input needed to make the transition. Every reduced step or keystroke is valuable particularly with mobile device searching. Indeed, applying prior approaches would be problematic because a search on amazon.com using the exact terms "amazon camera lens" might return if applied exactly to the input field of amazon.com results that differ from what the user desired, which is just "camera lens".

The steps of this process can be performed by a search engine site, from a browser search field, an application, any other entity, or any site that has an input field (such as starting at amazon.com and transitioning to google.com). For example, browsers often have input fields in the header portion which can be used for searching the Internet. Users can select whether a default search engine for that input field is google.com, yahoo.com or other search engine. However, the browser can also provide options which, when presented (if dynamically), clicked on or interacted with by the user, cause the transition to a second site (which has its own second site input field) preconfigured such that the user input populates the second site input field and in a state where that user input has been processed by the second site. This clearly provides an efficient way for the user to navigate and arrive at the results they desire from a general search engine.

Another aspect includes receiving, via the user interface of a browser, user input in an input field and presenting an object in response to the user input. The object is configured such that with a single click, the user can be transitioned to another website preprocessed in a certain way. The user input is passed to the second site and essentially automatically filled into the second site input field. The background process involves the browser or system causing entry of the user input in the second input field such that the second site processes the input and returns a response such that the second site is in a processed state based on the user input. The system then transitions the user to the second site associated with the object in the processed state. This reduces the number of interactions the user would have to engage in to transition from the one site to the other. The object is presented such that after entering the user input, only one click is required to transition to the second site in the processed state. This differs from simply hitting enter with the user input in the input field and getting search results, from which the user could click on a search result and transition to another website.

Figure 3:
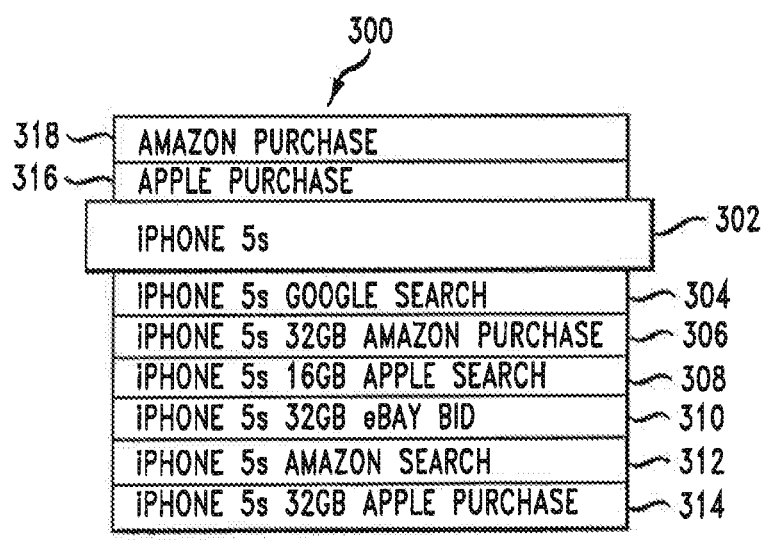
FIG. 3 illustrates a drop-down and drop up menu according to an aspect of this disclosure.

FIG. 3 illustrates an example one search field and drop-down menu feature 300. In this example, the single field 302 (which can be on a site or a browser input field) enables the user to provide input that the system analyzes to identify other options besides a search that are available. In this example, the user inputs "iPhone 5S" in the field 302. The algorithm analyzes that input to recognize that the search is directed to a product. The system can access a database of current products, purchasing patterns, product popularity, purchasing history of the user or of other users, availability of the product, and so forth. The system can access the database via an API call to one or more merchant databases. The algorithm can use this data to make a more accurate determination of whether the user desires a search or a specific product to purchase. In this case, the input "iPhone 5S" is clearly a product, thus this knowledge will help to drive and control the construction of the drop-down menu options.

Figure 4A:
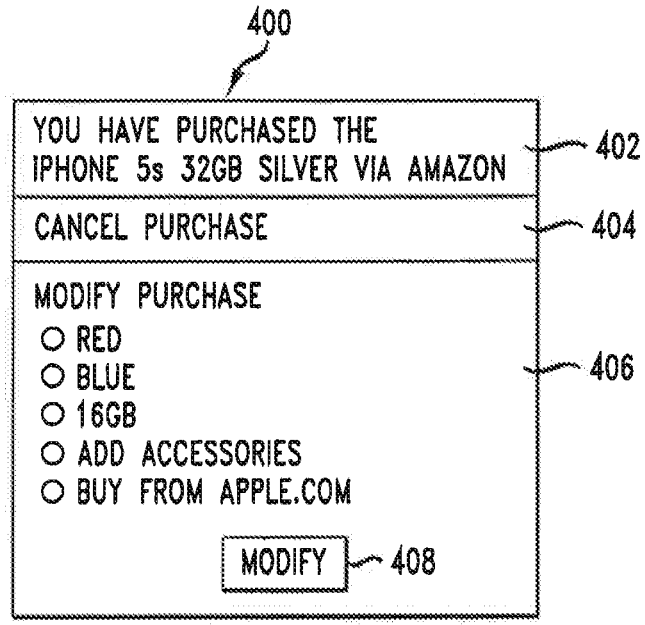
FIG. 4A illustrates a first example resulting interface according to an aspect of this disclosure.

Because the user input in field 302 is a product, the example drop-down menu options can include a standard Google search 304. Although this is the first option, the system can arrange the drop-down menus to place this option lower if the algorithm determines that the user is less likely to desire a Google search. The system can present more likely options closer to the input field 302, or closer to the mouse cursor, for example. If a user selects that option, then the result that is returned would be as though the user had entered "iPhone 5S" as a Google search. The drop-down menu can include an Amazon.com one-click purchasing option 306. If the user selects this option, the system can process the input as though the user were on Amazon.com, having searched for an iPhone 5S, and at a screen in which the user can select to "one-click", execute the purchase of the product for the user. In another variation, the system can present a one-click option at the one-search page, directly from the drop-down or drop-up menu. So, the user could click a button, an image, or a link to place the order with Amazon.com as if the user had navigated to the one-click point at Amazon.com and clicked the "order now" button. In this case, FIG. 4A illustrates the resulting screen 400 presented to the user from choosing option 306. Screen 400 includes data 402 informing the user that the iPhone 5S had been purchased via Amazon.com. When a color was not provided, the system can choose the most likely color for the user or for similar users. In this case, the system selected silver. A storage size of 32 GB is also shown as part of the purchase data.

In the case of unwanted or unintended purchases as people perhaps hit a wrong key or chose the wrong drop-down menu option, the system allows users to cancel the purchase 404 or modify the purchase 406. The user can modify any number of different options depending on the product. Options shown by way of example include changing the color from silver to gold or black. Similarly, the system can display an option to change the storage size to 16 GB. An option such as "add accessories" can bring the user to another interactive screen to choose accessories such as chargers, cases and car mounts. The system can determine which modification options to present and the order in which to present them based on a confidence score for each option. A statistical confidence score can be determined by the system using past purchases or user preferences. For example, the system may have a confidence score of 95% that the user wants a silver iPhone 5S, and can either not display the option to modify the color, or can display the option in a less prominent place or manner, or can provide the option to change the color through a menu or other 'hidden' location. This approach can allow the system to present purchase or item options to the user so that the user is only concerned with and can easily modify options about which the system is less sure. The other options can be presented via an object which initiates the purchasing process but receives additional selections from the user on features of the product or engages in a dialog with the user and then finalizes the purchase after the dialog (and perhaps the purchase is processed in the dialog application, as in the drop-down menu or separate dialog application). The system can present options to modify not only details about the actual item itself, but also about details surrounding the order, such as delivery address, billing address, payment method, or delivery method. The system can even allow the user to switch the order from one merchant to another merchant, if the user inadvertently clicked the wrong menu item in the pull-down menu, for example.

If that the entity which is processing the purchase is Amazon.com, as is noted in field 402, the system could also present an option to process the purchase through Apple.com. If any of these options are chosen, then the user selects the modify button 408 and the order is modified and automatically continues to be processed. Of course the system has the user profile, purchasing (credit/debit/PayPal/crypto, etc. account), address and any other information and can move seamlessly between purchasing/processing entities with ease. When the user sets up a profile and account on the website, permissions and accessibility capability is established and approved. In this manner, operations between entities to complete a purchase can be divided as necessary. Thus, an example of seamlessly moving operations between purchasing and processing entities can include the system handling a purchase and delivery transaction of an item by enabling a payment account registered with one entity (such as Google), to be used to pay for an item while the system coordinates with another processing entity, such as a merchant or retail partner, to handle filling the order. As is shown below, transitioning between purchasing/processing entities can also include transitioning to a dialog application that can enable a dialog between the user and a merchant and then complete the purchase in the dialog application.

FIG. 4A illustrates another aspect as well about transitioning or using a dialog to resolve concerns of the buyer or enable the buyer to select particular parameters via an additional interaction instead of simply a "buy now" option. As noted in the introduction, in some cases a personal interaction with the user can help to resolve concerns and provide the option to select particular parameters before completing a purchase. This disclosure provides a number of solutions for easily achieving this input and then efficiently completing the purchase. For example, FIG. 3 also illustrates a transition from the input field to a drop-down menu configured such that parameters of the item can be chosen and a purchase interaction is built into the transitioned location (in this case the drop-down menu). For more detailed questions, the user could transition to a dialog also configured to engage with the user to receive or provide more information and then have the ability to process the actual purchase through the dialog interface. FIG. 4A represents a more comprehensive dialog where the user can pick other options as well. The dialog can be an SMS application, email application, messenger application in a social network, an avatar that speaks and converses with the user in a natural language system, and so forth. The "transition" to a dialog from which the final purchase can be made can therefore include a drop-down menu item configured to receive more parameters about the product and then finalize a purchase, a texting dialog, speaking dialog, video dialog and so forth. The browser API can be used to process payment data to a site as part of interacting in a messaging application or a bot.

The following example is provided for how to manage such a dialog process in the context of social networking. In an example method of how the system could transition the user to a dialog as part of a payment process, a method includes receiving a posting of an item through a social networking site, such that the social networking site receives and transmits posted items from a posting entity to receiving entities. When the posting is not associated with a product for purchase in a product database or catalog, the method includes transmitting the posting through the social networking site without an option to buy. When a determination indicates that the posting references the product in the product database or catalog, and thus indicating a sale-related intent, the method includes transmitting the posting through the social networking site with a payment process initiation object associated with the product, such that the payment process initiation object can include one of the button, a drop-down menu, or a hyperlink, and receiving an interaction associated with the payment process initiation object, the interaction being performed by a user. Based on the purchase interaction, the method includes engaging in a dialog with the user regarding the product as part of a payment process such that at a conclusion of the dialog, the user can complete a purchase of the product.

The method can include, as part of the dialog, receiving a purchasing interaction from the user and processing the purchase of the product based on the purchase interaction. Processing the purchase occurs within one of the social networking site, via a payment agent or via an application programming interface between the social networking site and a merchant site selling the product. The purchase can also occur through the browser payment request application programming interface disclosed herein. The browser, social networking site, digital wallet, network storage service, can store payment data for the user to process the purchase. When the purchase occurs via the application programming interface between the social networking site and the merchant site, the social networking site can transmit payment data through the application programming interface such that the merchant site can process the purchase of the product. When the purchase occurs via the browser application programming interface between the browser and the merchant site, the browser can transmit payment data through the application programming interface such that the merchant site can process the purchase of the product.

The dialog can enable the user to select a parameter associated with the product. Example parameters include one or more of a color, a size, a shape, a configuration, and a technical characteristic. Delivery options, resolving any other concerns, gifting issues, discounts, coupons, and so forth can be managed within the dialog. The payment process initiation object can simply include a buy button or a notice "talk about and buy this item by clicking here". The dialog can be managed as between the user and the merchant via a dialog application. Engaging in the dialog can be achieved in one aspect by transitioning to a dialog application for managing the dialog and the purchase of the product.

FIG. 3 also illustrates other concepts. Feature 308 represents an Apple search. If the user selects this option, then the next field that is returned would be as though the user searched for iPhone 5S on Apple.com. The information presented by Apple on that product would be presented to the user. Optionally, the system can prompt the user to provide or confirm credentials for logging in to Apple.com. Because the transition from one-search.com to Apple.com occurred from one-search.com, the system can present an option in the new Apple.com web page to enable the user to return to one-search.com for further searches. For example, the system can provide a frame, in the browser, for returning to the one-search.com search while presenting the Apple.com web site. The frame can allow the user to modify the original input text, which can dynamically change aspects of the presented Apple.com web site presented in conjunction with the frame.

Figure 4B:
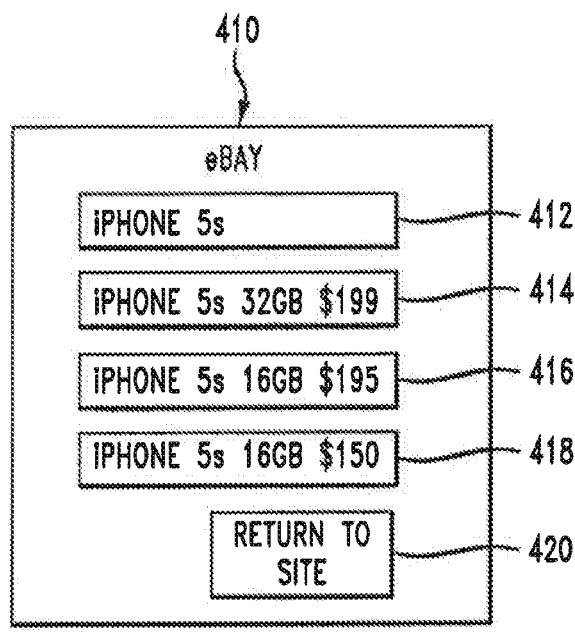
FIG. 4B illustrates a second example resulting interface according to an aspect of this disclosure.

Feature 310 in FIG. 3 represents an eBay bid option. In this case, if the user selects this option, the system sends the user to eBay and presents a screen 410, as shown in the example user interface of FIG. 4B, as though the user had gone to eBay.com and entered in "iPhone 5S" into the eBay search field 412. Feature 414 represents a selectable returned item for an iPhone 5S 32 GB with a current bid at $199. Feature 416 is an iPhone 5S 16 GB for $175 and feature 418 represents an iPhone 5 16 GB at $150. All of these are examples of the kind of processing that can occur. As noted above, a "return to one-search" button 420 can also be included in the screen for easy access back to the one-search field. The system can transition to the indicated destination page, such as the Apple.com, eBay.com, or Amazon.com purchase page for an iPhone 5S as an overlay, such that returning to the one-search field involves removing the overlay instead of a back navigation command to a previous page. The interface 410 could be a browser 1806 as shown in FIG. 18A that interacts with a merchant site 1816 via a browser API 1818 to exchange requests and responses for providing payment information to a merchant as disclosed herein. The browser 410 could also act as an agent to utilize a second API 1812 between the browser 1806 and a payment service 1810 for managing payments, authorizing payments, generating tokens and so forth. One could transition from the initial site, such as a searching site, social media site, or any other site, to the browser 410 for further interaction and to handle the payment processing.

FIG. 3 also shows an Amazon search 312 in the drop-down menu. When the user chooses this option, the system can present a screen as though the user had searched on Amazon.com for an iPhone 5S. From there, the user could continue shopping and searching as though the user had begun browsing on Amazon.com. The object 312 is selectable by the user and can have its first presentation to the user after the user types data into the input field 302. This reduces clutter on the interface. In one aspect, the drop-down menu automatically drops down as the user enters data into the field without any other interaction. In other words, as is shown in FIG. 3, there is no button to click on to produce the drop-down menu. This reduces the interactions necessary to transition to amazon.com (or any other site) with the user input data in the input field 302. In another aspect, the user hits the "enter" key on a keyboard (i.e., no button is clicked), which can cause the system to process the input and produce the drop-down menu. The menu can also simply be an object or field presented to the user for selection. In other words, it does not specifically have to be a drop-down menu. For example, the option 206 in FIG. 2A could be presented based on the user input in 202 or the user hitting "enter" on the keyboard to cause the options to be presented. The drop-down menu in FIG. 3 can include an option to purchase the product directly via Apple.com 314. If the user selects that option, and assuming that there is not a "one-click" purchase option at Apple.com, the user is brought to the point where they can, in very few interactions, complete the purchase. For instance, the system can bring the user to a shopping cart showing the product ready to be purchased. In one option, the system brings the user to the point of seeing the product and being able to place the product (iPhone 5S) into a shopping cart. In another aspect, the system could navigate the shopping cart model on behalf of the user and complete the purchase, thereby making the transaction a one-click purchase.

FIG. 3 also shows another example of this disclosure. In this case, because the "drop-down" menus include different types of data, the options can include a "drop-down" menu as well as a "drop up" menu. The purchase options could be dropped "up" as shown in features 316 and 318, while all of the search options or more traditional options can be dropped "down." The system can present menus to the left, right, diagonal, or in any direction, orientation, or angle as desired. Separating the purchasing options from search-type options can also reduce the number of inadvertent purchases. In this example, the drop-down menus of FIG. 3 could only include features 304, 308, 310 and 312 as these involve further searching. The system can position items 306 and 314 in "drop up" menus 318 and 316, respectively. The algorithm can predict the most likely search if the user desired a search and the most likely purchase if the user were to desire to purchase the item and position those as the first option down and the first option up in the menus. The user could use the arrow buttons on a keyboard or a touch screen to select the desired options. Alternatively, the drop-down or drop up menus can indicate shortcut keys which the user can press to select the options without using the mouse. For example, the menu can indicate that the user can press alt-1, alt-2, or alt-3 to select the various drop up menu options, or ctrl-1, ctrl-2, or ctrl-3, or some other single key or key combination to select the various drop-down menu options. The system can present auto-complete options which the user can activate using similar keyboard shortcuts. For example, if the user has typed "iPhone," the system can indicate that pressing "S64" after "iPhone" would autocomplete to "iPhone 5S 64 GB." The types and quantities of such autocomplete keyboard shortcuts can vary widely depending on the determined intent of the user, as well as attributes of the product as the system understands it up to that point. Voice activity or gesture input or any other type of input can enable the user to select a desired option.

In some cases, the system can determine that the data in the search field is not intended for a purchase. For example, if the user enters the text "South Dakota," the system can identify that the user does not desire to make a purchase. The "drop-down" menu in that case could simply list the traditional search options or could list options to one-click purchase items related to South Dakota, such as a South Dakota t-shirt or a souvenir of Mount Rushmore. In one aspect, the user can enter "research South Dakota", to indicate to the system that a purchase is not desired, but rather the user's intent is to perform research on South Dakota for a project, for example. In this example, the system can return research results displayed in a drop-down menu from sources having a variety of reliability ratings. The user can select a source from the drop-down menu as desired based on reliability or popularity, for example.

The user can also add hints or shorthand instructions in the search field to guide purchase options presented in a one-search.com field. For example, the user can provide the text "buy amaz iPhone 5S." These hints tell the algorithm that the user desires a purchase function, and that the desired merchant is Amazon. The algorithm can use regular expressions to search a database of available merchants to determine that the desired merchant is Amazon, and not that the user desires to buy an amazing iPhone. To resolve merchant ambiguities, the algorithm can further make decisions based on previous searches stored in a user account, for example. Based on these types of hints, the system can eliminate features 304, 308, 310, 312 and 314 from the drop-down menus shown in FIG. 3. In that case, the user could just hit "return" and the most likely desired product will be automatically purchased and processed for shipment. Information about this dynamic change in the enter function performed when the user hits enter can be presented in the search field, for example, to the right of the text typed in by the user. Options to cancel or modify of course can be presented, such as the cancel purchase button 404 and modify purchase button 408 shown in FIG. 4A.

In one example, the unified input field is part of an application downloadable or installable on a smartphone, tablet, or other mobile computing device. The functionality could also apply to a unified search field on a website. The application can be customizable as can any website disclosed herein. The application includes a single input field that is generic to multiple different types of processing. For example, the application can present an input field with a number of different options, such as a Skype or telephone call. The field therefore can be used to input a search for a contact. The user could type in the field "mom" and then select the Skype® video conference option, or the FaceTime® option. The system processes the input field according to the appropriate context by extending a video conferencing request or making a phone call. It is important to note that the unified field concept disclosed herein is not limited to the processing of the user input being related to web searches or purchases. Other functionality can be implemented from the unified field. Phone calls, video conferencing, triggering of any sensor on a smartphone, taking a picture, sending a text, etc. Several examples if these features follow. In the unified field, the user may input the text: "Mark S., are we getting together for lunch?" The user may then select the processing option of "texting," chatting in an online chat room, or posting the comment on a social media website, and so forth.

Figure 4C:
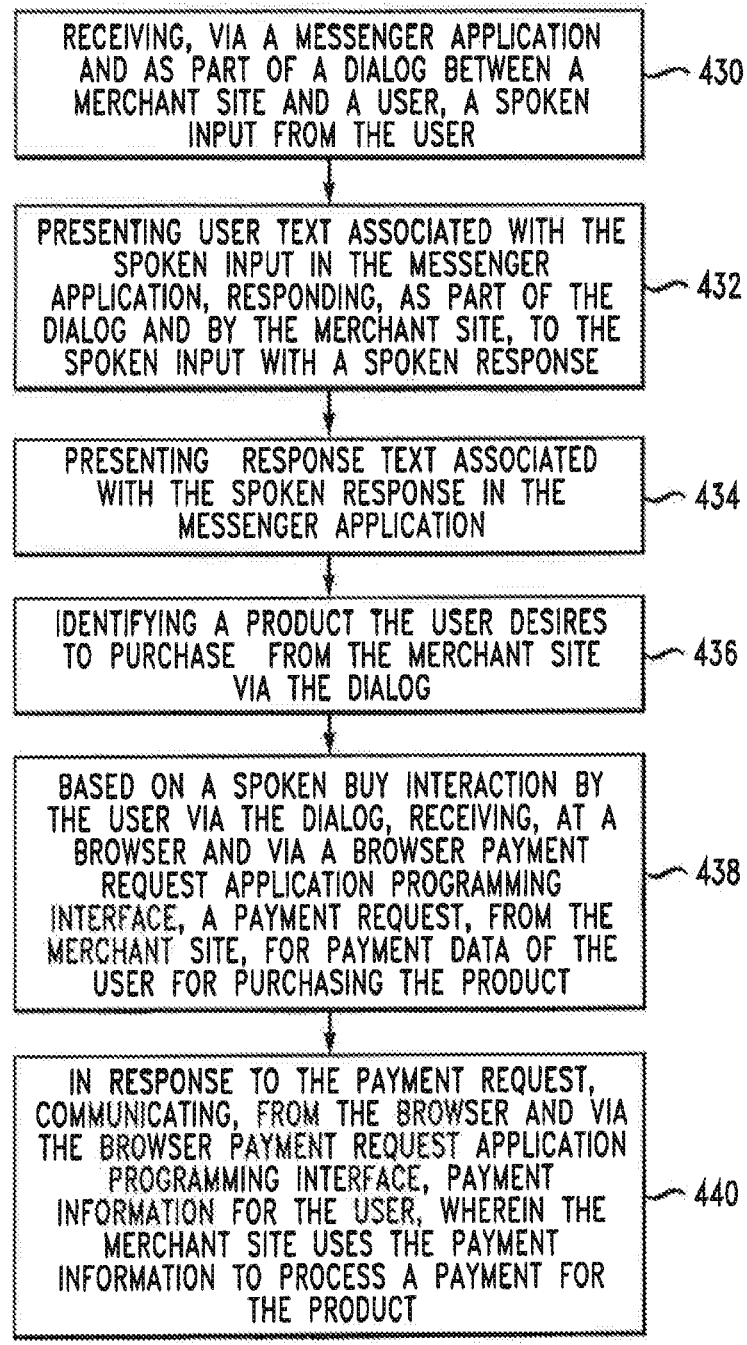
FIG. 4C illustrates a method example for providing a payment option through a spoken dialog.

FIG. 4C illustrates a method example of using a spoken dialog and/or messenger application for purchasing a product. A text dialog could be employed as well. The following is an example of a spoken dialog with both a spoken input and textual component, a similar approach could apply just with the user interacting via text. An example method in this regard includes receiving, via a messenger application and as part of a dialog between a merchant site and a user, an input from the user (430), presenting user text associated with the input in the messenger application, responding, as part of the dialog and by the merchant site, to the input with a response (432), presenting text associated with the response in the messenger application (434), and identifying a product the user desires to purchase from the merchant site via the dialog (436). Based on a buy interaction by the user via the dialog, the method includes receiving, at a browser and via a browser payment request application programming interface, a payment request, from the merchant site, for payment data of the user for purchasing the product (438) and, in response to the payment request, communicating, from the browser and via the browser payment request application programming interface, payment information for the user, wherein the merchant site uses the payment information to process a payment for the product (440).

The method can include receiving, at the browser and via the browser payment request application programing interface, an address request, from the merchant site, for address data for the user. In response to the address request, the method can include communicating, from the browser and via the browser payment request application programming interface, the address data for the user to the merchant site. The merchant site processes the payment using the payment information. The payment information can include payment account information for the user that the merchant site can use to process the payment for the product. A browser can present the messenger application to the user. The method could occur via a text dialog as well without spoken input.

A method from the standpoint of the merchant site can include transmitting, via a messenger application and as part of a dialog between a merchant site and a user, a prompt from the merchant site to the user, receiving, as part of the dialog and at the merchant site, user input, and identifying, based on the user input, a product the user desires to purchase from the merchant site via the dialog. Based on a buy interaction by the user via the dialog, the method can include transmitting, to a browser and via a browser payment request application programming interface, a payment request, from the merchant site, for payment data of the user for purchasing the product, and in response to the payment request, receiving, from the browser and via the browser payment request application programming interface, payment information for the user. Using the payment information the merchant can process a payment for the product. Of course this aspect from the standpoint of the merchant can include a text-only or a spoken dialog only approach, plus the approach where the user is speaking and the merchant is also speaking but a text version of the dialog is presented to the user for following along and user interaction, such as videos or images to select options for purchase.

Figure 5:
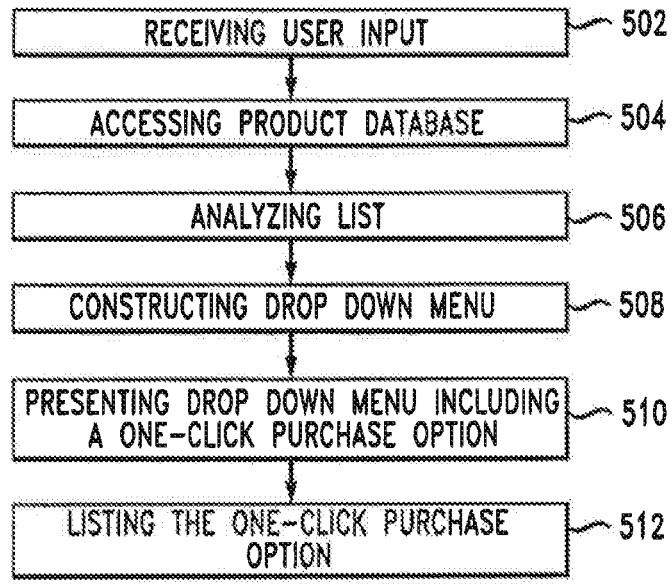
FIG. 5 illustrates a method example for presenting a one-click purchase option relating to a search input.
Figure 7:
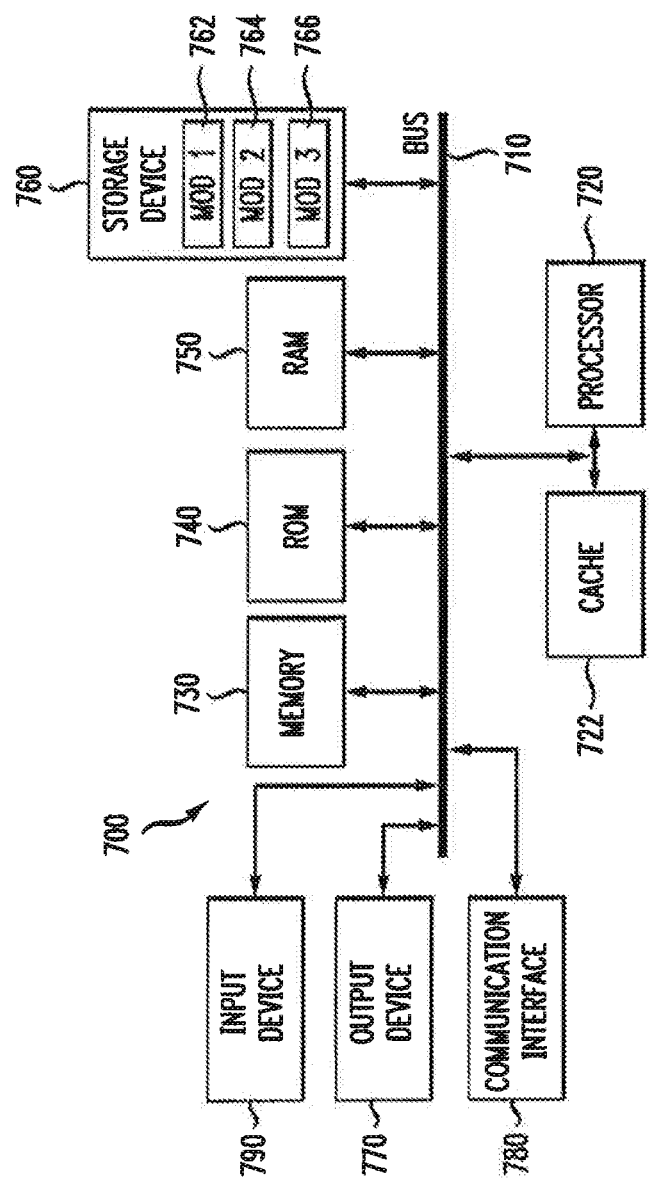
FIG. 7 illustrates an example system example.

Having disclosed some basic system components and concepts, the disclosure now turns to the exemplary method example shown in FIG. 5. For the sake of clarity, the method is described in terms of an exemplary system 700 as shown in FIG. 7 configured to practice the method. The steps outlined herein are exemplary and can be implemented in any combination thereof, including combinations that exclude, add, or modify certain steps.

Another aspect related to using a messenger application includes a method embodiment from the standpoint of the messenger application. A method includes transmitting, from a messenger application on a user device, to a software module on the user device, a request associated with a potential payment. The request can include information about the potential payment. The software module can be configured with a software module application programming interface that defines a protocol for communicating data between the messenger application and the software module, and can be configured to present a payment authorization graphical user interface. The payment authorization graphical user interface can be capable of presenting payment transaction data. The method can include receiving, at the messenger application, from the software module and via the software module application programming interface, authorized payment data. The software module can access or receive, based on the request and an authorization confirmation from a user, the authorized payment data for the potential payment from the device or a network-based entity separate from the device. The payment transaction data can include one or more of a payment method, a shipping method, a price, or an address. The payment can be from a first user of the messenger application to a second user of the messenger application. The first user and the second user can be registered with the messenger application. The authorized payment data can include cryptocurrency payment data or a confirmation of a payment by a payment service.

In another aspect from the standpoint of a user device, a method includes providing, on a user device, a messenger application for managing a dialog for a user of the messenger application, and, based on a buy interaction by the user via the dialog, authorizing payment data for a payment through the messenger application by one or more of: (1) receiving, from the messenger application, at software module on the user device, and via a software module application programming interface that defines a protocol for communicating data between the messenger application and the software module, a request for payment data, wherein the request includes information about a potential payment, (2) retrieving, by the software module, based on the request and via the software module application programming interface, authorized payment data for the potential payment from one of the user device or a network-based entity separate from the user device and (3) communicating, to the messenger application, from the software module and via the software module application programming interface, the authorized payment data.

The method can include receiving, at the software module and via the software module application programing interface, an address request, from the messenger application, for address data for the user. The method can include, in response to the address request, communicating, from the software module and via the software module application programming interface, the address data for the user to the messenger application. The authorized payment data can include one of payment account information for the user that the messenger application can use to process the payment for a product or a confirmation that the network-based entity separate from the user device processed the payment for the product.

In one aspect, the input from the user can include spoken input of the user and wherein the response in the messenger application includes a spoken response.

Another messenger application aspect applies to a method which includes one or more of: transmitting, from a messenger application and as part of a dialog between a first entity and a second entity, a prompt from the first entity to the second entity, the messenger application being on a user device, receiving, in connection with the prompt, user input from the second entity, identifying, based on the user input, a payment the second entity desires to make to the first entity via the dialog and, based on a payment interaction by the second entity via the dialog, transmitting, from the messenger application, to a software module on the user device, and via a software module application programming interface that defines a protocol for communicating data between the messenger application and the software module, a payment request for the software module to authorize transmission of authorized payment data of the second entity.

The method can further include, in response to the payment request, receiving, from the software module and via the software module application programming interface, the authorized payment data, wherein the software module authorizes the authorized payment data by one or more of: (1) retrieving, based on the payment request and via the software module application programming interface, the authorized payment data for the payment from one of the user device operating the software module or a network-based entity separate from the user device and (2) communicating, to the messenger application, from the software module and via the software module application programming interface, the authorized payment data.

The second entity can confirm the authorized payment data via one of a graphical user interface or a biometric interaction with the user device.

Another aspect can apply to a method which includes receiving, via a messenger application and as part of a dialog between a merchant site and a user, an input from the user, responding, as part of the dialog and by the merchant site, to the input with a response in the messenger application, identifying a product the user desires to purchase from the merchant site via the dialog, and, based on a buy interaction by the user via the dialog, authorizing payment data at a browser by: (1) receiving, from the merchant site, at the browser and via a browser payment request application programming interface that defines a protocol for communicating data between the merchant site and the browser, a request for payment data for purchasing the product, wherein the request includes information about a potential purchase of the product, (2) retrieving, based on the request and via the browser payment request application programming interface, authorized payment data for the purchase from one of the browser, a device operating the browser or a network-based entity separate from the device and (3) communicating, to the merchant site, from the browser and via the browser payment request application programming interface, the authorized payment data.

FIG. 5 illustrates a general method example. The system receives user input (502). The system accesses a product database or catalog in processing the user input (504). For example, if a new product just came out and is available for purchase on-line, the system can access that information so that when a user enters "iPhone 5S" the system can match that input with a product. The system analyzes the input (506) for a determination of the user intent. For example, if the user enters "Rhode Island" the system can calculate a very low likelihood that the user desires to purchase Rhode Island. User profile, user search and purchasing history, and any other data can be used by the algorithm to determine how to structure an extendible menu to enable the user to quickly make a choice of what they desire. However, as the user enters additional text, the system can update autocomplete options accordingly. For example, if the user enters "Rhode Island cookbook," the system can, at some point, determine that the user is not likely interested in the state, but in a cookbook, which is a purchasable item. The system can then immediately adapt the autocomplete options automatically as the user continues to enter additional text.

FIG. 5 next shows that the system constructs a drop-down menu (508) or a presentation of various options or object at any location in the user interface. This construction can also include a marketing aspect as companies may pay for how the option is presented. Amazon.com, or a product manufacturer, can pay a small fee to present their product with graphics or multimedia content, if it appears that the user may desire to buy that product, in order to encourage the user to select that option to purchase the product. The system presents the menu or other structured presentation of options for the user to choose (510). The options include one or more purchasing options (512) when the user input indicates via the algorithm that a purchase may be desired.

In another aspect, a classifier can process the user input in the general unified search field. The classifier can be trained to determine the intent of the user and to select which websites or applications to provide in response to the input.

Classification algorithms are often used in processing speech or phone calls. For example, some classification features can process and classify calls in various call types like local, international, voicemail, conference, etc. In some cases, as a user calls an interactive voice response system, a classifier can be trained using previous calls to process the user input to conclude that the user wants to talk to accounting or pay a bill. For example, the user might say in the call "I want to pay a bill" or "I need help with my account." By classifying that input, the system can route the call to the right person, destination, or entity.

Technologies that are used for classification include statistics, data mining, pattern recognition, machine learning, and in some cases neural computation and artificial intelligence. A general classification system approach involves receiving input, pre-processing the input, segmenting and labeling the input, extracting features from the input, post-processing, and ultimately classifying the input to arrive at a decision. While these principles have been applied in many fields, these technologies can be applied to a new classification domain. The new classification domain is the context or intent of a unified input field such as on a browser in which the user provides input, and that input can be applied to many different websites, applications, or actions. Right now, when a person goes to Google.com, the assumption is that the user wants to search the internet. When a user goes to Amazon.com, the user wants to buy something. The user must go to different websites for these different functions, requiring additional, unnecessary mouse clicks. This disclosure provides, in one respect, the introduction of a classifier that processes user input in a field on a website where there is no assumption that the user wants to search or buy a product. The classifier will determine via a classification decision what the intent of the user is.

In order to train the classifier, which is called herein an 'intent classifier', the system can monitor the web usage of a user for a period of time. The classifier can utilize data of one user or multiple users. For example, one could generate training data of input at a Google input field compared to input in an amazon.com input field for people of a particular demographic, such as 20-30 year old men, or women or a particular minority or religious group. The training data preferably would be particular in some respects to the individual user. If a user is logged into a browser such that it can connect to that user's training data or relevant training data, then the system can more efficiently process the user input in the unified input field. The system can use supervised learning (or unsupervised or semi-supervised learning) to label the training set so that the training data can provide which class (i.e., search, purchase, Wikipedia, etc.) the input belongs to. The training data involves the input provided via a search field as opposed to a purchase field. Other fields can apply as well such as auctions, medical advice, twitter input text, Facebook input text, or any other social networking input text and so forth. The general concept is that there is no assumption when the user inputs data into the field regarding what the desired function is.

Other data that can be useful for the training model is personal user information. For example, if the user is registered for making one-click purchases at amazon.com, then when the user types in "Android 4.4 KitKat", the system will know that the shortest number of clicks and computer interactions possible for the person to complete a purchase of the most popular smartphone with Android 4.4 is through Amazon.com. Otherwise, the user might be sent to another website and have to go through the shopping cart model, enter their credit card, and take a lot of extra time and effort to complete the purchase. Thus, knowing that the user is registered at one or two purchasing websites (thus enabling a quick "one-click" purchase) can drive the result of the classification.

In another example, the classifier in this case can have classification types of search, browse, purchase now, play game, update software, send email, send tweet, check Facebook, make call via Skype, and so forth. Some of the classification data for a trained model can be drawn from the different types of input that are used in input fields between google.com, amazon.com, Wikipedia.com, and so forth. The system for training the classifier can look at the different types of input in connection with which website is being used and develops training data. In other cases, if a user types in "call mom", such input would not be provided in an input field because normally the user would go to the Skype App or other calling app and choose his mother to make the call. Thus, in other cases, training may occur in a different way to capture that "command" type of input. However, since there is no assumption of the desired intent of the input at the start, such training can be used to enable the user to perform a host of functions starting at one input field.

The user can in this case also provide hints as to the desired input. It might be quicker for the user to type "buy" before "iPhone 5S" so that the entire input is "buy iPhone 5S" than moving one's hand to the mouse and moving the mouse to click on an amazon.com tab in a browser or on an icon, or typing "www.amazon.com" in an input field for URL's. Clearly, the suggestion to buy tells the classifier that a purchase is the intent. Currently, typing in "buy iPhone 5S" is still considered via a searching algorithm in which search results are provided. The system can show sponsored advertisements which enable the user to go to an advertisement or promotional page for the iPhone 5S, but those still take additional clicks to get to the point of actually being able to make a purchase. Further, the system can still present the results on a webpage (google.com) that does not enable the user to complete a purchase/delivery within one click.

Therefore, the classification algorithm according to this disclosure can utilize training data which includes different kinds of input that the user or similar users have provided via input fields on various web pages to determine an intent describing which web page the user desires to open, or which action the user desires to perform on the web page. The system can use other data to make the determination, such as time of day, time of the year, social media data like birthdays of friends, holidays, weather information, which websites the user had made purchases on and with which website the user has previously registered, etc.

For example, the classifier might determine that the user wants to make a purchase. The classifier can make a basic determination of an intent to search or an intent to make a purchase. Then the classifier can take a secondary step to determine based on history, user profile, registrations, best price, closest outlet to the user's address, etc., at which merchant the user likely wants to make the purchase. If the user has an account set up at amazon.com, then the system may choose amazon as the primary likely destination and take the appropriate step. For example, the system can create a new tab with the input term pre-entered at amazon.com, or where the user can open the tab and be at the state in the amazon.com website where the user can just click the "one-click purchase" button to complete the purchase. The system can present the new page in a new tab, within the same page as the unified input field, or in some other fashion.

Figure 6:
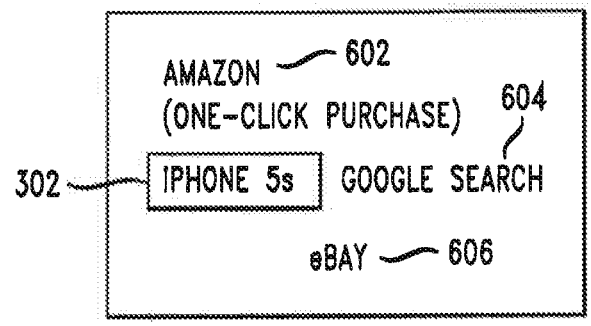
FIG. 6 illustrates another graphical resulting interface in response to received user input.

The system can, instead of a more traditional menu, present the options in a completely different form, such as a tag field. FIG. 6 illustrates options in which parameters associated with each selectable option are chosen based on relevance. For example, the system can select and modify positioning, size, shape, color, detail, of the items in the tag field for various options. Feature 602 is an Amazon one-click purchase. Feature 604 is a Google search and feature 606 is an eBay search. In a tag cloud or word cloud, the size, shape, color, and other details of the items can provide information about the items. In this example, the Amazon one-click purchase 602 is listed in a large font, in bold, and in close proximity to the search field 302. The large font can indicate that the system has determined that it is highly relevant to the text entered in the search field. The bold font can indicate that clicking the item will trigger a purchase. The eBay search 606 is similarly large, potentially indicating that it is also highly relevant, but not bold because there is no one-click purchase associated with that item 606. The Google search 604 is presented to the side, in a smaller font, indicating that it may be of lesser relevance or importance. The various details of these items can vary in a smooth, animated fashion as the user enters additional information in the search field 302. For example, as the user enters more information about the specific desired iPhone, the system can adjust the Amazon 602 option on the user interface to gradually increase in size, move closer to the search field, be drawn with thicker lines, and so forth. The system can provide these details as an animation for the user so that increasingly relevant items are presented in increasingly discoverable places or increasingly prominently.

FIG. 6 illustrates various options of how to structure and present the selectable options from a one-search input field. In one aspect, traditional drop-down options can be presented in a normal fashion with purchasing options presented like feature 602 in FIG. 6 thus providing a further differentiation of which items are standard drop-down menu, auto-complete type options and which ones are one-click purchasing type options. The system can, in the tag field or in other examples, present targeted advertising. For example, in FIG. 6, the user could have entered "buy Amazon iPhone 5S." This would result in a high likelihood or probability that the user wants to buy that product via Amazon, thus causing the system to present feature 602 showing that option in a large font and close to the input field 302. In other words, like tag clouds which make larger words of higher usage or interest in a story or from cloud input. Feature 604 could represent a paid-for advertisement from a competitor who may offer a cheaper price for the same product. Such information could be presented as part of an icon or advertisement represented as feature 604.

A description of a basic general-purpose system or computing device in FIG. 7 which can be employed to practice the concepts, methods, and techniques disclosed is illustrated. With reference to FIG. 7, an exemplary system and/or computing device 700 includes a processing unit (CPU or processor) 720 and a system bus 710 that couples various system components including the system memory 730 such as read only memory (ROM) 740 and random access memory (RAM) 750 to the processor 720. The system 700 can include a cache 722 of high-speed memory connected directly with, in close proximity to, or integrated as part of the processor 720. The system 700 copies data from the memory 730 and/or the storage device 760 to the cache 722 for quick access by the processor 720. In this way, the cache provides a performance boost that avoids processor 720 delays while waiting for data. These and other modules can control or be configured to control the processor 720 to perform various operations or actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the processor. The processor 720 may be a self-contained computing system, containing multiple cores or processors, a bus, memory controller, cache, etc. A multi-core processor may be symmetric or asymmetric. The processor 720 can include multiple processors, such as a system having multiple, physically separate processors in different sockets, or a system having multiple processor cores on a single physical chip. Similarly, the processor 720 can include multiple distributed processors located in multiple separate computing devices, but working together such as via a communications network. Multiple processors or processor cores can share resources such as memory 730 or the cache 722, or can operate using independent resources. The processor 720 can include one or more of a state machine, an application specific integrated circuit (ASIC), or a programmable gate array (PGA) including a field PGA.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 760 can include software modules 762, 764, 766 for controlling the processor 720. The system 700 can include other hardware or software modules. The storage device 760 is connected to the system bus 710 by a drive interface. The drives and the associated computer-readable storage devices provide nonvolatile storage of computer-readable instructions, data structures, program modules and other data for the computing device 700. In one aspect, a hardware module that performs a particular function includes the software component stored in a tangible computer-readable storage device in connection with the necessary hardware components, such as the processor 720, bus 710, display 770, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 700 is a small, handheld computing device, a desktop computer, or a computer server. When the processor 720 executes instructions to perform "operations", the processor 720 can perform the operations directly and/or facilitate, direct, or cooperate with another device or component to perform the operations.

Although the exemplary example(s) described herein employs the hard disk 760, other types of computer-readable storage devices which can store data that are accessible by a computer, such as magnetic cassettes, flash memory cards, digital versatile disks (DVDs), cartridges, random access memories (RAMs) 750, read only memory (ROM) 740, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system example is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 7 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 740 for storing software performing the operations described below, and random access memory (RAM) 750 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited tangible computer-readable storage devices. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules may be stored on the storage device 760 and loaded into RAM 750 or memory 730 at runtime or may be stored in other computer-readable memory locations.

One or more parts of the example computing device 700, up to and including the entire computing device 700, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 720 can include all types of processors disclosed herein, including a virtual processor. However, when referring to a virtual processor, the processor 720 includes the software components associated with executing the virtual processor in a virtualization layer and underlying hardware necessary to execute the virtualization layer. The system 700 can include a physical or virtual processor 720 that receive instructions stored in a computer-readable storage device, which cause the processor 720 to perform certain operations. When referring to a virtual processor 720, the system also includes the underlying physical hardware executing the virtual processor 720.

In each case within this disclosure, reference to "Amazon" or Amazon.com" is broad enough to encompass any purchasing/delivery or ecommerce website, as well as websites for traditional, brick-and-mortar businesses that provide goods or services. References to a "Google" site or search refer to any generalized search engine. In many instances, the principles set forth herein may be applicable to other, non-search and non-commerce sites, which the system can manipulate or traverse in order to accomplish a specific, intended action on behalf of the user.

The system of FIG. 7 can also represent a virtual reality device. The device can be a headset that is entirely contained or can include a headset that receives a mobile device such as a Samsung device or an iPhone or other mobile device. In this regard, the features of FIG. 7 can include the components of such a headset. The input device 790 can represent one or more different types of input devices, such as a camera for taking still images or video, a fingerprint reader which can be configured on a side of the headset for easy confirmation of purchases by a user, while in a virtual reality environment. The output device 770 can represent a screen through which the user views images. A communication interface 780 can provide a Wi-Fi, or cellular or other wireless communication means with other devices, access points, base stations, and so forth. The adjudication interface 780 may also represent an interface between a removable mobile device and the headset for communicating data between the two components. Memory 730 can represent any standard memory used in the art as well as a secure element which can be used to store payment information and/or other user information in a secure manner for use in payment processes such as Apple Pay.

In one example, a virtual reality headset includes electrical components, such that a fingerprint reader can be configured on the top or a side of the headset. The fingerprint reader component can be built into the headset and configured in a position easy for the user to access while they are in a virtual reality environment. In this scenario, if the user makes a purchase within the virtual reality environment, there using a payment process which requires a fingerprint authorization, the user could provide a fingerprint on the side of the headset to complete the purchase. The virtual reality environment, instructions could be provided to the user on the screen which could even points to the area on the headset where the fingerprint reader is positioned. The virtual reality headset could also include browser software or software or firmware with similar functionality which is configured to be able to communicate with merchant sites via the browser payment request application programming interface. Accordingly, the application which presents the virtual environment could act as a browser. In this respect and be programmed with the browser API protocols, either store the necessary payment and other user data, or have the communication capability of accessing external payment and/or other user data, which can be accessed wirelessly from a mobile device of the user which stores such data in, for example, a Microsoft wallet, and android wallet, a crypto current to wallet, and Apple pay wallet, and so forth. In one aspect the browser API will be enabled to process two purchases at once where a separate instance of the API of the browser can engage in a browser API interface payment dialog on two separate sites at once. If the user tries to do two at the same time, the system could identify one interface as a first interface and a second interface as the second interface and separately manage the payments for the two separate sites at the same time.

Some virtual reality sets also include handheld components that can be used to present items such as baseball bats or fishing poles in the virtual reality environment. These communicate wirelessly with the headset and monitor the position and movement of each unit such that if the user is swinging a bat, the bat shows up in the virtual world. These handheld component s could also have a fingerprint identification on them such that a user may be holding a handheld unit in his left hand and make a purchase in the virtual environment. Then, the user can touch the sensor with his right hand index finger to provide the confirming fingerprint. The data can be communicated through Bluetooth or other protocol or wired to the user device or headset which can utilize the information as disclosed herein to make a purchase.

Figure 8:
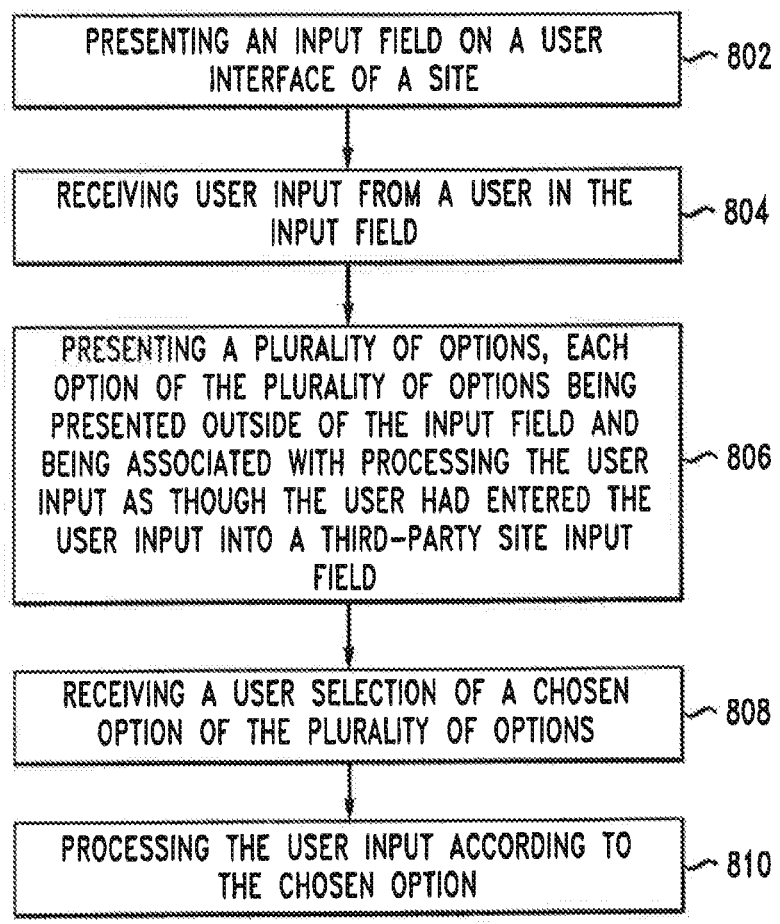
FIG. 8 illustrates an example method example for processing a selection from a user.

FIG. 8 illustrates an example method. In each case, wherever a "website" is mentioned, an application or site could also apply, such as when a mobile application is used to access data. A system will perform the steps of the method. The system presents an input field on a user interface of a website (802) and receives user input from a user in the input field (804). The system analyzes the input to determine whether the user wanted a search, to make a purchase, to perform some other function such as making a call, or watching a video, and so forth. The system presents a set of options, each option of the set of options being presented outside of the input field and being associated with processing the user input as though the user had entered the user input into a third-party website input field (806). Of course one option could be presented as well. FIGS. 2 and 3 provide examples of presenting the set of options for processing. A component of this approach is that the input field is not pre-designated or pre-designed to process the input in one particular context, but the input field is open to a variety of ways of processing the input, thus reducing the number of clicks necessary to navigate from one website to another to input data. The system receives a user selection of a chosen option of the set of options (808) and processes the user input according to the chosen option (810).

A first option of the set of options can be associated with a search engine and a second option of the set of options is associated with a purchase-processing engine. If the chosen option is the second option and associated with a purchase-processing engine, then the system will identify an item associated with the user input and process a purchase of the item and delivery of the item to the user. If the chosen option is the first option and associated with a search engine, then the system processes the user input to perform a search associated with the user input and returns search results. The method can also include identifying respective types for the set of options and presenting the set of options in groups based on the respective types.

The user input can include at least one of text input, multimodal input, gesture input, or voice input, or any combination thereof. The user can have a pre-existing account storing preferences governing how the set of options are presented. The browser API could also work in any kind of interface, such as a television interface where users could be enabled to buy items if the interface is considered a browser interface.

Figure 9:
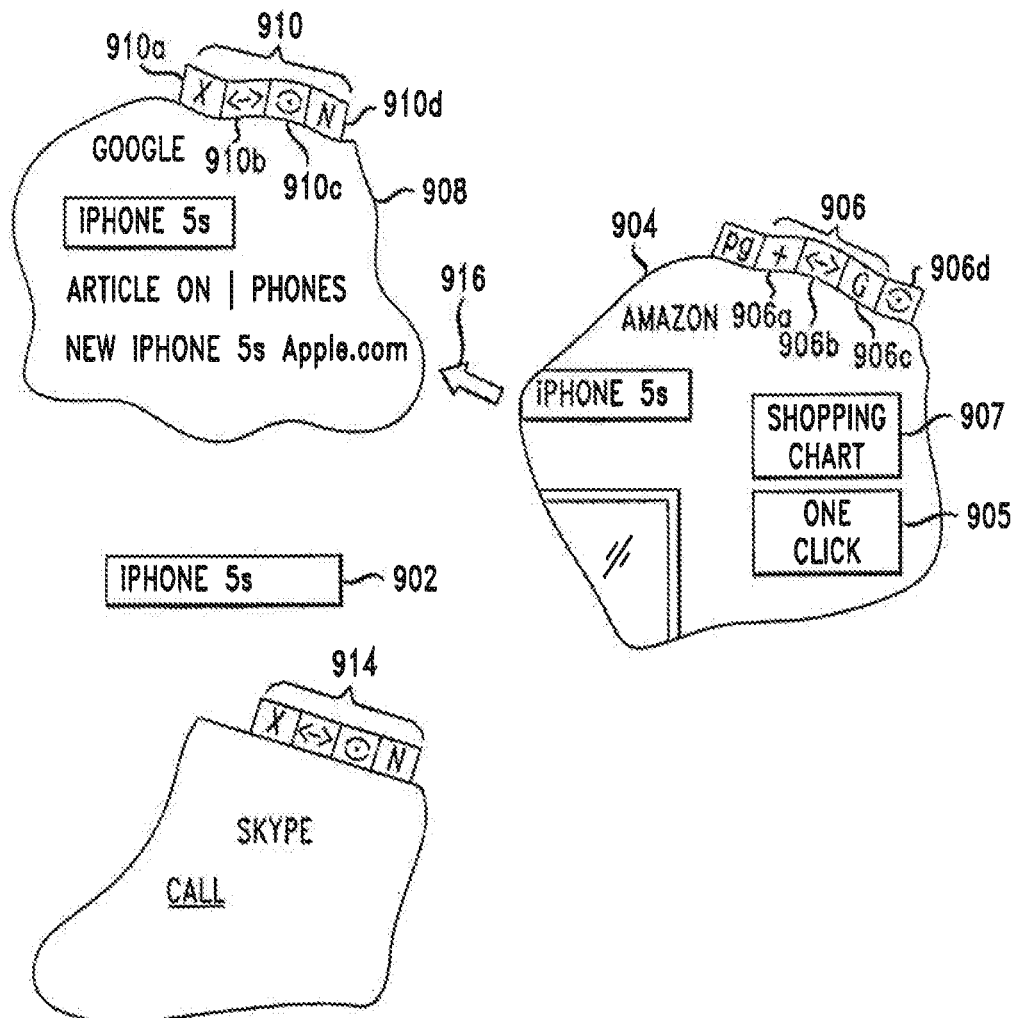
FIG. 9 illustrates a user interface associated with an example.

Executing an Action Based on Input Directed to a User Interface Integrated from Another Source FIG. 9 illustrates a user interface associated with an example of transitioning from an input field to a destination site. In this example user interface, the user enters the text "iPhone 5S" into a unified input field 902. The browser communicates the text to a one-search server that returns navigation destinations. The web browser can render "tears" 904, 908 in the page that appear to be holes in the interface peering into underlying other pages. The tears have two position considerations, the position of the tears in the host page, and the view of the tears onto the destination page. The system can consider both of these positions when determining the location and size of the tears to present. The user can click on the tear to navigate to that destination website. In that case, the tear can transition in the same manner as a click on a link to navigate to a different page, or can present an animated transition, such as expanding the boundaries of the tear until the tear completely replaces the previous page. The tears can include various controls 906, 910, 914 fitted along an edge of the respective tear so a user can manipulate the tear to move, maximize 906a, expand 906b, 910b, preview 910c, 906d, close 910a, go to the page 906c, or perform some other action on the tear. Further, the user can directly manipulate exposed user interface elements shown in the tear, such as the one-click purchase button 905 or the view shopping cart button 907. Some tears can show other non-web actions, such as a view into a Skype application to make a call. The system can position tears that are a closer match to an intent determined from the text entered in the unified input field so the more important tears are closer to the mouse cursor 916 or to the unified input field, for example. The system can expand a tear dynamically as a mouse 916 moves closer to the tear, and shrink the tear as the mouse 916 moves farther away. The tear edges can be any shape, including standard geometric shapes, or can have more complex edges that are sharp or smooth, or that are dynamic and can change based on various factors.

In a touch-based interface, a user can use touch gestures to manipulate the tears. For example, the user can tap and hold on a tear to begin moving the tear around on the page. The user can swipe to move the view of the page in the tear, or pinch to zoom on a page displayed in the tear. A user can double tap on a tear to navigate to the page displayed in the tear. The system can display content in the tears at a same zoom factor as the host page, or can shrink the content displayed in the tears to display a broader view of the content.

Figure 10:
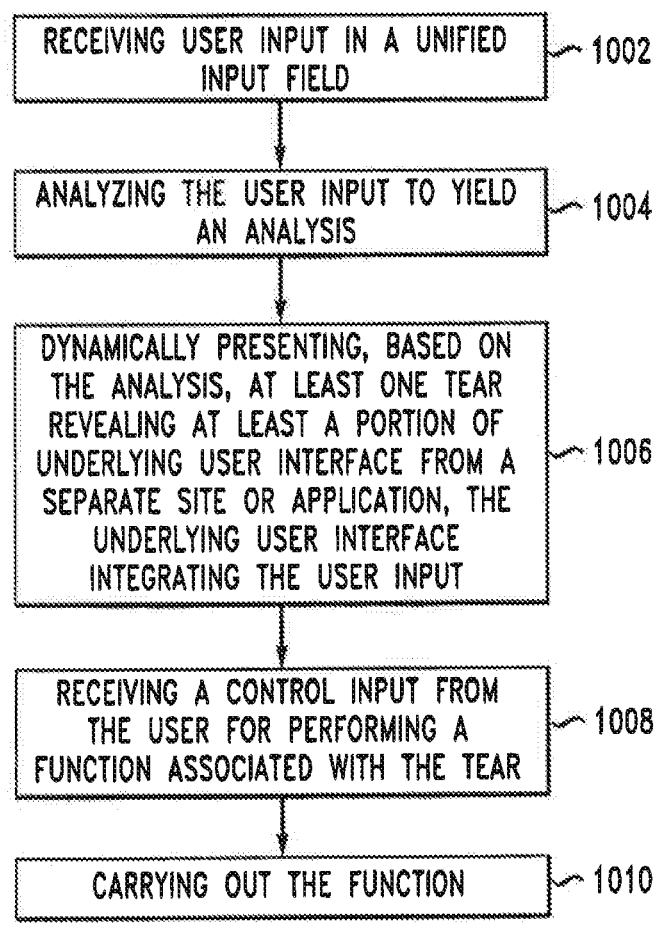
FIG. 10 illustrates a method example for executing an action based on input directed to a user interface integrated from another source.

FIG. 10 illustrates an example method for executing an action based on input directed to a user interface integrated from another source. In this example, a system performing the method receives user input in a unified input field (1002). The system analyzes the user input to yield an analysis (1004). The system dynamically presents, based on the analysis, at least one tear revealing at least a portion of underlying user interface from a separate site or application, the underlying user interface integrating the user input (1006). The system receives a control input from the user for performing a function associated with the tear (1008). The system can then carry out the function (1010).

Modifiable Enter Button

A system, method and computer-readable storage devices are disclosed which dynamically morph or adapt the search button associated with a unified input field based on an intent determined via a classifier and based on text provided to the unified input field. Typically a unified input field has two main components: a text input field, and a search button to execute a search based on input provided via the text input field. The search button is typically labeled with the text "search" or "go" or something similarly generic. However, as the user enters a search term, the system can identify some other, more specific action, and can modify the search button to not only display dynamically a different text or graphical label, but can also modify the action associated with the button accordingly. Additionally, the system can expand the single search button into multiple buttons.

For example, the user enters the text "Apple." At that point, the classifier does not determine that the text string "Apple" is sufficiently tied to a specific action or item to modify the label on the search button. So the search button remains unchanged. The user continues to enter the text "Apple iPhone." At this point the classifier identifies, based on the additional text, that several specific items or actions are likely, but too many of the items or actions are available or none are above a certainty threshold to modify the search button. The user continues on to enter the text "Apple iPhone 5S," at which point the classifier identifies a model of iPhone, the 5S. Then, based on user preferences or on other available data, the classifier can identify a specific variant of the iPhone 5S, such as a gold 64 GB iPhone 5S. Thus, the system can modify the label of the search button to no longer say "search," but instead to say "Purchase iPhone 5S, 64 GB, Gold." The user can, at that point, simply hit enter on the keyboard to execute that action and purchase the indicated iPhone 5S. The enter function is thus dynamic and changes from a first time in a default mode to a second function at a second time after the user starts typing a search query.

As an alternative to modifying the search button, the system can generate and present additional buttons next to the search button or a menu that drops down or up or any other interface. The system can provide an indication that different keys or key combinations will activate the different buttons. For example, hitting enter will activate the functionality associated with the "search" button, while hitting ctrl-enter will activate the functionality of the "Purchase iPhone 5S, 64 GB, Gold" button. Moving a cursor over an object can trigger or activate the change in the function performed when the user hits "enter." As the system presents additional buttons, the user can also click on the additional buttons to activate their various associated actions.

In some cases, the modified button can still require some additional disambiguation. For example, the modified button can be labeled "Purchase iPhone 5S, 64 GB." As the user presses enter to activate the modified button, the system can present an additional dialog or button modification, such as modifying the button to say "Press enter once for Gold, twice for Silver, or thrice for Black." After the user provides that input, the system can modify the button label to say "Press enter once to purchase from Apple, twice to purchase from Amazon." The system can modify the button label with these additional messages, or can present them at some other location on the page. In this way, the user can quickly enter the text associated with a desired action or purchase, and select the various options easily and without moving his or her hands back and forth between the keyboard and the mouse, and can navigate between a disambiguation decision tree using very simple and familiar inputs.

If the user makes a mistake or wants to cancel the selection, the user can simply hit backspace to delete characters in the entered text, which would potentially change the context, and trigger a reset of the modified button and corresponding action or actions. If the user made a mistake and wants to back out of the selection, he or she can simply hit the escape key or provide some keyboard, mouse, or other input indicating to the system to go back.

The system can learn the behavior patterns and preferences of the user and adapt accordingly, so that, over time, the system can require less and less input from the user to accurately determine or classify the user's intent. For example, the system can know which items the user has already purchased, which items the user has discussed with friends or family, which gift-giving events are coming up soon, and so forth. Based on all these data points, the classifier can make more accurate guesses regarding the user's possible or likely intent.

In a mobile device, which does not have a mouse and a keyboard, but instead is typically equipped with a touch sensitive screen or a stylus, the approaches set forth above may be modified. For example, instead of modifying a button in a traditional desktop style search field and search button pair, a mobile variation of the system can provide a search field for the user to enter text via an on-screen virtual keyboard, voice input, or some other input approach. As the user inputs text, the system can present a list of one-click actions in a drop-down manner from the search field. While some of the one-click actions may be implementing a search in the traditional manner, other one-click actions may include navigating to a specific stage in a website, such as the stage in Amazon.com where the user is already logged in and simply has to execute the "one click" to purchase, or placing a bid on eBay, or at the final check-out phase of an online merchant's shopping cart with a desired item already added to the shopping cart. The user can dismiss one-click actions in the list by swiping them off the screen.

Adjustable Enter Functions as the User Enters Input

Figure 11:
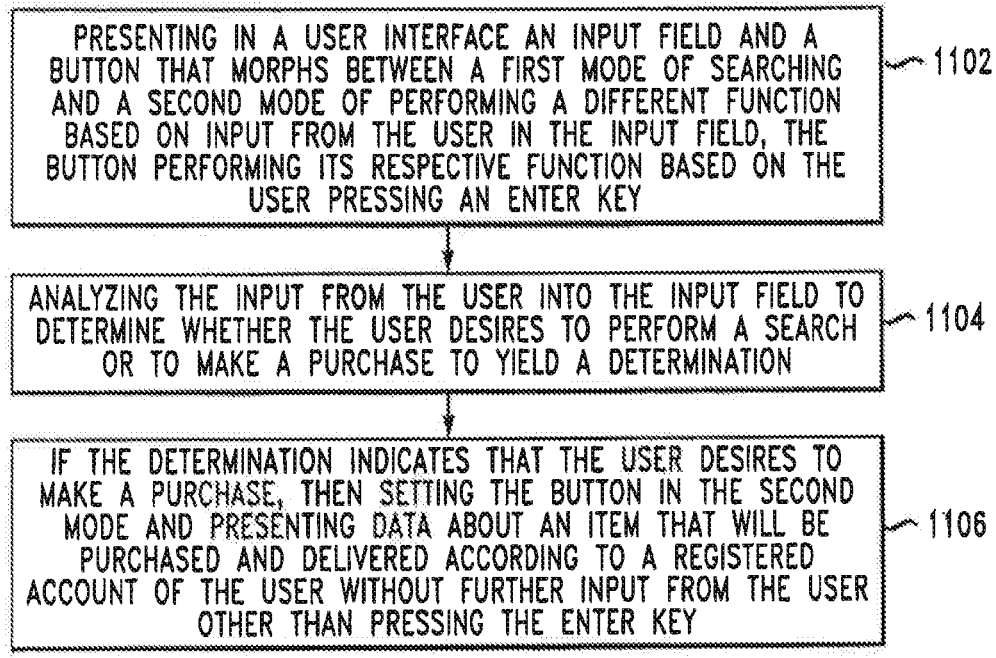
FIG. 11 illustrates an example method example for a modifiable entry button.

Another concept disclosed herein relates to approaches for dynamically modifying an enter function that will process user input as the user enters the input. For example, as the user starts to type text in an input field, a default function might be a Google search on the text. However, as the user types the second portion of the text, the function that occurs when the user hits enter can be modified into an Amazon.com search on the text. Visual indications of the change in the enter function can be presented in a menu system or via selectable objects. FIG. 11 illustrates a method example. The steps in the method example can be performed in any order, can be performed in other combinations or permutations that include additional steps or exclude all or part of some of the described steps. The system can present in a user interface an input field and a button that morphs between a first mode of searching and a second mode of performing a one-click purchase and delivery based on input from the user in the input field, the button performing its respective function based on the user pressing an enter key (1102). The user interface, while receiving the input, can present disambiguation information indicating to the user what key entry is needed to disambiguate the item to be purchased, and wherein upon receiving the key entry from the user such that a confidence level in the item desired to be purchased meets a threshold, the button can morph into the second mode. The first mode of the button can be a default mode for the button.

The system can analyze the input from the user into the input field to determine whether the user desires to perform a search or to make a purchase to yield a determination (1104). If the determination indicates that the user desires to make a purchase, then the system can set the button in the second mode and present data about an item that will be purchased and delivered according to a registered account of the user without further input from the user other than pressing the enter key (1106). The system can manage the entire process of buying and delivering an item by processing a payment for the item from the registered account associated with the input field entity and coordinating the delivery of the item through a business partner merchant. The item can be a product or a service. The system can select the item that will be purchased and delivered based on a probability that the item is a most likely item that the user desires to purchase based on the input. For example, a classifier can determine the probabilities and the items based on a user history of purchases, a user history of searches, a time of day, a time of year, social media data, information about holidays, user profile data, and/or user account balance information. The purchase and delivery data can be retrieved through the browser API disclosed herein between the destination merchant site and a browser of the user. The second mode can also include a transition to a second destination site (such as Amazon.com) in a searched state based on the user input, as though the user had navigated to Amazon.com (or any other secondary site) and entered in the user input and clicked search.

Figure 12A:
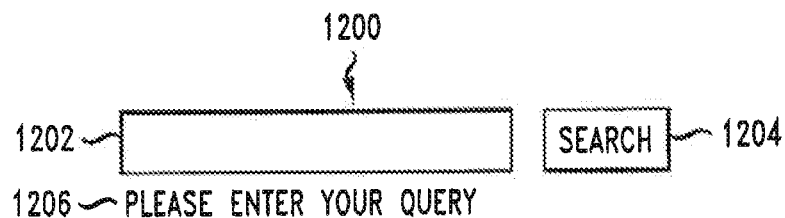
FIG. 12A illustrates an example modifiable entry button.
Figure 12B:
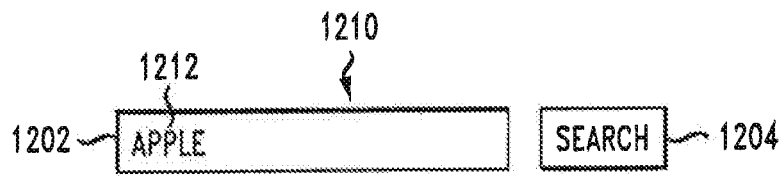
FIG. 12B illustrates input into an input field with a modifiable entry button.
Figure 12C:
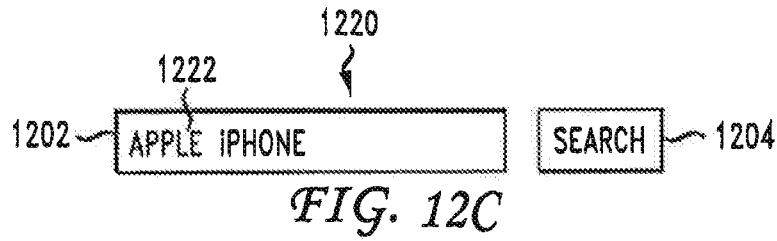
FIGS. 12C and 12D illustrate various changes and modifications that occur as a user types into an input field.
Figure 12D:
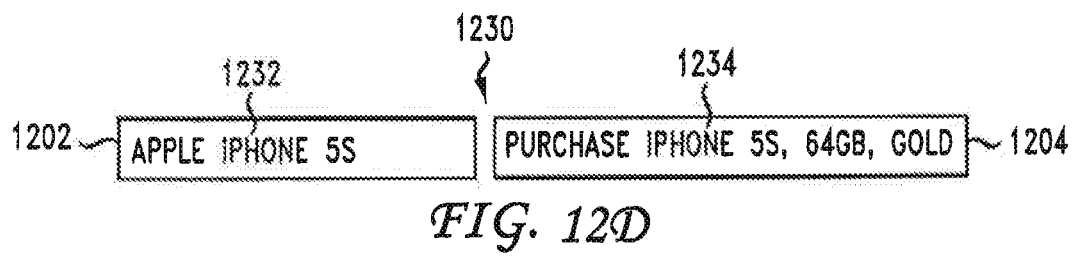

FIG. 12A illustrates a user interface 1200 with a generalized input field 1202 and a morphable search button 1204. The search button 1204 is really a generalized function button. The system can instruct the user 1206 to input a query or other input. The difference in this approach is that the function performed by hitting the "search" button will differ depending on the user input. This will be explained in stepping through the figures. FIG. 12B shows input in the interface 1210 starting to be put into the field 1202 of the word "Apple" 1212. The system processes this input to determine whether to change or modify the function performed when the user clicks "search" 1204 or hits the enter button. FIG. 12C illustrates additional input "Apple iPhone" 1222 in the user interface 1220. The system would continue to process that input and would be beginning to determine that perhaps the user desires to perform the function of a purchase as opposed to just a Google-type search. FIG. 12D illustrates an interface 1230 in which the input has continued to be more specific to include "Apple iPhone 5s" 1232. At a threshold point in analyzing the user input, the system reaches a high enough confidence that a particular function is desired. This could be based on historical searching data or the text itself independent of history. Here, the system changes the button 1204 from "search" to "Purchase iPhone 5s, 64 GB, Gold" 1234. Options not identified in the user input can be inserted into the text such that disambiguation can occur as well. But in this instance, the system, from a unified, generalized input field (from which searches and purchases can be made), enables the user to simply press "enter" or click on button 1204 in FIG. 12D and complete the processing and delivery of the purchase.

As can be appreciated, the approach enables a dynamic modification of the function that is carried out when the user hits enter or clicks on an icon, 1204. In some interfaces, such as is shown in FIG. 3, the default process 304 is presented right below the input field 302. Thus, given the state of the interface of FIG. 3, if the user hit enter, then a Google search for the words "iphone 5s" would be carried out. Applying the principles described with respect to a dynamically changing result when hitting the enter key is the user types their input, in one example, if the user were to continue typing in the input field 302 "Apple iphone 5s", the order of items in the menu could be modified such that the Amazon search option 312 is moved to the position where the default Google search 304 option is. This would be the indication to the user, like the changing button in FIG. 12D, that hitting enter will carry out a different process than would have been carried out when the user began typing.

A further interface can include which various buttons are presented for clicking on by the user. Buttons can show different options for the user to make the purchase via "one-click." If there is still a likelihood that the user may simply want to search, then the search button can also be made available. One of these can be highlighted in some way to identify that if the user hits "enter" on the keyboard, that the particular highlighted button will be the one that will process the input as a purchase or a search. In this manner, the user can enter the input data first, and then perform the function, rather than first navigating to a website (like Google or Amazon.com), and then entering the user input data. Another interface allows the user to give a direct hint by typing "purchase iPhone 5S, 64 GB, Gold." In this case, the system could then present options for the user to purchase it through Apple with shipping information, or Amazon with its price and shipping information 1256 or through a carrier, for in store pickup. The system negotiates the necessary purchasing information (credit card, debit card, delivery address, etc.) with the various websites so that it is presented to the user as a one-click purchase in the interface. This currently is not available to users and they must navigate to the separate website, like Amazon.com, where they have such information registered.

In another example of how the search button can be morphed, in some browsers, the input field at the top can be used to either enter a URL or enter a Google search. When you start with a search, there is a tag to the right of your typing that indicates what is going on. For example, like this: "dentists Dunkirk Maryland—google search." The "google search" language is not what the user types but is an indication that the browser is treating the text as a Google search. This text of course can also be morphed such that as the text being typed is analyzed, the indication to the user of what will happen when "enter" is hit can change. For example, the user may start typing and see the following: "apple—google search." However, as the user continues to type, it may change as follows: "apple iPhone 5s—Amazon search." As the user continued to type and disambiguate, it could result in the following: "apple iPhone 5s 64 GB silver—Amazon one-click purchase." At this point, the user can hit "enter" and the system coordinates the information necessary to identify the product, purchase account information (which can be with one entity) and delivery information such that the desired product can be purchased and delivered to the user. Delivery can be managed by a second merchant entity from one entity that handles the payment processing.

Figure 12E:
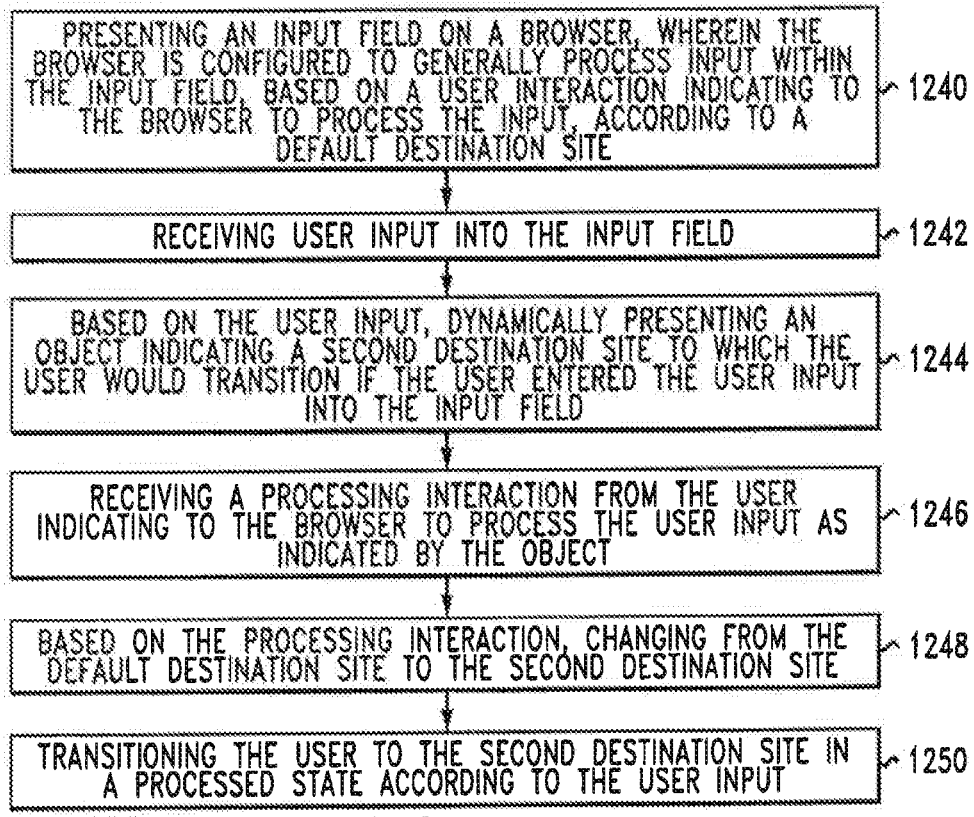
FIG. 12E illustrates a method aspect of modifications that occur as the user types in input.

FIG. 12E illustrates an example method addressing a process of changing from a default processing of user input to a first destination site (such as a default Google search based on the user input) to a second destination site (such as Amazon.com, Wikipedia, or any site). The method includes presenting an input field on a browser, wherein the browser is configured to generally process input within the input field, based on a user interaction indicating to the browser to process the input, according to a default destination site (1240) and receiving user input into the input field (1242). The user input can, in one case, be search terms and not a URL to a specific website. Based on the user input, the method includes dynamically presenting an object indicating a second destination site to which the user would transition if the user entered the user input into the input field (1244), receiving a processing interaction from the user indicating to the browser to process the user input as indicated by the object (1246), and, based on the processing interaction, changing from the default destination site to the second destination site (1248) and transitioning the user to the second destination site in a processed state according to the user input (1250).

As an example of the process shown in FIG. 12E, assume the browser has as his default processing setting a Google search. If the user enters in "north dakota" in his enter on the keyboard or clicks on an object indicate to process the input, then the result presented to the user would be a Google search result for the words "north dakota". However, based on different user input, and in one aspect guided by previous search history or navigation on the browser, the browser can indicate via a button, object, additional text automatically presented in the input field, or an item in a menu, that if the user hits enter on the keyboard or clicks on an object, that the user input will not be processed by the default approach but that a change or transition will occur such that a different destination site or search will be performed when the user clicks on enter. The user might type in "apple iphone 5s" and hit enter, and based on the analysis of the user input as the user is typing, the system can change from the default process to processing the input and transitioning the user to www.apple.com or www.amazon.com, or to any site. Thus, the processing that occurs based on the user hitting enter or the like dynamically changes while the user is typing. The system will, based on the user hitting enter, either process a normal default Google search if the input does not relate to say products at Amazon.com, or if an analysis of the input indicates that it could be product related, the system changes the result of the user hitting enter into an Amazon.com search, or other merchant site search and transitions to the destination site.

Figure 12F:
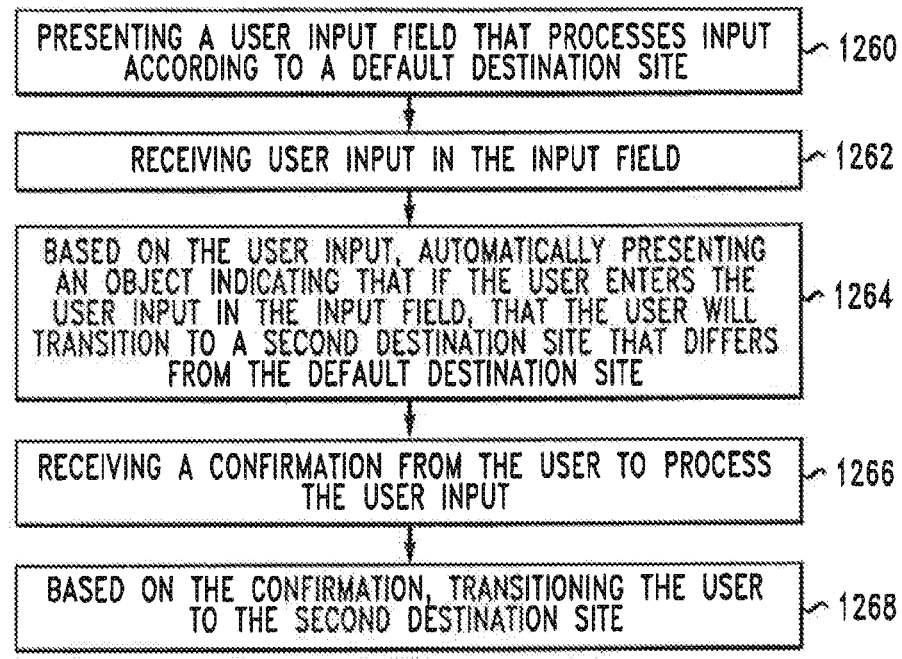
FIG. 12F illustrates another method aspect of modifications that occur as the user types in user input.

FIG. 12F illustrates another aspect of dynamically changing the processing of the user input. The method includes presenting a user input field that processes input according to a default destination site (1260), receiving user input in the input field (1262), based on the user input, automatically presenting an object indicating that if the user enters the user input in the input field, that the user will transition to a second destination site that differs from the default destination site (1264), and receiving a confirmation from the user to process the user input (1266). The method further includes, based on the confirmation, transitioning the user to the second destination site (1268). The confirmation can be the user hitting an enter button, providing some other type of input indicating that the user input should be processed or pressing the enter key on a keyboard. The order of items in a menu can also dynamically adjust as the user types such that the default site changes while typing. The user can monitor these changes while typing and arrive at a one click opportunity to transition to the chosen destination site. The one click can be the enter button on a keyboard or a click object for processing the user input. It is noted that No other input necessary. The presenting of the object is based on the typing of input into the user input field and without any other manual interaction from the user. It is noted that the user does not have to touch the enter button by the object is presented dynamically as the user types and based on an analysis of the input as the user types. Thus, the change in destination site process can occur dynamically as the user types.

Another example, based on the discussion above could be from the standpoint of the destination site. Thus, whatever coordination or communication of data would be necessary would be included as an embodiment, such that a destination site such as Amazon.com, eBay or Wikipedia or any other site, could receive a transition from user input in an input field such that the default destination site gets modified to a secondary destination site. This embodiment would include receiving such a transition at the destination site in which the transition was enabled via the process is set forth above.

Another aspect of this disclosure relates to the timing of the process. A first time can be established as a time prior to a user entering data into the input field and/or a portion of time as the user begins typing in input into the input field. At the first time, an enter function is established as a default action when the user types in input and hits the enter key. For example, if a default enter function is a Google search, then at the first time, as a user begins to type in text into an input field, the default enter function is a Google search, which means if a user hits enter with the text in the input field a Google search will be performed on the text. At a second time, which is after the first time, which is after the user starts typing input, the system can change the enter function. For example, after the user types one word or two words (which if the user hits enter after the first word or the second word, the first default function would be performed) and types a third word, based on the overall input or part of the input, the system determines that a different function should be performed when the user hits enter after the third word. The system then changes the enter function from the default function to a new enter function. The system may determine that a product is entered into the field rather than a place or other inquiry which indicates more of a search intent rather than a purchase intent. A graphical object can also change at the second time to inform the user that the enter function has been changed. The object can be a button, an item in a drop-down menu or other menu, or a rearranging of a menu such the enter function identified in the menu changes. The change may be automatic without any user input or the change in one or more of the enter function or a graphical indication of a change in the enter function can be triggered by the user interacting with a menu item or other object which triggers the change, such as moving a cursor over identification of what a suggested new enter function would be, which can cause the change to occur. It is also noted that in one aspect the input by a user relates to search terms and not a URL of a website. Some input fields on browsers enable the user to enter a default Google search or a www.website.com URL, in which case, when they hit "enter", they are transitioned to the www.website.com. Thus, the input in one scenario differs from a URL or website identifier.

In another aspect, the user input can be characterized as a first portion and a second portion. FIGS. 12A-12C illustrate an input field with no data, or the beginning of a search query, such as the word "apple" and "iphone." This text can represent a first portion of the user input. While the user is entering the first portion, the default enter function 1204 is operational. If the user clicks on the search button or hits enter on the keyboard, the default search function will be carried out. As the user enters the first portion of the user input, an enter function is set such that if the user interacts with an enter button while entering at least part of the first portion of the user input, the method includes processing the first portion of the user input according to the default destination site. FIG. 12D illustrates additional text "5s", which can represent a second portion of the user input. As the user begins to enter the second portion of the user input, the enter function is changed or set such that if the user interacts with the enter button while entering at least part of the second portion of the user input, the method includes processing the user input according to the second destination site, which is shown in FIG. 12D as a purchase function 1234 but could include a transition to a second destination site such as Amazon.com with the user input processed as though the user had entered in the user input into a search field of the second destination site. The transition of the enter unction from a default function to a secondary function can occur automatically based on the typing, and can be presented in objects next to the input field, or adjustments made to a drop up or drop-down menu or can be triggered by some user interaction.

Figure 13:
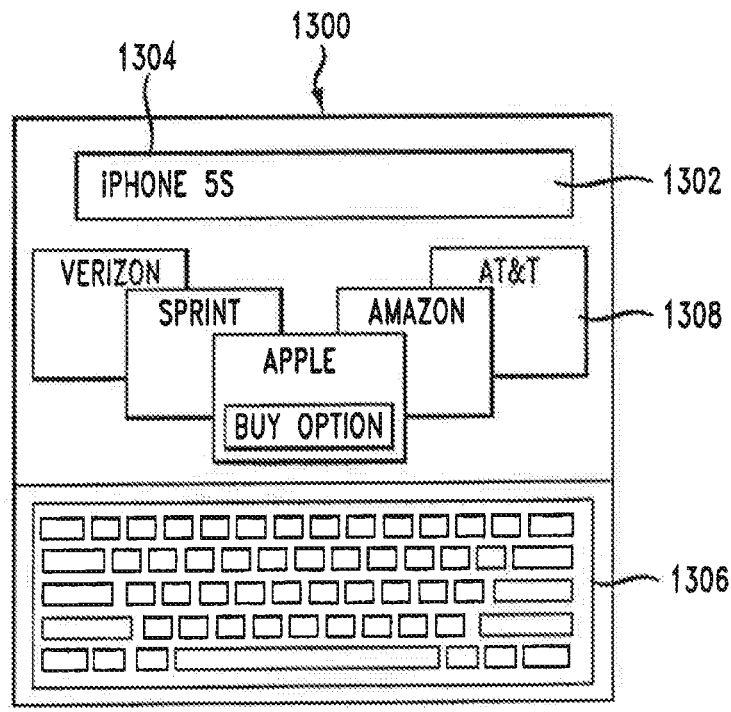
FIG. 13 illustrates an example user interface.

FIG. 13 illustrates a smartphone version of a user interface 1300 in which the input field 1302 has data 1304 that results in various options 1308 presented. A mobile keyboard 1306 is shown as well. Here, the one—search input field 1302 enables the user to put in a generalized input and have various "one-click" options 1308 to scroll through to process the input. Other user interfaces 1300 of course are contemplated for a mobile device or computer. An application and/or backend associated with the interface 1300 can preprocess purchasing and delivery information with various websites, vendors, etc. to enable the user to scan through options 1308 from different sources and just "one-click" from the chosen source. Further, the system can present preprocessed input to a stage not quite at a "one-click" stage but at a search-result stage such that the user can browse and study more before purchasing. For example, the results 1308 can indicate that the advertisement is associated with a buy now option and would be processed according to the principles disclosed herein, such as where the search entity has stored payment information for processing a payment and is communicating with the merchant which will handle delivery. As can be seen in FIG. 13, various merchant branding can be provided in the responses such that merchants can maintain a relationship with the buyer but the purchase process is simplified using the buy option features and APIs disclosed herein.

In one aspect, the various destination options 1308 can switch positions as the user types in the query. For example, as the user begins to type a first portion of the user input at a first time, the top level option might be a search engine which indicates which function will be performed when the user hits enter. As the user continues to type a second portion of the user input, say "5s" as is shown in FIG. 13, the destination functions may adjust based on that input such that a different top level destination function is presented. Thus, if the user hits enter after typing at least some of the second portion of the user input, the user input will be processed according to the secondary function that is identified to the user by virtue of being on a top-level of the menu items 1308.

Universal Search Application Programming Interface (API)

A system, method and computer-readable storage devices are disclosed which replace a URL based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field can simplify this process.

For example, one-search.com can provide a unified input field. The user provides input via the unified input field, such as a search for "iPhone 5S." The system can identify, based on a user profile and on the entered text, a most likely desired page, such as a top ranked page in a listing of search results. The system can modify the "search" button associated with the unified input field to indicate that pressing enter or clicking the button would transition the user to that top ranked page from the search results without the intermediate steps outlined above. However, if the user enters additional information, such as "iPhone 5S 32 GB Silver," then the classifier can determine, based on the text and in conjunction with a user profile or search history, that the user's intent is to purchase the indicated iPhone. In this situation, the system can modify the search button to link directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could modify the button to transition the user to a page ready for the user to make a one-click purchase of the indicated iPhone. Alternatively, the system can modify the button to also include the action of clicking the one-click purchase button, so that the user can go to one-search.com, enter the text in the unified input field, and hit enter to purchase through Amazon. In this case, hitting enter after entering the text in the unified input field could lead to a purchase summary of the just-executed order, potentially allowing the user to modify shipping options, product options, billing information, or other order details. In another variation, the system can place the order automatically based on the user hitting enter in the unified input field, or based on an interaction with a social media site or any site, and transition the user to a webpage for purchasing accessories, service related to the item purchased, technical support pages, or some other related web resource.

Thus, the system can immediately transition the user from a one-search.com unified input field or any site to a one-click purchase page on Amazon, for example, when the user hits enter in the unified input field or processing input or interaction on any site. The system could also include the purchase in the transition action, so that the purchase is completed based on the user pressing enter in the unified input field. In this regard, one-search.com would handle the purchase but then coordinate with the second entity such as Amazon.com or a merchant to complete the delivery of the item.

The system can present different options or different destinations based on user input. For example, the system can present a message or indication that pressing "enter" by itself would transition the user to a one-click purchase page for the desired item on Amazon.com, while pressing "alt-enter" would automatically make the purchase on Amazon.com. The system can present a message to the user stating that pressing "shift-enter" would transition the user to a pre-populated shopping cart page on Apple.com, ready for the user to click "submit order." Multiple different keys and/or key combinations can trigger different behaviors based on the input in the unified input field. Further, the various actions and key combinations triggering those actions can change as the user enters additional text in the unified input field, or modifies text in the unified input field.

The user can establish preferences with the system, such as indicating that all purchases default to Amazon.com unless the price difference is greater than 20% at a different retailer with which the user has an existing account, or a price difference greater than 30% at a different retailer with which the user does not have an existing account. In this way, the system can act intelligently based on rules or policies that the user establishes.

In one aspect, the system can act intelligently based on financial policies that the user establishes. The system can compare potential purchase prices at differing retailers against user-established financial policies and can make a determination accordingly. For example, an existing policy can state that each month the user is limited to a certain amount of spending money online, such as $500. When the user approaches the online spending limit, the system can advise the user that a particular purchase would completely deplete the user of any more spending money for the month. The user can then make a purchase decision with this additional information. For instance, the user may opt to buy a moderately priced iPhone instead of buying the most expensive iPhone due to monetary constraints. Or, the user may opt to wait until the following month to buy the most expensive iPhone when the user has more online spending money. The user may decide to go ahead with the purchase anyway, although it violates an established financial policy because the user feels it is an immediate necessity, such as a working phone. Other rules or policies are contemplated that would enable the system to act intelligently on behalf of the user. This approach can also apply to the scenario shown in FIG. 17I in which a browser shopping cart can apply across multiple purchasing sites. Multiple items to be put in the shopping cart from various sites and prior to making a purchase, a policy could be applied which, prior to the purchase being finalized, would analyze the user's financial condition as though the user had made the purchases and make recommendations. The recommendations could include not making any of the purchases, only purchasing one item in the shopping cart, and/or making any other combination of. Suggestions such that the user's financial condition can be maintained in the proper state according to the algorithm applied. Application Ser. No. 14/046,444, filed Oct. 2, 2013, includes a number of concepts which can be applied to the browser shopping cart model disclosed herein. This application is incorporated herein by reference.

Once the user clicks enter, the system can transition immediately to the new URL or destination site as if the user had clicked and navigated through a series of pages in a shopping cart, loading each page in turn and entering data automatically on the browser side, or the system can communicate with the target website directly to accomplish the various sub-tasks associated with selecting an item, adding that item to a cart, entering or selecting shipping and payment information, and so forth, leading up to the final stage where the user simply clicks "submit order." The browser API could be used to manage the payment process. One example of such sub-tasks is that the one-search entity can process payment information and coordinate delivery data to the merchant who will deliver the item. The system can pre-perform all of these steps prior to presenting the page to the user after the user hits enter in the unified input field.

Figure 14A:
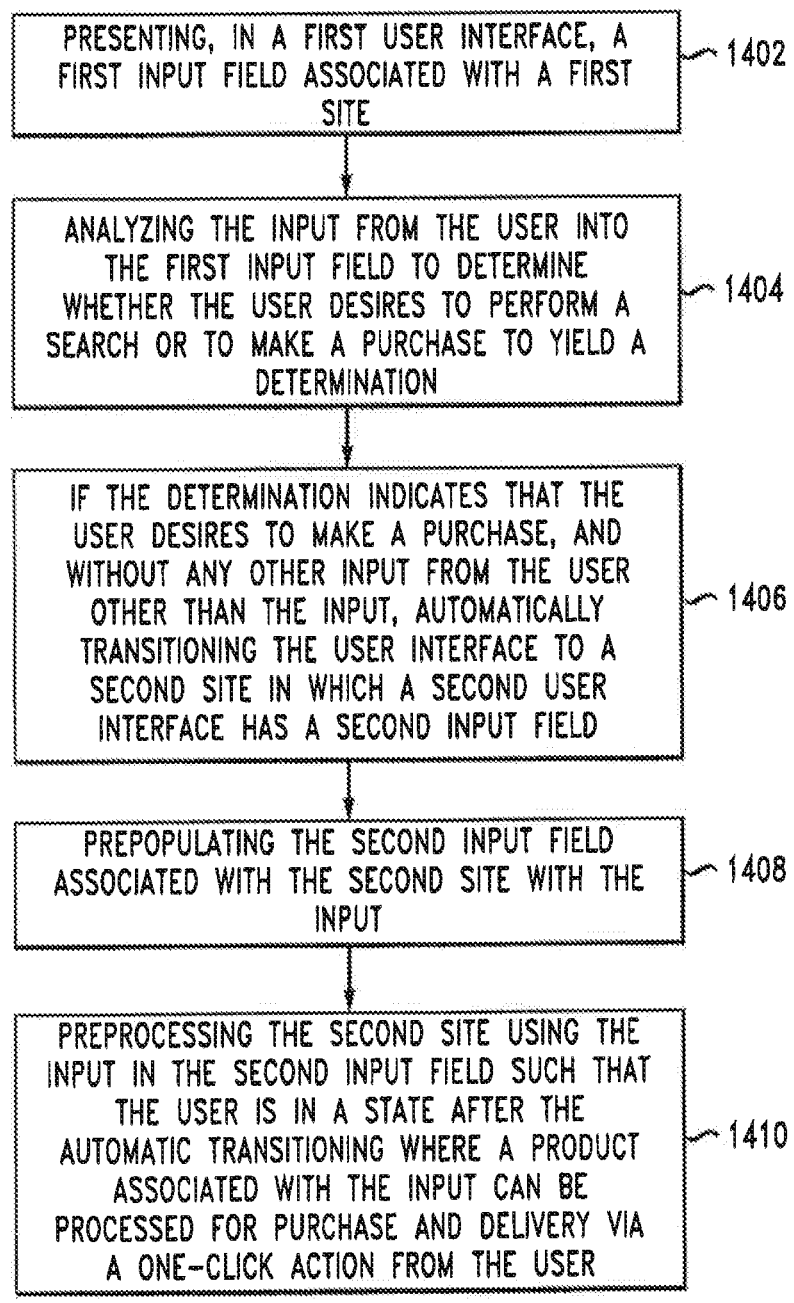
FIG. 14A illustrates an example method example for operation of a search application programming interface (API)

FIG. 14A illustrates a method example. The steps in the method example can be performed in any order, can be performed in other combinations or permutations that include additional steps or exclude all or part of some of the described steps. The system can present, in a first user interface, a first input field associated with a first website (1402). The system can analyze the input from the user into the first input field to determine whether the user desires to perform a search or to make a purchase to yield a determination (1404). The determination can indicate that a confidence level that the user desires to make a purchase has passed a threshold.

If the determination indicates that the user desires to make a purchase, and without any other input from the user other than the input and/or perhaps the enter key, the system can automatically transition the user interface to a second website in which a second user interface has a second input field (1406). The system can prepopulate the second input field associated with the second website with the input (1408). The system can preprocess the second website using the input in the second input field such that the user is in a state after the automatic transitioning where a product associated with the input can be processed for purchase and delivery via a one-click action from the user (1410). The system can, for example, transmit user data from one of the first web site and/or a browser via an API to the second website, or automatically navigate through a shopping cart model of the second website to yield the state where the product can be processed for purchase and delivery via the one-click action. The system can automatically transition the user interface to the second website by replacing the first website in the uniform resource locator field of a browser with the second website in the uniform resource locator field of the browser. The system can further prepare a third website having a third input field preprocessed using the input, wherein the user can provide a switching input to indicate that the third website should be presented rather than the second website. In another example, the first site can process a payment for the item and coordinate with the second site to provide the necessary information for delivery of the item.

Figure 14B:
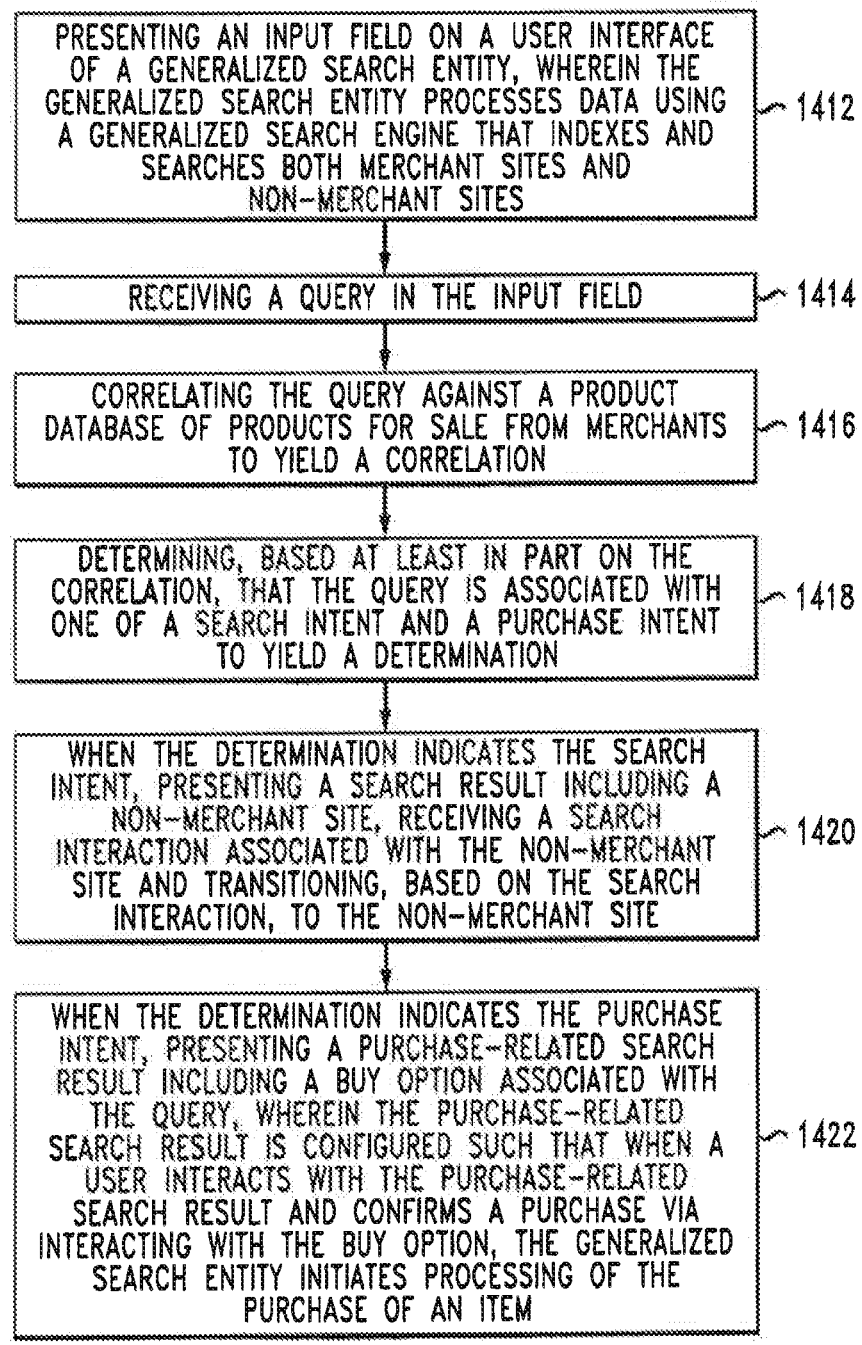
FIG. 14B illustrates another example method for operation of a search application programming interface (API) from a search engine side of the processing.

FIG. 14B illustrates an example of processing between a search engine and a merchant via the API from the search engine viewpoint. The method includes presenting an input field on a user interface of a generalized search entity, wherein the generalized search entity processes data using a generalized search engine that indexes and searches both merchant sites and non-merchant sites (1412), receiving a query in the input field (1414) and correlating the query against a product database of products for sale from merchants to yield a correlation (1416). The method includes determining, based at least in part on the correlation, that the query is associated with one of a search intent and a purchase intent to yield a determination (1418). When the determination indicates the search intent, the method includes presenting a search result including a non-merchant site, receiving a search interaction associated with the non-merchant site and transitioning, based on the search interaction, to the non-merchant site (1420). When the determination indicates the purchase intent, the method includes presenting a purchase-related search result including a buy option associated with the query, such that the purchase-related search result is configured such that when a user interacts with the purchase-related search result and confirms a purchase via interacting with the buy option, the generalized search entity initiates processing of the purchase of an item (1422). The generalized search entity stores payment information, or a third party payment processing service stores payment information, a browser can store payment data, and one or both of these entities communicates via a communication interface such as an API with merchant site for exchanging advertising information for products from product databases and payment information. Any piece of information of processing can occur on either side of the API between the browser, non-commercial site and/or the merchant site.

In another aspect, the method includes presenting an input field on a user interface of a generalized search entity, wherein the generalized search entity processes data using a generalized search engine that indexes and searches both merchant sites and non-merchant sites, receiving user input in the input field and determining, via a processor, whether the user input corresponds to a product in a product database to yield a determination. When the determination indicates that the user input does not correspond to the product in the product database, the method includes presenting a search result including a non-merchant site, receiving a search interaction associated with the non-merchant site and transitioning to the non-merchant site. When the determination indicates that the user input does correspond to the product in the product database, the method includes presenting a purchase-related search result, wherein the purchase-related search result is configured such that when a user interacts with the purchase-related search result and confirms a purchase associated with the purchase-related search result, the generalized search entity initiates a purchasing process for the product.

From a merchant site standpoint, the method can include providing a database of products from a merchant to a generalized search entity and receiving a payment for a product from the merchant. The product can have been purchased on-line by a user. In this scenario, the product is found and purchased by the user on-line by operations performed by the generalized search entity in which the operations include presenting an input field on a user interface, wherein the generalized search entity processes data using a generalized search engine that indexes and searches both merchant sites and non-merchant sites, receiving user input in the input field, and determining, via a processor, whether the user input corresponds to a product in the database of products to yield a determination. When the determination indicates that the user input does not correspond to the product in the database of products, the method includes presenting a search result including a non-merchant site, receiving a search interaction associated with the non-merchant site and transitioning to the non-merchant site. When the determination indicates that the user input does correspond to the product in the database of products, the method includes presenting a purchase-related search result for the product, wherein the purchase-related search result is configured such that when a user interacts with the purchase-related search result and confirms the payment associated with the product in the purchase-related search result, the generalized search entity initiates a purchasing process for the product.

One aspect of this approach enables the user to easily make a purchase without the need of transitioning to the merchant website, and manually entering in payment and address data. The merchant can coordinate with the search entity the product information and the search entity can manage the payment process and make a payment to the merchant with instructions (purchaser name, address, etc.) for delivering the product to the buyer. Thus, this approach involves a new mechanism and infrastructure for coordinating between the search entity and respective merchants purchases of products from product searches initiated at a generalized search entity input field. This enables easy purchases from a default search field on say www.google.com, www.bing.com, or an input field of a browser set to a default generalized search engine.

The generalized search entity can performs operations including correlating the user input against the database of products to yield a correlation, wherein the correlation is used to infer whether the user has a search intent or a purchase intent. The generalized search entity can receive an interaction associated with the purchase-related search result to confirm the purchase of the product and process a purchase of the product by the generalized search entity using user payment data stored with the generalized search entity or on the user device. By receiving an interaction with a buy option associated with the purchase-related search result and managing a purchase of the product based on payment information stored at the generalized search entity, the coordination between the merchant and the search entity can enable the delivery of the product to be handled via the merchant while the user experience is simplified and can be initiated at a generalized search engine. The merchant can simply receive the payment, address data or any other data and deliver the product to the user.

Figure 14C:
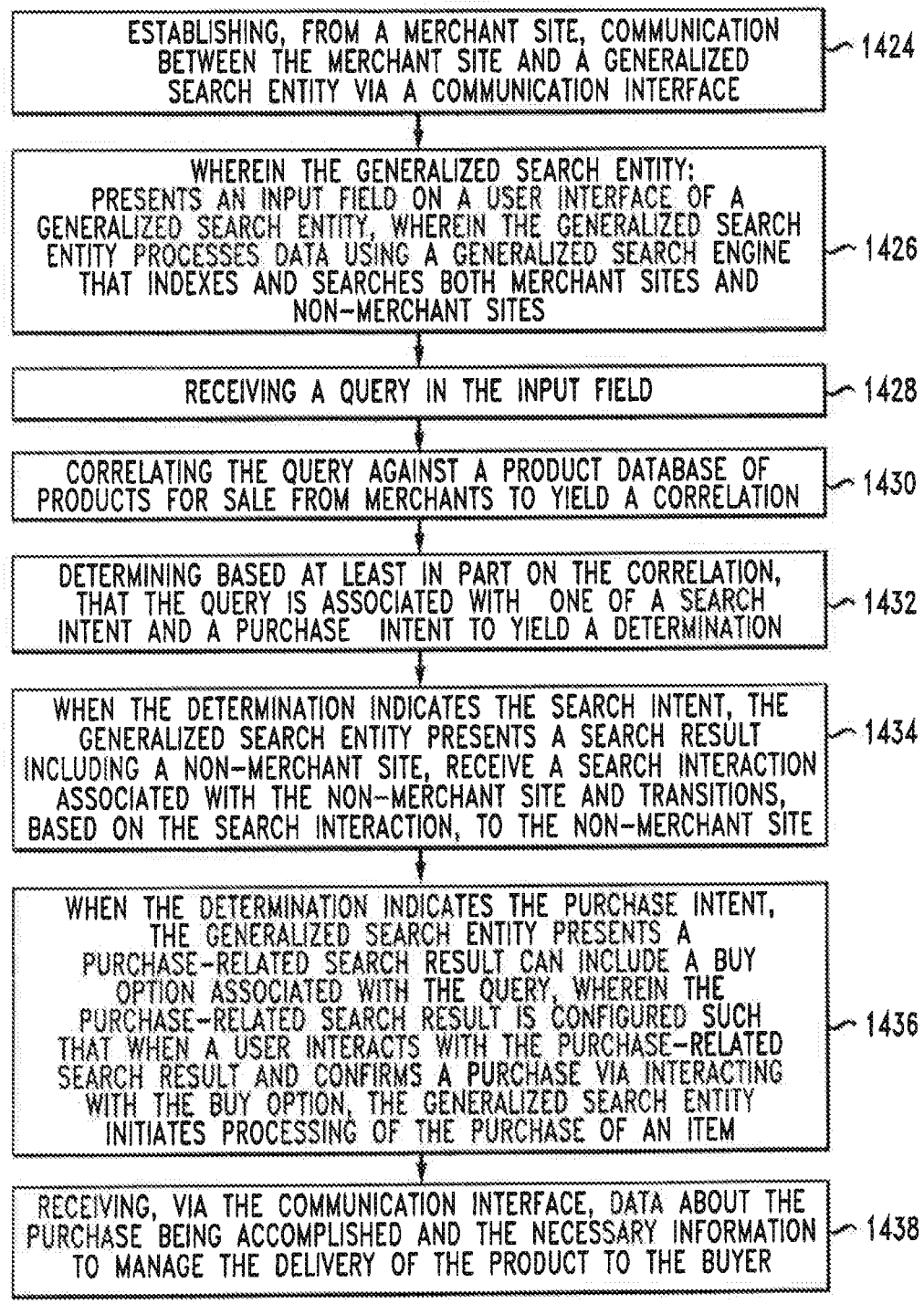
FIG. 14C illustrates another example method for operation of a search application programming interface (API) from a merchant side of the processing.

FIG. 14C illustrates a similar process to FIG. 14B but from the merchant viewpoint. A method includes establishing, from a merchant site, communication between the merchant site and a generalized search entity via a communication interface (1424). The generalized search entity in this case performs the operations describe above. Namely, the generalized search entity presents an input field on a user interface of a generalized search entity, wherein the generalized search entity processes data using a generalized search engine that indexes and searches both merchant sites and non-merchant sites (1426), receives a query in the input field (1428), correlates the query against a product database of products for sale from merchants to yield a correlation (1430), determines, based at least in part on the correlation, that the query is associated with one of a search intent and a purchase intent to yield a determination (1432). When the determination indicates the search intent, the generalized search entity presents a search result including a non-merchant site, receives a search interaction associated with the non-merchant site and transitions, based on the search interaction, to the non-merchant site (1434). When the determination indicates the purchase intent, the generalized search entity presents a purchase-related search result that can include a buy option associated with the query, wherein the purchase-related search result is configured such that when a user interacts with the purchase-related search result and confirms a purchase via interacting with the buy option, the generalized search entity initiates processing of the purchase of an item (1436). The merchant site can then receive, via the communication interface, data about the purchase being accomplished and the necessary information to manage the delivery of the product to the buyer (1438).

Figure 15:
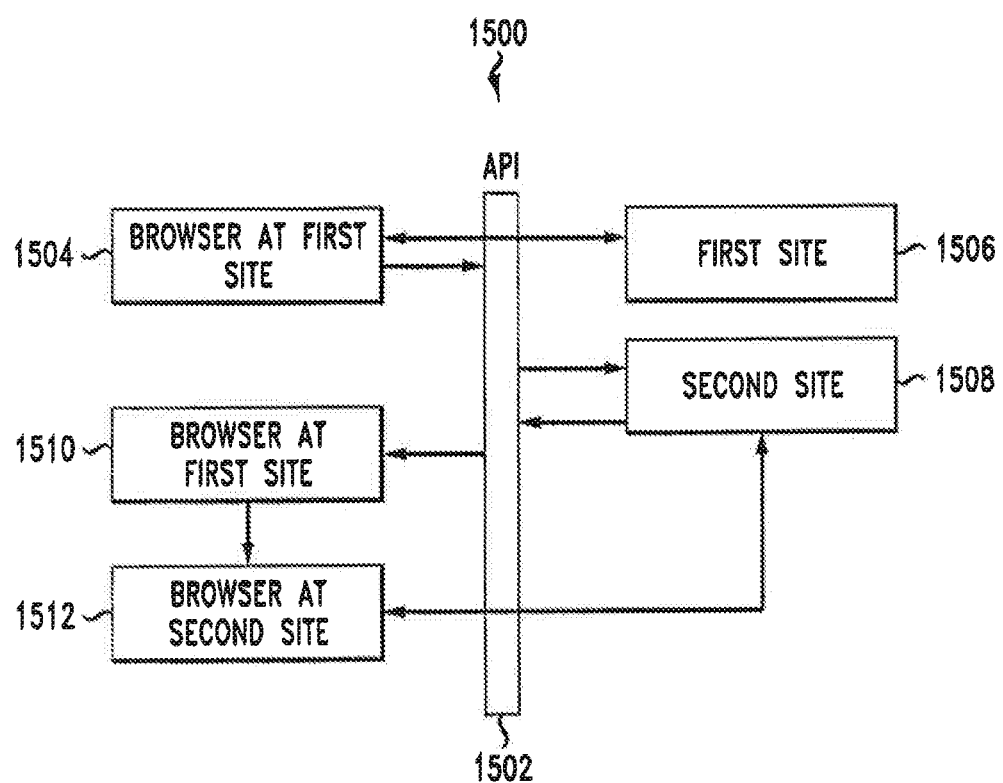
FIG. 15 illustrates communications via an application programming interface (API)

FIG. 15 illustrates an example scenario 1500 showing communications via an application programming interface (API) 1502. A one-search server, a web server, social media site, payment service, or some other computing device can provide services accessible via the API 1502. The services provided by the API 1502 can be accessible from a web server serving pages to web browsers or other web clients, an application for mobile devices, or from a web browser, such as through a JavaScript call to the API 1502. In this example, a browser navigates to a first web site 1504, and retrieves the data for the first website, such as HTML, CSS, JavaScript, images, metadata, or other data, from a first website server 1506 without relying on the API 1502. Then, when the browser parses the data for the first website 1504, renders the page, and loads scripts or other executable instructions for the website, one or more portions of the data are linked to or reference the API 1502. For example, the attributes or instructions associated with a text field can instruct the browser to request search data via the API 1502. The API 1502 handles the complexity of how to manage the request so that the browser 1504 does not necessarily know or care which server is handling the request, how the data is processed to achieve a result, and so forth. From the perspective of the web browser 1504, data is submitted to the API 1502, and the API provides resulting data or performs a resulting action. Example actions can include providing payment data for processing a payment at the site 1504 or communicating with a payment service at a second site 1508. In this case, the text field can instruct the browser to submit a request to the API 1502 based on text entered in the text field. Thus, as the user enters the text "buy iPhone 5S 64 gb," the browser 1504 that has loaded the first website can submit the text string to the API 1502 character by character, word by word, or at some time interval (such as 250 milliseconds). Further, as part of the page loading and rendering process, the browser 1504 can submit user data for the user or can establish, re-establish, or link to an existing session with the API 1502, so the API 1502 has sufficient context data about the user to make appropriate decisions. In response to receiving text from the web browser 1504, the API 1502 can analyze the data, determine a response of one or more actions, web browsing destination, desired item to purchase, and so forth. Then the API 1502 can cull the list of one or more actions to an N best list, which can be based on the type of device or browser the user is using. For example, on a mobile device with limited screen space the N best list can be limited to 3 actions or destinations, while on a desktop or laptop computer with more ample screen space the N best list can be limited to 10 actions or destinations. As part of determining the best actions or destinations, the API 1502 can communicate with a second website 1508, which can provide payment services or any other service or data. If the action is a one-click purchase action with the second website 1508, the API 1502 can, on behalf of the user or the browser 1504, negotiate with the second website 1508 to navigate to the appropriate location at the second website 1508, populate the appropriate data fields automatically, create an account (if necessary) or log in to an account for the user, receive a payment request through the API from the second website when a user clicks on a buy button, respond with payment data, and so forth. The API 1502 can handle all of these tasks automatically in response to an API request, and pass that information back to the browser at the first website 1510, which presents these possible destinations or actions to the user. If the user selects the destination or action associated with the second website, the browser can then directly continue the session with the second website 1508 that the API 1502 created or modified. In this way, the API 1502 can coordinate between websites and automatically enter user data in response to API calls and pre-navigate to various actions or destinations on behalf of the user so they are ready for the user to select and open. Upon landing on the second website, if a buy button is presented and the user clicks on a buy button, the second site can request payment information through the browser API and receive payment data via the browser API such as an account and address or a token for processing a payment. Note that FIG. 15 can also be viewed in coordination with FIG. 18A and the use of two APIs 1818, 1812 for managing coordination by a browser 1806 between a merchant site 1816 and a payment service 1810. In other words, FIG. 15 and FIG. 18A illustrate, in one aspect, how APIs are used to manage payment data and payment processing between a first site and a second site or payment processor.

An example method of applying the use of the API is as follows. A method includes presenting an input field on a user interface, wherein the input field is associated with processing data using a generalized search engine that indexes and searches both merchant websites and non-merchant websites (or any other site such as a social media site or messenger application), receiving input from a user in the input field to yield user input (which can be other types of input, besides input field input, based on the functioning of the respective site), and receiving an interaction associated with the user input indicating that the generalized search engine should process the user input. When the user input is determined to indicate a search intent, the method includes presenting a search result that can include a non-merchant website and receiving a search interaction associated with the non-merchant website and transitioning the user to the non-merchant website. When the user input is determined to indicate a purchase intent, the method includes receiving, via an application programing interface, data associated with an item from a merchant site, the item being selected based on the user input, presenting a purchase-related search result that can include a buy now option associated with the item, receiving a user interaction associated with the buy now option and, based on the user interaction, processing a payment for the item via stored payment information for the user at the generalized search engine or browser to yield purchasing data. The method can then include communicating the purchasing data via the application programming interface to the merchant site, whereby the merchant site can manage delivery of the item to the user.

From the merchant side, the process is as follows: A method includes establishing, from a merchant site, communication between the merchant site and a generalized search entity (or any site such as a social media site or any other application) via a communication interface or an application programming interface. The generalized search entity operates to present an input field on user interface (or other functionality based on the respective site), wherein the input field is associated with processing data using a generalized search engine that indexes and searches both merchant sites and non-merchant sites. The generalized search entity receives user input in the input field. When the user input indicates a search intent, the generalized search entity presents a search result can include a non-merchant site, receives a search interaction associated with the non-merchant site and transitions the user to the non-merchant site. When the user input indicates a purchase intent, the generalized search entity presents a purchase-related search result including a buy option associated with the user input, the search result including an item offered from the merchant site. The generalized search entity receives a purchase interaction associated with the buy option. The merchant side of the process is as follows. When the user input indicates the purchase intent, the method includes, receiving, via the communication interface and at the merchant site, payment information from the generalized search entity or from a browser, the payment information associated with the purchase interaction for the item and processing deliver of the item via the merchant site. In this manner, the merchant site or application can communicate and receive communications via the application programming interface or communication interface to achieve the presentation and a sale of one of its items.

It is also noted that while FIG. 15 illustrates websites communicating via an API, that the API could also enable communication between two applications on a device, or could cause communication between a website and an application on a device. The API can also be between a browser and a site. The API is meant to be the means of two different entities, each of which have different purposes or means of interfacing with users, such that coordination between the two entities can be facilitated.

Social Networking Applications

Twitter

Another aspect of this example is how the concepts apply to social networking applications such as Twitter, mentioned above. Twitter is a social networking application or service in which users can send and read short messages, usually equal to or less than 140 characters. Registered users can post "tweets" which are transmitted through the network to followers. Users can post images and videos as well. Unregistered users can read tweets. Users access the service through a website, a mobile device application or through some other application. An example of the concepts disclosed herein applying to a social network like Twitter are as follows. A method can include presenting an input field on a user interface of a social networking site, wherein the input field is associated with processing data for social networking within the social networking site. The social networking site, in the case of Twitter, can transmit short 140 character or less text-based messages from senders to followers. Images or videos can also be transmitted through this site with metadata pointing to or referencing a product. In the case of an image or video, metadata can be associated with the image or video that references the product database or catalog and triggers the processing and presentation of a buy option. This would apply to a Twitter account, Facebook, Instagram, Pinterest and so forth. The general approach in these examples is described below in FIG. 30 and its associated discussion.

Usually, users input data into an input field and the data (text, pictures, and/or video, etc.) is transmitted to followers of that user. The method can include presenting an input field or mechanism through a social networking site and receiving text-based user input in the input field and determining whether the text-based user input is associated with a product database or catalog of products for sale from a merchant using the text-based user input to yield a first determination. This can be done through a link or analysis of the user input. In this regard, for example, a twitter user can input text into a tweet and the system will analyze that text to determine whether the input references a product database or catalog and thus can be associated with a sale, advertisement, purchase or other intent. If the user input does not reference a product database, then the system can determine that the user input is not sale related but merely to be transmitted through the social networking system. In other words, the user may just be providing a normal tweet to the system which is distributed or transmitted in the normal fashion through the social networking site according to a first intent (a normal tweet intent to share information with followers). In one aspect, the merchant shares a product catalog with the social media entity which can enable products within postings to be purchased without leaving the social media entity context—or without transitioning to a merchant site for a browsing and/or payment process.

However, when the determination indicates that the user has referenced a particular product database, and thus the sale-related intent, the method includes transmitting the text-based user input through the social networking site with a buy option associated with the text-based user input. In this case, for example, the text input can provide a link to the product database or a service that indicates an intent to send an advertisement, or to buy a product, or to sell a product. If the intent is a sale or purchase-related intent, then in additional to just transmitting the tweet through the social network, the system can coordinate and present a buy button associated with the text input. Much like the Google example disclosed herein, the social networking site or a service associated with the social networking site can store user payment processing information thus only requiring a user to input such information once. Thus, a recipient of the tweet will not only see at least some text of the tweet but will see a buy button and the system can receive a purchase interaction associated with the buy option. The system would then process the purchase of in item associated with the tweet. Through an API, as is noted herein, the purchase can be processed (by the social networking site) and delivery can be managed by the merchant as coordinated through the API. This process will increase conversion of sales through social networking. In each case where "text-based input" is mentioned herein, an alternate approach can be to receive an image or a video with metadata which provides the information necessary to access the product database and the processing continues in a similar manner. Of course similar approaches can be used through any social networking site like Facebook and others.

Another aspect is handling buy options through a social networking site from the standpoint of the merchant who is selling products. In this aspect, a method can include establishing, from a merchant, communication between the merchant and a social networking site that processes and transmits short messages of 140 characters or less within the social networking site. An API can be established through which such communication can occur. The social networking site presents an input field on a user interface, receives textual user input in the input field, and determines whether the textual user input is associated with a product database of products for sale from the merchant using the text-based user input to yield a determination. For example, a URL can be placed within a tweet that access a database of products and the merchant can have products offered through that database.

When the determination indicates that there is no reference in the textual user input to the product database, the social networking site transmits the textual user input through the social networking site in the normal fashion, such as sending the tweet or posting the Facebook post. When the determination indicates that the textual user input references the product database of products for sale, and thus indicating a sale-related intent, the site transmits the textual user input through the social networking site with a buy option for an item associated with the textual user input. Thus, those reading or receiving a tweet or a posting will see a buy option associated with that item. Recipients can have their payment information stored through the social networking site or another service like Apple Pay or Paypal such that products from all different merchants that are offered through this service can be purchased without needing to be transferred to that merchant for inputting payment information, etc. The merchant then receives an indication that a purchase interaction associated with the buy option was received (i.e., a recipient clicked on the buy button) and processes a delivery of the item to a person who provided the purchase interaction or processing the delivery based on the purchase interaction. The social networking site can then make a payment to the merchant for the item. The social networking site, or its agent, may also charge a small fee for processing the sale. Determining whether the textual user input is associated with the product database of products for sale from the merchant using the textual user input can include communicating or correlating between the social networking site and the product database via an application programming interface. Processing delivery of the item can include receiving information from the social networking site that payment for the item is complete and receiving information that the merchant selling the item through an application programming interface is to ship the item to the person.

A Twitter example relates to the processing from the merchant standpoint. In this case, the merchant posts a short message of 140 characters or less within an input field on a user interface of a social networking site. The social networking site receives text-based user input in the input field and determines whether the text-based user input is associated with a product database of products for sale from a merchant using the text-based user input to yield a determination. When the determination indicates that there is no reference to the product database, the social networking site transmits the text-based user input through the social networking site. When the determination indicates that the text-based user input references the product database of products for sale, and thus indicating a sale-related intent, the social networking site transmits the text-based user input through the social networking site with a buy option associated with the text-based user input, receives a purchase interaction associated with the buy option, and processes a purchase of an item based on the purchase interaction. The merchant then receives, at the posting entity, purchase data indicating that the item has been purchased. Thus, the merchant, through an API, will receive notice that a recipient has made a purchase of the item, and that the merchant should ship the item.

In another aspect, the method can include presenting an input field on a user interface of a social networking site, wherein the input field is associated with processing and transmitting short messages of 140 characters or less within the social networking site, receiving user input including at least user text in the input field, and determining whether text based on the user input correlates to a product in a database of products for sale by a merchant to yield a correlation. When there is not a product that correlates to the text, the method includes transmitting the user input through the social networking site. When there is a product that correlates to the text, and thus indicating a sale-related intent, the method includes transmitting the user input through the social networking site with a buy option associated with the user input, receiving a purchase interaction associated with the buy option and processing a purchase of an item based on the purchase interaction.

In another aspect, clicking on a shop button on the social media site can transition the user to a merchant site associated with the product. The transition can access data from the browser to transition to the merchant site in a one-click purchasing state such that the user can buy the product from the merchant site. The browser API can be used to request and receive payment data from the user.

Using Social Networking Dialogs as Part of a Payment Process

The following discussion combines together several features disclosed herein. The concept of social networking buy buttons is combined with the dialog features referenced in FIGS. 3 and 4 in which the user can transition to a dialog to narrow down and select more features. A buy option can be incorporated in the dialog element. The following discussion also includes the concepts of transitioning to a dialog from a remote site into a social networking site having a dialog application that enables users to communicate and wherein the payment process and data for a product viewed on the remote site are transitioned into the dialog such that a purchase can be completed via the dialog.

As noted above, the claims in this present application focus on a dialog component to a payment transaction. The present disclosure addresses an issue of enabling users to learn more information about the product and ask more questions about the product before completing a purchase. In some cases, a one-click purchase option or buy option may be for a product that requires some additional data such as a size or color or other parameter. The user may have other concerns about delivery, bad publicity, bad reviews, and so forth. In this scenario, the object can be presented at some stage along the process of purchasing a product that can transition a user to a dialog application or interaction. From the dialog, the user can complete the information and commit to the purchase. The transition can be from within a single site (such as Facebook from an advertisement in a news feed to a messenger application) or it could span a number of sites. For example, transitioning to a Facebook Messenger application (or any dialog application) could help in completing any purchase if the user has questions or needs to make other choices about the product. Thus, the transition at any site at any stage of the process to a dialog application can occur to help provide further data. The dialog application could be presented in a webview interface which can be a reduced version of a browser. One example method can include presenting the advertisement with a payment process initiation object. The payment process initiating object can include a link or transition to a dialog application in which the user engages in a dialog about the product/item of discussion and completes the purchase. The transition and discussion is configured such that an easy payment can occur once the questions are answered or information gathered. The transition can be sliding down a listing of items in a drop-down menu and selecting a feature and making the purchase via the item in the drop-down menu that is configured to complete the purchasing transaction.

In this regard, an example method includes receiving a posting of an item through a social networking site, wherein the social networking site receives and transmits posted items from a posting entity to receiving entities. When the posting is not associated with a product for purchase in a product database, the method includes transmitting the posting through the social networking site without an option to buy or some other interactive call to action option. Optionally, when the determination indicates that the posting references the product in the product database, and thus indicating a sale-related intent, the method includes transmitting the posting through the social networking site with a payment process initiation object associated with the product, wherein the payment process initiation object includes one of the button, a drop-down menu, or a hyperlink, and receiving an interaction associated with the payment process initiation object, the interaction being performed by a user. A posting entity can also directly post a product-based or advertisement based posting with a buy button at a social media site such, for example, as a newsfeed of a user. Based on the purchase interaction, the method includes engaging in a dialog with the user regarding the product as part of a payment process such that at a conclusion of the dialog, the user can complete a purchase of the product. The dialog can be presented via a browser like a webview browser such that a browser API can be utilized to communicate between the merchant and the browser for enabling the merchant to receive payment data. Thus, from any interactive state on a social networking site, from a newsfeed or from an advertisement or otherwise, the user can be transitioned to a browser interface, like a messenger webview configured with a browser/user interface payment request API capability, and interact with a merchant site through the browser, and when a time comes for a payment, the merchant can communicate with the browser interface via the browser API to request payment data and receive payment data for processing a payment for an item.

The method can include, as part of the dialog, receiving a purchasing interaction from the user and processing the purchase of the product based on the purchase interaction, wherein processing the purchase occurs within one of the social networking site, via a payment agent or via an application programming interface between the social networking site or the browser and a merchant site selling the product. The social networking site or the browser can store payment data for the user to process the purchase. When the purchase occurs via the application programming interface between the social networking site or the browser and the merchant site, the social networking site or the browser can transmit payment data through the application programming interface such that the merchant site can process the purchase of the product.

The dialog can enable the user to select a parameter associated with the product. Example parameters include one or more of a color, a size, a shape, a configuration, and a technical characteristic. Delivery options, resolving any other concerns, gifting issues, discounts, coupons, and so forth can be managed within the dialog. The payment process initiation object can simply include a buy button or a notice "talk about and buy this item by clicking here". The dialog can be managed as between the user and the merchant via a dialog application. Engaging in the dialog can be achieved in one aspect by transitioning to a dialog application for managing the dialog and the purchase of the product.

If the state at site.com (or app) includes a buy button, such a buy button could be, as disclosed herein, presented in connection with a browser API or other API that processes the payment through the browser, agent, or other manner such as passing the payment information from the browser to the site for final payment processing.

One example of transitioning from any site or application to a dialog application configured to enable payment from the user to a merchant follows. Assume a user is on a site or application such as site.com. Typically the site will be in a state close to a user being able to make a purchase of a product or service, or provide some kind of payment. At this stage in the progression towards a purchase or a payment, the site can interact via an API to obtain information about the user and the user's ability to make a payment through a dialog application such as the Facebook Messenger or an SMS application, email application, or any other application in which a user can interact to get more information about a product or service or ask questions. The site can interact by making requests and receiving data necessary to make a transfer. For example, the site may make a data request asking if the user has a Facebook account and whether they are configured to make payments through Facebook or if they have data stored on Facebook on in connection with a browser to enable the purchase. Other data might be an account with PayPal, Apple Pay, or Android Pay or any other type of data that is needed. The information can then be used to achieve a payment of the product.

If through the API or otherwise a confirmation is provided that a payment could be made through a dialog application, the site could present at any stage along the path towards a purchase an object on the user interface. The object could be "chat and pay" or "dialog/ask questions" or "go to Facebook Messenger about this product". Typically, the object will be configured such that a user interaction with the object will cause a transition to a dialog application that can be separate from the site.com. For example, the transition can be to Facebook Messenger for a discussion. One issue at this stage is whether site.com knows who the user is. At this stage is it assumed that either the site knows who the user is or can access via the API or otherwise the user name such that transition can communicate the necessary data to login to the user's dialog application and/or Facebook. The user information can come from a site like google.com or a search engine, or a browser, or other service. Thus, all the necessary information, passwords, encryption, security, names, etc. are exchanged such that in response to the interaction with object on the site, a dialog is presented to the user configured such that the user can start messaging with the site about the product. Items such as an image, price, size, amount, or other data are provided. If the user had on the site chosen the product and entered such data as a discount or coupon and so forth, one or more of those parameters can be passed to the dialog application. Thus, the view in the dialog application can include one or more of a picture of the product/service, the price, shipping charges (which can be confirmed by the user's location for delivery or address data), discounts, delivery address, shipping instructions, and so forth. The user can then ask for more details such as what size or color they wanted. They can ask questions of the merchant. The site can provide the necessary transition such that an employee or robot or dialog application can interact with the user. The user may ask any kind of natural language question through the dialog application, such as "what is the rating, does it come in large, or can I get it in red."

To facilitate the dialog, if the system has a natural language interface, dialog models such as speech recognition models, spoken language understanding models, pronunciation models, speech generation models, and so forth, that can be tailored to the product and the likely discussion around the product. Dictionaries that store all the characteristics of the product (color, size, technical features, etc.) can be loaded to improve recognition, understanding and speech generation. Social information can be provided such as details about friends through Facebook who have purchased the product or similar products. The dialog could include "Your friend John bought this two weeks ago and gave it a 4/5 rating." Whether the dialog is with a live person or an automated system, such information can be used. For example, the purchase management system disclosed herein that tracks and managers purchases of users across multiple channels can communicate its data through an API or through some other means to a dialog management system such that the purchase history and/or experiences of friends within your social network. That information can be made available to the dialog application for answering questions and interacting with the user. If the dialog application is speech based, then one or more of speech recognition models, spoken language understanding models, speech generation models and so forth can be updated dynamically or in advance with such data to improve the dialog experience. For example, certain phonemes, words, phrases, names, products names, and so forth can be loaded into these speech processing models to focus the dialog application for that particular user. An animated character could also be generated to engage with the buyer and receive questions and provide answers. The character can be chosen based at least in part on characteristics such as friends, family, favorite actors, and so forth. The social networking data obtained about the buyer can be used to select voices, gender, political leanings, race, and so forth of the animated entity that will engage the user in a dialog about the product. Pre-synthesized speech units can be gathered about the product and friends that have purchased the product. Personal information can be incorporated into the dialog as well. For example, the entity can say "Have a great birthday tomorrow Jane, how can I help you with the purchase of this chair, do you want it in black?" Thus, as a user clicks on a purchase process initiation object that transitions them to a dialog, the dialog management system can obtain text and data from various locations such as the merchant for data about the product, product review data, friends/family data associated with the product, social media data about the user, and so forth to generate a domain specific experience in the dialog around that particulate product. The aspects presented can therefore make the user feel more comfortable and in a friendly environment. Accents, personalities, jokes, visual characteristics, dialog responses, timings, and so forth can be tailored for the particular user such that even if they only want to choose red as the color of the chair, they can have a more socially pleasing experience when communicating with that merchant.

As noted above, the transitioning object can be presented, for example, as part of an ad which is the result of a search on a search engine. Thus, while "buy buttons" are disclosed herein as part of that advertisement, a buy button can be accompanied by a "messenger" or "dialog" or some other label on a transition button that takes the user to a dialog with the merchant about the product. Of course, the advertisement can just include the transition button only. When the system is transitioning the user to the payable dialog system, a worker for a merchant or the site can receive a notice that a dialog is to begin. That person can be presented with the product. The data provided to a live person can be organized such that the most relevant data can help them in the dialog to quickly answer questions and lead to a sale. If a friend bought the product that information is provided. If the potential buyer just traveled to Italy (known through their Facebook posts) and the product might be relevant if they went back to Italy, that information can be provided to the worker. Thus, an analysis can be made of the user's social media activity on one or more social media sites, their friends and contacts data, and/or any other data available that might be relevant to that product and aggregated and presented to the worker for use in the dialog with the present buyer. Since the worker can only have so much information presented at once, the information can be dynamically changing such that as the buyer interacts with the dialog system, the information can change and be modified. For example, the buyer may literally ask—"have any of my friends bought this?" and the system can automatically process that data and present to the worker or automatically information answering that question. This kind of information will become more available as users make purchases through social media sites. An API could also be provided with that information. For example, if 5 friends of the buyer purchase that product through a Google search, or directly from site.com, and so forth, that information can be shared much like Facebook friends data is shared. Assuming the proper permissions are in place, where friends allow such information to be shared, an API can be used to enable the site, in response to the question "have any of my friends bought this" to formulate a query of the buyer's Facebook friends to determine who bought that product or a similar product even if it was not on Facebook and directly in that database. The API could respond with "John bought this on Amazon.com, Jane bought this at Best Buy in Arlington VA, and Fred bought a similar product through Facebook last week." The times of the purchases, who got discounts, who used coupons, who used giftcards (Fred used a giftcard from Jane Smith), can also be provided. Purchasing data for individuals can be identified and aggregated at an information database which can then be accessed in the above scenario for providing information to a buyer in a dialog mode about a particular product.

Other information can of course be available for the user—such as merchant ratings, product ratings, customer ratings for the product, return rates, complaints, etc. A summary of that information could be automatically provided as the system transitions from an advertisement or from the site to the dialog application. This is important because in some cases with one-click purchasing, users want to know these kinds of ratings about merchants and the product before they buy. By jumping into a dialog application, they can quickly find out more of that information to resolve any concerns that they may have and within the dialog application complete the purchase.

If the system is automated or part of a spoken dialog system, that information can be aggregated and an updated language model, recognition model, spoken language understanding model, and so forth can be compiled and generated for the dialog. Thus, friend names, product names, locations, product characteristics, and so forth can all be combined such that a very tailored speech processing system can be provided such that the interaction with the spoken dialog system is as clean and normal as possible.

As questions are asked and answered or further parameters are provided, the interaction in the dialog will reach a point where it is appropriate to present a purchase object. The user/buyer may write or say "I'm ready to buy" and the response from the site through the dialog messenger the user can see an object such as "buy now."

The user at this point can interact with the buy now button and through the dialog application a payment can be caused to be made as disclosed herein. Through the API, the dialog application, knowing all of the payment information about the product, can use that data to manage the payment process. The dialog application can locally process the payment, communicate payment information data to the site, or use another payment service. The site could provide a cryptocurrency option to pay as well. Coupons, discounts, and so forth can be presented. The site can also utilize the browser/user interface payment request API to request the payment data and receive the necessary information via the browser API to process the payment. If there is a coupon available for the site, information about the coupon can be transmitted as part of the API communications such that an interface managed by a browser can present an option for a coupon code or to insert or provide coupon data. Thus, the browser API interface can receive the coupon information and transmit that information back to the site for application to the sale. Parameters or coding can be implemented as part of the API to turn on or off the ability to receive and apply coupons to a particular sale. The user could also provide the coupon information prior to committing to the sale or hitting a "buy" button, such that pricing can incorporate a coupon reduction prior to the user interaction with a buy button or committing to a buy in a dialog. If the dialog is managed through a webview or other browser separate from a primary browser on a device, then the browser presenting the dialog could communicate with the primary browser (Chrome, Safari, Firefox, Microsoft Edge, etc.) to retrieve the payment data. The triggering point for requesting the payment data can be a button click, an oral instruction "I want to buy this now", a gesture, or any other indicator of purchasing intent.

After the payment, the user at this stage, while in the dialog application, may want to return to the site or continue to stay in the social media application. Further objects can be presented in the dialog application to return the user back to the site or elsewhere. For example, if the user returns to the site, it can be to the site in a state as though the user had just made the purchase. The user can then continue monitoring delivery, handling returns, and so forth, as though they had purchased the product on the site. The site manages the delivery of the product in the normal fashion. In this manner, this process can cause a transition from any site or application in any state to a payment enabled dialog application that is part of a social network or otherwise. One beneficial result of this approach is that the dialog application can enable a personal interaction between the merchant and the buyer that directly is part of a product purchase. Thus, this approach can expand the access to the payment enabled dialog application to outside the dialog application or a social networking site it is associated with. The ability to resolve any concerns that the buyer may have quickly and easily will increase conversions and provide for happier customers.

Further, in some cases, the merchants or site.com does not want to lose control over their interaction with their customers. So transitioning from their site may not be that desirable. However, this transition to a dialog application such as a Facebook Messenger converts the interaction into a social media one between the user, logged into their Facebook Account or Messenger account, and the merchant, logged into their social media account. Thus, the transition really still maintains a direct connection between the buyer and the merchant but just through their social media application. Therefore, the merchant does not lose control of the interaction but can improve the direct personal connection with the buyer through social media, which is a highly desirable result.

Indeed, to further enhance the experience, other merchant branding could be incorporated into the experience, such as a media branded background to the dialog application. The opportunity to have a personal uplifting exchange with a buyer is very important. Usually in a dialog application, the user types in questions and responses are provided from the merchant. There is no general branding for the merchant except perhaps a picture of the product that is being discussed. The dialog application could provide an opportunity for a branding package to be available to the merchant. Thus, while in the dialog between the user and the merchant, a background image of a waterfall could be provided, videos could be provided, or music could play that sets a certain tone. Colors, borders, headers, objects, fonts, font sizes, synthetic voices, and so forth, could be tailor for that merchant. Usually the dialog application is small in that it only needs to provide real estate for a dialog with the merchant. However, in this context, where a branding effort is desired in addition to merely receiving a question and answering the question, the dialog application could be expanded in size (if on a desktop or laptop computer or any device with a larger screen) and revised to provide a much richer experience for the user when interacting directly with the merchant. This is important because it can deepen the relationship with the merchant much more than a mere quick dialog and payment.

As one example of how this could function, assume a buyer clicks on a transition object on an advertisement. This could be termed an information gathering and purchase interaction object or a purchasing interaction object because it initiates an information gathering interaction that leads to a purchase. Thus, while it does not provide an immediate confirmation of a purchase, it is initiates a dialog or interaction that provides one of gathering information from the user and/or providing additional information to the user. The user is transitioned to a messenger application that is expanded to include a larger window with an image of the merchant's storefront. The user may say/write "I want something similar to this widget but in a different size and color". The system could present within the larger window or even the same sized window the alternate similar widgets in different sizes and colors. The user could scroll through those and select the desired one for purchase. A screen could be presented where the user could move through a virtual space in the store which could be configured to place the alternate items on a shelf in the store that the user could browse as though they were literally there.

In another aspect, the transition to the dialog application could also relate to any other product such as streaming audio or video. For example, a user could be on Netflix.com and want to get more information about a movie, the user could click on a transition object and be taken to the dialog application and speak with a merchant about the movie. The dialog application could be configured to confirm a purchase (utilizing the browser API) and/or a download of the media. Thus, the dialog application could not only be used for product purchases but other digital media distribution. The media could be downloaded to a current device (upon which the dialog is occurring) or to some other device or account for watching later. Thus, another element of this process of transitioning from a site to a dialog application can provide other results besides buying something. Appointments for doctors, dentists or other professionals could be made after a dialog about their service, media distribution and/or purchase, buying tickets for sporting events, canceling orders, managing orders, customer complaints, and so forth. In many of these instances, a dialog with the other party would be very helpful to accomplishing some result. The process here can enable a transition to a dialog application configured to enable a productive dialog about the issue, and present the ability to "one-click" the result. Thus, in addition to purchasing a product, the user may dialog with a law firm about an issue and confirm an appointment to see an attorney, or confirm or change a dental appointment time. Thus, transition objects can be presented on calendars, media distribution systems or sites, in Outlook, in emails or text messages, or any other location where there is a reason for the user to engage in a dialog with another party. For example, a user might see on their calendar for next Tuesday an appointment with the dentist. If such an appointment is known to be with a business, a transition object can be presented on your calendar. Clicking on that object transitions the user to a dialog application with the dentist. The user can then type or say "can we move this to Thursday at 3 PM?". If the response from the dentist is yes, then the resulting action (rather than a purchase), can be a calendar update. The dialog application can be integrated through an API or another mechanism with calendar applications, or other applications to make such changes.

In this regard, the dialog application could also be used to initiate an email or a telephone call based on the dialog. Other applications like MS Word could be launched or documents could be retrieved. Thus, the transition to the dialog application can come from any originating source and any number of productive resulting actions can be taken in addition to making a purchase. The resulting location that user is transitioned to after using the dialog application can depend on the specific action taken and where the user is likely to want to end up.

The dialog application does not have to be a social media dialog application. For example, if a search engine like Google were to enable messaging between registered users or messaging between Google and Facebook, any dialog application could implement these ideas.

Now, the decision to place a transition button on an ad or other interface could be dynamic. The system could analyze the product and where products are more complicated or higher priced, consumer may want to talk more about them prior to buying. The product may have gotten some bad reviews or bad press. People may have been posting bad things on social media sites or making bad comments. In such cases, damage control may need to engage in such that for a period of time, transition objects are placed on the product notices and interface such that explanations can be made. Transition objects may be presented to individual users who have a history of not purchasing quickly or wanting to move to another site (such as Amazon.com) to study reviews. The timing of interactions from a user that typically leads to purchases can play a role. For example, if the user pauses for a long time prior to making a purchase, the system can present during that time a transition button to answer any questions. Perhaps a product is new and the interactions can help to increase purchases and transition people to comments in say Amazon.com to provide positive feedback on the purchase. Perhaps there is a short sale period and the transition button is used to talk with potential buyers about the sale. The button can provide further information such as "talk about the recent bad reviews and why." Other parameters such as weather, the holiday season, an upcoming birthday or anniversary of the potential buyer, purchasing choices of friends of the buyer, and so forth can be analyzed and used as a basis for whether and/or how to present a transition button to a dialog application. The key is to make the presentation of the transition button strategic and tailored for the user or the product such that if real questions might exist about the product (is it as bad as opinions.com said?) can be answered and concerns of the buyer can be resolved.

Any feature disclosed herein can be mixed and matched with any other feature. As an example, the "tear" feature disclosed herein can be from one site to the Facebook Messenger that transitions to the messenger. Further, only the messenger may show—with the main site around it. The overall user interface then can include a messenger/dialog superimposed on the site view. The superimposed messenger/dialog graphics can be presented and run by the second site (Facebook or other site), such that the purchase or other action taken through the dialog will be managed by the second site. Or the messenger/dialog graphic can transition the user back to the main site where a final "buy" interaction can take place. The API's can transition to and from the dialog/messenger application such that the buyer returns to the site in a more advanced state towards a purchase (or other goal), then they were when they transitioned from the site. The browser API can be used in any purchasing scenario and at any stage of a navigation and purchasing process. In other words, when they left the site to go to the messenger/dialog, they may not be in a state of a final "buy" object being presented. They may have just pulled up the product. Thus, if the dialog indicates that they are ready to buy, that data can be communicated back to the site such that a more advanced state can be presented when they return, and they can buy at that point with a one-click, or their payment information can be presented with other optional information such as delivery location, price, etc. The state could then be in a final confirmation state for payment. The state could be one or more steps prior to a final state as well. For example, the dialog could confirm that they want to use visa or bitcoin. The dialog may not confirm such information. The state of site.com could accommodate for that when they return. The dialog could be used in this context to not only help them make choices such as the color blue or size large but to confirm that they want to use their debit account or visa. Each piece of information can advance the state of the site.com if they return for final confirmation of a payment.

Group Payments in a Messenger Application

This disclosure further extends the messenger payment application process. Facebook Messenger enables payments from one person to another, and now from a person to a business. What is not enabled is the ability to do group payments or sharing of payments within the messenger. This addresses an internet centric problem because the messenger applications themselves are based on the Internet and the problem is that it is currently limited to one person making a payment.

If you are on a group chat and you want to buy a gift, for example, the system could identify each party in the group chat and configure an advertisement or product offering that could be purchased within the chat but the cost would be divided amongst the group. Reservations for the group could also be made through such an application. Each member of the group chat can see the same offering. The "buy now" option presented could be paid by the first person clicking on it or a "share payment equally" option could be presented in which the cost would be shared equally (or unequally) amongst the members of the group. The system could be set up to require each group member to commit to share in the payment or the payment does not occur. In the group chat, progress information could be provided ("Jane, John and Jill have committed, George, Marty, are you in?). The group payment interaction could be "called" in the messenger app via a callout like "group payment chatbot, we want to share in the cost of this hat". A selectable object or drop-down menu item could also configure the system to present a payment option that could be processed/payed for as a group. The browser API could be used for each individual member to exchange messages/requests and payment information.

Any group function could be accomplished in a similar manner, such as reservations, scheduling events, sending messages, giving charitable donations, and so forth. The interactions can be configured for the group and tailored for the group as well. In most cases, the group will see the same interactive objects, but different members might see different features.

In one aspect, if a buy button is presented in a messenger application, and it is a group chat with more than 2 people, then the system can modify the presentation such that an option for a group pay is initiated. In this scenario, a user might be in a discussion with a merchant and want to add his sister in the conversation. She can jump in and look at the product (maybe it is a gift for their mom) and then when the "buy now" option is presented, it can include separate objects for each user, such as for Jim: "You pay $15, Jane pays $15" and for Jane: "You pay $15, Jim pays "$15". The users could adjust the amounts too in the chat so that one person pays more—this could be done through the dialog "Jim, I'm short this month, can you pay $20, and I'll pay $10". The system can analyze the text and automatically adjust the amounts and the object to reflect what is agreed upon in the chat.

Alternately, a group of 3 friends can be in a chat and desire to add in a merchant as they are looking for a wedding gift. In the messenger application they could call up a chat with Amazon.com or Target.com (let's say the couple is registered with Target). This can be done within the application or via a separate interface. Within the app a user may say "hey target.com, please log in" and the system analyzing the input of the users will connect either to a live representative of target or an automated system. The decision point could be that if it is a group chat, then a live user is connected, otherwise, it is automated, at least to start.

Then through the chat they could engage with the merchant that could present various items for sale and answer questions. Upon interacting and agreeing upon an item, a "buy now" object could be presented in the chat and each user could pay their equal portion or an unequal portion, and the payments could be processed as disclosed herein. In this manner, the solution to the problem is to enable payments to be divided amongst individuals participating in a group chat in which the payment mechanism is enabled to be completed within the chat. A service or browser communication and coordination could resolve any ambiguity on which person pays which amount.

Users could initiate a merchant chat by listing the merchant just like any other user in a group chat "to" field. The user could input "jane doe, john roe, target.com" and start the group chat with a target user as well. In this case, merchants could be listed as "friends" in the social network such that chats or messages could be exchanged and products purchased. The Target user could present on a screen information about each person in the group chat, browsing histories, and any other data available to help focus the person on what they (the group) might be interested in buying. Information common to the group can be presented as well, such as the fact that they all have a friend about to be married, and that that friend is registered at Target. Thus, the target user can say "hey everyone, is this for Fred's wedding? He does not yet have the silverware set." The group could then see a picture of the item and pay for it as a group.

As noted above, data about each person in the group can be received and analyzed to guide the interaction between a merchant and the group of users. Decision on what selectable objects to present, how to label those objects, what functionality is associated with respective objects, whether to present different interfaces to different users, and so forth can be based on the analysis.

If John is using one browser (such as Chrome), and Mary is using another browser (Such as Mozilla), the system can communicate with the different browsers to identify what kinds of accounts the users can pay with and can exchange requests, responses, data, and any kind of information, to improve the type of communication found within a group message. APIs can communicate data between individual applications or browsers used by individual people, and merchant websites or sites, other payment providers, service entities, and so forth to ultimately allow users to share in costs of making purchases.

Payment Processes on Facebook, Instagram, Pinterest, Youtube

Similar approaches can be used through any social networking site like Facebook, Instagram, Pinterest, Youtube, and others. In each case, the determining of whether a sale or purchase related intent is associated with a posting can involve analyzing the input (often text but it does not necessarily require text and can include an image like in Pinterest) for a reference to a product or service that can be purchased by recipients of the posting through the respective site. The posting can be presented on a newsfeed, an advertisement or otherwise in any way be presented on a social networking platform. If the analysis does not yield any reference to such a product or a service, found often in a database of products/services, then the respective site simply transmits or posts the sender data (Tweet, Facebook posting, pictures on Instagram, Pinterest, etc.) through the social networking site without any buy now option. The site in that case processes the input in the conventional manner. In other words, the determination that does not necessarily require a parameter to be set or a specific result stored in memory. For example, if the tweet does not include a URL pointing to a product database, and the system is analyzing the input for such data, the absence of the reference to the product database can in and of itself be the determination that there will not be a buy now option presented through the social networking site for that posting. When the input includes a reference to a product database, the site can implement unconventional processing in which a buy button is presented to recipients or viewers of whatever results the site presents by processing the user input. The site includes additional coding and processing to enable the user to either purchase an item while still in the site or easily transition to a merchant site at a deep-link to enable quick and easy purchase of the product, or to continue shopping at the merchant site. For example, if a picture of a red hammer is presented with an associated buy button, the site, when the user clicks on the red hammer picture, can be transitioned to a deep link with the merchant site as though the user had searched for a red hammer and was ready to make a purchase. Upon being transitioned to the deep link, the user in this case can easily simply purchase the hammer or put it into a shopping cart and continue shopping or continue processing the purchase on the merchant site. The deep-link could also be a transition to a dialog application which receives data about the user, merchant, product, social media data, and so forth to provide an efficient transition to a messenger application that enables questions to be asked and then answered and then a purchase to be made in the messenger application.

Use of a deep link configured to a state of a destination site as though the user had searched for the product, logged in, and/or entered in payment information, whereby the user can complete a purchasing process without entering payment information or logging in. This can be accomplished through accessing data in the transition from the browser, such as payment data, one-click purchasing settings, address information, login information, etc. For example, if one-clicking settings are accessed and set to "on," the user can land at the destination site in a one-click purchasing state. When a site like amazon.com submits a posting to a recipient on a social networking site, it has information about the recipient's identification. If that recipient has registered with amazon.com, and provided their payment information to amazon.com, then when the recipient clicks on a buy now object or an object that indicates a desire to make a purchase, the recipient can transition from the social networking site posting associated with a product to the posting site, such as amazon.com, with a "deep link" in which the user is transitioned to the site in a state as though the user had searched for the product and the site is in a state where the user can "one click" purchase the product. This is possible because the transition from the social networking posting to the site includes enabling the user to be logged in to the site and presenting the user an interface in which they can purchase the product with minimal further clicks. The transition process can include accessing user data from the browser. The data can be payment data, login data, one-click authorization settings, parameter settings, payment data, address data, and so forth.

In a social networking case such as Instagram or Pinterest where images are posted from a posting entity to a group of recipients, the process can operate as follows. A method includes receiving a posting of an image through a social networking site, wherein the social networking site receives and transmits posted images from a posting entity to receiving entities. A system can analyze the image for associated text-based data or metadata. The text data can be metadata or other data that provides information about the image and can reference a product database, for example an inventory database, associated with an item in the image. The system determines whether the associated text-based data identifies a product within a product database for sale from the posting entity to yield a determination. For example, the system can determine that there is inventory for the item in the product database. When the determination indicates that there is no reference to the product in the product database, the system transmits the image input through the social networking site without a buy now button. In this manner, the posting of the image would proceed through the social networking site in the normal, conventional fashion. When the determination indicates that the image references the product in the product database, and thus indicating a purchase or sale-related intent, the system transmits the image through the social networking site with a buy option associated with the image. When the system receives a purchase interaction associated with the buy option, the system processing a purchase of an item based on the purchase interaction. This involves implementing additional code to provide an unconventional series of steps for a social networking site.

Determining whether the image is associated with the product in the product database from the posting entity can include communicating between the social networking site and the product database via an application programming interface. The social networking site can process the payment and communicate the sale to the posting entity such as a merchant. The merchant can then deliver the item. As noted elsewhere herein, the system can also transition the user from a state in the process of moving towards a purchase to a dialog application that is configured to enable a dialog between the user and a merchant and then process a payment in the dialog application. APIs are used to communicate data between an originating site, the messenger application, a merchant site, a user, a payment agent, and so forth, to enable a "one-click" purchase (as part of the dialog or in the dialog application) after engaging in a dialog via the messenger application.

Processing delivery of the item can include managing a payment for the item and informing the posting entity selling the item through an application programming interface to ship the item. A user or merchant can have a pre-existing account storing preferences governing how the image and the buy option are presented. The buy option can include a one-click purchasing option, which, because the social networking site stores the purchase data of the recipient who is making the purchase, can occur without the need of moving or transitioning from the social networking site to a merchant site to complete the sale.

One example also covers the above process for an image sharing site from the standpoint of the merchant, who can post images on the social networking site that operates as described above. In this case, the merchant posts the images with the text data that points to or accesses a product database such that upon confirmation of a product in the product database for sale, the social networking site presents the image with the buy button and upon confirming a purchase, informs the merchant of the purchase so that the merchant can process delivery.

With respect to processing from the merchant side for a buy option in a social networking site, the method can include posting, by a posting entity such as the merchant, of an image, text or a video through a social networking site in which users share images, text or videos. The social networking site is typically structured to receive and transmit posted images, text or videos from the posting entity to receiving entities. The social networking site determines, using text data or metadata associated with the image or the video, whether there is a product within a product database for sale from the posting entity to yield a determination. The social networking site can determine whether the image or the video is associated with the product in the product database from the posting entity via an application programming interface between the social networking site and the product database.

When the determination indicates that there is no reference to the product in the product database, the site transmits the image or the video through the social networking site to the receiving entities without an option to buy a product but performs in the conventional manner. When the determination indicates that the image or the video references the product in the product database, and thus indicating a sale-related intent, the site transmits the image or the video through the social networking site with a buy option and receives data that a user of the social networking site interacted the buy option to yield a purchase interaction. The merchant (posting entity) then processes a delivery of an item based on the purchase interaction. The social networking site can process a payment for the item through its own mechanism or can use a service like Apple Pay and the like. The posting entity can receive from the social networking site payment data after the social networking site processes the payment for the item. When the user of the social networking site interacts with the purchase interaction, the merchant can receive a transition of the user of the social networking site from the social networking site at a deep link on a site of the posting entity. This is an optional approach in which the payment processing can occur outside of the social media site and by the merchant. The social networking site can transition the user to a deep link within the site of the posting entity in a state in the site of the posting entity in which the user of the social networking site can purchase the item. In this case, the posting entity can receive a payment of the item from the user of the social networking site.

For example, from the merchant standpoint, the method can include posting, from a posting entity such as the merchant, an image, text or a video on a social networking site. The social networking site can receive and transmit posted items from a posting entity to receiving entities, wherein the posted items can include at least one of text, images, and videos. The social networking site analyzes the image, text or the video for associated text-based data or metadata and determines whether the associated text-based data or metadata identifies a product within a product database for sale from the posting entity to yield a determination. When the determination indicates that there is no reference to the product in the product database, the social networking site transmits the image, text or the video through the social networking site without an option to buy, in other words in the conventional fashion. When the determination indicates that the image, text or the video references the product in the product database, and thus indicating a sale-related intent, the social networking site transmits the image, text or the video through the social networking site with a buy option associated with the image or the video and receives a purchase interaction from a buyer associated with the buy option. The buy option can also include an object which, when interacted with, causes a transition to a dialog application which is configured to engage in a dialog about the product and then process a payment within the dialog application for the product, thus making it easier and more simple to revolve concerns of the buyer and process the payment. The posting entity can also just post a product based posting onto the social media site with a buy button.

Once the social networking site receives the interaction to purchase the produce, there is a necessity of completing the sale of the product. From the merchant standpoint, the merchant then receives a transition of the buyer from the social networking site to a deep link in the site operated by the posting entity. The merchant processes the purchase and delivery of the item from the posting entity. In one aspect, the merchant presents to the user after the transition a deep link within the site of the posting entity in a state in the site of the posting entity in which the user of the social networking site can purchase the item. The item presented in the image, text or video posted on the social networking site can be the same item purchased. A browser API can be used between the merchant and the browser to manage payment data once the user lands on the merchant site. The merchant site may already have the payment and address information stored and the transition might only require a one-click parameter to be set in the browser. In one aspect, the determining of whether the associated text-based data identifies the product within a product database for sale from the posting entity to yield a determination is performed via an application programming interface between the social networking site and the product database.

In another aspect, the method includes receiving a posting of an image or a video through a social networking site including Facebook, identifying data associated with the image or the video and determining whether the data identifies a product within a database of products for sale from the posting entity to yield a determination. When the determination indicates that there is no reference to the product in the product database, the method includes transmitting the image or the video through the social networking site without a buy now button. When the determination indicates that the image or the video references the product in the database of products, and thus indicating a sale-related intent, the method includes transmitting the image or the video through the social networking site with a buy option associated with the image or the video to buy the product, receiving a purchase interaction associated with the buy option and processing a purchase of the product based on the purchase interaction, wherein processing the purchase occurs within Facebook.

Facebook, Twitter and any other social networking site can process user input including text plus optional other input such as a video, an image or other user input in connection with a posting. The combination of user input can depend on the structure of a particular non-commerce site. For example, Twitter's user input differs from Facebook's user input. Both involve posts that can include text alone or text plus other user input. The respective social networking site will process user input according to its functioning. An image plus some description or metadata describing a location or a product in a product database can be input. The user input in this case can include any combination of user input according to a non-commerce site that includes a reference to a product in a product database that indicates that the posting on social media should include a buy button when the post is processed through the social networking site. The posting can be prepared and posted by an individual user or an automated system depending on the processing of the non-commercial site.

Figure 29:
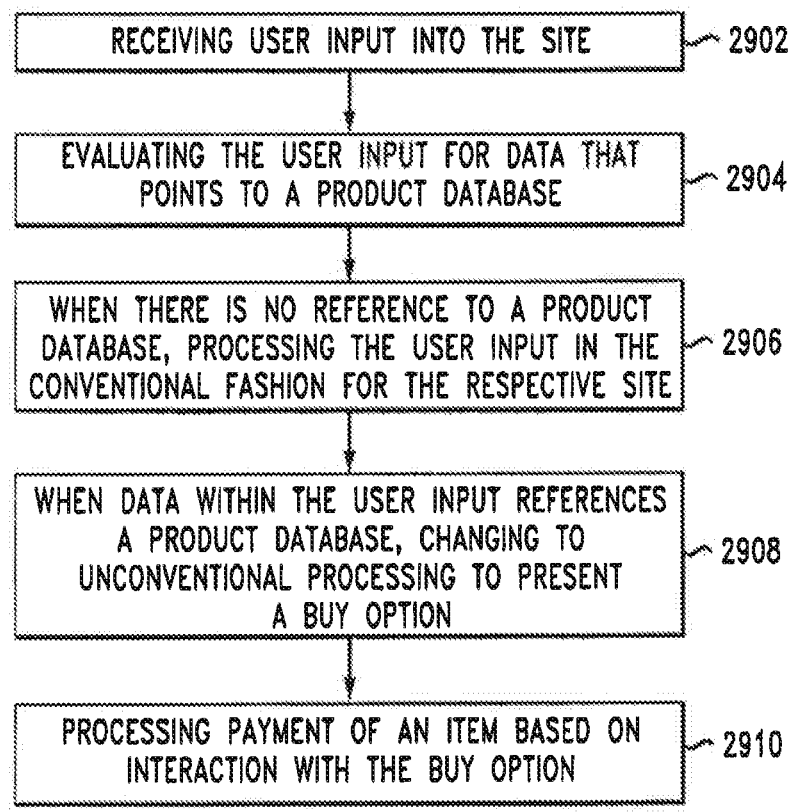
FIG. 29 illustrates another method aspect.
Figure 30:
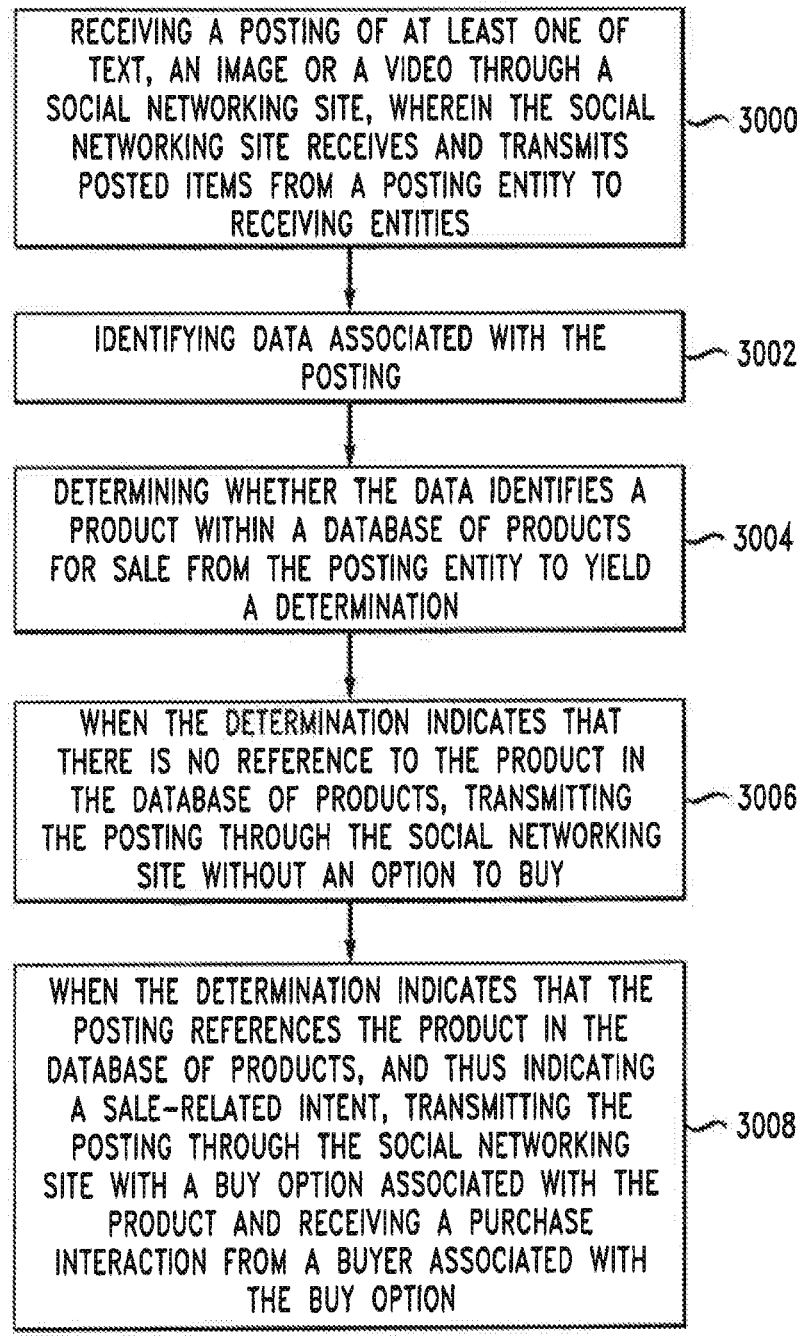
FIG. 30 illustrates a Facebook method example.
Figure 31:
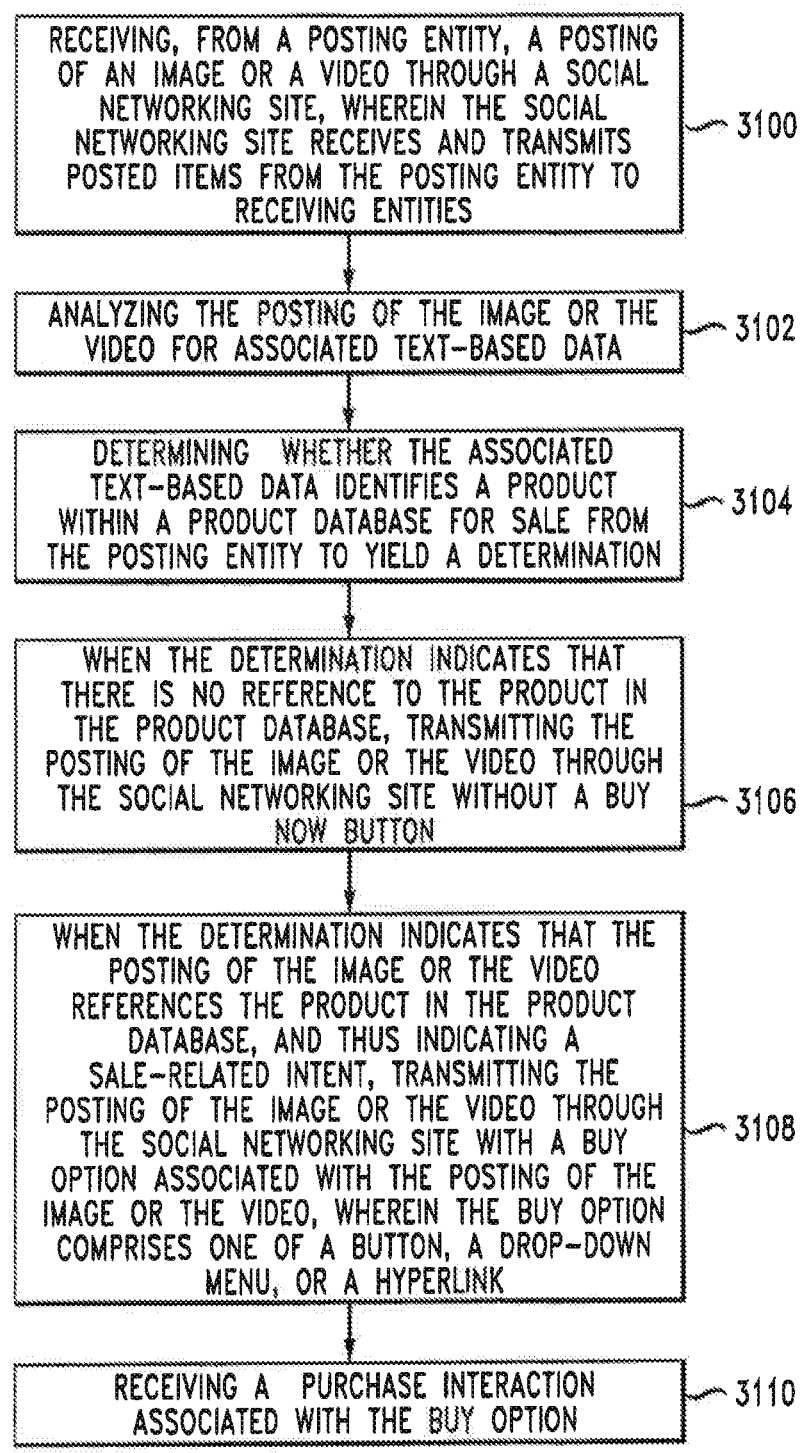
FIG. 31 illustrates a Pinterest type social media method example.

In another aspect, posting entities such as merchants can provide product database feeds to a social media entity such that when they submit postings to the social media entity, data about products featured in the postings can be provided such that the initiation of the purchasing process can occur while the user remains within the social media entity. For example, if a shirt company posts on Instagram a posting featuring a T-shirt for sale, and a product database feed is provided to Instagram which includes the T-shirt, then the user could click on the posting or the T-shirt and purchase that T-shirt all while remaining within the Instagram site or app. The merchant would then be notified of the purchase and can ship the T-shirt to the buyer. This approach greatly reduces friction in the purchasing process on a social media entity. FIGS. 29-31 further discuss this process.

Modified Browser Interface Based on Tabs

A system, method and computer-readable storage devices are disclosed which prepopulate tabs based on intent determined by a classifier that processes input provided to the unified input field. In a typical web search, a user clicks to select a search field, enters text, waits for the results page to load, clicks a desired link in the results page, and finally arrives at the desired link after waiting for it to load. This process requires many steps. A unified input field that prepopulates tabs in the browser can simplify this process.

For example, one-search.com can provide a unified input field. The user provides input via the unified input field, such as a search for "iPhone 5S." The system can identify, based on a user profile and on the entered text, the n most likely desired pages, such as from a listing of search results if the user were to execute a search using the text entered to that point. The system can then instruct the user's browser to create and populate new tabs in the browser with the n most likely desired pages. The value for n may vary based on user preferences, already open tabs, how many pages exceed a confidence threshold, available memory, network bandwidth, which pages are ready to be loaded, diversity within the pages to be populated in the tabs, and so forth. In one variation, the system can automatically create and populate three new tabs in the browser, each with a different likely desired result in response to the input provided via the unified input field. One tab can be an Amazon one-click purchase page, one tab can be the final page of a populated shopping cart at Apple.com, and one tab can be the final page of a service contract for purchasing the iPhone 5S with a 2 year service contract through AT&T. In this way, the user can automatically select, browse, and compare the tabs to determine which one he or she desires. At this stage, however, the input data does not necessarily provide sufficient information to lead to a specific purchase. Thus, the system can select pages like an Apple information page about the iPhone 5S, a Wikipedia page about the iPhone 5S, or a popular video review of the iPhone 5S.

However, if the user enters additional information, such as "iPhone 5S 32 GB Silver," then the classifier can determine, based on the text and in conjunction with a user profile or search history, that the user's intent is to purchase the indicated iPhone. In this situation, the system can load purchase-specific tabs in the browser. For example, the system can load tabs directly to an Amazon.com or Apple.com page as if the user had already navigated there, selected the iPhone 5S, 32 GB, silver, added the iPhone to the cart, and was at an advanced stage or potentially the final stage in the check-out process. In the case of Amazon.com, the system could load a tab that is ready for the user to make a one-click purchase of the indicated iPhone. Alternatively, the system can load a tab that automatically performs the actions of clicking the one-click purchase button, so that the user can go to one-search.com, enter the text in the unified input field, and hit enter to purchase through Amazon, and the resulting purchase page is loaded in a new tab automatically for the user. In this case, hitting enter after entering the text in the unified input field could cause a new tab to be loaded with a purchase summary of the just-executed order, potentially allowing the user to modify shipping options, product options, billing information, or other order details. In another variation, the system can place the order automatically based on the user hitting enter in the unified input field, and transition the user to a new tab of a webpage for purchasing accessories, service related to the item purchased, technical support pages, or some other related web resource.

When the user enters a first partial input string in the unified input field, the user may click back and forth between one or more tabs to preview the results. Then the user can go back to the tab with the unified input field, and modify or add to the input string. The system can remove the previously generated tabs and populate new ones, or the system can keep the tabs that the user has opened, looked at, manipulated, or clicked on, for example, while eliminating the other previously generated tabs. In this way, the user can select which tabs to keep and which tabs the system is free to remove or replace based on the updated input string.

The system can predictively retrieve and cache potential matching pages for inserting into new tabs based on what the user is typing. For example, if the user is typing "Apple" in the unified search field, the system can retrieve pages of the three most popular Apple products or the three Apple products in which the user is most likely to be interested. Then, as the user types "Apple iP", the system can narrow the search to products that match the partial string, such as Apple iPods, iPhones, and iPads. Items such as the MacBook Air or the Apple TV would not be included, as they do not match the partial input string in the unified input field. The process can continue refining the cached pages, thereby saving time so the pages are ready to present to the user when a certain event occurs or a threshold is met. For example, in one variation, the system can wait for the user to press enter in the unified input field to populate the new tabs, even though the system is preparing, retrieving, and caching pages in advance of the user pressing enter. In this way, when the user presses enter in the unified search field, the system can very quickly create new tabs and populate the new tabs with the retrieved pages. If any additional pages have not been predicted or retrieved, tabs for those pages can load normally, while others are ready for the user to view.

In one variation, the system can immediately transition the user from the tab displaying the unified input field to a different tab that is created in response to input provided via the unified input field. While most browsers allow the user to a mouse to click on the tab, or press a keyboard shortcut such as ctrl-tab, ctrl-shift-tab, ctrl-pgup, or ctrl-pgdn to navigate between tabs, the unified input field can allow the user to press enter or some other key at the end of providing input via the unified input field to automatically switch to a newly created tab populated in response to the input. For example, the system can switch to a tab of a one-click purchase page on Amazon when the user hits enter in the unified input field. The system could also include the purchase in the transition action, so that the purchase is completed at Amazon based on the user pressing enter in the unified input field as well as switching the user to that new tab.

The system can present different options or different destinations based on user input. For example, the system can present a message or indication that pressing "enter" once would transition the user to a first new tab, while pressing "enter" twice would automatically transition the user to a second new tab, and pressing "enter" thrice would automatically transition the user to a third new tab, and so forth. Multiple different keys and/or key combinations provided via the unified input field can trigger different behaviors for managing or navigating tabs based on the input provided in the unified input field. Further, the various actions and key combinations triggering those actions can change as the user enters additional text in the unified input field, or modifies text in the unified input field.

Figure 16:
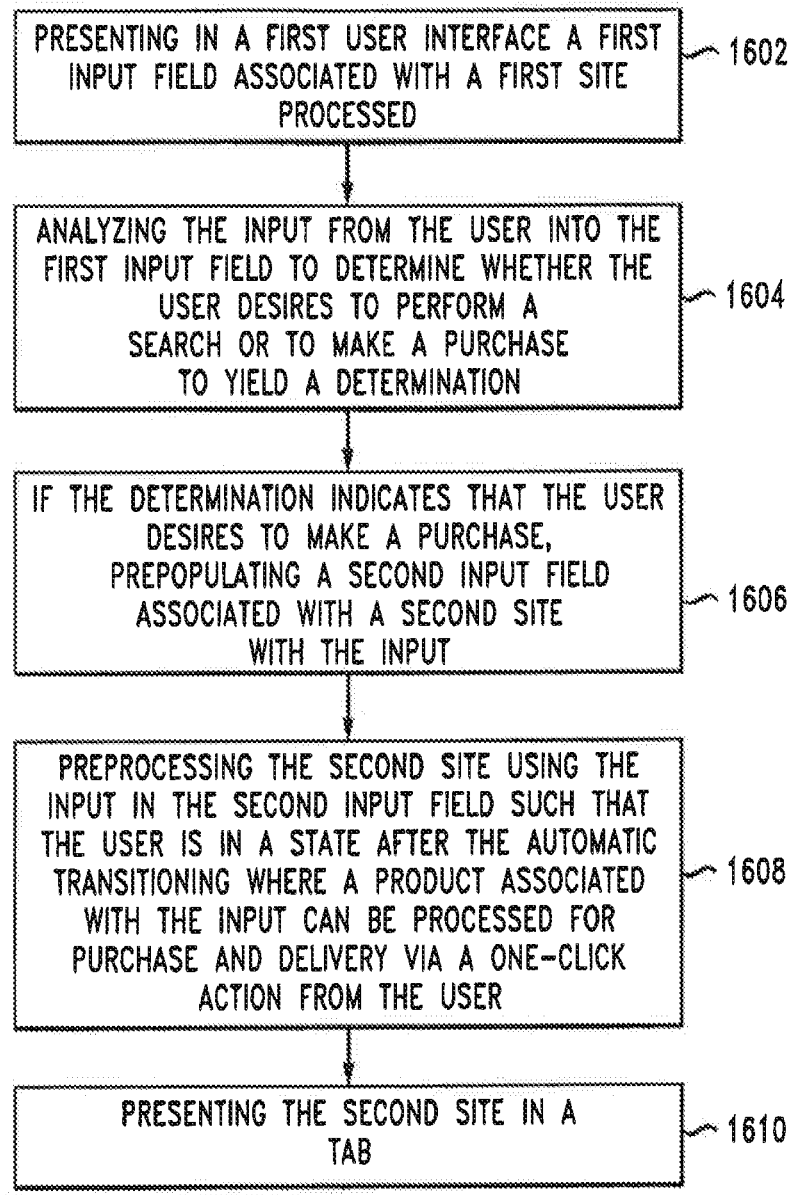
FIG. 16 illustrates an example method example for an example modified browser interface.

FIG. 16 illustrates a method example. The steps in the method example can be performed in any order, can be performed in other combinations or permutations that include additional steps or exclude all or part of some of the described steps. The system can present in a first user interface a first input field associated with a first website processed via a browser (1602).

The system can analyze the input from the user into the first input field to determine whether the user desires to perform a search or to make a purchase to yield a determination (1604). If the determination indicates that the user desires to make a purchase, and without any other input from the user other than the input, the system can prepopulate a second input field associated with a second website with the input (1606). The system can preprocess the second website using the input in the second input field such that the user is in a state after the automatic transitioning where a product associated with the input can be processed for purchase and delivery via a one-click action from the user (1608). The system can preprocess the second website by transmitting user data from one of the first website and a browser to the second website. Payment data can be communicated between the browser and the site to simplify the process for the user. The system can preprocess the second website by automatically navigating through a shopping cart model of the second website to yield the state where the product can be processed for purchase and delivery via the one-click action. The processing can include that when the user interacts with the interface to make a purchase, the entity associated with the input field processes a payment of an item and coordinates with a separate merchant for delivery.

The system can present the second website in a tab in the browser (1610). The system can present a visual notification to the user associated with the tab that clicking on that tab will present to the user the second website in the state in which the user can process for purchase and delivery the product via the one-click action. The visual notification can be a popup, an indication on the first website, a browser-specific notification associated with the tab, or in some other location in the user interface. The system can present multiple additional websites in additional tabs in the browser, and can provide a mechanism, via the unified input field, to manipulate or navigate through those tabs independently of the established keyboard shortcuts and mouse clicks inherent in the browser. For example, the system can preprocess a third website using the input in a third input field such that the user is in a state after the automatic transitioning where a product associated with the input can be processed for purchase and delivery via a one-click action from the user, and presenting the third website in a second tab in the browser.

Figure 17A:
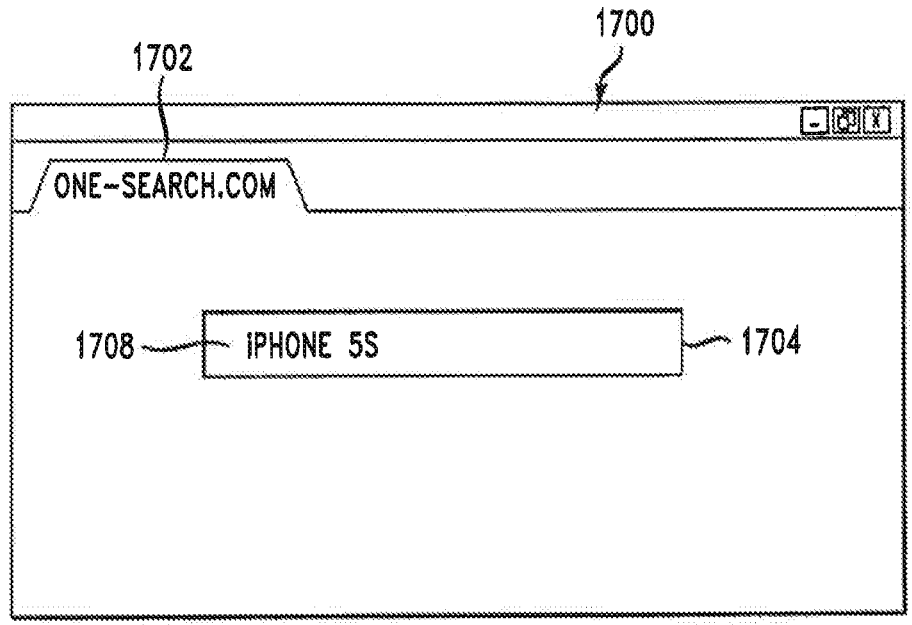
FIG. 17A illustrates an example browser interface.

FIG. 17A illustrates an interface 1700 having a tab 1702 with an input field 1704 and user input 1708. This input field 1704 is open ended or open loop in that it does not automatically process the user input as a search but can process the input to perform a number of different functions. Assume the user inputs "iPhone 5S." The system analyzes that input and determines that there is a high likelihood that the user desires to make a purchase. The system then preprocesses that input on one or more website, such as Amazon.com and Apple.com, such that each of these alternate web sites are positioned in a state which is the equivalent of the user having navigated to that website, and entered "iPhone 5S" and continued to browse and navigate to a state in which one more click causes a purchase and delivery of the product. Thus, in FIG. 17B, the system can present a tab 1710 for Amazon and a tab 1712 for Apple. The user can continue to type further text such as "32 GB Silver" 1708. The system continues to refine the preprocessing of the alternate websites. Thus, after the user is done, if the user clicks on the Amazon tab 1710, that tab will reveal a preprocessed search in a "one-click" state such that the next click can enable the user to buy and have delivered that product. Where websites like Apple don't have a similar "one-click" option, the system can navigate and preprocess a shopping cart model to essentially cause the tab 1712 to present the shopping cart, ready in a state where the user just needs one more click to make the purchase. The browser or one-search.com application can, via an API communicating with the alternate website, provide the purchasing account data, delivery address, passwords, etc. necessary to navigate in the background through the purchasing pages of a website that does not have one-click purchasing capability. The API may only need to communicate necessary data for completing a transaction if one-search.com handles the processing of the payment for the item. In this manner, merchants can easily communicate with one-search.com through the API for delivery.

The positioning of the tabs can be based on history, personal preferences, likelihood of intent, and so forth. For example, if the user typically purchases items through Amazon.com, then that tab will be presented 1710 next to the current tab 1702. The probability of a search intent over a purchasing intent may be equivalent, and thus a Google or Yahoo! Search may be presented in tabs next to a purchasing option. The tabs may also give hints as to how deep the preprocessing went. For example, one tab may say "Amazon search" and another may say "Amazon one-click" indicating to the user, that clicking on the Amazon search tab means that the "state" of that tab is that the user input has been preprocessed such that, as in a normal Amazon search, a list of items is returned for browsing but that the state is not a "one-click" state in which the user could do just one more click to complete a purchase and delivery. The depth of the preprocessing can also be performed based on how much disambiguation is needed. If the user does not provide enough data, then only search-level states may be provided. If there are only two options such as two colors to choose from on an item, and the user did not specify a color, the system could present in a tab, two different items, each having a "one-click" purchasing button, such that the tab is still in a one-click purchasing state, but two items are presented on the page such that no further navigation is necessary. The system could present a gold "one-click" option and a silver "one-click" option for purchase.

Figure 17B:
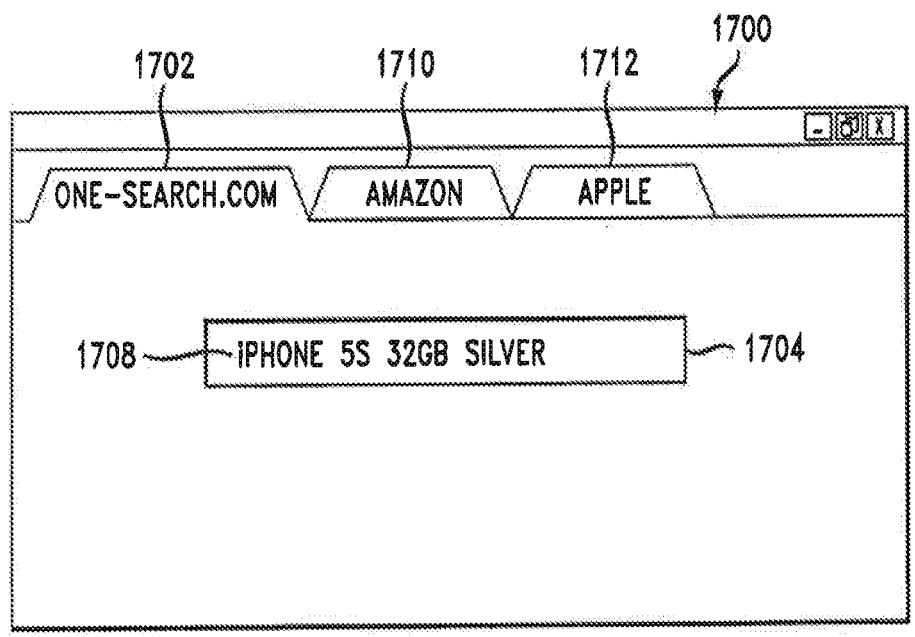
FIG. 17B illustrates an example interface with prepopulated tabs.

In a typical web search, a user clicks to select a search field, enters text, waits for the results page to load, clicks a desired link in the results page, and finally arrives at the desired link after waiting for it to load. If the user desires to continue and make a purchase, then the user must either log in with an existing account or create a new account with the website, place the item in a virtual shopping cart, check out, provide shipping information, and so forth. This process requires many steps. A unified input field that prepopulates a shopping cart for the user can greatly simplify this process.
Information Exchange Between Browser/Agent Merchant Site API In one aspect, this disclosure covers a novel browser having an API through which information is exchanged between the browser and one or more merchant sites as is illustrated in FIG. 17B to simplify the payment process. Such a browser addresses prior problems with trying to address the complexity and deficiency of requiring users to enter in all of their payment information into numerous input fields. Some browsers had included form filling ability in which stored payment information is used to fill in forms on the browser's end. However, these form filling features never caught on and were still too cumbersome. The forms served from merchant sites were not coordinated and users still had to view all of the data being entered and then sent back through the form to the merchant site. Further, different sites had different structures for filling in all of the fields which confused the process. What is needed is a more comprehensive and coordinated effort to simplify the payment and checkout process for sites that did not have a buy registered with stored payment data. The browser API disclosed herein solves this problem in a more comprehensive way such that the payment process truly can be simplified down to its essential element in a way previously unachievable. For example, the site and the browser can exchange back and forth much more data in a more specific, strategic and tailored way then the old form filling approach. Being able to exchange much more information via the API enables a more efficient approach which will be noticeably easier to the user.

A browser or a web browser is a software application for retrieving, presenting, and traversing information resources on the World Wide Web. An information resource is identified by a Uniform Resource Identifier (URI/URL) and can be a web page, image, video or other piece of content. Hyperlinks present in resources enable users easily to navigate their browsers to related resources. Example web browsers are Firefox, Internet Explorer/Microsoft Edge, Google Chrome, Opera, and Safari. They can run on servers, desktop computers, laptops, mobile devices, and any other device configured to run the software. Web browsers typically include a user interface, layout engine, rendering engine, JavaScript interpreter, user interface backend, networking component and data persistence component.

The primary purpose of a web browser is to bring information resources to the user ("retrieval" or "fetching"), allowing them to view the information ("display", "rendering"), and then access other information ("navigation", "following links").

The process begins when the user inputs a Uniform Resource Locator (URL), for example http://en.wikipedia.org/, into the browser. The prefix of the URL, the Uniform Resource Identifier or URI, determines how the URL will be interpreted. The most commonly used kind of URL starts with "http:" and identifies a resource to be retrieved over the Hypertext Transfer Protocol (HTTP).

In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets.

Information resources may contain hyperlinks to other information resources. Each link contains the URI of a resource to go to. When a link is clicked, the browser navigates to the resource indicated by the link's target URI, and the process of bringing content to the user begins again. Browsers can store user data such as payment data, one-click parameters or settings, as disclosed herein. Other payment services like Android Pay and Apple Pay can communicate with a browser for payment functions. For example, a secure element on a device can store payment data for Apple Pay and coordinate with the browser the access to that data for a payment on a site. Further, the browser functionality can be modified to communicate the necessary data via an API to simplify the purchasing process.

Accordingly, this embodiment covers the interaction through the API between the browser and a merchant (such as http://www.merchant.com) to manage the request and transmission of payment data through the API to the merchant.com site so that the site can process a purchase of a product according to their normal payment processing structure. If a separate payment service is used, the API can handle, in an organized way, the management of the payment by the payment service and communicating payment data to the site. In this regard, the browser (or any other agent) can provide the intermediary communication of data between the merchant, the buyer and the payment method or payment account. The browser can store the payment information or can communicate with another local application that stores the payment information or can communicate with a payment service like Android Pay or Apple Pay. For example, with Apple Pay, data is stored in a secure element that is accessed by the browser when a request is received for payment via the browser API. Another server is accessed and a payment token is generated which is passed through the browser API to the merchant site for processing. There is a standardized specification of parameters and data that are communicated through the API to achieve the overall objective of enabling a payment process which does not require the user to manually enter in credit card data, address, etc. The process can enable the site to receive or create a pay button (different in function from their locally used pay button which does not interface through an API with the browser), request and receive payment data about the user such as an address and payment account data, which can be encrypted, enable the user to update any of the payment data and then locally process the payment using the received payment data. There are many mechanisms through which the browser can pass payment information to the site. For example, the browser can store a credit card and/or could be integrated with Android Pay through Chrome or Apple Pay through Safari. In this regard, there may be a separate application or software such as Android Pay or Apple Pay that communicates with the browser to provide one or more of the data needed to pass to the site for payment processing. The separate application could also process the payment and report back through the API to the site that the payment has been made. All the attending information associated with the payment can be provided.

In one aspect, the process can proceed as follows. A computer-readable storage device stores browser instructions which, when executed by a processor, cause the processor to perform browser operations for retrieving content, presenting the content in a user interface, and traversing information resources on a world-wide network. The browser instructions are modified and extended such that, when executed by the processor, the instructions cause the processor to perform further operations including receiving, via the user interface and from a user, an interaction with an object associated with a site which can lead to a purchase. The object might be a button on a site or a kiosk, a button in a game that can lead to the need to process a payment, any interaction in a virtual reality environment leading to a purchase intent, or a buy button associated with a product or service. The operations include receiving, based on the interaction and via an application programming interface, a request from the site for payment data for the user in connection with the purchase and transmitting, to the site and via the application programming interface, the payment data (or a tokenized version of the payment data for security purposes), wherein the payment data can be used to process the purchase on the site. In one aspect, another agent, search engine, or entity processes the payment and reports back to the site as noted herein.

Another embodiment covers the process from the standpoint of the merchant who receives a payment interaction with an object, or any payment interaction indication, and transmits a payment request to the browser/user interface payment request API, and receives back from the browser API the payment data for processing the payment.

Using a Kiosk with the Browser/User Interface Payment Request API

Another aspect of this disclosure addresses how a person would use a kiosk with the browser/user interface payment request API. The kiosk could be any device with a browser through which a user may interact with a merchant or other service provider to make a payment. It could be used for paying tolls, buying food, ordering replacement paper towels in your pantry via a device, etc. In many cases these kiosks will be public such that there is no single set of payment information that is stored on the browser or available through a paired device for responding to requests via the browser/user interface payment request API.

The problem is that if a person goes up to a public kiosk which can be used to purchase any item, the browser on the kiosk is not their personal browser. It does not contain their payment information. However, that user may have their Android device, iPhone, or other mobile application that has a browser or some component of a user interface (like for managing payments) that supports the browser/user interface payment request API and thus stores the necessary payment information or enables access to networked based information. The following provides a mechanism for enabling one to convert that kiosk browser to a personalized browser temporarily such that the functionality is the same (i.e., one click, or simplified purchasing). The kiosk and the mobile device can exchange information such that the kiosk browser can be a temporary proxy for that user. Through Bluetooth, WiFi, near field communication, cellular, 5G, or any other approach or protocol, even a wired approach, the kiosk browser can securely access the payment data (credit card account, Android Pay, Samsung Pay, Apple Pay, Microsoft Wallet, other financial institution information, debit account, PayPal account, etc.) available to the mobile device browser. For example, an NFC tag can provide data to a mobile device when it is tapped to initiate a browser or app, which will return an appropriate user interface, to enable other operations (one or more) for performing actions such as purchasing an item, finding a location on a map, renting a space or an object, opening a door or gate, and so forth. The mobile device might even be able to provide data or changes to the NFC tag as well if the tag is configured and the mobile device is configured to enable writing data to NFC tags.

In some cases, the device will use Apple Pay or Android pay in the normal wireless fashion. This disclosure enables a new approach which leverages the payment request API infrastructure which is a standardized approach for making payments. Thus, while many merchants are moving in the direction of using the payment request API, kiosk type devices can also utilize the same payment mechanism.

When using Apple Pay on a laptop, the Safari browser will receive a payment request from a merchant site through the API (proprietary Apple payment request API), and in one aspect, the user will confirm the purchase not on the laptop but on their iPhone via a fingerprint confirmation. The laptop and the iPhone will communicate wirelessly to accomplish the transaction. The proposed approach differs in several respects. The kiosk (or any device having a browser) in this case will not in the first instance have any payment information for the user as it is a public kiosk. The browser/user interface payment request API can be modified to include a notification that the browser being used is a public browser or a browser without payment information. Thus, if a user is starting to pay a parking meter kiosk, and they interact with the "pay" button, the back end merchant application could send a payment request through the API to see if that is an available payment option. The kiosk could query wirelessly (or using a wired connection) to see if the mobile device of the user has a browser containing the user payment information and/or whether there is authorization to connect and utilize that information. If so, then the user experience with the kiosk can be the same or very similar to a normal purchasing experience using the browser API (confirmation through finger print, CVC code entry, confirmation of delivery address or payment account, etc.). The communication between the kiosk browser API can be coordinated through a connection between the kiosk browser and the mobile device browser of the user. A separate API can be used for communications, requests, replies, etc. between the kiosk browser and the mobile device browser. When the appropriate time comes for passing the payment information to the merchant site, the data can be passed from the mobile browser to the kiosk browser to the merchant site. The data can be tokenized or encrypted in any manner for security. The merchant site then receives the payment data just as it would receive the data from a normal browser through the payment request API. The kiosk browser would not store the payment data but only pass it through to the merchant.

In one aspect, for the kiosk browser to be able to properly communicate via the browser API with the merchant in a situation where the kiosk browser does not actually store the payment information for the user, parameters may be set or dummy information me be provided to enable the kiosk browser to respond. For example, if the merchant request indicates that the merchant accepts VISA and MASTERCARD payments, and the mobile device user has a VISA account stored in the mobile device browser, the communication between the mobile device and the kiosk can enable the kiosk browser to have enough information to respond to the merchant request that VISA will be used for the payment (although the kiosk may not actually store the VISA account number). Any amount or type of data could be communicated to enable the kiosk browser to successfully communicate via the browser API with the merchant while maintaining security of the user's private information. For example, in one scenario, dummy information could populate data in the kiosk browser (one or more of dummy credit card number, user name, address, etc.) such that the kiosk browser believes it has the necessary data to process a payment. Then when actually providing the payment information is required, the mobile device could transmit a token or transmit the necessary actual information to the kiosk which can forward the information to the merchant for processing a payment. In another aspect, the browser API could be modified such that a kiosk parameter could be set in the kiosk browser indicating that it is in communication with a mobile device (or other device) and that although it does not have the actual data, the mobile device does and the user has a VISA account. Thus, the kiosk browser could proceed with the process of exchanging data in a payment process. For example, the kiosk browser may acknowledge that VISA can be used to make the payment, can receive the total amount of the charges, and shipping costs, and can forward that information to the mobile device browser and receive and pass on the final payment and/or address or any other information to the merchant site at the appropriate time in the process.

The kiosk may detect multiple mobile devices which could be associated with the user. (Three different people each with a device may be near enough to the kiosk while the user is processing a payment). Accordingly, disambiguation techniques may be needed to ascertain which device (which mobile browser) to use. An extra layer of security may need to be implemented, such as fingerprint confirmation on the kiosk, CVC code, dialog, speaker verification, and so forth. The confirmation may be as simple as "is this Tom or Mary" or "what is your CVC code?" The user may need to provide fingerprint confirmation on their mobile device ("Confirm that this is Mary through fingerprint confirmation on your iPhone"). Any such security measures are contemplated as part of this disclosure.

Assuming that the security measures are in place, the process disclosed is that the mobile device will pass payment information for the user through its browser to the kiosk browser which will then pass the payment information through to the merchant for processing. The payment information can be stored at the mobile browser or accessible by the mobile browser from another entity. The result will be that the user will have the same or a similar purchasing experience at the kiosk. No credit card will have to be swiped or used. The kiosk browser can act as an agent or proxy browser for the user to enable a simplified purchasing transaction for the user. The payment process will be the familiar browser/user interface payment request API process even at a public kiosk.

The exchange between the mobile device and the kiosk can be through an API or any other means in which requests, responses, communication of data, and so forth can occur in connection with the purchasing transaction. The kiosk browser will, in one aspect, not store the person's payment information, delivery information, or any other information about the user. Indeed, one approach can enable a separate delivery of the payment information from the mobile device though a cell connection or other connection to the merchant such that the kiosk browser never even sees a tokenized version of the payment information. In another aspect, the kiosk can communicate data about the user to the merchant site and the merchant site can perform a browser API request directly to the user mobile device and communicate payment data through that communication channel.

In one aspect, the payment interaction for a purchase made at a kiosk can actually occur on the mobile device. For example, the user may click on a "pay" object on the kiosk but then be transitioned to their mobile device for viewing and interacting with payment interfaces. Any division of interfaces, communication of data, and so forth can occur between the mobile device, the kiosk and/or other devices to achieve simplified interaction for the user to achieve a payment of any product or service.

This alternate process could proceed as follows:
(1) The user with their mobile device approaches a kiosk with a browser
(2) Prior to or as user initiates interaction with the kiosk, a wireless communication is established between the mobile device and the kiosk such that on the mobile device (or on the kiosk) a pre-authorization object is presented such as "Mary, authorize communication of payment information for your purchase with Kiosk #3". Through a simple authorization interaction with an object, a fingerprint, a code, facial recognition, or any other approach, the authorization is provided.
(3) In one aspect, the payment information (credit card, address, expiration date, name, etc.) is communicated to the kiosk browser such that the proper memory is populated with the information. A one-time payment token could also be transmitted to the kiosk from the mobile device.
(4) Mary uses the kiosk to browse products, make decisions and ultimately interact with a "buy" object.
(5) The merchant site receives the interaction and initiates a payment request through the browser API to the kiosk browser and Mary interacts with the kiosk browser to confirm the purchase in the standard way.
(6) The kiosk browser, following the final confirmation, deletes from its memory the payment information for Mary and can confirm the deletion.
(3a) In another aspect, the payment information is maintained on Mary's mobile device.
(4a) Mary uses the kiosk to browse products, make decisions and ultimately interact with a "buy" object.
(5a) The merchant site receives the interaction and initiates a payment request through the browser API to the kiosk browser.
(6a) The kiosk browser communicates with the mobile browser to receive the payment information from the mobile browser. The payment information can be a one-time use token that is received by the kiosk browser and passed through the API to the merchant site. The kiosk browser may act like the user's mobile browser say on a laptop and communicate with the user's iPhone to confirm an Apple Pay payment.
(7a) Mary interacts with the kiosk browser to confirm the purchase in the standard way.

All the necessary data, communication, requests and responses, and confirmation can occur between the various devices to enable, in as few interactions as possible, a linking of the user's mobile device, with payment information, and the kiosk device, such that the user is enabled to use the kiosk browser in the manner as they would use the browser on their own mobile device, desktop device, tablet, or laptop device. The ultimate goal is to give the user the same comfortable purchasing experience via a kiosk or with any device that uses the browser API for managing the purchasing process but that does not store or know of the particular user.

Peer-to-Peer Browser API Application

In another aspect, the browser API could be utilized for peer-to-peer payments. In this scenario, the "merchant" site could simply be a peer site which initiates the requests for payment data. In a peer-to-peer scenario, in which each user, for example, has a mobile device, or any kind of device, it is assumed that each device has a browser configured to communicate data through a browser API. A service could operate to perform the particular functions that the merchant typically operates as disclosed herein. For example, while a first device communicates with a second device via an application in a peer-to-peer context, if an instruction is made for a first peer to transmit $20 to the second peer, then a service could generate the necessary payment requests through the browser API with the first peer as well as payment requests through the browser API with the second peer. In this scenario, the browser API would be modified so that the second peer is not making a payment but is rather receiving a payment. In this regard, the browser API would be modified to retrieve the account data for the second peer such that money could be paid to that account. This is a similar process that would occur for refunds which could generally be processed in the same way. This approach can also be used for refunds to a user. For example, a user could receive via the browser API a tokenized payment data packet. Once received through the browser API, the device can communicate that token to a payment processing system for receiving the refund to their account.

Thus, in a peer-to-peer context, the method can include enabling a peer-to-peer communication between the first peer and a second peer and receiving an indication of a desire to transfer a benefit, such as money, but the benefit could be points, media, or any item of value, from the first peer to the second peer. The method would include initiating a first payment request through the browser API to the first peer as disclosed herein with the necessary information to retrieve payment data and/or other data to accomplish the payment. The service. The charge the payment account of the first peer. A credit request could be submitted through the browser API to the second peer. Similar to the payment request API disclosed herein, the exchange of information could harmonize available payment approaches available for the service to provide a credit and accounts types available by the second peer to receive the credit. The service could then charge the amount from the first peer based on the data received via the browser API and provide a credit the account of the second peer based on the account data received from the second peer. In one aspect, the second peer to provide a one-time use token which is configured differently from a payment token because it would be a credit receipt token. The service could utilize the payment receipt token from the second peer and provide one time payment to the account of the second peer without ever actually viewing the payment data. A cryptocurrency, or other payment approach could also be truly peer-to-peer without an intervening service such that the appropriate keys or tokens or payment data could be exchanged via the respective APIs and managed between browsers on the different devices. Further, peer-to-peer purchases of products and delivery could also be provided in a similar manner where address information can also be communicated via a browser API of a purchaser of a product such that the seller in the peer-to-peer communication can receive a payment as well as the delivery information for delivering the item. Any other data or information that is desirable to be communicated in a peer-to-peer context could be implemented in a modified browser API such that peer-to-peer to communications, sales, money transfers, and so forth are enabled. In another aspect, the API can be used to receive a payment at a service and a recipient debit card could be used to credit the payment to the peer to peer recipient.

Utilizing the Api for Registration Purposes

The browser or other agent (such as amazon.com) can store address, name, credit card, etc. Besides being used for payment, the API could also be called from any other site for other purposes. For example, if a user is registering for a conference, the registration website could generate an API request to the agent (browser, service, amazon.com, or any other entity that stores the information and interacts via an API) which asks for just the user name and email address, or whatever combination of information is needed for registration. Any input field on any site that requests one or more pieces of information could submit a request through the API for that information. The normal payment request API includes such information as what payment types are approved for that site (VISA, Mastercard, etc.) but the API could be modified to simply ask for the name only, or name and address, or name and email address, and so forth.

Thus, by expanding the use of the API, a person utilizing any website or application that has any input field which requests even discrete pieces of information, may not have to manually enter that information because an API call to the browser could be made for filling in the data. Thus, uses beyond or completely independent of a payment process could utilize an information field API to fill in the information. In this regard, the browser could also store beyond payment data or payment relevant data, other information such as preferences, food restrictions, room requirements, location based information, birthdays, or any piece of information that could be useful for any site input field. Any such piece of information can be received through the browser API. This can also provide a standardized process across the web for people, say, registering for a conference or providing their email address to obtain access to a website or to content, booking hotel rooms, registering for classes, requesting a white paper, and so forth.

Merchant and Browser Interaction Utilizing an Object to Exchange Payment Data

Figure 17C:
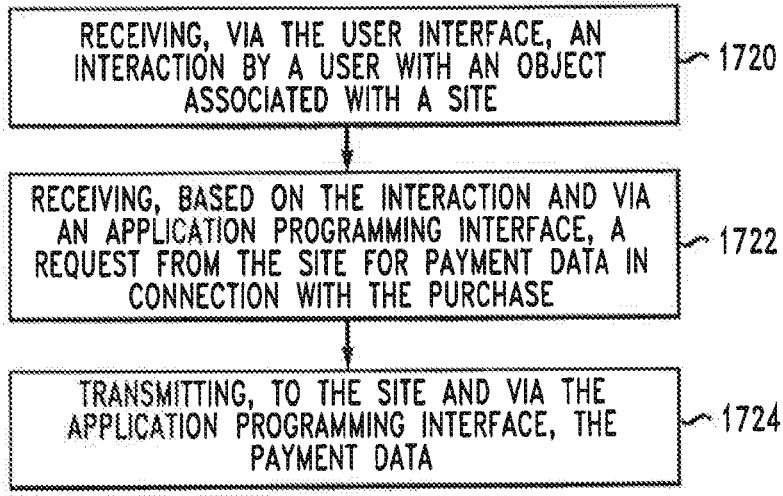
FIG. 17C illustrates an example method.

In another aspect, the disclosure covers, as is shown in FIG. 17C a browser receiving, via the user interface, an interaction by a user with an object associated with a site (1720), the interaction indicating a user intent to make a purchase, receiving, based on the interaction and via an application programming interface, a request from the site for payment data in connection with the purchase (1722) and transmitting, to the site and via the application programming interface, the payment data (1724), wherein the payment data can be used to process a payment or deliver a product associated with the purchase.

The process can in more detailed be performed as follows. After a user interacts with the object, the site can make the JavaScript API call for a payment request via a browser/user interface payment request API between the browser/user interface and the site or app. The API request can include data such as acceptable forms of payment for the site (Visa, Mastercard, Bitcoin, etc.), the amount to be charged, what currency they expect, other data depending on the context of the purchase, and so forth. The API request can also include details about the transaction such as total amount, currency, how amounts are calculated, tax, discounts, shipping costs, etc. The browser can then determine a match between acceptable payments and available payments through stored credit card information, access to an altcoin wallet for the user, Apple Pay, Android Pay PayPal, or any other type of payment service. The system may present the user with current information and an opportunity to add a shipping address, correct data, or change any of the necessary data for the transaction. The system receives and updates any changed data. If options are presented to the user, the user can select which payment option to use for processing the transaction.

Next, the user can authorize the transaction depending on the type of payment account the user is using. A shipping address might be exchanged or used to include in a total amount a shipping charge. An interface can be presented to the user to confirm one or more of a payment method, a payment amount, a shipping address, and so forth. The payment method might be through a stored credit card in which the last 4 digits might be presented for confirmation. If that is used, then the credit card information (card number, expiration date, name, CVC) is transmitted through the API to the site for processing using the site's payment process system. This can be an encrypted transmission or some secure mechanism to maintain security such as a generated one time use token. If a local payment is chosen through say a Google Wallet, Android Pay or Apple Pay type of service, then the chosen service can process the payment and a report through the API can be provided to the site. Other information about the user can be sent to the merchant as well such as email address, address, payer phone, social media data, contacts in social media etc. The merchant can then continue with a relationship with the buyer.

Figure 17D:
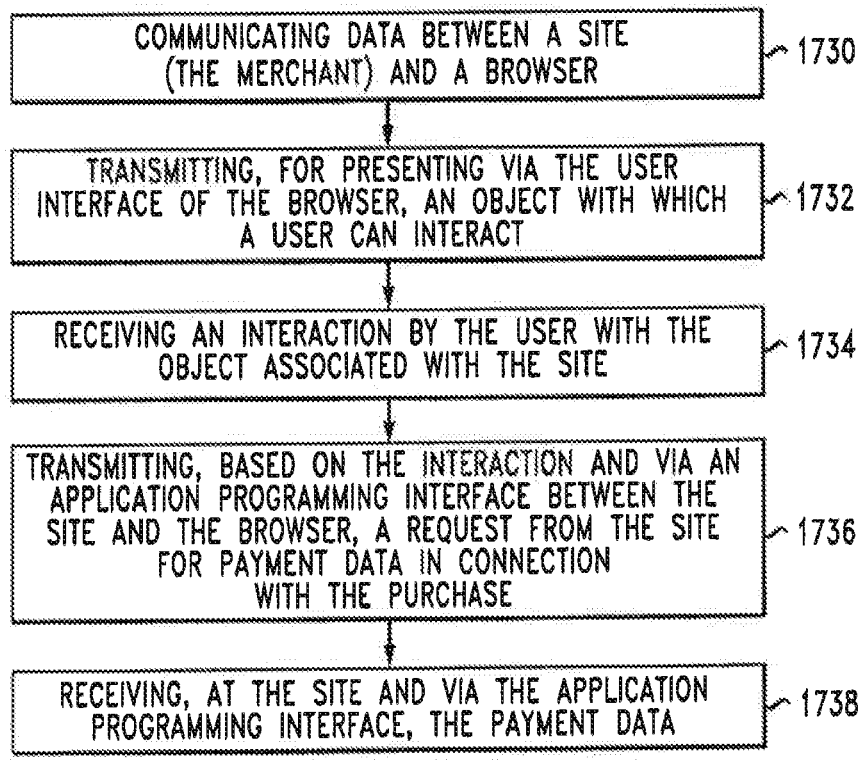
FIG. 17D illustrates another example method.

From the merchant standpoint, the method can generally proceed as follows and shown in FIG. 17D. The method includes communicating data between a site (the merchant) and a browser (1730). The method includes transmitting, for presenting via the user interface of the browser, an object with which a user can interact (1732), receiving an interaction by the user with the object associated with the site (1734), the interaction indicating a user intent to make a purchase, transmitting, based on the interaction and via an application programming interface between the site and the browser, a request from the site for payment data in connection with the purchase (1736) and receiving, at the site and via the application programming interface, the payment data (1738), wherein the payment data confirms a payment or can be used to process a payment for a product or deliver the product associated with the purchase. As noted above, the payment processing can occur on either side of the API depending on what service the user is signed up for or the preferences of the user. When the site processes the payment for the product, the payment data can include at least user payment account data such as a one time use token. The method can further includes the site processing the payment for the product based on the payment account data received from the browser via the application programming interface. When a payment service processes the payment for the product, the payment data can include a confirmation that the payment for the product has occurred by the payment service such that the site can deliver the product to the user. Alternately, if an altcoin approach is selected, the API protocols can include a feature for exchanging, in an encrypted fashion, information or personal keys, addresses, amounts, conversion data between currency and altcoin values, and any other data necessary to enable an altcoin wallet or payment service to make the altcoin payment to the merchant site and report the success of the payment. In this regard, the API protocol is structured such that the user can select various methods of payment, including payments occurring on the browser side of the API (through the browser or payment service associated with the browser or communicating with the browser, or an altcoin system) or on the merchant side of the API, through the merchant's standard payment processing structure for payment systems like Visa, Mastercard, Debit cards, PayPal, etc. Thus, in one user interface as the user is getting close to making a purchase, the user could see payment options such as "Visa ********1234" or "Android-Pay". Choosing the Visa payment method would cause the back end processing between the merchant and the browser to have the Visa payment information, account number, security code, user name, address, etc. transmitted to the merchant site so the merchant can process the payment. Choosing Android Pay would result in the purchase amount, tax, shipping and/or any other necessary data to be transmitted through the API such that the Android Pay service could process the payment and report back a confirmation of a completed payment such that the merchant can deliver the product.

The above approach also can be applied to the drop-down or drop up menus. With the API in place, the efficiency of making purchases from a drop-down/up menu option can be increased. For example, a user's information such as hat size, shoe size, shirt size, pant size, etc. can be stored. User preferences for color, style, etc. can be stored and such information can also be accessed via social media sites or contact information. This data can be used to help autocomplete or select products to list in a drop-down menu. Such information can be communicated via the browser API with merchants who sell products with parameters that can be filled in through such user data. If the user starts to type "green baseball cap", a drop-down menu item could state "green baseball cap 7⅗ inches, buy now with Visa, $11, delivered by Walmart on Tuesday". As the user types the words, a correlation to a product database at a merchant site could lead to the merchant exchanging product information or make a request for a payment request through the payment request API. The user's address can be drawn upon to determine shipping costs, taxes, etc, quickly such that the drop-down/up menu can include one or more of a charge, a payment option, delivery information, description of product, size information, personal user preferences for color or style, etc. The user merely clicks on that option to make the payment (on either side of the API depending on the capabilities of the merchant, user payment accounts, and so forth), and have the product delivered. If more than one payment option is available (Visa, Android Pay, Bitcoin), the item in the drop-down menu can perhaps have multiple sub options to choose from perhaps in a left to right fashion. This would be a more dynamic drop-down/up menu in which the user could drop-down to select the row but then slide to the right or left until the cursor is over the Android Pay option. Releasing the cursor could cause the system to continue to exchange information via the API and process the payment through the Android Pay option and report that payment to the merchant. The menu option could report any number of different pieces of information for the product, such as a pickup location (For pickup at Walmart in Dunkirk), and so forth. Current drop-down menus provide some options like to search for the item on Amazon.com or Yahoo.com but they do not provide the purchasing simplicity that can be achieved by tailoring the drop-down/up choices through use of the browser API between the browser and merchant sites. Objects that the user can interface with can be presented in any location on the user interface, not just drop-down menus.

Another benefit of this approach is that as the user is typing in the product information into the search field, the user can view the drop-down/up results and narrow the scope as they go. For example, if a user types in "baseball cap", a drop-down/up item could include items such as: "G"reen Baseball cap sold from "W"almart or "C"osco. The user could continue to type: "baseball cap G C" which could utilize the hints from the drop-down menu to make it green and from Cosco. Perhaps two prices could be shown "$11 or $20" and the user continues to type "11" into the input field. The dynamic exchange of typing and feedback from the drop-down/up menu item could also indicate which of a number of different drop-down/up menu items the user is interacting with and continue to focus the search and the results on what the user is looking for. Throughout this process, it can quickly be assumed that a purchase intent is likely and the exchange of payment data and options can be presented and chosen by the user. For example, the drop-down menu item may say "Green Baseball Cap, $11, "A"ndroid Pay, "V"isa or "B"itcoin" " and the user could continue to type "baseball cap G C V" which would indicate the choice of Visa as the payment method. Pictures can be dynamically presented through this process including the opportunity to click on a picture and continue providing information through the input field such that ultimately the user has chosen the item, its color, size, and so forth, the payment mechanism, and can confirm the payment. In one example, the menu item could be more dynamic than current menu items to let the user click on different objects within the item to choose payment options, size, color, merchant, delivery address, and so forth. As the user narrows down which drop-down/up item the user wants to focus on, more information to complete a purchase could be provided such that the process becomes very quick and simple. The menu items could start out short and simple but as the user types more or interacts with a menu item, new data or objects could be presented which, in a dynamic fashion through interaction with the API, could lead to a quick finalizing of the item for purchase. For example, the user may initially choose "iPhone 8, from Bob's Audio Video", but then the merchant can communicate that it can handle Visa and Android Pay through the API. If the user also has these payment options available, then the menu item can add two selectable objects which the user could click on or alternately continue typing in the input field (since the user is already at the keyboard typing anyway) a "v" or an "a" to represent the choice. The system after interacting to confirm an item, an amount, a delivery address, a payment option, etc. can manage the payment as disclosed herein on either side of the API, and instruct the merchant to make the delivery.

The process, through the browser API, enables the exchange of payment data, one-click parameters or settings, any other data, and to process the payment in the manner chosen by the user. The merchant delivers the item. The drop-down/up menu concepts disclosed herein work in a different way with the browser/user interface payment request API but achieve a similar result of more efficient purchasing process for the user. The disclosure covers the interactions both from the side of the browser interacting throughout the process through the API with the merchant and the processing from the merchant site where they manage their database of products and interact and exchange information, requests and so forth via the API with the browser.

The following discussion continues to relate to the use of an API or other protocol to communicate payment related data from a browser, site, agent, or other storage location to a merchant site for the purpose of populating payment fields for the user to simplify the purchasing process. In one aspect, the disclosure relates now to transition a user from a search engine, social media site, or any site, to a merchant site using the API. In another aspect, the merchant site can (independent of how the user navigated to the site) interact via the API with the browser/agent/entity to obtain the payment data for automatically populating the payment information to eliminate or reduce the need of the user to fill in data fields, which is particularly cumbersome on a mobile device.

In one aspect, a system, method and computer-readable storage devices are disclosed which prepopulate a shopping cart in an online vendor's website based on intent determined by a classifier that processes input provided to the unified input field. The user intent can be classified or determined in any manner. A user can be registered with and/or logged in with his or her browser, such as Chrome, Firefox, Internet Explorer, Samsung Internet, Microsoft Edge, Safari, or Opera, such that user's purchasing credit/debit card or other accounts and delivery addresses, and/or other data, are stored in a user profile. Then, if the user desires to make a purchase through a destination website that may have a product not found on their registered website, the browser (or system processing in a network) can handle negotiation (via an API) between the browser and the website such that the system can convert a shopping-cart based model website with which the user is not registered into a "one-click" purchasing experience for the user. For example, the system (through a service like Google Wallet, Apple Pay, Android Pay, or PayPal, etc.) can handle the payment for the item and communicate with the merchant site to handle delivery. Of course in this scenario, the process can initiate not from a search engine but merely from a state within the merchant site in which the user is in a position of making a purchase of an item. At that state, the merchant site could communicate via the API with the browser, agent, or search entity, to retrieve payment data for populating the necessary payment fields and present via the interface with the user a simplified purchasing experience. With payment data (one or more of account data, delivery data, dates, delivery options, preferences, etc.) communicated through the API to the merchant site, the merchant site can process a payment from the user's payment account using their normal payment system.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. This can occur as part of a transition from say a social networking site to a destination merchant site in a one-click purchasing state based on a setting in the browser that needs to be accessed in the transition. The user provides input in a unified input field, such as "buy acme toaster 4.5" which the system and the classifier categorize as a desire to make a purchase of a particular toaster model. The system determines, based on various criteria such as pricing, shipping, country, and so forth, a merchant website that offers that toaster model. The user has never registered or made a purchase at the merchant website offering the toaster for sale. Thus, if the user were to buy the toaster from that merchant website, the user would have to place the toaster in a virtual shopping cart, then enter personal information such as address, credit/debit card information, user name, password, and so forth to have the item shipped.

The system, in one aspect, can identify the merchant site based on the input provided via the unified input field or can initiate the process directly from the merchant site independent of a search to arrive at the merchant site. Then the system can navigate to the state in the merchant website where the user would normally click to place the item in the shopping cart. In this case, however, the system will navigate to the merchant website where the item can be placed in the shopping cart, and determine that the user is not registered with this merchant website. Then the system can automatically communicate with the merchant website, such as via a new user registration page, or an API, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input. This approach can turn non-one-click purchasing websites into one-click purchasing websites, via input through the unified input field. The system can also use the registered payment information to process the payment as well and coordinate with the merchant site for filling the order. The process of obtaining payment data through the API for automatically providing payment and/or delivery data can also occur simply between the merchant site and the browser through the API. The merchant site, at the appropriate state in which the user may make a purchase, can submit a request through the API for payment data which can be provided as stored by the browser or agent for simplifying the purchasing process. The data can also be provided from the browser to the merchant site via a tokenized process to protect payment account information. The interface the user views can be a combination of merchant information (picture of the product, reviews, other date) as well as a "'buy now" or "buy through google" or "Android Pay" type of button which is provided via the API to the graphical interface.

In one aspect, the system stores whatever information is necessary to use the payment request API on the user device. For example, when a user adds a debit or credit card to a payment mechanism, the account information is encrypted and sent to a network server. The server(s) then link up with the user bank to verify the information. The bank can create an encrypted device account number that is transmitted back to the servers and stored on the secure element in the user device. The secure element can be embedded in a near field communication (NFC) chip on a device. This number is completely unique to the user device and to the credit and debit cards (or cryptocurrency or other forms of payment) associated with it.

When the user makes a purchase through the browser API, the secure element (which is a security chip) creates a unique code and sends that, along with the device account number, to the payment terminal in place of the card number. The card information, in one aspect, is not stored on the user device or in the servers and it may not be backed up to a cloud provider. The unique code is transmitted through the browser API to the merchant site for processing the payment. Thus, according to this aspect, the information stored on the user device may not specifically be the payment account number but is a particular account number which is associated with the payment account number of the user. The end result is the same as if the device transmitted the account number to the merchant site for payment. With some service providers, the device account number is used to identify the credit card or debit card used for the payment.

Figure 17E:
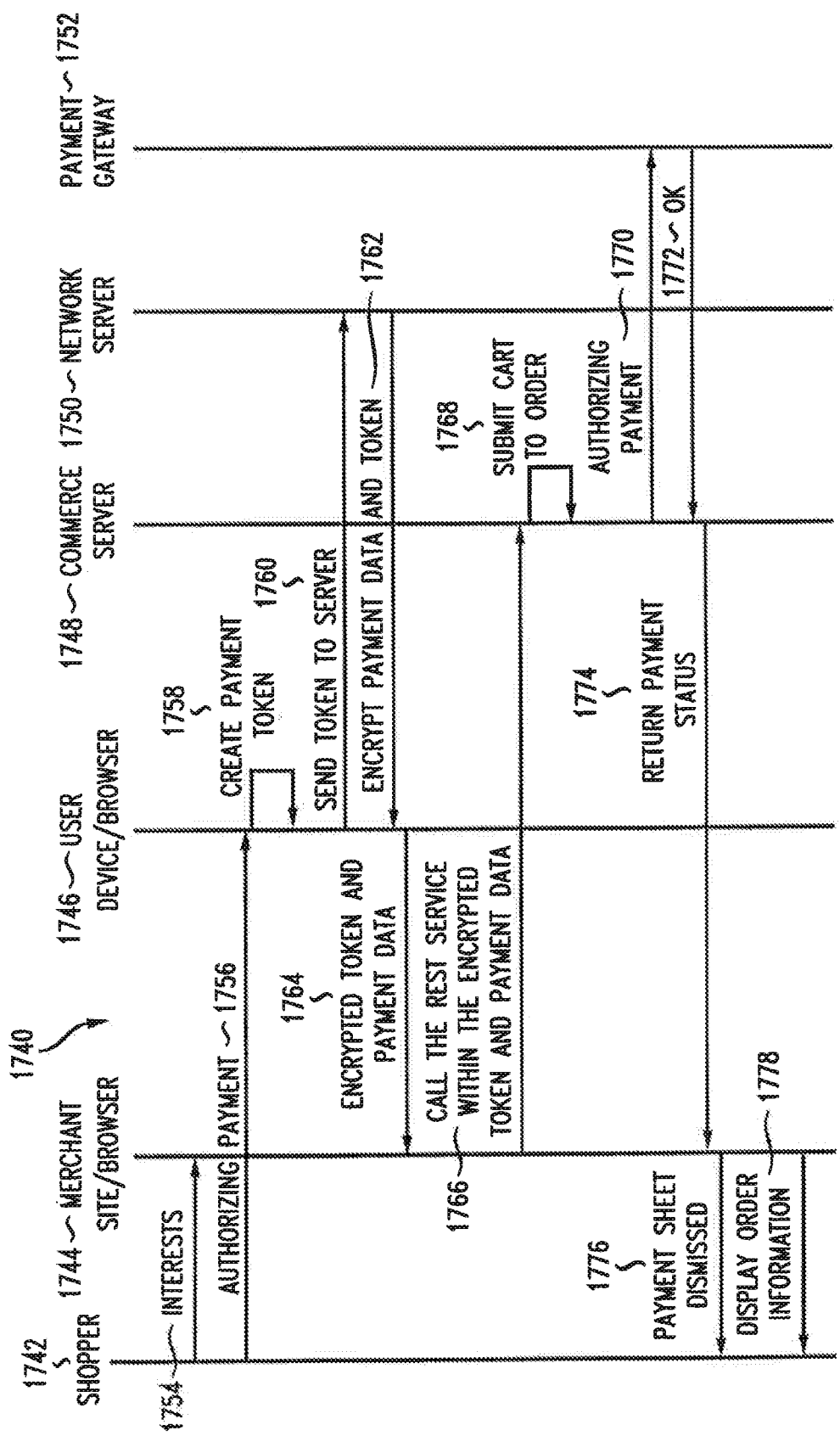
FIG. 17E illustrates a method of using the browser API.

FIG. 17E illustrates a tokenization process 1740 for use with the payment request API. When using a tokenized process, a merchant 1744 may need several pieces of information to be able to process the received token from the browser API. A merchant may need a unique identifier that represents a merchant associated with the payment process. The merchant may need a payment processing certificate that is used to securely transfer payment data. Network servers 1750 can use the payment processing certificates public key to encrypt the payment data. The merchant may use a private key to decrypt the data when processing the payments or the token information. A merchant identity certificate or a transport layer security certificate can be used to authenticate a merchant session with network servers. This process will be illustrated in more detail next.

As is shown in FIG. 17E, merchants or applications 1744 will interact 1754 with a user or a shopper 1742 as the user navigates through the site. Once the user decides to make a purchase, they may click on a buy button and authorize a payment process to initiate. This can also include a touch ID such as a fingerprint to authorize payment 1756. Such capabilities can be enabled in Xcode. As noted above, the merchant 1744 has, in one aspect, registered a merchant ID and created a payment processing certificate, which is a cryptographic key that is used to securely send payment data to the merchant server. The clicking of a buy button and providing fingerprint authorization to process a payment can involve a single step or can involve multiple steps.

To initiate a payment, the merchant application creates a payment request to submit to the payment request API between the merchant 1744 and the browser 1746. This request can include the subtotal for the services and goods purchased, as well as any additional charges for tax, shipping, or discounts. The merchant can pass this request to a payment authorization view controller, which displays the request to the user and prompts for any needed information, such as a shipping or billing address. A delegate can be called to update the request as the user interacts with the view controller 1754. This can also include requests for size information, color preferences, social media data like birthday information, or any other information that can relate to the purchase.

As soon as the user authorizes the payment 1756, payment information can be encrypted to prevent an unauthorized third party from accessing it. In one aspect, the payment request can be sent to a secure element (such as the secure element used on iPhones to enable Apple Pay with near field communication at a merchant site), which is a dedicated chip on the user's device 1746. The secure element adds the payment data for the specified card and merchant, creating an encrypted payment token 1758. It then passes 1760 this token to network servers 1750, where the servers reencrypt the token using the merchant payment processing certificate 1762. The servers 1750 transmit 1762 the reencrypted token back to the user device 1746. The reencrypted token represents a second token that is prepared to be transmitted to the merchant site 1744. Through the browser API, the user device 1746 sends the encrypted token and/or payment data back to the merchant site 1764 for processing. Other data requested can also be transmitted through the API back to the site, such as shoe size, shirt size, pant size, color preferences, style preferences, etc. Multiple different calls to the API can be made in the process at different stages. For example, several steps prior to a payment request being made, the merchant site might want the size information so that the user does not have to click "X" or "XL" or "M" for a shirt size. Furthermore, body models are being generated for the human body. Data for the user can be stored in a body shape model at the browser or accessible by the browser. If the use is looking for cloths online, data about their body model could be retrieved via a browser API and transmitted to the site which can adjust the presentation of clothing for that individual. They could also include data for other individuals such that as the user interact with the site, the site could say is this for you or your sister, or your wife and their body model data could be transmitted such that the clothing could be tailor to the right person. Views of clothing items could then be modified for that body model.

The merchant site 1744 then, as part of the payment process, calls a REST service (which is known by those of skill in the art for processing payments) or other similar service with the encrypted token and payment data 1766 which communicates the data to a commerce server 1748. The server 1748 submits the cart to order 1768 and authorizes the payment 1770 to a payment gateway 1752. An "ok" signal 1772 is transmitted back to the commerce server 1748 which communicates 1774 a return payment status to the merchant site 1744. The payment, having been processed and confirmed, causes the merchant site 1744 to dismiss the payment sheet 1776 and display an order confirmation to the user 1778.

In one aspect, the payment token is never accessed or stored on the network servers 1750 which are used to encrypt the payment data and token. The servers simply reencrypt the token using the merchant certificate. This process lets merchants securely encrypt the payment information without it having to distribute the payment processing certificate as part of the merchant application.

In many cases, the merchant site passes the encrypted payment token to a third-party payment solution provider 1748 to decrypt and process the payment. However, where merchants have an existing payment infrastructure, the merchant can decrypt and process the payment on their own server. Reading, verifying, and processing payment information can involve one or more cryptographic steps such as calculating an SHA-1 hash, reading and validating a PKCS

7 signature, and performing elliptic curve Diffie-Hellman key exchange. It is noted that the above approach represents an example tokenization process for use with the browser/user interface payment request API. A payment token object can include such data as a transaction ID, an amount of money, data about the product, information about payment network, payment token data such as a signature and a header which can include encrypted payment data, and an amount, a cardholder name, a CVV code, an expiration date, a payment account number, payment processing data, and address, other user preferences, cryptographic currency data, and so forth. Of course other processes are contemplated as well for tokenization, which can add a layer of security to the process.

In another aspect, the browser may be operational on a first user device, such as a laptop computer, and the payment data may be stored on a second user device, such as a mobile device or mobile phone. The first user device and the second user device can communicate wirelessly through a protocol, such as the Bluetooth protocol. In some scenarios, the first device may not have a fingerprint identification option, while the second device does. In this scenario, while the user interacts via the first device with a browser which is configured to utilize the browser payment request application programming interface, the first device, as part of the payment process, will establish a communication with the second device such that the user can authorize the payment via a touch identification, and wherein the second device can be utilized for generating a payment token and communicating with a network server to receive a second payment token which is passed from the second device to the first device and through the browser payment request application programming interface to the merchant site for payment processing. In other scenarios, the first device includes a fingerprint recognition mechanism, and thus only a single device is needed for confirming authorization of the purchase. The browser can be any user interface used to view and navigate sites or applications. The browser API may also receive one or more of data about the product, the merchant, keys for encrypted communication, or any other information such that a payment process could occur separate from passing payment data through the API back of the merchant. For example, for security purposes, payment information may be communicated to a separate payment processor which can handle the payment so that payment data for the user is not provided to the site. However, the merchant still must delivery a product, so the browser API could have a separate payment processor process the payment but pass a user name and address delivery information to the site for delivering the product.

In yet another aspect which relates to processing from a browser or application standpoint, an example method includes presenting, on a graphical user interface, a presentation, the presentation being received from a site over a network, receiving, via the user interface and from a user, an interaction with the presentation, receiving, via a browser application programming interface between a browser and a merchant site, a request from the site for payment account data for the user and transmitting, to the site and via the application programming interface, the payment account data, or other data, wherein the payment account data can be used to populate payment fields for payment processing on the site. The data can be a token which can be used once for a payment and that maintains privacy of the account information. The payment account data may just be used by the merchant site for processing the payment and may not literally populate fields that otherwise would be manually populated by user input. For example, if payment data is received in a tokenized secure manner, the data may just be used to process a payment and not literally used to fill in pre-set form fields. The presentation can include one of a product for purchase and a service. The method can include the site processes a payment for an item or a service using the payment account data for the user. The graphical user interface can be associated with a browser or an application. In one aspect the API that communicates data between the site (merchant site) and a browser that can store the payment account data for the user. This aspect covers the process from the standpoint of the browser that stores the payment/deliver data of the user and communicates that data via the API with the merchant site for populating the necessary fields (or an equivalent type of process) to create a one-click purchasing experience for the user who is on the merchant site.

The API can also be used to request body type, sizes, or a body model for the user for use in presenting clothing for purchase. In another aspect, the merchant site may determine whether the browser API is available through the browser being used to navigate the site. If so, then a browser API request can continue, and if not, the site proceeds with a standard input field approach for payment and address information.

The method can further include updating the presentation to include a buy option which is configured, based on a confirmation from the user, to enable the site to utilize the payment account data received through the API to process a purchase of an item or service without a need of the user to fill in the payment fields on the site. The browser or other agent communicating via the API can also provide the graphic for a "pay now" type of button to integrate with site graphics. The payment account data can further include one or more of address data for the user, a payment account number, an expiration date, a security code, a cardholder name and shipping instructions for the user.

The request through the API can further include one or more of a supported payment method for the site, a total amount value for a purchase, items that may be displayed for purchase, shipping options, payment modifiers, a request for a user email address, a request for a user's phone number, and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface, receiving, via the network and from a user, an interaction with the presentation, and transmitting, to an application programming interface, a request for payment account data of the user. The method includes receiving, at the site and via the application programming interface, the payment account data and populating payment data fields associated with a payment process with the payment account data for the user to yield populated payment data fields. The payment data may also be in a tokenized format for processing a payment in a secure way that does not reveal the user's account information. Partial account information (u.e., the last 4 digits of the account number) could be transmitted for presentation on a user interface to confirm which account to use. The site can process a payment for an item or a service using the payment account data for the user. The API can coordinate data between the browser and the site wherein the browser stores the payment account data for the user. Upon receiving a confirmation from the user to make a purchase of an item or service associated with the presentation, the method can include processing a payment for the product using the populated payment data fields.

The method can further include, upon receiving the payment account data, updating the presentation to include a buy option which is configured, based on a confirmation from the user, to enable the site to utilize the payment account data to process a purchase of a product or service without a need of the user to manually fill in the payment data fields on the site. The payment account data can further include one or more of address data for the user, a payment account number, an expiration date, a security code, a cardholder name and shipping instructions for the user. The request can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network, receiving, via the user interface and from a user, an interaction with the presentation, receiving, via an application programming interface, a request from the site for payment account data for the user, autopopulating a payment field associated with the presentation with the payment account data (or just using the data as necessary for payment processing) and transmitting, to the site and via the application programming interface, the payment account data, wherein the site can process a payment based on the payment account data for the user. The method can also include receiving a confirmation from the user of a purchase after the payment field is autopopulated.

The system can process the new registration pages silently, such as in a background tab or new window in the browser, or can negotiate the new registration process with the merchant website without presenting the registration page to the user at all. The system can present a progress bar on the same page containing the unified input field after the user requests a purchase, such as by pressing enter after providing input via the unified input field. The progress bar can indicate to the user the progress of creating a new account, entering shipping data, adding the item to the cart of the merchant web site, and placing the order.

The user can establish default preferences for which personal information to use for new registrations. The user can establish these default preferences in advance of encountering the merchant website, or even in advance of encountering the unified input field. Alternatively, at the first instance where a registration is required, the system can prompt the user to establish such settings and/or provide additional information.

The system can prefer merchant websites with which the user already has an account or with which the user is already registered. For example, if Merchant X and Merchant Y both offer the same item for sale, the system can choose to use the one of these two merchants where the user already has an account. The system can determine this by examining a browser history, profile data available to the browser, browser type, or cookies stored by the browser or by other browsers associated with the user. The system can intelligently determine when to use a merchant with which the user is not registered, such as based on a difference in shipping time, or a difference in price. For example, if the merchant with whom the user is not registered offers the desired item at a price that is at least 25% lower than the merchant with whom the user is registered, then the system can create a new account. If the user does not desire to have the system create user accounts on his or her behalf, the user can instruct the system to make purchases where he or she already has accounts, or at merchant websites which allow guest accounts.

However, the system can identify, using the classifier and user profile data, the merchants the user is most likely to select, and present them to the user for disambiguation. The system can present to the user a table, such as by a JavaScript popup, showing merchants, shipping times, and total price including shipping and tax. The user can simply click on a desired merchant from the table, and the system can automatically register the user with that merchant if necessary, and process the order with that merchant. The user only has to make one click to identify the merchant, and the system handles the rest of the steps, thereby providing a one-click interface into a non-one-click website via the unified input field.

Figure 17F:
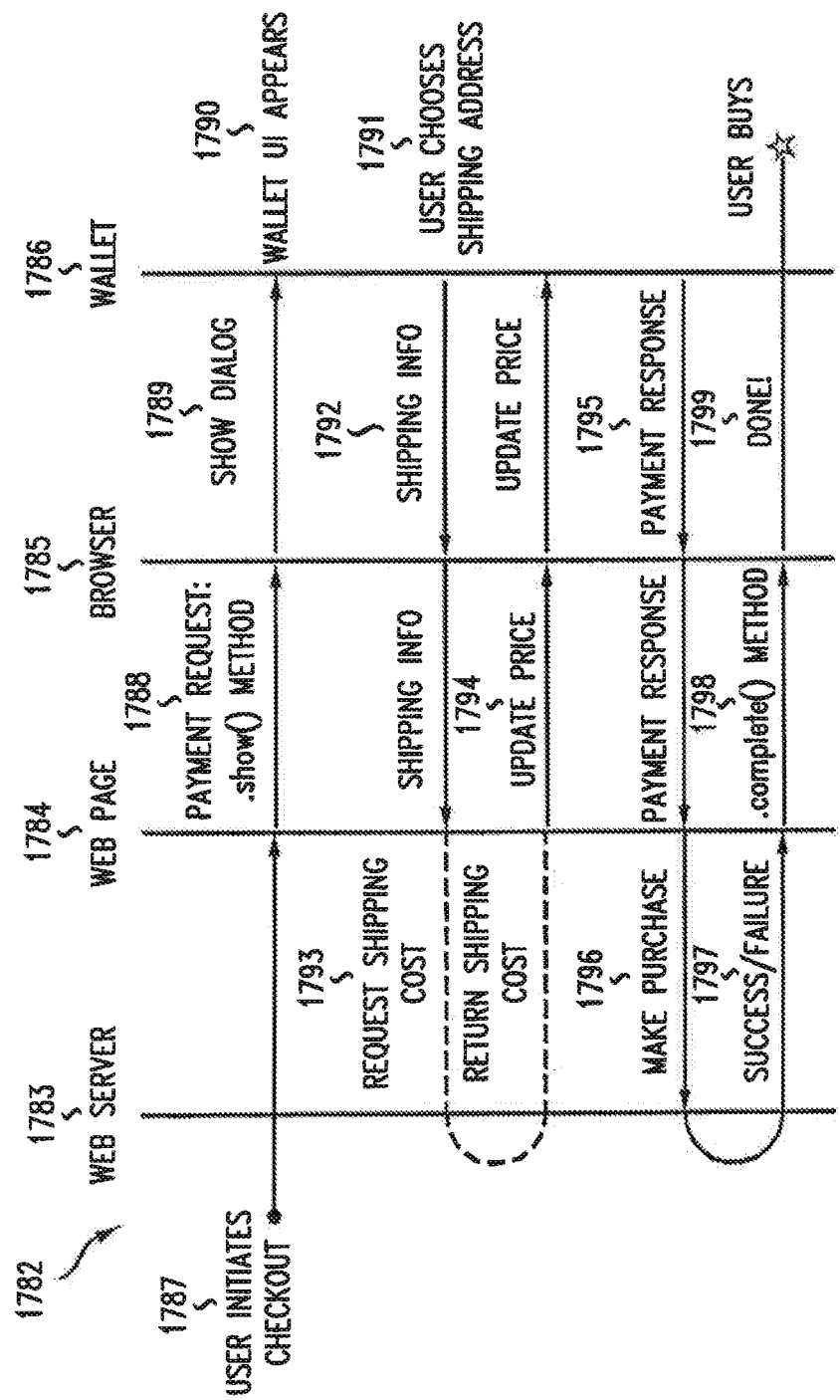
FIG. 17F illustrates another method for using the browser API.

FIG. 17F illustrates another aspect 1782 of using the browser API for communicating payment data. After the user has navigated through a website and initiates a checkout process 1787, the webpage should create a payment request which is typically initiated when the user clicks "buy" button. The payment request can include method data, details and options. The method data can include required payment method data that includes payment method identifiers, required transaction information, and optional information such as shipping or contact information that should be returned. In one aspect, the payment amount could be negative and the payment request API could be used to process returns or discounts. Of course in this aspect, money would flow from the merchant site through the browser API to the user's digital wallet or payment account. In this aspect as well, the process could essentially be reversed where the user would initiate a payment request from the browser or from a site and any aspect of this process could essentially be reversed where shipping information, discounts, any other data necessary, can be utilized to enable a refund to be processed. Tokens could be used and generated either on the browser side or the merchant side with account information and data for processing a return or a peer to peer payment. Return shipping information, extra charges, or any other data necessary to enable a user to return an item, and receive a refund can be exchanged through the browser API in a similar manner as occurs when the user makes a purchase at a merchant site.

Figure 17G:
FIG. 17G illustrates a user interface for the browser API.

Continuing with FIG. 17F, the payment request 1788, can initiate a "show" function, which shows a dialogue 1789 for use as an interface for processing the payment. A user's wallet 1786, such as the Microsoft wallet, a cryptographic wallet, payment information stored at a browser or other location, and so forth can be branded or utilized as part of user interface. In this example, the user chooses a shipping address 1791 through the interface. FIG. 17G illustrates an interface 1781 with such information as the user's name, shipping address, shipping options, and email address for a receipt. The shipping information is returned from the wallet 1786 to the browser 1785 which is then passed to the webpage 1784 such that the webpage can request a shipping cost 1793 from a Web server 1783 which returns the shipping cost to the merchant 1784 who can then update the price 1794 which is passed to the browser 1785 and the wallet 1786. A payment response 1795 is generated for the wallet to the browser 1785 which passes the payment response through the browser API to the merchant 1784 who makes the purchase 1796. A success or failure signal 1797 is provided to the merchant who can then complete the process 1798 by informing the browser 1785, at which point the purchase is complete 1799. While FIG. 17F does not specifically mention a tokenization process, various encryption technologies could also be used to encrypt data or tokenize the data such that the payment request or the payment response passed through the browser API could be a one-time use token which encrypts the various information needed to process one or more of a payment, a delivery of payment, and update of user information, and so forth.

Figure 17H:
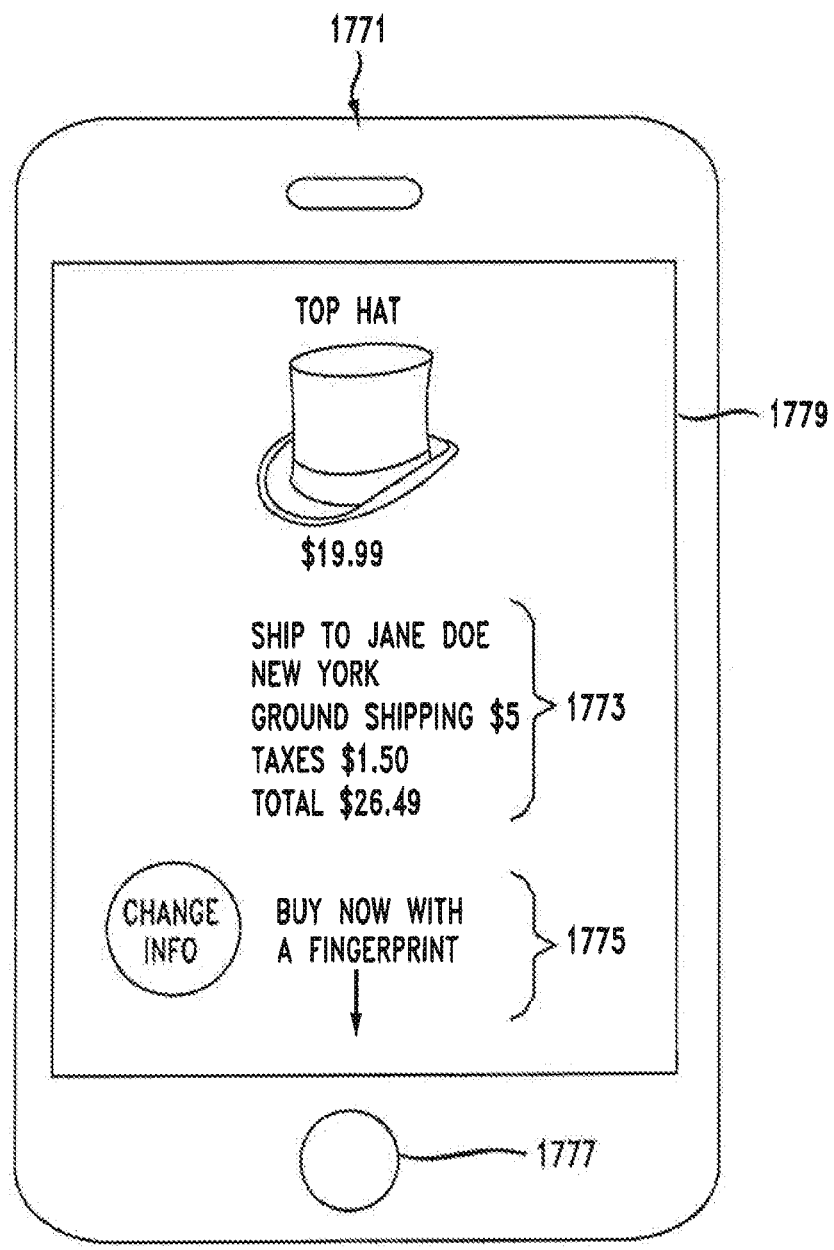
FIG. 17H illustrates another user interface for the browser API.

FIG. 17H illustrates an interface 1771 which has several unique features to it. One unique feature is that there is no buy button in the touch sensitive screen 1779. The standard way of providing a secure purchasing experience with fingerprint ID is to require several interactions to complete the purchase. The first would be to click on a buy button on the user interface 1779, followed by a user ID via fingerprint confirmation. Since it involves two clicks, an approved mechanism for a system which includes a fingerprint ID could be the following. While the user is navigating through a site such that they are approaching a state in which a purchase could be made, the site could provide a request through a browser payment request interface for preliminary information associated with a purchase. The preliminary information could include the town or city of the buyer as well as the name of the buyer. It could include payment account information. Some information may be encrypted or delivered in part to maintain privacy. In one scenario, a sufficient amount of information is communicated to provide the user with enough information to confirm that the proper user is identified, as well as the proper town 1773. A type of shipping can also be displayed 1773. With the communication of preliminary information, the total amount to be charged can be calculated and presented to the user prior to the user clicking on any buy button. The browser/user interface payment request API is an appropriate communication channel to receive, via the browser or user interface, the basic data needed to arrive at the state of the user interface. The trigger for when the browser submits a payment request calls to the browser API for information could be the state of the navigation on the site. Thus, rather than triggering a payment request based on the user clicking a buy button, the site could recognize that a user has placed an item in a shopping cart, and when the user clicks on a functional button that reveals the shopping cart, which interaction would occur before a buy interaction, the system could submit a payment request such that no buy button needs to be pressed on the interface. One or more of the following parameters could be included in an analysis to determine when to initiate a payment request or call to a browser API for one or more pieces of information associated with the potential purchase: machine learning tools or information about user habits, an analysis of previous interactions of the user and buying habits of the user, the configuration of the website, the time of day, the type of product that potentially could be purchased, social media information such as birthdays of friends and family, location of where the user is navigating the site, type of device that the user is using such as a desktop, laptop, or mobile phone, and so forth. Any one or more of this data could be analyzed to determine when to initiate a call to the browser API separate from the user clicking on a buy button. As noted, by initiating the call based on a state of the navigation rather than a user clicking a buy button, an interaction can be removed such that to make a purchase. The user doesn't need to both click on a buy button and press a fingerprint reader.

Also shown in the interface 1779 is an option for the user to change the information that is presented. Typically, users will have particular patterns which they will use over and over, such as choosing ground shipping. Thus, in many scenarios, the information provided in the user interface which indicates that the user can buy now with a fingerprint 1775 enables the user to truly have a single touch purchasing experience where the single touch not only indicates the intent to purchase but also provide the fingerprint authorization. Of course the fingerprint authorization could also be provided on the touch sensitive screen 1779, if it was so configured. As the use of the fingerprint button 1777 is outside of the browser, the device 1771 may communicate the touch to the site indicating that the user has provided the intent to purchase as well as the fingerprint authorization. At this point, the system could proceed to create the various tokens or encrypted data necessary to return an encrypted token and payment data back to the site for processing the payment.

Where the system might want to include devices such as a laptop without a fingerprint sensor and a coordinated mobile device having a fingerprint sensor, that configuration could be communicated to the site such that the appropriate information can be provided from the mobile device, through the wireless interface, to the laptop or other device, and then to the site such that the preliminary information provided and shown in FIG. 17H can enable the browser on the laptop to instruct the user in notice 1775 that to make the purchase the user simply can provide the fingerprint identification on the mobile device. The step that is removed in this scenario is a requirement of the user to click a buy now button within a browser on the device. Thus, the interface 1779 can be dynamic depending on whether the user requires a single device for fingerprint authorization, or multiple devices. A dynamic buy button can be presented based on a detected browser type or user payment account type. If a single device is used, the notice 1775 can simply instruct the user to provide their fingerprint on finger print sensor 1777 to make a purchase. If multiple devices are used, the notice 1775 can instruct the user to simply provide the fingerprint authentication on their second device. A display can also be provided on the second device to coordinate the information and confirm that by touching the fingerprint identification button on the second device, the user is buying the top hat shown on the first device. By providing this coordination between the merchant site, the first device, and the second device, the payment process can eliminate one interaction. This process can make the purchase a true one click purchase experience.

The following example illustrates the point made above. Assume the user has been navigating and selecting several items for purchase from a site and has placed those items in a shopping cart. Assume three items have been placed in the shopping cart and the user desires to now checkout. The user clicks on a "view shopping cart" button. That button can cause the system to initiate a call to the browser API, which can retrieve one or more pieces of information such that the user can be presented with the three items in the shopping cart, identification of a payment account, such as a visa, an identification of a shipping address and shipping method and instructions to simply provide the fingerprint authorization for the purchase. There really is no need for a buy button at this stage. Of course options can be presented for the user to edit the information or change the payment account and so forth. Machine learning or other intelligence can be utilized to prioritize which payment account the user is likely to use. For example, a business credit card may be presented based on one or more factors, such as the location where the user is making the purchase, the kind of purchase, the time of day, and so forth.

The machine learning algorithm can also be applied to other types of interfaces such as a spoken dialog interface. Speech related models have been developed in the past with respect to dialog management in general. The additional concepts disclosed herein is to utilize machine learning to dynamically modify or present the payment process as part of any kind of user interface. The payment process might be a spoken dialog, graphical, multimodel, near-field communication, mobile-based, desktop-based, and so forth. For example, in a messenger application which includes a text component and a spoken component, the balance of what is presented as a text or a message and what is spoken or visual can be selected or determined by machine learning models. A spoken dialog might select what to say, how to say it, what voice to use (male, female, accent, etc.), whether to switch from one voice to another, and so forth, based on what type of interaction will not only be easier for a user, with less friction, but also what might increase conversions and the completion of the payment process. Plus, voices might be associated with particular payment services, such as from Apple or Google. The choice of dialog, volume, tone, accent, payment service, options presented, can be based on historical data, machine learning data, and other data such as history of purchases, user preferences and so forth. Utilizing such an approach can enable the payment process to differ from person to person in such a way as to enhance the individual user experience with the purchasing process. No longer will everyone be presented with the same set of input fields or the same PayPal button. The very point of committing to make a purchase and authorizing the purchase can be tailored to the individual. That personalized approach can also be offered across different platforms and sites such that the user will have a consistent experience. The browser API could pass to the site some data associated with how the user historically has experienced a checkout or can pass user parameters, or any other data to instruct the site to improve the process. For example, in a normally graphical user interface experience, one user might have a 30% increased likelihood of finalizing a purchase if an audible comment is made when a buy button is presented, such as "Mary, thank you for coming to our site. We're set to use Apple Pay for you". A dialog could be added to the graphical experience to step people through the process and make them more comfortable. Tutorials, graphics, video, chatting opportunities, and so forth could all be a part of the payment experience and managed to be presented in a dynamic fashion for each user.

Multi-Site Site Shopping Cart

Figure 17I:
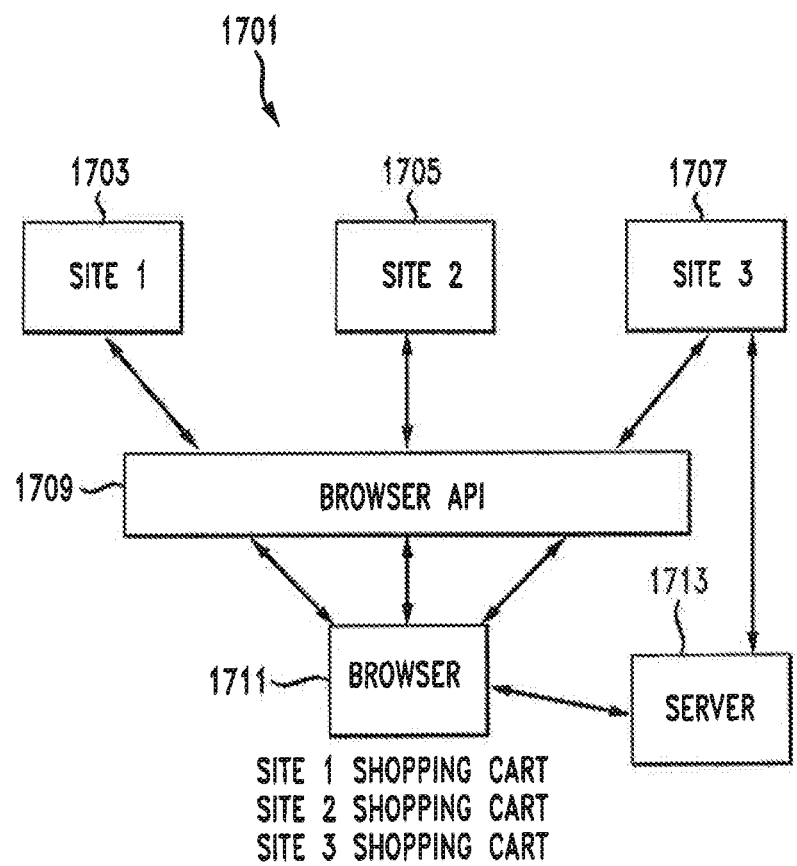
FIG. 17I illustrates a persistent browser shopping cart API.

Referencing the shopping cart above brings up another aspect of this disclosure, shown in FIG. 17I. The configuration of system 1701 and this figure represents the user navigating to multiple sites 1703, 1705, 1707 for shopping. We first note that if the user is shopping at a single site such as Amazon.com and places a number of items in the shopping cart, the user can view that shopping cart and with one click purchase multiple items within the cart. However, even using the browser API, if the user navigates to multiple different sites to make purchases, the user has to make multiple one click purchases to purchase three items. For example, if the user bought a first item from site 1 (1703) and a second item from site 2 (1705) and the third item from site 3 (1707), then the user would have to make three clicks for purchasing because of the separate nature of these sites. The following is an approach to eliminate a number of clicks when making purchases across multiple sites. An aspect of this disclosure is to use the browser API to store items placed in the shopping cart. Another aspect involves storing data across a universal shopping cart with a search engine or search entity such that a single checkout for purchases made via different modes (such as a shopping cart filled with one item from a web search and another item from a spoken dialog with a dialog system to fill the cart with another item). The search entity or entity managing a checkout from a universal cart can charge the merchants for managing the checkout. For example, where multiple merchants have products in a universal cart, the entity managing the checkout can charge each merchant a portion of the fee for managing the payment process. In the case of a search entity, the search entity may not charge for advertising with the merchants but may only charge for purchases made through a universal shopping cart.

For example, assume the user is at site 1 and places a toaster in the virtual shopping cart. An option could be presented to the user to place the toaster in a browser shopping cart. This may be a separate button for interaction with the user from a normal shopping cart which remains at the site, or could be integrated in with the standard site button for placing an item in a shopping cart. If such is the case, the system may notify the user, as they transition from site 1, that the toaster is placed in a browser shopping cart. In any event, the browser 1711 will receive through the browser API 1709 all the necessary information associated with the toaster. The information may be passed through the browser API if the user abandons the shopping cart prior to making the purchase, which process could be modified via user setting. In this respect, the browser shopping cart becomes persistent across navigation to multiple sites. Assume next that the user navigates to site 2 and places a cookbook in a virtual shopping cart in a similar manner. That information is communicated through the browser API 1709 and stored in a site 2 shopping cart. Assume the user does not buy the cookbook yet. Next, assume that the user is on site 3 and adds a pencil to their virtual shopping cart. At this point, assume that the user clicks on a "view shopping cart" button. In this scenario, that interaction can trigger a call to the browser API 1709 which can retrieve the toaster in site's 1 shopping cart and the cookbook in site's 2 shopping cart, and present those items with the pencil in a shopping cart while the user is at site 3. A buy button can be presented enabling the user to purchase all three items at once. As can be appreciated, this process has eliminated at least two clicks from the traditional way of purchasing multiple items across different sites. Once the user confirms payment, each respective site gets paid their portion of the overall payment. The browser or other entity can process, for example, a $105 payment in which the first site gets paid $30, the second site gets paid $50 and the third site gets paid $25 for the respective items, shipping costs, taxes, etc. Any approach disclosed herein for managing the purchase can be utilized, such as, a notification on an interface that a fingerprint interaction can purchase all the items. Options can be presented for different items to be shipped to two different locations, and so forth. Machine learning, historical information, or other analyses and algorithms can be utilized to predict addresses, payment accounts, shipping options, and so forth, in order to reduce the number of interactions or simplify the process for the user. A network service, via an API or other means, such as a search engine, search entity, or other service, could also provide the functionality for a multi-site shopping cart experience. For example, a network service can store in a shopping cart items from one site accessed by a first device and a second item from a second site accessed by a second device, using a similar or different interface modalities, and then process a payment for all items in the cart at once. Sites can register with the service and claims can be drawn to the service, the browser, the shopping cart model and to the merchant processing. By utilizing a browser API for the purpose of processing the payments, the system can alleviate the need of the user to login to a shopping cart extension or provide payment and address information to a separate shopping cart extension. The universal shopping cart disclosed herein can utilize the browser API to eliminate the need of the user to give their payment information and address information to yet another entity. When an entity like a search entity stores the payment/address data, it can provide a payment process and apply the payment to items in the shopping cart.

It is noted that the browser API and communication with any respective merchant will harmonize capable payment processes for the merchant relative to the types of payments that the user utilizes. This disclosure recognizes that the persistent shopping cart across multiple sites could result in different payment capabilities across the sites relative to the user abilities. All of these differences are resolved in this process, whether at the browser, or coordinating with other services or entities. In other words, site 1 may only take Visa, while site 2 may only take MasterCard. Site mode 3 may take Apple Pay. Assume, in this case, that the user has a stored Visa card, a stored MasterCard, as well as an Apple Pay account. The combined shopping cart can present to the user a confirmation that an entity has coordinated all of the user's available payment mechanisms and assigned them to the appropriate respective site such that the single click interaction will cause a visa payment to be made to site 1, a MasterCard payment to be made from site 2 and an Apple Pay payment to be made to site 3. Each respective process can utilize the browser API, a search entity, or other network-based service, to accomplish the respective payments, generation of tokens where necessary, and so forth. Discounts can be built in for respective purchase, coupons, refunds, etc. Other mechanisms could also be provided by a service that, for a small service fee, charges the Visa card or any other single payment mechanism provided by the user and processes the other payments to the other respective merchants. In one aspect, a single tokenized payment can be transmitted to a payment processor for handling all the respective payments amongst the different sites.

FIG. 17I represents any and all types of communication, requests, calls, responses, and so forth which can be utilized for providing a persistent shopping cart across different sites using a browser API. In some cases, the browser or device upon which the browser is functioning may communicate with a server 1713 to store information, retrieve information, analyze data, retrieve encrypted payment data or tokenization data, and so forth. The server 1713, may also, as part of the process, communicate directly with any of the sites from which shopping cart items are stored. Payment data, any other data or communication can occur between the server 1713 and a respective site. The shopping cart data can be encrypted or tokenized for a single use, or otherwise provided with security measures. This aspect of the disclosure represents an enhanced utilization of the original browser API, which enables a persistent shopping cart to be maintained across multiple sites that are navigated for shopping.

In another aspect, the browser 1711 to simply represent a network-based service that utilizes an API 1709 and functions in the same manner. Data of products placed within a shopping cart can be communicated through API calls in any number of different stages of the process. For example, the merchant site could set up different scenarios for when to transfer the shopping cart information through the API. Information to be transferred as soon as a person places an item in a shopping cart or as soon as they click on a buy button. In some scenarios, there may not necessarily be a "shopping cart" but merely data associated with a product in the process of being purchased. For example, between the time someone clicks on an "Apple Pay" button and the time in which they provide a fingerprint to confirm the purchase, the data could be provided to an API for storing and later access. The service could charge the merchant a certain amount, if the user later purchases that product because it is produced in a persistent shopping cart, and thus brought back to their attention.

Currently, much advertising on, for example, social media involves presenting advertisements to users in their newsfeed based on other website navigation. Users may browse for a toaster, but never even put it into a shopping cart or get close to the mode of making a purchase. An advertisement for that toaster is then later presented on their newsfeed which can result in the conversion. Another aspect of this disclosure is to add such items to the shopping cart disclosed herein. Thus, if the user had searched for a toaster but never even place one a shopping cart, rather than later advertising that toaster on a social networking page, one aspect can involve placing that toaster in their shopping cart such that later on when they're making a purchase of another item in the shopping cart, they can see the toaster and make one click to purchase the other item, as well as the toaster. There may be a user interaction as well to confirm that the toaster should be purchased with the other item. Options can be presented to delete the toaster from the shopping cart or hold it for a later purchase. Thus, the shopping cart becomes a more dynamic environment in which items can be purchased in aggregate and thus simplifying the process. In another aspect, a posting on a social media site for the toaster, when interacted with, could transition the user not to the merchant site but to their shopping cart with that item contained therein with other items from the multi-site shopping cart. In other words, a selectable object on an advertisement or posting could cause a transition to a multi-site shopping cart to include the item advertised as well as other items the user has placed in shopping carts.

Another aspect involves aggregating accounts. For example, some couples share an amazon.com account such that purchases made by either individual can be seen in the purchase history. If items are stored in a shopping cart, each individual can see the item stored by the other individual. Another principle that can apply in the present case would be to combine shopping carts based on any number of factors. For example, prior to this disclosure, if a husband shopped on merchant site number one in place an item in a shopping cart, and his wife shopped on merchant site number two and placed the second item in a shopping cart, there was no mechanism of combining those two items into a persistent shopping cart. Accordingly, whether by linking to computers, or accounts, or based on a payment account used, or any other number of factors, such as user preferences, individuals can combine their separate shopping cart items into an aggregated shopping cart. Thus, as linked users shop and places items across multiple sites, they both will be able to view the aggregated shopping cart and can make a purchase of those items. Further, the users may have different permissions such as children can add items but only parents can make the purchase.

Figure 17J:
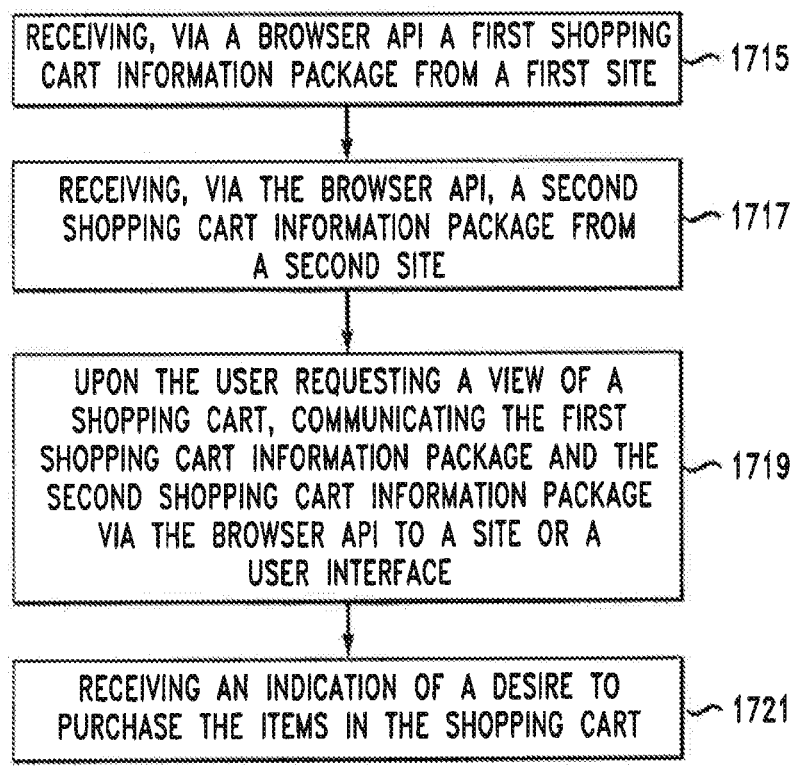
FIG. 17J illustrates a method for a shopping cart browser API.

FIG. 17J illustrates a method aspect of the system disclosed in FIG. 17I. The method includes receiving, via a browser shopping cart API, or a first device, a first shopping cart information package from a first site (1715) and receiving, via the browser API, or via a second device, a second shopping cart information package from a second site (1717). The method includes, upon the user requesting a view of a shopping cart, communicating the first shopping cart information package and the second shopping cart information package via the browser API to a site (if the user is navigating at a site) or a browser interface (if the user is at their browser requesting the shopping cart) (1719), and receiving an indication of a desire to purchase the items in the shopping cart (1721). The shopping cart information packages can include the information necessary to identify the item that's in the shopping cart from the respective site, identification of the site, and/or an identification of any other parameters selected by the user, such as a shipping address for that item, a payment account associated with that item, whether it is a gift, whether it should be giftwrapped, shipping instructions, and so forth. Other items that can be included and communicated via the API could be videos, images, comments, comparisons, reviews, and/or links to any such information. The necessary protocols for providing images, videos or other branding material can be included within the modified browser API, which provides for the persistent shopping cart. While the user is navigating at any respective site, the user can make such selections and decisions and that information is part of the shopping cart information package that can be communicated via the browser API to the browser for storage and later retrieval. Different devices can be used to access different sites through different modalities as well, and products from each site can respectfully be included in a shopping cart for a single purchase process for multiple products, from one or more sites.

The concept also covers determining whether a user desires a local shopping cart view or a multi-site shopping cart view. A user may be on, via use of a first device, a site putting a number of items in the local site shopping cart. Options or an object could be presented as part of viewing the local shopping cart to add the other products stored in the browser API shopping cart. The options may be dynamic based on user habits, cost of products in the local cart compared to the overall cost of the browser products were included, social media data, and so forth. The local site, when the user proceeds to view a shopping cart, could initiate a call through the API (to the browser or a network-based entity) to determine if other items are waiting or stored in the browser shopping cart. If so, the site could present the selectable object to "add browser products" or the like to the shopping cart to enable the user to purchase all the items together. Brief information about the items could be provided as well. For example, if the user has a toaster and a toothbrush in their browser shopping cart, the merchant could provide an object which ask the user to "add your toaster and toothbrush to this cart" or a buy button could be modified to indicate that purchasing the item at the local site can also result in processing a purchase of the other browser shopping cart products. Two buy buttons could be presented in this case, one for just buying the local site product(s) and another for one-click purchasing of the local site plus the browser stored products. The purchase could occur through a payment request type of API or managed via a search entity using payment related information stored with the search entity or other entity.

Figure 17K:
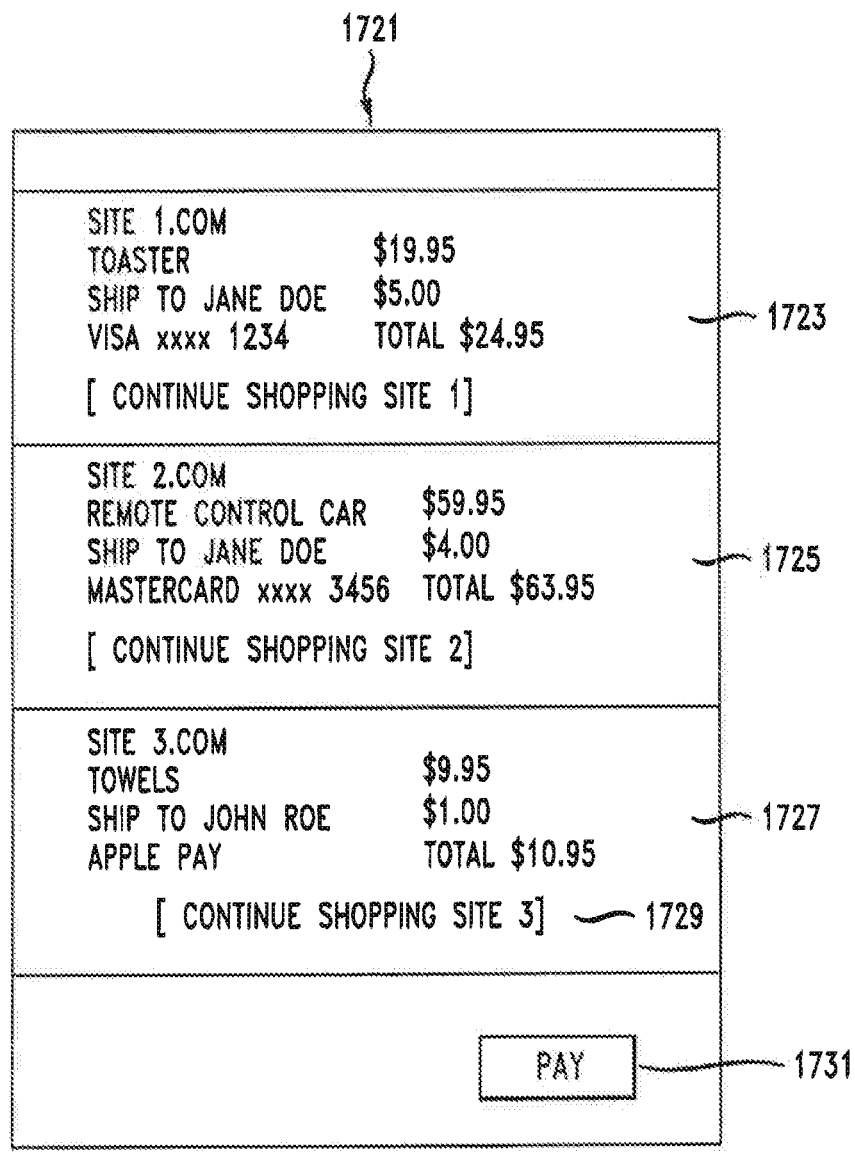
FIG. 17K illustrates an interface for a shopping cart.

In one aspect, the user could retrieve the shopping cart from the browser via the browser API or from a network service. Inasmuch as the user has payment information stored at the browser or accessible via the browser, the browser could include an option, via an interactive button or via a drop-down menu to view their shopping cart. A dynamic object could be presented only when there are items in a shopping cart to remind the user that they have stored items. In other words, on a top interface of a browser, a "view shopping cart" option can be presented only when there are items in the shopping cart. When the user clicks on the object, the shopping cart can be presented with all of the available options for choosing shipping addresses, payment accounts, and so forth. FIG. 17K illustrates a persistent browser-based shopping cart interface 1721. As the browser has access to the payment information, the user could make the purchase right from the browser. Access to the shopping cart can also be provided through a social media posting or menu, or any location where the user navigates or spends time. For example, if the user has items in the shopping cart, that information could be communicated through an API to a social media network, such as Facebook, and a posting could be generated on a user's newsfeed which provides an object with which the user can interact to access their shopping cart for making the final purchase. Such an object can be presented on any social media site and would be configured according to how the user interacts with that site, as well as any ancillary services such as Facebook messenger, texting, and so forth. Triggers can be incorporated into the process such that such a posting or notification is provided under certain circumstances, such as length of time that items have been in the shopping cart relative to an upcoming birthday, or any other combination of factors which can be utilized to trigger such a notice to the user. Spoken dialog systems can be utilized as well.

The timing of transmission from any respective site to the browser can also be dynamic. For example, if a user at site 1 places several items in a shopping cart, and then simply purchases those items, there may be no need to communicate a package of information through the browser API to the browser for those items. However, if the user, places several items in the shopping cart, but then abandons the shopping cart or does not complete the purchase, and transitions from the site, then an information package can be communicated such that those items are maintained in a universal shopping cart. User preferences might be implemented to prevent this from occurring automatically or to require an interaction to confirm the transfer of the data package. In one regard, this approach can to some degree solve the problem of abandoned shopping carts even with a one or two click purchasing option as has become available through the browser/user interface payment request API. This approach enhances the use of the browser API or a network service such as a search entity to maintain a more persistent shopping cart experience such that abandoned shopping carts may not be completely abandoned, but the user may view the cart at a later time with those items again, in a shopping cart with a simplified purchasing process which can increase the probability that the user will make the purchase of the items upon the second or third view. This disclosure also includes any other objects or manipulation opportunities for users to manage the browser persistent shopping cart. For example, any objects presented which the user can interact with to remove items from the shopping cart, add items to the shopping cart, maintain the items of the shopping cart for a particular period of time, drop items of the shopping cart after a period of time such as two weeks, and so forth.

FIG. 17K illustrates various items in the persistent shopping cart. The toaster from site1.com is shown at 1723, with a remote control car from site2.com 1725 and towels from site3.com 1727. These sites can be accessed through different devices as well. A "continue shopping" object 1729 it is also shown as well is the pay now button 1731. Again, the advantage of this approach is that via the one pay now enter action 1731, the system will carry out (1) a payment using the Visa card to site1.com (such as by sending a token or the necessary payment information, as well as other information through the browser API to site1.com), (2) a payment using the MasterCard to site2.com for the remote control car and (3) a payment site3.com using Apple pay for the towels. Of course, a total amount can be shown for all of the purchases, as well as other options for deleting the purchase, changing the number of items, and so forth. Where such individual manipulations take place, the browser shopping cart API can communicate with the respective site in order to update the total amount charged based on the number of items, or a change to the shipping address or shipping instructions. Thus, the interface 1721 can include any such objects to enable the user to make the appropriate changes and adjustments to each individual order at which point, when the user pays, all of the various payment mechanisms can be implemented. Usually, a merchant site initiates a call through the browser API for payment data. Under a later purchase made through a shopping cart model, the browser may initiate a call to the merchant site informing them that the user has purchased one of their items. The call may include identification information to reference the earlier search of the user for the item on the site and initiate the necessary communication via the API for the payment data to be transmitted and processed. In one aspect, a separate local or Internet-based service could provide one unified payment from the user and then the service could, based on the information about each purchase, make a payment to each individual vendor or merchant.

In another aspect, the user can place a first toaster 1723 in the persistent shopping cart 1721 from site 1 and then find a different toaster from site 2. Both toasters being placed in the shopping cart could cause the system to identify that similar items have been placed in the cart, and that the user may desire a comparison analysis. In this regard, when the user retrieves the persistent shopping cart with both toasters, the shopping cart could present some comparable information between the exact two items. This is a very easy location with which to provide such comparisons because at this state of interaction with the user, the user could then simply choose one of the items and delete the non-selected item from the shopping cart and proceed with the purchase process. Further, from the persistent browser shopping cart, links can be provided for options to "continue shopping" at each respective site. This process can eliminate and simplify the shopping experience across multiple sites.

A service could also provide an analysis of the various items in the shopping cart and provide suggestions or upgrades accordingly. For example, if a user buys plates from one site and glasses from another site, or a suit from one site and a tie from another site, the system could analyze the items within this coordinated shopping cart and provide suggestions and advertisements for alternate items or items that might better match each other, upgrades, alternate colors, and so forth.

The browser could also store the history of the items purchased for later retrieval and processing, such as selecting to return an item or following its shipping progress. In this regard, after a purchase is made, the information could be communicated through the browser API and stored for later retrieval from the browser or via an object on a site, social media interface, app, and so forth as disclosed herein.

Another aspect includes integrating a shopping cart with other product searches beyond products placed in shopping carts. For example, if a user navigates to Amazon.com on a desktop computer or target.com via a voice-based device and looks or orders at a toaster, but does not place the toaster in a shopping cart but merely views, at some level, data about a toaster that could be bought (it could include putting it into a shopping cart), then one current process that exists is presenting an Amazon advertisement in a newsfeed featuring that toaster. The advertisements enable the user to have another opportunity to purchase the item. In the present scenario, this concept is extended such that any user interaction with the product, whether it be physically, virtually online, in a virtual reality environment, and so forth, could cause the system to generate a shopping cart entry for that item. A service could retrieve the information about which products the user served for or viewed and generate a most likely product which the user would like to buy. Then, when the user views their multi-site shopping cart, that item could be listed and easily bought with one click either individually or in an aggregated way with other items. Inasmuch as such items were never put into a shopping cart by the user, additional interactions could be presented such as a selectable object which the user can click on to formally place the item in the shopping cart for purchase. In another aspect, the item could be placed in the shopping cart in a preconfigured state such that clicking on the buy button within the shopping cart will cause the purchase to be made for that item, as well as any other items in the shopping cart. A threshold could be set for when such an item is placed within the shopping cart. For example, machine learning could be utilized to determine parameters such as how deeply the user searched and studied the item, how much time the user spent on the item, how many reviews the user read, whether the user compared the item to other similar items, and so forth. In this scenario, once that threshold is met, then the system would create an entry for the user's shopping cart featuring the item. In another scenario, if two similar items were searched, the system could present both items with comparison data within the shopping cart enabling the user to review the comparison information, click on the selected item, such that the next click or next interaction could literally be a purchase of the selected item with any other items within the shopping cart.

The shopping cart disclosed herein can be integrated within a website such that no extension needs to be logged into or clicked on to utilize the features. No separate registration of payment data or an address needs to occur within a shopping cart extension. The universal shopping cart can operate without a selectable object on a browser interface to activate the cart. Sites may register, for example, with a search engine to be able to coordinate a universal shopping cart model such that items can be placed in the universal cart across different devices and across different merchants and difference devices. Shopping can occur from a device, within an assistant application, via a voice-based device, via a browser, via a vehicle-based device, a watch, and so forth. The universal cart can span these various modes of interaction with merchants and be coordinated by a network-based system. The search entity can then process payment of multiple items for one or more merchants in the same universal cart using stored payment data. This can be done through the browser API disclosed herein or an API or other technology managed by the search entity. An item can be placed in a shopping cart from a web search on a first device, followed by another item placed in the cart from a voice dialog via a second device. The user can checkout once for both items through a unified purchasing process using the browser API or a search entity-based process in which data stored with the search entity is applied to purchase the plurality of items. Each merchant can be paid and then ship the respective items. The search entity can charge the merchant(s) for using the universal shopping cart at the time of purchase.

Other concepts related to a universal shopping cart include providing data to website from the shopping cart—i.e., items in cart, demographic data, to improve the site search or presentation—which can modify the user shopping experience. For example, if site2 knows that a toaster from site 1 is in the universal shopping cart, the navigation results or search results or presented items for the user at site2 can be modified to improve the user experience. Next, we note again that the use of an API can be in both directions. For example, the user buys an item in a shopping cart and a package of information is passed through the API to the website with one or more of an object, a token, payment information, address information, registration information, login in formation, product information, size data, etc. to initiate the whole transaction from the browser API. This is what would happen if you had left a website but had an item placed in a shopping cart.

A method can include identifying a first item that can be purchased from the first site based on user navigation, but the first item is not purchased. This can be done within the normal standard navigation of the site. The method includes receiving a transition of data associated with the first item (which can be over an API to a browser, an extension, or to a network service). For example, the W3C browser API includes a "displayItems" member and/or the "additionalDisplayItems" that are part of a PaymentDetailsBase dictionary that is an optional feature for providing details of products or a breakdown of taxes and shipping. The browser API could be modified such that the site could pass product details at any time during the navigation process to a shopping cart for later retrieval. The triggering of transmitting the data about a product can be at any number of navigation states or stages between an initial search and a completed purchase. For example, if the user has a browser API interface presented but they do not complete the transaction, the site can pass the product data to the browser for storage and later retrieval. Assume the user then navigates to a second site via the same device or via a completely separate device which can also include a device with a voice-based or other type of user interface. The method includes identifying a second item that can be purchased from the second site based on user navigation, the second item being placed in a shopping cart, transmitting information about the first item to the shopping cart, receiving a confirmation via user interaction with a purchasing object to buy the first item and the second item, communicating purchasing information to the first site for processing the purchase of the item and communicating payment data to the second site for processing a purchase of the second item. The communication can include communication between a browser API with information to initiate a purchase at the first site of the first product. For example, the browser API could transmit data to the first site to place the first site in a state as though the user had navigated to the point of purchasing the first item and clicking on a purchase button. Normally, that interaction would cause the first site to initiate a payment request through the browser API to the browser for the payment information. However, in the above scenario, the user has left the first site that the information about the first item is retained in the shopping cart. Accordingly, to facilitate the purchase of the first item, the improvement includes expanding the use of a browser API to initiate the purchase of a product through transmitting the information through the API to the first site. In this aspect, the first site would then initiate a payment request to the browser API, to retrieve the payment data, address data, and so forth and complete the purchase and delivery of the product in the normal fashion. Additional communication may need to be exchanged in order to make this happen. The package of information sent to the first site can trick it into thinking that a user has navigated to the first item and hit the "buy" button. The information can cause the merchant site to initiate the payment request API request back to the browser to ask for payment information for processing a payment of the product. The package of information could be sent when the user opens the shopping cart. Such that timing wise, when the user clicks on the 'buy" button with a first item from a first site and a second item from a second site, both sites basically have a state as though the user had navigated to the point of viewing the respective item with a buy button for processing the purchase. However, the shopping cart buy button can be linked to these two different states such that when the user does hit the buy button, both sites send a payment request through browser API for processing the payment based on the single click. The plug in for the shopping cart can disambiguate or present any other interaction information necessary for processing the payment. For example, if one website requires Apple Pay, the shopping cart can simply ask for the user's fingerprint for the payment but does not have to identify that it is for one particular product purchase.

In another aspect, the browser coordinating with the shopping cart can send a package of data that includes payment capabilities for the user, a payment token, payment data, address data, product data, price, etc., such that the first site can finalize the purchase and delivery the product. This approach represents an expansion of the capabilities of the browser API concept. In one aspect, based on the user's initial navigation at the first site, the lack of purchase of an item of the first site, the first site can generate a transaction ID, which is transmitted through the API to the shopping cart management system (which can be a plug in or an extension for a browser or a third party network-based service). This transaction ID can later be used in past back to the first site with the payment data, address data, and any other data, such as a one-time use token, to remember the item and process a purchase of the item for the user.

Other aspects include tracking the location of phone for products like sitting in a chair at Staples and once you get a threshold interaction with a product that indicates an interest, providing details about the product in the persistent shopping cart. As you surf the web, once you hit that threshold, like reading reviews of a product, or spending a certain amount of time on a product page, the information can be forwarded to a service that includes a product ID, merchant ID, timing, personal information, cost, discounts, etc. for placing that item in a shopping cart even when the user is at another site.

The network device disclosed herein that can be used for managing multiple items placed within a universal shopping cart can coordinate the universal shopping cart across the various devices used by the user. For example, a search entity can identify a first product put into the shopping cart from a first browser search on a mobile device and then identify the user using a voice instruction on a second device to identify a second product to put into the shopping cart. The user can then purchase both products on either device or at any time. The system can identify the user through voice identification or through other means to connect the items as being part of the same user shopping cart. The voice based device can already be associated with a particular payment account or can adjust to different payment accounts based on voice identification. For example, a user at home might put a first product in a universal shopping cart from a desktop computer and then go to a friend's house. Through social networking data or speech/voice identification, the user could talk to the voice based device at their friends house, which could confirm their identity by asking "Is this Mary Smith?", at which point the user could add another item to the shopping cart via a voice command and make the purchase of all the items. Social media data or preferences could connect Mary to potentially using her friend's voice-based device for purchases. A separate biometric confirmation could be provided in these scenarios as well to confirm the purchase is from the proper person. In one example, when Mary goes to her friend's house, a voice-based device or other device can identify her through her mobile phone. Geo-location data can also be provided based on Mary's location. Based on this data, a voice-based device through a search entity can be configured to potentially expect that Mary may make a shopping request at her friend's home through the voice-based device. Speech recognition models, speaker identification models, or any other speech related pre-configurations that might need to occur can be initiated on a network basis or transferred to the local voice-based device, or both. Thus, when Mary says to the voice-based device, "Please add paper towels to my shopping cart," the system can recognize Mary's voice, interpret the speech using a tailored speech recognition model, and respond with "OK Mary, the paper towels are in your shopping cart with the salt and pepper shakers to added yesterday, do you want to check out?". She can then make a single purchasing transaction for all the items in her shopping cart from her friend's voice-based interface device. To confirm the purchase, the system may ask Mary to provide a fingerprint authentication which can be coordinated via the network system. It can be similar to a NFC payment experience as well. The voice-based device might have a NFC capability and to confirm the purchase, Mary would simply move her phone near the voice-based device and provide a fingerprint to complete the purchase of all the items. The data provided to the voice-based device would be similar to what is provided at a NFC device at a retailer when Apple Pay or Google Pay is used. The user would move their device close to the voice-based device and the payment interface would pop up asking for a finger print or facial recognition. In this manner, users could complete shopping or initiate shopping easily at a friend's home or at a device at a different location from their home location, but using the same simple interface. All of the necessary communication to and from the network system (such as the search entity managing the payment process), can occur between the voice-based device and the system to enable Mary to order an item, have it included in her shopping cart and check out.

There could also be an NFC tag on a product or object that the user's mobile device can interact with to cause a browser to launch and present a user interface to pay, rent or perform some other function. The device could also write data to the NFC tag as well.

If Mary did not have her phone with her, the voice-enabled device may have a fingerprint reader on it as well that Mary could use to "register" at the device. Facial recognition or any other mechanism could be used as well. Once identified at the device, it can become as through it was her device for the purpose of her universal shopping cart. Devices can be positioned at restaurants, shops, or at any location for similar purposes. If multiple people are at a friend's house, multiple profiles can be added to the voice-enabled device at that location such that any person of the group can talk to the device and have it adjust to their profile, their universal shopping cart, and so forth, even though the people do not live at that location. The device may also not have any pre-configured data based on knowledge that the person is at the location. The system may just identify the user by their voice when they speak to the voice-based device.

The concepts disclosed herein can also work for physical malls. People could do two things. In one case, users just shop and put items in their physical shopping bag. The users would not check out at individual stores but just go from store to store. One checkout for all the stores could be used for all the items together with one payment. The checkout could be at an exit or on their own phone, via a bar code reader or other identifier of the products which can combine them such that a single click can process all payments.

Also, users could go to a physical store and peruse items for purchase. They could have a code reader on their phone and as they look at products they like, they could scan a code, or it could be automatically identified through near field communication or some other wireless protocol. The user might not then actually take the item with them. Once they've gone to all the stores and looked at say 4 items in 4 different stores, they can then pull up their shopping cart on their mobile device and see all those items placed in a shopping cart. They can then one-click purchase and all the payments are processed for the respective stores. The items could be brought to them as they leave the store, at a certain exit, such that notices to runners at each store in the mall to take the purchased item and deliver it to John at the East exit to the mall, or they could be delivered to them at home so the user can just leave. The system could also track the movement of the buyer's mobile device and simply find them in the mall. A code could be used by the runner to confirm the right user is receiving the purchased products. The shopping cart can provide the option or code or other data. Timing expectations can be provided to users for how long they have to wait. Perhaps the users could buy the items on their phone as they start to walk away to their car and given the tracking of their mobile device, which can provide geofencing information on which entrance they came into, the items they've purchased can be waiting for them at their exit when they get there. Runners can deliver the items to an identified locker, the user based on location information of their phone, or location at their exit so they can just take the items home. This improves the experience where users don't have to carry around all the items they've purchased as they walk around the mall. Expected timing of delivering all the products could be provided. The user could click "buy" on their shopping cart and the system may predict a 10 minute time when all the products will be delivered to the user. It might increase the number of items people would buy as well. From the single shopping cart, the Browser/user interface payment request API can be used and a plugin could manage all the payments to the different stores. Users also could use Apple Pay or other payment mechanisms at each store as well, and the system could simply combine the purchased items into the "shopping cart" such that when the user leaves, they can indicate that they are leaving and they need delivery. Then the items can be gathered and delivered to the user. The runner or runners can receive, via an app, instructions on what items to get, from which stores, an identification of the purchaser, and can easily gather up all the items and bring them to the purchaser.

In another aspect, by scanning items in a store using a mobile device, the system can evaluate an expected weight of a bag containing all the items purchased from a store or stores. The weight could be added up, the user could place the bag of products on a scale and the purchases from that user, identified by NFC data, Bluetooth data, or a scan at the scale, or other mechanisms, can confirm that the weight corresponds to the group of items they purchased. If the weight was greater (or less) a manual check could be provided. This weighing of the products can further simplify the process of leaving the store. Multiple stores can be shopped at and an exit to a mall can provide the weighing mechanism. A server would compare the weight of the items on the scale with the weight of items in their virtual shopping bag or the items they've purchased. The use of a payment mechanism could also correspond to the weighing process where they click on a pay button after the weight matches their virtual shopping bag items. Thus, a timing element could be introduced in terms of when the payment button is presented after a successful weighing. It of course could come before or as the user buys items. Then they are correlated for a weighing operation. Being browser based, the user could navigate to the store or mall's website and initiate the process of making purchases through scans. There is no need to download an app to accomplish the functionality when using the browser-based API's disclosed herein.

Individual products can also be configured with a UPC code or QR code or other feature which, after the sale and the product is out in use, others could scan the code, take picture of the product (clothing, bike, etc.) and match a product with accompanying size data, etc. and the user can then purchase the product and have it delivered using mechanisms disclosed herein. These can be built into the product and not on a tag that is removable, as the idea here is to enable another person to purchase the same item upon viewing it with the original buyer. For example, a shirt might have a QR code sewn into a location or on a permanent tag. The code or image can cause the user device to access a URL, progressive web app, local app, or other entity and provide data about the product. After identifying the product and accessing the server associated with the product, the user can be presented with a buy now button (their body size can already be sent, or they can choose their size). The presentation can be configured such that the server determines the payment capabilities and API capabilities of the user device, browser, software module, etc., and configures a purchasing experience accordingly. The user may scan the code (or other process) in one step, and be presented with an interface at a site via a browser, for example, configured with an image of the shirt or game or whatever the product is, with the right size showing for that user, and with an Apple Pay or Google Pay (other any other payment mechanism such as Paypal, Amazon Pay, crypto, etc.). The user can then just confirm the purchase and it will be delivered to their home. The location of the code could be on a sleeve, collar, or any location that is easy for a friend to access and scan. An NFC device could also be embedded into the product.

A merchant's store can be a distributed amongst all the purchased products that are out in the world. If you like the shirt your friend is wearing, one could scan a code or take a picture of the shirt, or any mechanisms of identifying the product, match the user's size through a body model or selection of size, and the user could receive the product in the mail after an API-based payment. This could be done through an app, a site, through photos on your mobile device which present purchasing options of items in the photos, etc. This concept expands upon the idea of a mobile device used for in-store purchases to use of a mobile device wherever the user is, and wherever they may see an item that they would like to purchase. When identifying a product, alternate products, colors, etc. could also be provided. You may love the shirt, but want a different color, once the user identifies the product, alternatives can be made readily available for purchase. One issue will be that the friend will not know necessarily the store where the shirt or item was bought. The tag built into the item might identify a progressive web app, URL, app, or other data to enable the user to connect with the right network-based entity of identifying the proper product and enabling the purchase. Aggregation sites might be used where the user could go to a single site, scan the code or take a picture of the product, and obtain the proper vendor and data to make the purchase of the same product.

The system may also enable multiple stores to function as a group. A user might be able to navigate to a localmall.com site which can turn on or access a group of stores in that mall such that the user can go through and scan items from any of the stores and do a single checkout for all the items at a mall exit. A scale can be provided at an exit which can coordinate the weights of all the products purchased. At a grocery store, a scale can cover an entire shopping cart and the products therein. The user may walk out and have the cart/products put on a floor-based scale to confirm the purchases made. This process can alleviate long check-out lines. In some cases, brick-and-mortar check out schemes like Apple Pay and Google Pay would also be eliminated in favor of the browser-based API model described herein in that no checkout point of sale would be needed.

In another aspect, the system can store the various products that have been perused on the various websites. As a user then enters a product into a shopping cart, and option can be presented which populates the shopping cart with one or more of these other items from other sites. The system can strategically present this option. For example, if the user had perused a toothbrush in the toaster on different web sites, but now places a different toaster in a shopping cart, the system may only ask if they would like to see the other toaster presented with comparable information. If the user has a certain number of items that they have recently perused, the system may ask if they would like to see the most recent three items added to their cart, or the items that they spent the most time on reviewing, or the most expensive items, or any other characterizations that the user might desire. This approach allows the user to control which items are added to their universal shopping cart for a one click purchase of the group of items. Artificial intelligence and/or machine learning approaches can also be utilized to characterize user shopping and navigation history with respect to their buying habits such that the shopping cart could be populated with only those items having a threshold probability of the user actually purchasing. As has been noted above, the shopping cart can also involve multiple users. Accordingly, multiple users group by family, friends, payment accounts, browser usage, or any other grouping can be coordinated such, for example, that if a parent opens a shopping cart, that items viewed by the children could be added to the shopping cart for determining whether to purchase or not. Such a shopping cart can also be a jumping off point for continued shopping at any respective site. For example, if the shopping cart includes three items from three different sites, and the second item from the second site is a toaster but not quite the right toaster, a selectable object can be presented to continue shopping at that site for similar products. The object can be configured to transition the user to a deep link in the second site with search results associated with the product in the shopping cart, but that shows comparable products for continued perusal. In such a scenario, the persistent state could be maintained such that as the user transitions to the second site for continued shopping, if the user chooses a separate toaster, the user could transition back to the shopping cart with the separate toaster replacing the initial toaster for again single click purchase of a group of items.

One benefit of the approach disclosed herein is that users don't need to register their payment information or address information with a shopping cart plug-in or service inasmuch as the browser API is utilized for the payment information. However, some of the other functionality could also be applied where the user registers payment information, address information, or any other information with the shopping cart plug-in or extension.

In one example, the process can work as follows from the standpoint of a server associated with the store, or group of stores. The user walks into a store with a mobile device, and accesses the server via a URL on a browser, app, or via an automatic interface presented via a confirmation via Geo fencing or location-based service that the mobile device has entered the store. The browser or app can access a camera on the mobile device such that the server can provide instructions to control an interface to enable the user to walk around the store, and scan codes associated with the products that they desire to purchase. As the user scans codes, the codes are transmitted back to the server to further process the purchase of those products. As the user is ready to buy the product or products, a payment process occurs using the browser as an agent and via browser-based APIs disclosed herein. Payment information is thereby passed through the API to the store server to process the payment. Also, as disclosed herein, the system can enable the user to choose between a network-based payment approach, which is accessed via the browser API such that a service like PayPal, for example, could be selected, the process the payment. Cryptocurrencies could be used as well for payment as managed by the browser API. Any number of different payment approaches can be selected via the use of the browser API. Users may make purchases of individual products or the store server may maintain a shopping cart of the various products to enable a single checkout process. In a scenario where a group of stores are coordinated, such as in the mall, the shopping cart can expand from one store to another for a single checkout of products from multiple stores.

From the standpoint of the mobile device, a method can include receiving, via a browser, a URL input from the user, which would cause the browser to establish communication with a store server. The mobile device receives instructions regarding how to manage an interface for the user, which includes the browser accessing a camera feature on the device an interface for instructing the user to perform actions to scan a code associated with each product they desire to purchase. The device can receive the image of the code which images transmitted via the communication link between the browser and the store server to the store server for processing. When the user is ready to buy the product or a group of products in a shopping cart, the device or the browser on the device manages the payment process as disclosed herein, via a browser-based API between the browser on the mobile device and the store server.

Codes could be retrieved by the mobile device in other ways beyond an image scan as well. For example, a small disposable component could be configured on each product that includes a battery and which can, through near field communication protocols, or other wireless protocols, transmit the basic data about the product, which would be the equivalent of an image scan of a code. In this way, rather than needing to align a camera with a code image associate with the product, the user would only need to bring their mobile device in near proximity to the item and data associated with that item, and interface which enables the user to confirm that they desire to purchase that product could be initiated. The small disposable component could include a small solar panel as well which can help to power the component.

In another aspect, the system can manage and enhance the user experience using their mobile device, as they walk around a store. For example, by knowing a specific location of each product, or through location-based services, the interface provided by the store server can include advertisements, suggestions, or directions to other products in the store. For example, if a user scans a code for a shirt, the system can instruct the user that on the next aisle over, on the second shelf, is a pair of pants that would match well with that shirt. The advertisements could also be for a product or item in a different store which is nearby, or a different store in a group of stores, such as a mall. Instructions to go to a specific location, accessorizing suggestions, additional online purchasing options, and so forth can also be provided. For example, the person may be buying a pair of pants and a shirt, but the ideal necklace or earrings or watch might not be at that particular store. The store server could present an image of a product that could be associated with what the user is physically buying and put that product as well in their shopping cart for home delivery. Thus, the shopping cart in this scenario could span physical items the user is carrying as well as online purchased items as part of the same quote shopping cart". Machine learning algorithms can be implemented and trained for providing such suggestions. Inventory supplies can also be accessed to determine whether such products should be offered.

In yet another example, disclosed herein is the concept of providing body model data via a browser-based API to a server. The approach can also be utilized in this scenario, where a user walks into a store with their mobile device to make purchases. For example, as the user accesses the URL of the store server, the browser can manage the communication between the mobile device and the store server, and pass along body model information to the store server. In this scenario, the store server can utilize data regarding the location of various sizes of clothing, for example, and literally guide the user right to close that will fit them, according to the body model received. For example, the interface for the user may indicate or provide a map of the store with highlighted points, which indicate the sizes matching the user. Inventory can be also correlated such that if the user's size is not available at that time, the interface can enable the user to see clothing styles in the store but order online for their personal size. Often, individuals are looking through a stack of pants, or a series of shirts, of a style that they desire to purchase, but their particular size is out of stock. Using these principles, the system will know as the user enters the store that certain pants are out of stock and the server can present an image to the user on their mobile device, indicating that this is the proper size for you and the one that you are holding (which the server can gain knowledge of by virtue of near field communication or the user scanning a code) is the wrong size. However, the user in this scenario can see the product and can then purchase the product online for the right size.

In this scenario, the user could walk into a clothing store, and see and touch clothing that they may desire to buy, and if the user scans a code of a piece of clothing, the system can also identify the size and the configuration of the clothing scanned and instruct the user regarding how well such clothing will fit with their body model. Perhaps a different size in the store will fit better. If there is inventory available, the store server can instruct the user that they should pick a different size, and instruct them that there should be one in stock on the shelf. If not, the store server can communicate with the browser of the mobile device that the pants they've chosen is not the best fit for them and they can order right now online the better fitting pants which will be delivered to their house in two days. This all becomes possible with the communication of the body model to the store server. This process can also of course be available for body models of friends or family members of the individual, wherein a dialogue or graphical interface can be presented to enable the user was walk into a store to pick a body model to transmit to the store server to help them purchase clothing for their friend or family member. All of the description above applies where, for example, the user passes a friends body model to the store server, the store server can respond with instructions regarding clothing within the store that fits that body model, online offerings of clothing that will fit better than physical products currently at the store, and so forth. Audible instructions can also be provided to guide the user to products that would fit appropriately. Similar concepts can also apply for color selections, product selections, volume selections, food selections, and so forth outside of the clothing scenario. For example, in the food scenario, the user could select a recipe that they desire to make an enter grocery store, and in this scenario, the recipe could be transmitted to the grocery store server and through the browser acting as an agent, the grocery store server can direct the user to not only purchase the proper ingredients for the recipe but the proper sizes or number of items to make the recipe for a specified number of individuals. Thus, the general concept described above, involves the user accessing a store server via a browser or app, and being guided regarding the purchasing of products within the store, via the interface, or via a spoken interface, and then being able to purchase the products using the browser API payment process disclosed herein without the need of going through a traditional physical check out process.

Additionally, data regarding current food supplies at a user's home can be fed to a server. For example, a smart home system can be implemented which provides data regarding food storage that a person's home. For example, the system may identify that the user is low on milk, eggs, cheese and cereal. This data can be provided to a browser or a network-based service. For example, while the user is at home with their mobile device, a system can periodically update their browser to contain grocery stock information for their home. This can be done through Wi-Fi, near field communication, or Bluetooth. The browser can be configured to be able to access the communication components of a mobile device and manage a process of retrieving updates of information which can then be used by store servers as a user physically goes to a respective store. Any kind of data is contemplated as being part of this process. Then, as the user goes to a grocery store and accesses the grocery store server for making purchases as described above via their mobile device, the browser could pass a data package identifying their grocery stock information for their home. The system could then instruct the user or suggest to the user certain products, where they are, and/or amounts to enable the user to not forget or easily restock their grocery supplies as needed.

To protect from fraud, video cameras, location-based ID, and correlations of purchases and inventory could identify where mismatches exists and potentially identify shoplifters from that data. Instructions could be provided to people of risk to require them to have a clerk confirm their purchases. Users can generate or earn confidence scores as they shop in these scenarios. If a user is suspected of shoplifting, and the system requires a confirmation of their product purchases, they can increase a confidence score or repair a confidence score. Such information can be presented to the user as part of the interface such that they know to be honest in their purchasing decisions and activities. For example, a confidence score can be presented to them, such as 9/10 or 5/10, with instructions to note that a clean purchasing experience confirmed by a clerk or scale, or otherwise can cause the confidence score to increase to 10/10. By granting a more efficient process to users with high confidence scores, the overall system can encourage honesty and reduce the amount of shoplifting. Further, shoppers experiences the different stores can be correlated in a confidence score that can span any store or stores that utilize a service.

Another aspect applies to utilizing an API to fill a cross-site shopping cart in a different way. It relates to how users can have product information transmitted through the API or other mechanism from a site to a browser or other location for storage, aggregation, presentation and payment/delivery processing. A site can have programming added to the site to monitor searching and navigation of the user on the site for a determination of what products to send to an API. For example, if a user spends 20 seconds looking at a toaster, reading reviews, looking at pictures, and so forth, the system can determine that there is enough interest to send the product data through an API for storage with the browser or elsewhere. The API, for example, can have a syntax like "sendproductdata (product, UPC, Size, Time, Color, Size, price, taxes, token, rating, other)." This and any other data can be transmitted through the API and stored for later use for making the purchase. A trigger for sending the data can be automatic or manual (such as the user clicking on an object to send the data). As the user navigates to the site, the site can send an API request to determine whether the API is available for product information. If so, the site can utilize the API to send the product data for products that the user searches for. If the user later purchases the product on the site, the product can be removed from the browser product storage. The data can include an evaluation of a likelihood of the user desiring to later purchase the product. All of this information is transmitted through the API to the storage location.

A user can then navigate to other sites as well and surf for products. As the threshold is met, multiple products can be transmitted to the browser for storage. Data associated with the products can be sent as well, such as a user likelihood of purchasing. As the user surfs the web, products will be gathered up and passed through the API and stored. The user can set parameters on the circumstances that will cause product data to be sent, such as viewing for more than 60 seconds, or all products reviewed 2 weeks before a family member's birthday, or all products above a price of $10, or at a certain stage in navigation such as the product is placed in a site shopping cart (and also should be transmitted to the browser shopping cart). The user can then browse for items across different sites, when they get to the point of making any purchase using the browser API interface, such as at site3.com, the system will or can include within the buy button interface, the items from the first site and the second site that they searched. See FIG. 17K. An important point is that the interface here is the browser/user interface payment request API interface and not necessary (although it can be) the normal payment interface. The interface can also include other options. For example, the user is at site3.com purchasing the item from that site, the payment interface can include a selectable option to "add other 2 items from browser shopping cart" or "add items searched for today" or "add items searched for this week". The user can then have those items added to the shopping cart and one click can manage the individual purchase and delivery of each item. Disambiguation of different delivery addresses, greetings, or any other data could be gathered at any stage of the searching or payment process. Drop-down menus can be included such that when the user is in the purchasing mode, the various items can be gathered together for payment as an aggregated group. The shopping cart could also be viewed directly within the browser independent of any site. Comparisons, discounts, options for incentivizing purchases, can be provided in the aggregated group of items. The browser or other service manages all of the payments to individual sites. The syntax of the payment request API could be adjusted for accomplishing the functionality disclosed herein.

The benefit is that the browser/user interface payment request API interface can be modified so that when the user makes a purchase on any site and the browser/user interface payment request API is accessed for the purchase, that automatically or manually, the other items in the shopping cart can be added to the interface such that the user can purchase multiple products in one click or the series of clicks to get through the payment process. A threshold can be met for transfer. A site can provide a plus button, buy button or other object that dynamically is presented when a threshold is met that the user can click on to add to browser shopping cart. Then the user can move on to the next item. The concept applies both from the standpoint of the site (monitoring navigation, determining to transmit product data to browser shopping cart API, and receiving data about a purchase of the product on a browser/user interface payment request API interface from another site, such that the site can process the purchase of the product. This of course even though the user has never navigated to the product on the first site and indicated on the first site that he or she wants to make the purchase there. When the purchase is made at another site as part of a group of products shown on a payment interface, the browser can manage the notification back to the first site that the purchase has been made, and can transmit through the browser shopping cart API and/or the browser/user interface payment request API data about the product, the payment account, a one-use token, address delivery information, product identification, etc. A package of data can be transmitted to the first site with all of the data to enable the first site to identify the product previously searched and communicated to the browser, a payment token or other payment data, address information, and so forth, such that the site can process the payment and deliver the product. The site can also adjust based on whether the product browser API is available. For example, if it is available, buttons can be presented for adding the item being viewed to the shopping cart. The site can also include a messenger app, communication application, video application, and so forth. So in any context where a product is being presented, the site or application would offer the ability to transmit data to the product API for storage in the shopping cart of the user.

In yet another aspect, as the user navigates to the site, the site can access a user information API associated with the browser or a network-based service. The browser or any other service can store information like user hat size, shirt size, pant size, show size, color preferences, style preferences, purchase history, social media information such as friends and family information, sizes, preferences, and so forth. As the user begins searching, the site can receive such data via the API. Based on this data, the site can adjust its presentation to the user of the navigation object and interfaces. For example, the user might not need to be presented with the option to choose between an S, M or L shirt if the API informs the site that the user is a medium. Color or style preferences can be tailored for the user as they search the site. As soon as the user navigates to a respective site, the site can do a call to the browser asking for personalization parameters, and the browser can respond with the personal data for the user and/or other users that the site can use to tailor the browsing experience. The user could set parameters such as buttons on the site, menus, auto transmission of items, and so forth.

Indeed, as the user beings surfing, an interface can be presented to ask what the user is interested in. A natural language or text interface could receive data from the user such as "I'm shopping for my wife's birthday". With the system knowing the social media data for the user, including sizes of family/friends, the user could shop more efficiently for say a coat for his wife's birthday. Color and style choices associated with his wife could improve options presented. Size information can be preconfigured such that the user does not need to choose the size. Any parameter, social media data, size, preferences, style, purchase history, and so forth could be used to change the navigation features for a site as the user navigates. There will be no more need for size choices for shirts, pants, or shoes, etc. Such data can be transmitted through the API to the site for reconfiguring the site for that user's navigation. The site can receive other data about the user that can help in more effective presentation of products/services. If the site knows the user is shopping for a book for his mother that can certainly aid in a more focused presentation of products.

Further, the products searched for could be classified automatically or manually, such as birthday, or Christmas, or Mother's Day. Options for classification can be presented on the site based on social media data, product characteristics, or menu selections. Thus, a user could browser different sites and have three items classified as mother's birthday items and two items as their own purchases. When the user is buying an item with the browser API interface, the option could be to add mother's birthday items, add personal items, or add all items for purchase. Items could be grouped as toys, or kitchen items, or bathroom items, or office materials. Any number of ways can be provided to add a group of classified items into the shopping cart. All the items in the cart can be groups or organized based on manual or automatic means. Thus, the items that you want to purchase together could be more streamlined.

At any point, a disambiguation dialog can help to focus the information from the user for improving the navigation. For example, as the user navigates to a site, the system may ask "are you shopping for you or for your Wife's birthday?" With some data about what the shopping is for, the system can transmit the personalized information, address information, etc. to the website via an API so that the site can modify the experience for the user. For example, rather than size buttons like "S", "M" or "L", the system can present, "Mary", "Mom", "Nancy", "Tim". You just need to pick the size for your brother Tim. A drop-down menu could include the various people the user is shopping for so the user just picks the person. All of the names, sizes, preferences, and so forth can be sent for one or more people to the site for processing. If the system knows that Tim loves red shirts the system could also suggest to the buyer that the blue shirt might not be the best choice.

Triggering events for when a site transmits product data through the API can be time spent on a product, reviews read, placing item in shopping cart, reviewing product, a combination of these kinds of navigation data coupled with data transmitted to the site such as other items in shopping cart, summarized information about the user, size of user, color preferences, etc. A discount can be provided to the user if they authorize the personalized data to be sent. From the site standpoint, the site receives user navigation, receives personalized data for the user via an API such as size information, style preferences, purchasing history, social media data, holiday data, and so forth, such that the site presents interfaces and selectable options based on the received data. Those preferences can also drive the algorithm that determines when to pass product data to the API for placing in their universal shopping cart. A trigger algorithm can be adjusted based on the data transmitted to the site, such as a 30 second time frame for a product can be reduced to 20 seconds based on a birthday coming up.

The size information for people in your social network can be passed as well based on social media data. For example, your friend's size information can be passed if your friend has a birthday coming up. The system can also tokenize that size information such that you can choose your friend's size for clothing, but you don't know what their size is. You can share your data in a tokenized or secure manner from your browser storage.

Figure 17L:
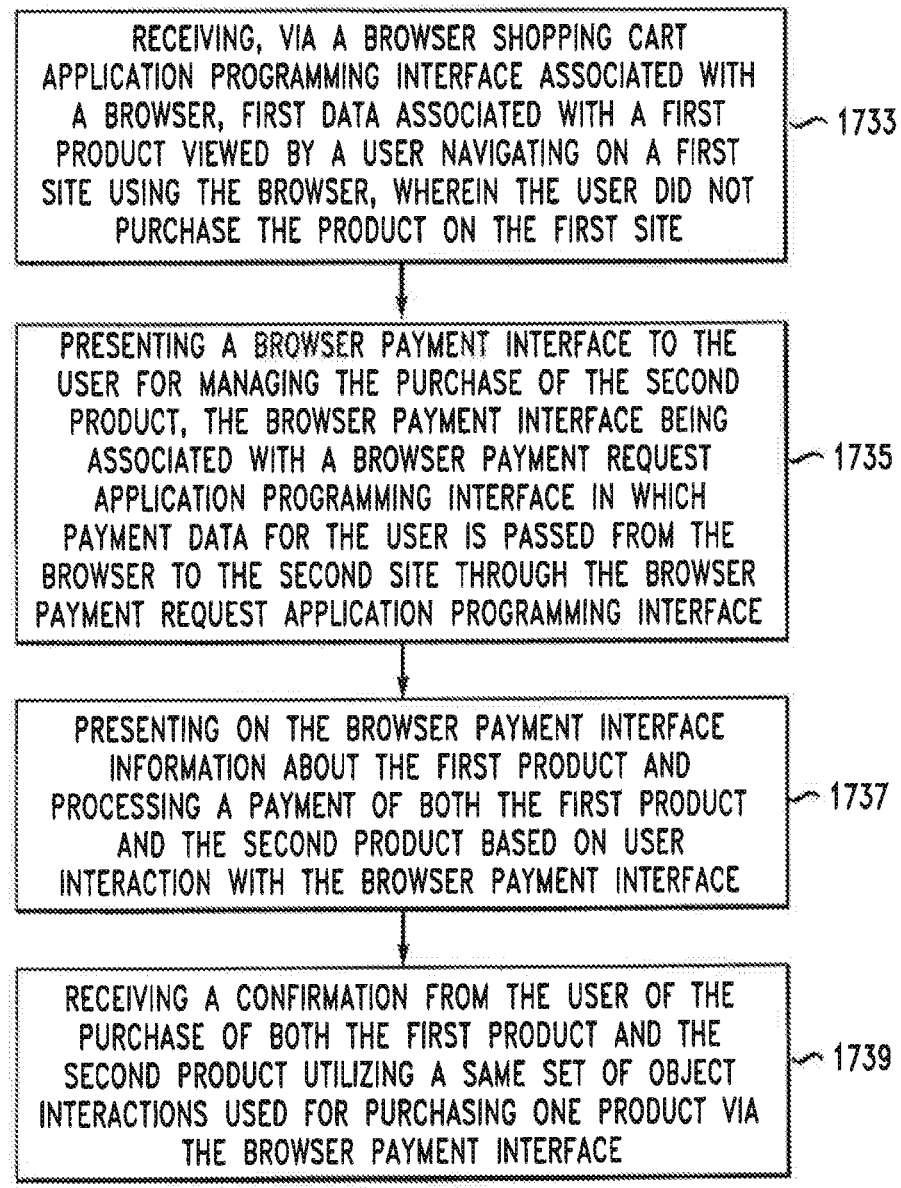
FIG. 17L illustrates a method embodiment for a cross-site shopping cart.

FIG. 17L illustrates an example method embodiment. One aspect of this disclosure applies to multi-site universal shopping carts and particularly presents a solution that is applicable using a modified version of the browser payment request application programming interface implemented by W3C. Users can access multiple sites across different devices, using different modalities and in different locations. In one aspect, a method, system or computer readable storage device operates from the standpoint of the browser. The method includes receiving, via a browser shopping cart application programming interface associated with a browser, first data associated with a first product viewed by a user navigating on a first site using the browser, wherein the user did not purchase the product on the first site (1733). The first data is stored such that it is accessible to the browser or a network service such as a search entity. This storage can be with the browser, on a user device, or on a network device hosted by a search entity or other payment entity. The method includes presenting a browser payment interface to the user for managing the purchase of the second product, the browser payment interface being associated with a browser payment request application programming interface in which payment data for the user is passed from the browser to the second site through the browser payment request application programming interface (1735). As part of the payment request API, an interface is presented to the user that they can interact with to achieve the payment. This interface is augmented with additional shopping cart items to enable multiple items to be purchased with "one-click." (The interface usually requires a few clicks but many less than a normal payment process in which multiple fields have to be filled in manually by the user). The method further includes presenting on the browser payment interface information about the first product and processing a payment of both the first product and the second product based on user interaction with the browser payment interface (1737). The processing of the payment of both the first product and the second product can occur using first communication between the browser and the first site via the browser payment request application programming interface and second communication between the browser and the second site via the browser payment request application programming interface. The difference is that the second site is already communicating with the browser for the payment process of the second product. The user, however, has navigated away from the first site, so a communication back to the first site must identify the product as well as providing payment and/or delivery data to the first site for "reminding" the first site of the previously searched-for product. Processing the payment of both the first product and the second product further can include transmitting, through the browser application programming interface, a package of data which enables the first site to process the first purchase of the first product. The package of data can include payment data for the first site to process the payment for the first product and address information associated with the user for the first site to deliver the product. The method can also include receiving a confirmation from the user of the purchase of both the first product and the second product utilizing a same set of object interactions used for purchasing one product via the browser payment interface (1739). In other words, since the user is already in the browser interface for processing the payment for the second product, the method can include utilizing the same "one-click" plus perhaps one fingerprint recognition or CVC code entry, or whatever few steps are utilized for the purchase of the second product, to also process the payment for the first product. As noted, the universal shopping cart may be separate from the browser API and completely managed by a network entity or search entity as well. There may also be coordination between the API and a network entity for managing the cart and the purchases.

Processing the payment for the first product and for the second can include communicating first information via the browser payment request application programming interface to the first site for completing the purchase and delivery of the first product from the first site and communicating second information via the browser payment request application programming interface to the second site for completing the purchase and delivery of the second product from the second site. Receiving the first data associated with a first product viewed by a user navigating on a first site using the browser further can include receiving the first data based on a threshold user interaction associated with the first product. For example, the user may need to put the first product in a shopping cart, or click on a button, or view the product for a period of time to indicate that there might be a purchasing interest. In another aspect, a search entity can store payment credential and address and/or other information for the purchase and manage a payment process for the universal shopping cart.

The method from the standpoint of the first site is shown in FIG. 17M and can include transmitting, from the first site and via a browser shopping cart application programming interface associated with a browser, first data associated with a first product viewed by a user navigating on the first site using the browser, wherein the user did not purchase the product on the first site, wherein the browser can manage storing the first data is stored such that it is accessible to the browser (1741) and, after the user navigates away from the first site to a second site, receiving a package of data from a browser payment request application programming interface for processing a payment of the first product, wherein the package of data identifies the first product and can include payment data associated with the user for processing the payment for the first product, wherein the user confirmed payment for the first product via an interaction with a browser payment interface presented as part of using the browser application programming interface to manage a purchase of a second product on the second site (1743).

The package of data received at the first site further can include address information for the user for delivery of the first product. The methods can include any communication needed from both the first site and the second site to identify payment methods, communicate shopping cart and payment capabilities of the browser, product data, session data associated with the user's search on the first site, user data, payment data, delivery data, size data, or any other data associated with processing a payment for the first product or aggregating the first product and the second product into the browser payment interface associated with the browser/user interface payment request API such that multiple products from different sites and/or apps can be purchased via a single shopping cart. Any concept referenced herein for processing a shopping cart can apply from the standpoint of the first or second site depending on the embodiment covered.

In another aspect, the user may have several items in a browser shopping cart and decide they would like to purchase the items and have them delivered. However, the user may not want to have to navigate to a product on a site and make a purchase of an item on a site to initiate the browser API payment interface. In this case, the system can provide a notice on the browser or a dynamic object could be presented or a menu item could be presented which enables the user from the browser to be presented with a payment interface with the shopping cart items. The user can be presented with a dynamically modified buy button associated with their browser type, payment request API type, or user account type. Then the user can purchase those items via interaction with the required objects. In this case, since the user is not on any site, if, for example, there is a first item from a first site and a second item from a second site in the shopping cart, the browser API would then transmit product ID, payment details, address details and so forth to the respective sites for processing the payment and delivery of the product even though the sites did not initiate a payment request according to the standard payment request API. Where payment services such as Apple Pay are used, those can be processed appropriately such that the standard data needed by the respective site to process the purchase (card type, token received, confirmation of purchase made, etc.) can be received via the API and the delivery of the product can be achieved. The shopping cart would also be made available wherever the user surfs—such as on their social media site (Facebook could have a selectable object indicating that there are items in the shopping cart), texting application, email application, calendar application, and so forth.

In another aspect, when one site uses Apple Pay, another site requires VISA, and a third site uses Android Pay, the user's shopping cart with three items from the sites may utilize some different interactions (such as fingerprint versus CVC code) to finalize the payments. Where there are differences in such interactions, the interface can aggregate the requirements such that one click on one object can indicate "Pay with Apple Pay and Android Pay" or "Pay with Apple Pay and VISA". The interface may then request a fingerprint and then a CVC code. The aggregation and organization of the various interactions can simplify the process of making purchases in one shopping cart with different payment mechanisms.

Another aspect relates to how to coordinate between different versions of APIs. For example, if a user is making a purchase using Apple Pay, which utilizes a proprietary browser API, the system could access data about shopping cart items stored in connection with the W3C browser/user interface payment request API, which is an industry standard. Whether a common protocol is used or some translation of parameters between the different APIs is used, one approach is to present one single shopping cart, with one buy button or set of interactions that is aggregated, such that multiple items are purchased in the shopping cart, even when the aggregated shopping cart spans two different versions of the browser API or two versions of the browser shopping cart API, or two different purchasing interfaces. In one example, assume the user is in an Apple Pay interface, and clicks on a buy button and confirms the purchase with a fingerprint of three items, one of which is an Apple Pay item and two of which are incorporated in from a different context but that would require Android Pay for one item and a VISA payment for another item, each from different sites. The local device and/or a server can coordinate the communication of the information between the Apple Pay process (in Safari) and a W3C browser API (such as on Chrome or Mozilla or Microsoft Edge, for example) such that a confirmation of the purchase can be utilized to process the Apple Pay purchase in the normal fashion, but then provide instructions to the W3C API to carry out the process of communicating with the respective sites such that the purchase of the second item via Android Pay is achieved and the purchase of the third item via VISA is coordinated. Thus, this aspect covers all of the coordination and information that is exchanged between two different APIs (browsers) for the purpose of enabling purchases from various sites to be accomplished behind the scenes when a single shopping cart containing multiple items that span multiple sites and multiple versions of browser/user interface payment request APIs is used to purchase the multiple items together. This aspect covers all the communications, responses, confirmations, security related communications, instructions and so forth between browsers and between one or more of browsers, different sites, services and/or payment processors to achieve a one click purchasing of items in a shopping cart as part of a browser API payment interface but wherein the inclusion of the items in the shopping cart spans different versions of the browser payment API or differ browsers such that notification of different site and processing of payments can be carried out based on a single payment process for the multiple products. Thus, Safari could manage the payment interface but communicate with Chrome to receive shopping cart items and then notify Chrome of the purchase of the respective Chrome items in the shopping cart. Then Safari can manage its payments for products purchase from a site and Chrome can manage its payments for products purchased from its sites. Further, the shopping cart can be integrated with other non-browser API interfaces. For example, a PayPal interface, or an Amazon Payments interface could also access via an API shopping cart items stored in connection with a browser and incorporate or aggregate those items into a one-click purchase experience of multiple items across not only different browser API interfaces but non-browser API interfaces.

Multiple Browser API Versions

There are different flavors of the browser API. There is Apple pay and the standardized W3C browser API which utilize a different version of the same API. There could be others as well. Users also utilize different apps on devices to make payments, such as a PayPal app. Any particular website which desires to provide a checkout procedure using one of these browser APIs, may need to detect which browser API is available and thus choose the appropriate buy button to present as an object with which the user interacts. If a user is using Microsoft edge as the browser, the merchant site should not present an Apple pay buy button. Accordingly, the concepts disclosed herein involves a merchant site determining which browser API is available. The merchant site to determine which browser is being used between Safari, Mozilla, Microsoft edge, chrome, Samsung, Internet, and so forth. The merchant site can then present a buy button which is appropriate for the respective browser that is being used to navigate the site. If the merchant site determines that the user is navigating through the site using Apples Safari browser, the object that is presented which the user can interact with to indicate an intent to purchase can be an Apple pay button. This of course may also involve a call through the API to determine if the user has Apple pay set up on their device.

The merchant site may also provide some branding as part of the interface to manage the payment process. Thus, if the user has a Microsoft wallet, and they are using Microsoft edge, the interface can include branding for the Microsoft wallet. In any case, after the merchant site determines which buy button to present, in the user clicks or otherwise interacts with the object, the merchant site will communicate through the respective browser API to request the payment information and provide the necessary data associated with the purchase such that the merchant site can receive, through the browser API, one or more of the payment data, name, address, security codes, fingerprint identification, audio information, visual or facial information, and so forth, to complete the purchase and deliver the product. This aspect of the disclosure primarily involves the determination evaluation by the merchant site regarding which browser API to use and how to present the user interface to ensure that an improper or unavailable option is not presented to the user as part of the improved checkout process is available through the use of the browser API.

The differences between the browser APIs could be that one utilizes a merchant verification procedure or enables the communication of payment data from a separate user device from which the user is accessing the site via a browser. For example, Apple pay has a browser API with a different protocol, then the W3C payment request API. Apple pay requires a merchant verification procedure and also enables the user to access a merchant site via the Safari browser on a laptop or desktop computer, and, when the user clicks on an Apple pay buy button on a site via the browser, the Safari browser can access payment data on a separate mobile device such as an iPhone that communicates via Bluetooth with the laptop or desktop computer. Thus, when using Apple pay. In this manner, the user, on the laptop or desktop computer, clicks on Apple pay and then provides a fingerprint verification on their iPhone, which is linked to the laptop or desktop computer, via Bluetooth. Of course other variations might exist between a first browser/user interface payment request API and the second browser/user interface payment request API. Facial recognition can be used as well to verify identity.

In another aspect, a user could be using Mozilla on a MacBook rather than using Safari. The user may have stored payment information for Apple Pay. The system could detect that the user is browsing with Mozilla but through a Safari browser on the user device, the user could implement Apple Pay. The proper communication of data could be provided such that the user is able to use Apple Pay even though they are surfing with Mozilla. This would require a verification, for example, that the user is using an Apple iOS device and has an Apple Pay configuration. The merchant site would receive a notification through the Mozilla browser that Apple Pay is available. Data could be communicated to confirm that Mozilla could enable a communication link from the Mozilla browser to the Safari browser on the user device to tunnel the information through to the merchant site. In this manner, the Mozilla may cause an instance of Safari to initiate in the background of the Apple device such that Mozilla can communicate with Safari and the merchant site such that the merchant site could present an Apple Pay button and the same interaction used for making an Apple Pay payment could be made through the Mozilla browser API.

In another aspect, a method includes determining whether a user is accessing a site via a first browser or a second browser, wherein the first browser implements a first browser/user interface payment request API and the second browser implements a second browser/user interface payment request API to yield a determination. When the determination indicates that the user is accessing the site via the first browser, the method includes presenting a first buy button on the site associated with a purchase and receiving an interaction, by the user, with the first buy button. The method includes transmitting a payment request via the first browser/user interface payment request API to receive payment data stored on a user device and receiving the payment data via the first browser/user interface payment request API. When the determination indicates that the user is accessing the site via the second browser, the method includes presenting a second buy button on the site associated with the purchase, receiving an interaction, by the user, with the second buy button, transmitting a payment request via the second browser/user interface payment request API to receive payment data stored on a user device and receiving the payment data via the second browser/user interface payment request API.

The first browser/user interface payment request API can from the second browser/user interface payment request API. The first browser/user interface payment request API can verify the site. The first browser/user interface payment request API can enable multiple user devices to communicate in order to provide the payment data via the first browser/user interface payment request API to the site. The user can access the site via the first browser on a user client device. The first browser can cause the user client device to wirelessly receive the payment data stored on the user device, wherein the user device is a physically separate device from the user client device. The user device can communicate with the user client device via a Bluetooth wireless protocol.

Further, tailored information can be provided for each interface. For example, Apple pay has its own browser API and other browser such as Mozilla, Microsoft edge, chrome, and others utilize the W3C browser API. Particular wallets may be utilized with each browser. For example, Microsoft edge utilizes the Microsoft wallet for providing the payment information through the browser API. Users may desire to see which wallet is being used, to make a payment. For example, the user may have a visa stored in a Microsoft wallet but a MasterCard stored in a Google wallet. Thus, one aspect of this disclosure is to provide a notification on an interface associated with the payment process in connection with a browser API, which identifies the wallet which is being used for a particular transaction. Indeed, in one aspect, where a user might have multiple browsers on a device, and thus might have multiple wallets, one aspect of this disclosure is presenting the user within a browser API interface, with an option to select from different wallets were storage locations for payment data which is to be communicated through the browser API. In this regard, a method could include presenting an object which is selectable by user as part of a browser/user interface payment request API interface. The object may be associated with a default wallet to use for the payment. In another aspect, the interface might just present several objects which the user can just simply click on to select the proper wallet. For example, the interface may present an object for Microsoft wallet an object for Apple pay. These may be one click operations in which the user simply indicates that they desire to make the payments and to use the particular wallets. In another aspect, a default wallet could be presented, such as Apple pay, with an object that indicates that other alternate wallets might be available. A button, drop-down menu or link could be provided that the user is unable to select in order to change from the default wallet. Upon receiving a user interaction with the object, the exchange of information via the browser API continues in the normal process according to the chosen wallet.

Using the above scenario, one example of the approach in action could be where a user is surfing the web via Safari, and wants to purchase a widget. Because the user has an Apple pay account, and Apple pay button is presented as part of the payment process for the user to select. However, if the user also has a Mozilla browser on the device, which includes in his auto fill database payment information including the necessary payment account number, user address, and so forth, then the interface could present the user with the option of the paying through their Mozilla stored data. In this regard, the Safari browser could communicate with the Mozilla browser to receive the payment data communicated through the Apple browser API to the merchant for payment. An API could be used for such browser to browser communication of data. Further, assume that the user also has a Microsoft edge browser and a Microsoft wallet. In this respect, the user could be presented with the option of switching to either a Mozilla account or a Microsoft wallet account for making the payment. In some respects, if an alternate payment mechanism is selected, then the system could launch the associated browser which could then communicate with the merchant and the payment information could be communicated through that browser API to the merchant. In other words, if the user begins on Safari to browse the merchant site, within selects a Microsoft wallet for the payment, the device can cause the necessary communication between the Safari browser to the Microsoft edge browser, which would launch the Microsoft edge browser, and provide a deep link or a communication to the session in which the widget is being purchased such that the merchant could either launch a payment request API call to the Microsoft edge browser or simply receive the payment data stored in the Microsoft wallet to handle the purchase. This approach can give the user more control over which wallet is used for a particular purchase. This approach also provides the ease of communication with the user notifying them of all the available wallets which could be used for any particular part purchase. This approach of course could also be extended to include bitcoin or other crypto currencies which might be available on the device for making a purchase.

Banks or credit card companies may provide discounts or coupons for making such a selection. For example, within the user interface, if Apple pay is the default payment mechanism, the merchant, or a bank, or any other entity might offer a discount on the price of the widget if the user selects the payment account in their Microsoft wallet for the payment. This could be because Apple pay charges the merchant, or because a particular credit card also charges a higher fee for the purchase. In this regard, one aspect of this disclosure includes, for a particular purchase, evaluating the various fees or charges associated with each possible payment account which is available to be made from a user device via a browser API. If a determination is made that one particular available payment account has fewer fees or provides a particular benefit, then a method could include presenting a discount, or a coupon as part of the user payment interface which provides the user with an opportunity to select the alternate payment account and thereby receive a discounted price on the widget or some other benefit. Users may opt in to an approach which makes their various wallets available through each browser on their device. Furthermore, advertising or notifications could also be presented on the browser API interface which could be based on social media data, prior purchasing history, available wallets to use for purchases, and so forth.

Site/App Monetization

Another aspect of this disclosure can include web monetization approaches. For example, using one or more of the payment request API and the payment handler API as disclosed herein, micro-payments to be provided from a user to a website that the user is browsing. These APIs can be adapted to micropayments in which they are not processing payment based on a "buy" click by a user, but based on the user navigating to a site/app that exchanges access to the content for micro-payments. The micro-payments could be established to be continuous rather than a one-time event and could be based on any number of factors. For example, the micro-payments could be dynamic and vary based on the amount of data communicated between the site and the browser. If the user is viewing video, the micro-payments might be higher, for example. If the user is merely viewing or reading an article, the micro-payments might be relatively less. The user's experience could also be a blending of advertisements and micro-payments. For example, caps could be provided with respect to any given site navigated to wherein after the user has made a certain amount of a micro-payment such as 10 cents, and advertisements could start. The user could establish settings where micro-payments are made for nonvideo browsing but that the user would accept viewing advertisements in connection with the YouTube video or other video viewed from a site. Further, the ability or existence of making micro-payments could impact which version of the video and individual sees. For example, Youtube might be able to present different versions of the video based on whether web monetization exists. If the user can pay a site through web monetization, then the viewer should be able to see videos without advertisements. The site of course can share payments between itself and a contributor of the video. Youtube.com might receive micro-payments for itself but also have to distribute some of the payments to the creators of respective videos that are viewed under a web monetization approach.

In another aspect, when applying web monetization, a graphical presentation could be provided to the user in a separate window similar to the window presented to the user for making a payment via the payment API. The graphical representation could inform the user the payments are being made and utilize a bar chart or some graphical representation of how much payment has been made to the site. Notifications could be provided to the user where payments are being made but it might appear that the user is no longer watching. Haptic signals, audio signals, visual signals or any combination thereof to be provided to remind the user that money is being paid to the site currently viewable. The site of course could also be an application whether a progressive web app or a client-based app that is set up for monetization. In one aspect, no user interaction is needed to manage the monetization approach, whereas in other aspects, the user interface can be presented to enable confirmation of payments, confirmation of continued viewing, confirmation of changing states from a monetization approach to an advertising approach while browsing a site, and so forth. A browser or any module configured to control a user interface or payment process can be programmed with an API to handle monetization in this manner.

In another aspect, sites or apps could provide enhanced services for increased payments. For example, a site might provide an audible reading of its articles in exchange for higher monetization. A browser or user interface module might present options regarding which version of the site/app the user will view based on whether the user wants to make the appropriate payment. The variations can include video quality, audio quality, access to content, access to other users viewing the site, access to comments, ability to comment, ability to share be a social media, and so forth. In one example, a user may start a Youtube video but then open up another tab where the user still hears audio, but no longer sees the video. In such cases, adjustments can be made where the micro-payments are modified where the user only hears the audio but cannot see the video. If the user clicks on the tab with the video, then the micro-payments can adjust back to the full amount. These choices can be made manually or the decided according to a user profile or predefined parameters. Weekly or monthly reports can be provided to users regarding their payments to sites such that they can identify how much they have paid and to what sites the payments have gone to.

Another aspect of this disclosure relates to merchant sites. Users may make micro-payments to a merchant site but be reimbursed if the user purchases a product. Similarly, users may make payments to a nonmerchant site but if an advertisement does exist and the user ended making a purchase associate with the advertisement, users might be reimbursed the micro-payment. Thus, the flow of payments can be both to a site or from a site throughout the user experience at the site. For example, the user may browse a site and be making continuous micro-payments but decide at some point to share a social media posting associated with the site at which point the micro-payments might be returned and/or the user might be paid for making the social media connection and thus advertisement for the site. Opportunities for sharing a sites or an article could be presented dynamically. Communication regarding such actions can be built into the protocol for the API which can manage such information between the site/app and the browser or module. For example, a sites might monitor its receive micro-payments and as it hits a threshold, such as a 25 cents, the site could present the user with an option to share the article, video, or any other aspect of the site on their Facebook feed. The site can notify the user that if they now share the article, that their micro-payment will be returned or some other variation of payment will be provided to the user. The amount returned could also depend on the user's social media following. For example, if the user has 10M Twitter followers, then the sites might return the user's 25 cent contribution and pay them $5 for the posting on Twitter. Thus, a payment could flow from the site to the user via one or more of the APIs disclosed herein.

As can be appreciated, one aspect of this disclosure can include micro-payments flowing from the user to a site as well as micro-payments flowing from the sites to the user. A ledger can be used to maintain a balance of these various payments and at the conclusion of the user navigating away from the site, a net payment flowing in either direction could be made. Follow on social media, email, texting, or other communication can occur from the site to the user after the user navigates away from the site. For example, the user could later receive an email which states "thank you for visiting www.website.com. You made $1 visiting our site—come again when you are ready". The message of course can include a link to the site to draw the user back.

Overall Architecture for One-Click Payments

FIG. 18A illustrates an example architecture 1800 for pre-populating a merchant shopping cart, as well as for using a browser API. In this example, a user 1802 of a computing device 1804 running a web browser 1806 loads a web page with a unified input field or any other site such as a social networking site. The site communicates with a server 1810 via an API 1812. The server 1810 can represent any site or app, even payment service applications. As the user 1802 enters data in the unified input field, or interacts with the site in any other way based on its respective functionality, the browser 1806 sends the data, via the API 1812, to the server 1810. The server 1810 can analyze the data to identify that the intent of the user 1802 is to make a purchase, based on the data entered in the unified input field. The server 1810 can identify a merchant website 1816 that sells the desired item, and communicate with that merchant website 1816 via its associated browser/user interface payment request API 1818, if available. In one aspect in this scenario, the payment data stored 1814 can enable the site 1810 to process the payment and communicate via the API with the merchant the payment details and information to the merchant 1816 to deliver the product. If an API is not available, the server 1810 can communicate with the merchant website 1816 via HTTP and can navigate through the website in an automated fashion as if a user were clicking or entering data on the merchant website 1816. The server 1810 can use a network-based database 1814 of payment and delivery data or other personal data about the user 1802 to populate data fields at the merchant website 1816.

However, if a network-based database 1814 is incomplete or does not exist, the server 1810 can, via the API 1812, request data from a database of payment and delivery data 1808 local to the browser 1806 or to the computing device 1804. The payment data 1808 can be any payment data stored on the local device (or at a network based service), even if for other purposes such as a YouTube account, or associated with an email account, or an iTunes account. If a user is logged into their browser, or their email account or any other type of account, and there is payment data stored, the system can utilize or access that payment data to initiate a commerce purchase. When the user is making a purchase, the system can present the various payment accounts stored, such as a credit card in Google Wallet, plus a Play Store account, and let the user choose amongst the available payment options. This can also occur across platforms such as information stored in Chrome plus an Amazon account stored on Amazon.com. In this scenario, the Amazon.com data can be represented by the server 1810 and data 1814 and can be provided to the browser 1806 through an API 1812 or other means. The browser 1806 can access and utilize any stored payment data for simplifying the payment process. The server 1810 can continuously receive additional data entered by the user in the unified input field via, and update or modify data entered at the merchant website 1816, products selected for purchase at the merchant website 1816, or even switch to a different merchant website altogether. The server 1810 can transmit a response to the browser 1806, via the API 1812, so the browser 1806 can present actions or destinations to the user 1802 based on the data entered in the unified input field. Then, if the user selects one of the actions or destinations, the browser 1806 can navigate to that page and communicate with the merchant web site 1816 directly, or without the server 1810, although the server 1810 may continue to communicate with the browser 1806 to track behavior of the user 1802 at the merchant website 1816. For instance, the server 1810 may track eventual purchase details referred through the unified input field. The server 1810 can update the network-based payment and delivery data 1814 from time to time based on information processed from the local payment and delivery data 1808, or based on user input. The browser/user interface payment request API 1818 establishes the basic protocols for communicating information between the merchant site 1816 and a browser 1806 for simplifying the payment process. The browser 1806 can also represent any device such as a voice controlled assistant or an appliance. The payment data that is communicated from the browser 1806 through the API 1818 to the merchant site 1816 can be tokenized for security purposes. The merchant site 1816 can then process a payment for the product with their payment processor 1820. The benefit of this approach is that the same payment infrastructure can be used by the merchant and only minor changes to a site are needed to utilize the browser API 1818 to obtain the necessary data for processing a payment. As shown in FIG. 18A, communications between the merchant site 1816 via the API 1818 with the browser 1806 to obtain any kind of data 1808, can occur in both directions. Thus, the merchant 1816 can initiate a request for data through the browser API and receive that data for any purpose such as payment data to avoid the user needing to manually fill in payment account, address information, as well as any other data such as shirt size, pant size, shoe size, color preferences, one-click purchasing parameters etc.

For example, if the merchant site 1816 is amazon.com and the site already has the payment account and address of the user landing on amazon.com, a one-click purchasing authorization or parameter may need to be set on the browser 1806 for the destination state to be a "one-click" purchasing state. In the transition from the server 1810 to the site 1816, the process can include accessing or confirming that the one-click purchasing state is "on" for the browser to enable the user to land on the site 1816 and have the next interaction be a one-click to purchase the product.

Various example aspects of implementing the payment request API 1818 are disclosed herein. It is noted that the payment and/or delivery data, as well is any other data (such as user profile data, one-click purchasing data, settings, parameters and so forth) that may be used for processing a purchase, can be stored 1808 locally, on a user device 1804 or may be retrieved from a network server or service, or a combination of both. For example, when the browser 1806 receives a payment request through the API 1818, it may communicate data with a network server associated with a purchase. A network server can encrypt data and create a token which is transmitted back to the user device, for passing on to the merchant for processing the payment. The server 1810 can also represent any site other than search sites, such as social media sites, and the respective functionality associated with the respective site will apply to how one might transition from an interaction with the first site 1810 to a destination merchant entity site 1816. In other words, the initiating transitional interaction may not be entering data into an input field but could be any interaction associated with the respective site, such as interacting with an advertisement or an interaction associated with a game, map application, conferencing application and so forth.

In one aspect, as is shown in FIG. 18A, the site 1816 can also request via the API 1818 payment data from the server 1810, which can have access to the payment data, user data and/or other data. Thus, for example, a site could present a buy button as the user navigates for a product and decides to make a purchase, and to turn that purchase into a one-click type experience, the site could perform an API call to a server, such as a Google based server or an Amazon based server, for example, and retrieve payment information and/or other data stored with Google or Amazon, or any other entity, which can be passed through the API to the merchant site for processing the payment and potentially delivery of the product to the buyer. Thus, payment data stored in say Google Play, or with an email address or YouTube, or at Amazon, could be accessed and provided quickly and easily such that the user does not have to manually enter the data to make a purchase. The server 1810 might also access payment data stored in connection with the browser 1806 to make a payment. Indeed, the API 1818 and/or API 1812 could be used to present a number of different payment options via a user interface, such as one payment option stored in a browser 1808 and one payment option stored at a Google server 1814, or Android Pay, for example, and enable the user to choose which payment account to use for a payment. Information about the chosen payment account can be passed through the API 1818 to the site 1816 for processing.

Figure 18B:
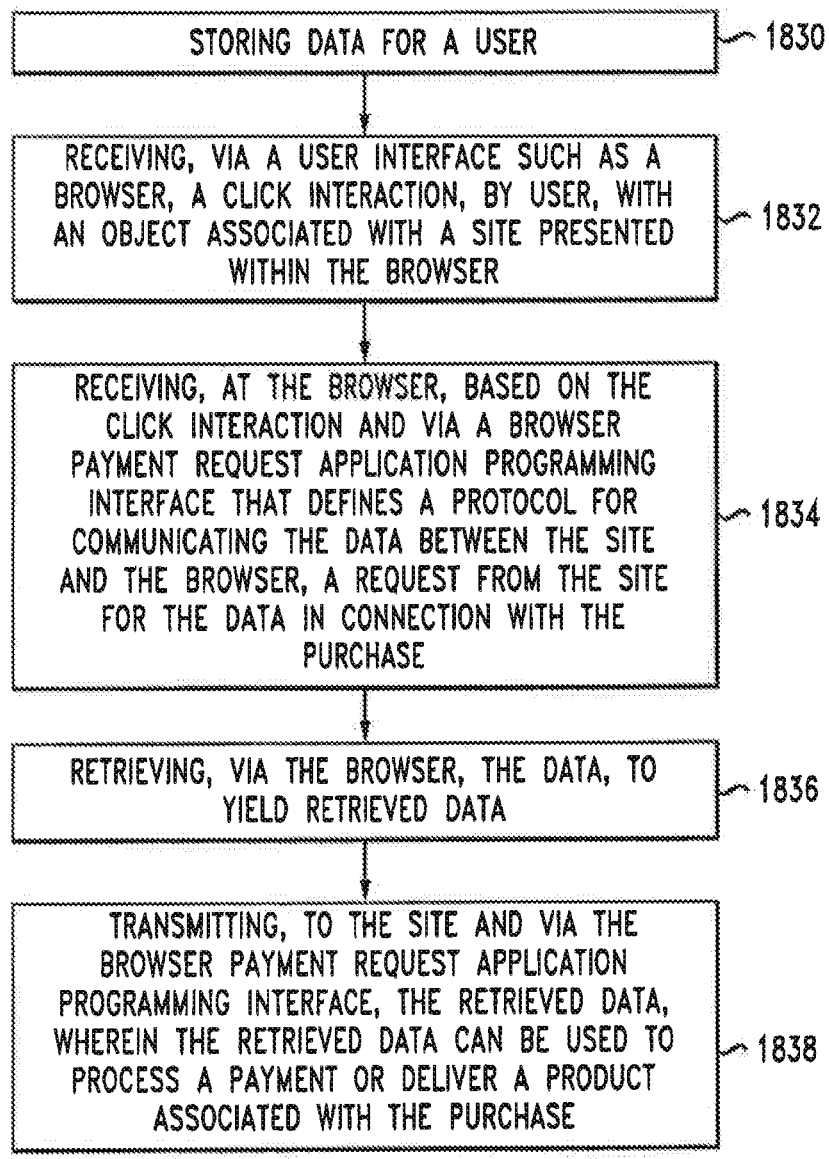
FIG. 18B illustrates a method embodiment for the browser API.

FIG. 18B illustrates a method example related to the browser API shown in FIG. 18A. The method can be performed by a browser and include steps of storing, in a non-transitory storage medium of a user client device, payment data for a user (1830). In one aspect, the payment data can include any one or more of address information, payment account information, a date of expiration, a CVC code, a token or code which can be used or encrypted for providing a payment token for use by a merchant, user delivery preferences, user size information for clothing, and so forth. Any data related to processing a purchase can be included in payment data. The payment data is typically not being associated with any specific site but can be used across multiple sites. Any security mechanism can be implemented to ensure safe communication of payment data or modified payment data to the site 1816 for processing a purchase. User size information could also be tokenized when communicated through the browser API. When the purchase occurs via the application programming interface between the social networking site and the merchant site, the social networking site can transmit payment data through the application programming interface such that the merchant site can process the purchase of the product.

Figure 19A:
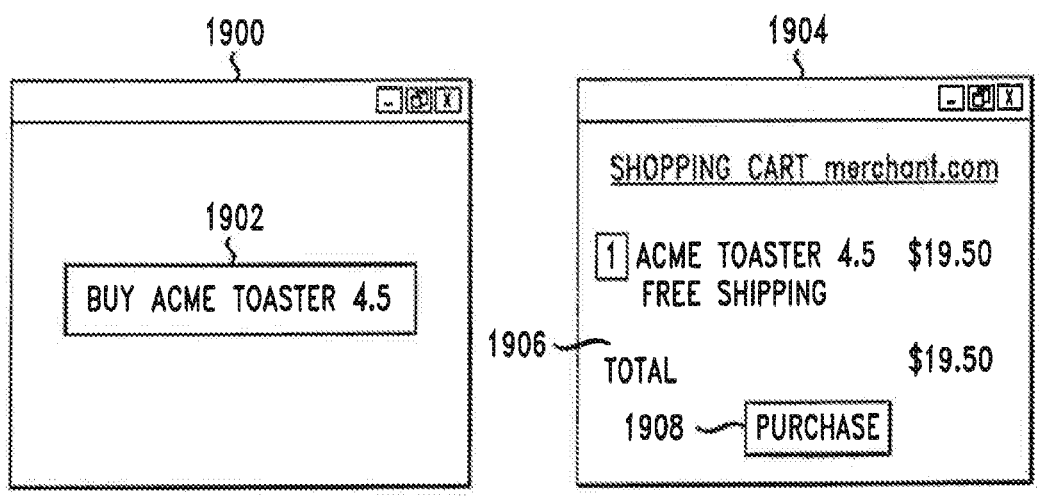
FIG. 19A illustrates example user interfaces for a pre-populated merchant shopping cart.

The method can include receiving, via a user interface such as a browser, a click interaction, by user, with an object associated with a site presented within the browser (1832), the click interaction indicating a user intent to make a purchase and receiving, at the browser, based on the click interaction and via a browser payment request application programming interface that defines a protocol for communicating the payment data between the site and the browser, a request from the site for the payment data in connection with the purchase (1834), retrieving, via the browser, the payment data (or a version of the payment data that is tokenized or encrypted for security), to yield retrieved payment data (1836) and transmitting, to the site and via the browser payment request application programming interface, the retrieved payment data, wherein the retrieved payment data can be used to process a payment or deliver a product associated with the purchase (1838). In one aspect, the browser can also interact with another server 1810 which can also process payment data 1814 such as generating a token that is passed back to the browser 1806 for communication to the merchant site 1816. FIG. 19A, feature 1908 illustrates such an object which can be interacted with for initiating the interaction between the merchant site 1816 and the browser 1806. In another aspect, the payment data 1808 can be stored with the browser in whole or in part and other data can be accessed via a network server 1814 in whole or in part to generate payment data or payment information that is communicated to the merchant 1816 for processing a payment. In this example, payment data could be exchanged with user size information, registration data, or any other data that is exchanged via the browser API.

In another aspect, the methods disclosed herein can also apply to an "app" context in which the user is interfacing with an app downloaded on a user device, and upon a click interaction, such as clicking on a buy button, the app requests payment data from a module configured to manage a user interface. The module configured to manage a user interface retrieves payment data, for example by retrieving data stored on the device, and communicating data to a network-based payment service, through use of one or more APIs, and returns authorized payment data to the app via an API configured between the app and the module configured to manage a user interface.

Figure 18C:
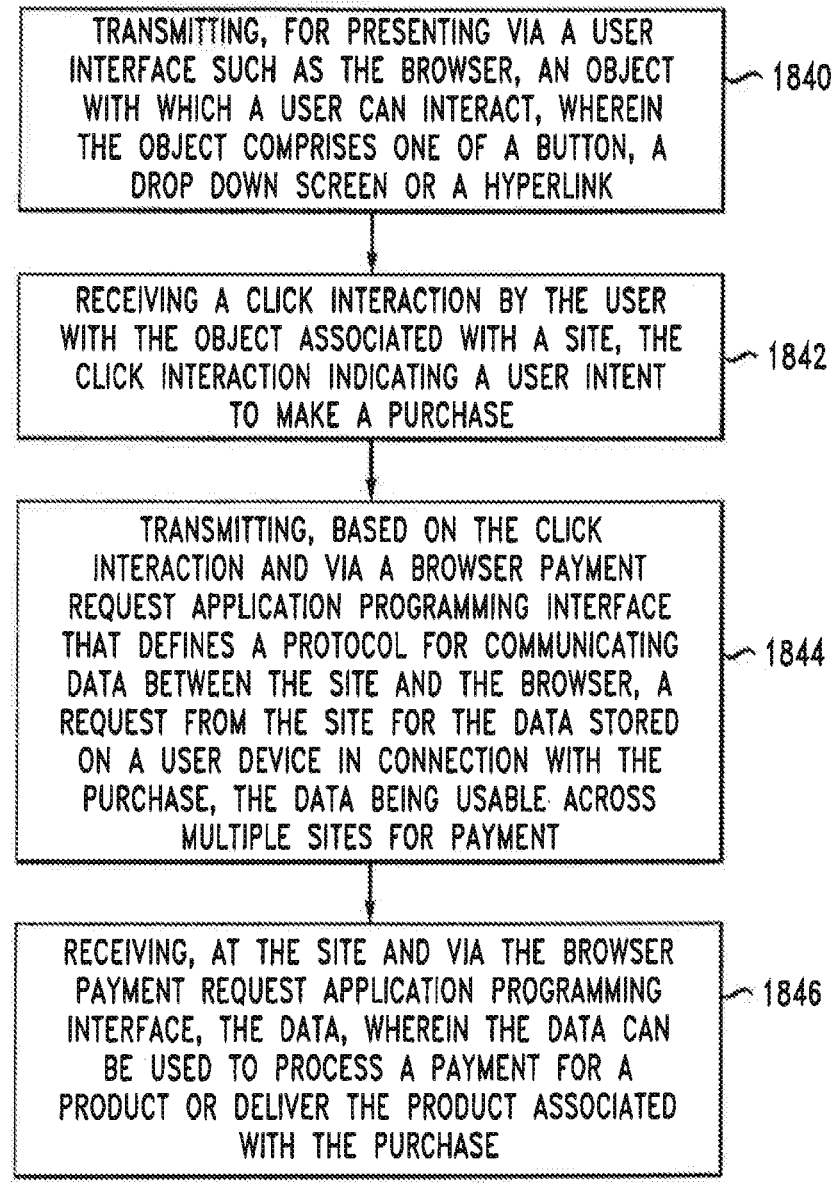
FIG. 18C illustrates yet another method embodiment for the browser API.

FIG. 18C illustrates a process from the standpoint of the merchant site. In this case, the method can include transmitting, for presenting via a user interface such as the browser 1806, an object 1908 with which a user can interact, wherein the object includes one of a button, a drop-down screen or a hyperlink (1840), receiving a click interaction by the user with the object associated with a site, the click interaction indicating a user intent to make a purchase (1842), transmitting, based on the click interaction and via a browser payment request application programming interface that defines a protocol for communicating payment data between the site and the browser, a request from the site for the payment data stored on a user device 1804 in connection with the purchase, the payment data being usable across multiple sites for payment (1844) and receiving, at the site and via the browser payment request application programming interface 1818, the payment data 1808 (or secure data such as a token based on the payment data), wherein the payment data can be used to process a payment for a product or deliver the product associated with the purchase (1846). The merchant 1816 can submit the payment data or information received to a payment processor for processing the purchase.

The browser API has a number of characteristics that can distinguish it from APIs between the site and a payment server, such as a PayPal scenario, and from general hypertext markup language (HTML) protocols. HTML is a markup language that web browsers use to interpret and compose text, images, and other material into visual or audible web pages. Web browsers will receive HTML documents from a Web server or from local storage and then render those webpages. HTML generally describes the structure of such webpages semantically and describes using his protocols. The instructions for the appearance of documents on the browser. Cascading style sheets and JavaScript can also be part of HTML. Default characteristics for every item of HTML markup are defined in the browser, and these characteristics can be altered or enhanced by the web page designer's additional use of CSS. IN contrast, an application programming interface represents a set of subroutine definitions, tools, and protocols which outline a set of clearly defined structures for communication between various software components. It is an established API for communicating between a site, such as a merchant site, and the browser. As such, the browser must be programmed with the routines, data structures, object classes, variables and/or remote calls to enable a respective site which desires to utilize the API to be able to make payment request calls and receive the appropriate data via the API for processing payments. The browser API is not an HTML interface, nor is it an API that is designed for communication between the site and directly with a network-based payment server or payment service. We note that disclosed herein is a process in which the browser can act as an agent and manage through other APIs between the browser and network-based payment services, the process of making a payment or providing payment data, such as tokenized data, to a merchant site. However, in that scenario, the site does not need to make separate API calls to a network-based server because the browser is established as the agent to manage the process, thus simplifying the communication for the site such that only calls through the browser API need to be made for authentication, authorization, network-based processes, to occur. Thus, the API, which can be a set of HTTP request messages, along with a definition of the structure of request messages and response messages, which can be established in an XML or JavaScript object notation format, is built into the browser enabling the browser to act as an agent for providing authorized payment data, password data, login data, tokenized payment data, or to manage as an agent network-based payment processing or logging in processing, all through payment request or other calls made from the site through the browser API. The browser API manages the flow of data between the browser and the site and enables the browser to separately reach out for authentication, data, tokens, or other network based services. The API provides a consistent experience across payment methods, systems, platforms and merchants. Typical web based APIs have defined interfaces between the site and a web service and a novel concept disclosed herein is the new API that defines the architecture and programmable interface, data structures, and so forth, which are built into a browser, such that the browser can receive payment requests, retrieve authorized payment data, respond to the request, whether the process be a payment process or a login process, such that payment or login processes can be simplified and unified across sites.

FIG. 19A illustrates example user interfaces for a pre-populated merchant shopping cart. In the first user interface 1900, the user has entered the text "Buy ACME toaster 4.5" in the unified input field 1902 of a web page in a browser. After hitting enter or clicking a search button, the browser communicates with a server that has already navigated to (or is currently in the process of navigating to) a merchant website to populate the shopping cart at the merchant website with the desired toaster. The server can hand off that browsing session to the browser to continue at a specific point in the checkout or shopping cart process, or can return a URL to the browser that is formed to go directly to a shopping cart that is populated based on the text entered in the unified input field. In this case, after hitting enter or clicking a search button, the browser navigates directly and automatically to a merchant website 1904 listing the item already placed in the shopping cart, order details, and a one-click purchase button 1908. Alternatively, the browser can navigate to a stage where the order has already been placed, such as the page that would load after the user clicks the purchase button 1908. Notably, the merchant has some branding on screen 1904. Where the purchase button 1908 is used to process a payment using the stored payment information at the search engine site, as can be appreciated via the disclosure here, the coordination between the payment processing on the search engine side of the API, and the delivery being handled on the merchant side of the API, makes the process more simple and easy for the buyer, thus increasing the chances that a sale will occur.

Screen 1904 can also represent simple navigation on a merchant site by a user such that they get to the point where a user is committed to making a purchase 1908. The click or otherwise interacting with a buy button 1908 can initiate the communication through the browser API to request and ultimately receive the necessary payment data for processing a payment.

The screen 1904 can be hosted by the search engine/social media site and/or the merchant. The system can populate other details of the shopping cart automatically on behalf of the user, as well. The system can even create a new account at the merchant on behalf of the user, if the user does not have an account with that merchant. In this way, the system enables a user to access websites, through a unified search field, as if they were one-click purchase merchant websites, even if the user has not previously registered with that merchant or if the merchant does not offer an "Amazon style" one-click purchase interface. For example, the first website entity associated with offering the generalized input field can process the payment for an item based on payment account information it stores and coordinates with the merchant on finalizing delivery of the item.

In an app context, the screen 1904 can be presented after a user clicks on a button 1902 in an app 1900. An API configured to control communication between the app and a module that controls the user interface 1904, as described herein, can be used to enable a simplified and safe purchasing process. The app would request payment data from the module that controls the user interface, and the module that controls the user interface, for example, could retrieve payment data from the device and/or communicate with a network server to obtain authorized payment data to pass back to the app via the API protocol.

Site Personalization

Figure 19B:
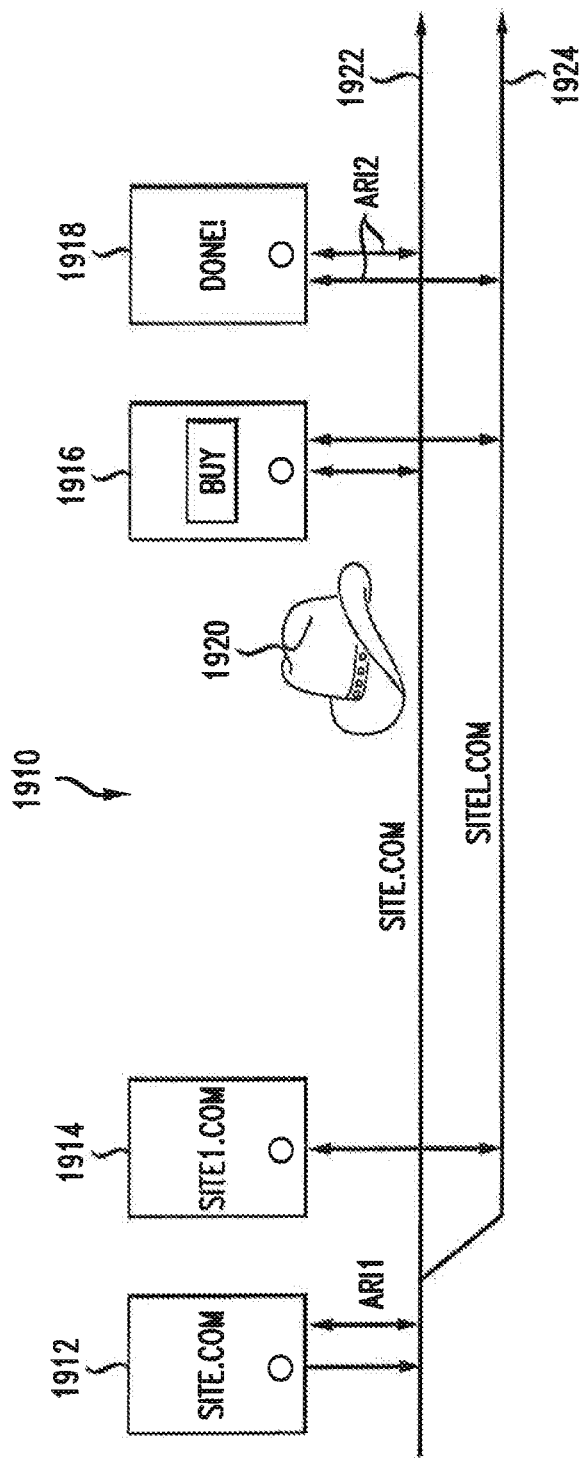
FIG. 19B illustrates an approach to personalizing a site.
Figure 19C:
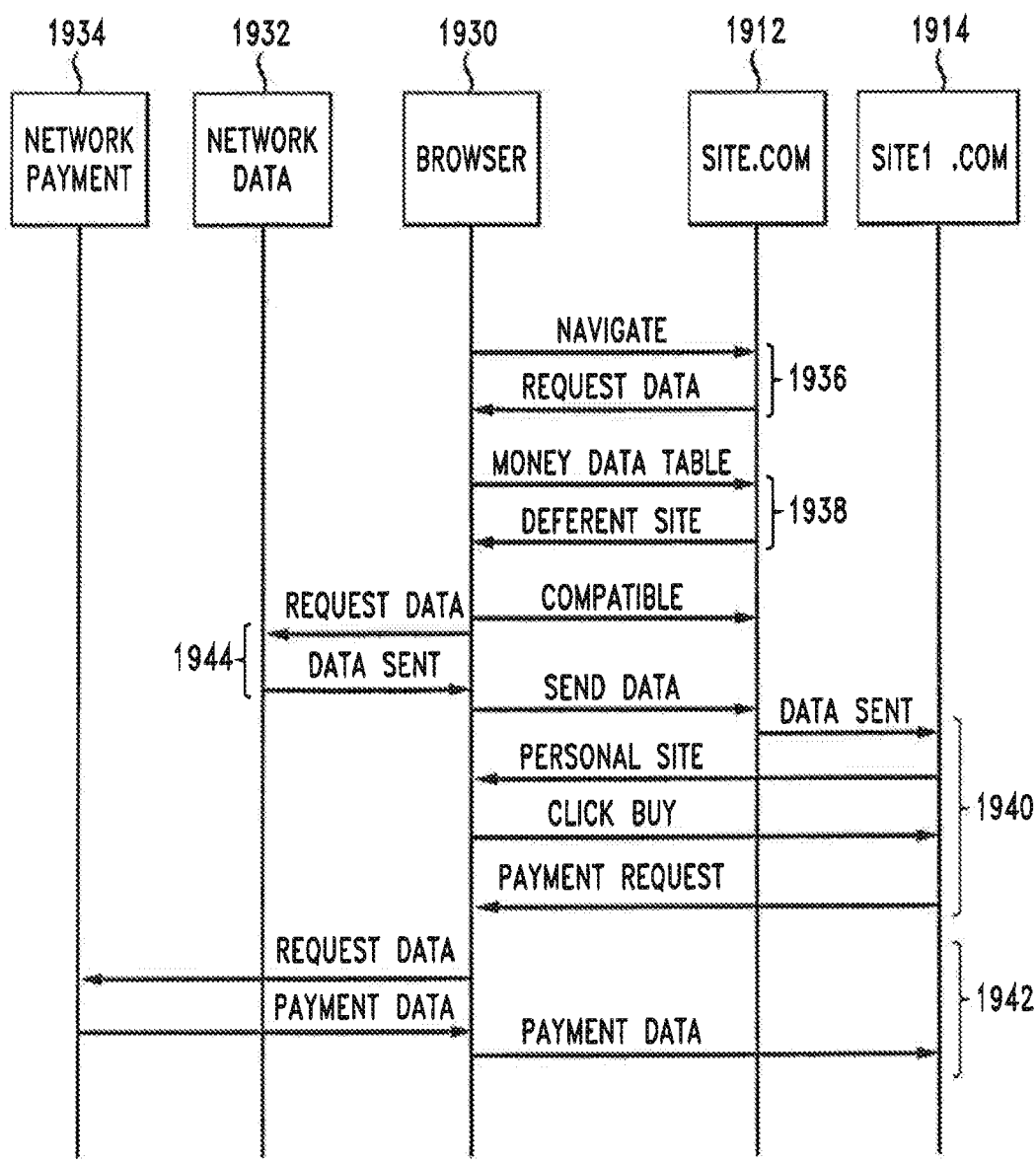
FIG. 19C illustrates the approach to personalizing a site.
Figure 19D:
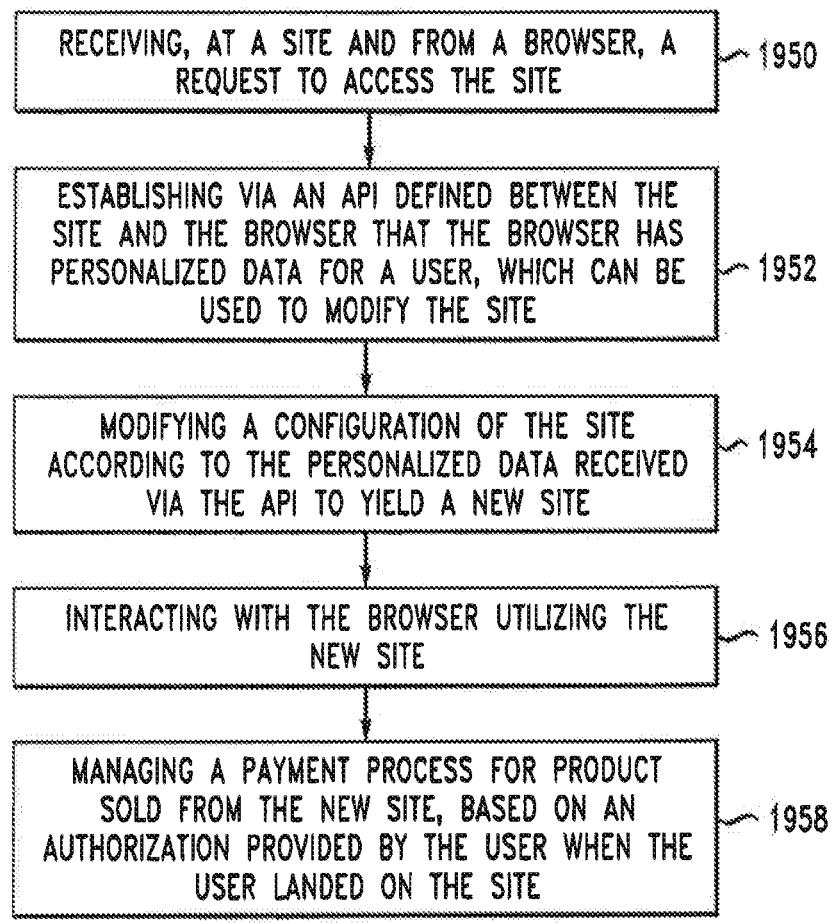
FIG. 19D is a method embodiment related to personalizing a site.

FIGS. 19B-19D illustrate a novel approach to personalizing a website using a browser-based application programming interface. The other browser-based APIs disclosed herein typically focus on a payment process and simplifying that process. This section describes a correlated concept in which a browser-based API is implemented to exchange information between the browser and the website can be made to personalized the use experience when the user lands on the website such that adjustments.

The browser API in this regard defines a protocol or syntax to enable communication between a site and a browser in order to retrieve personalized information, such that the site can be modified for that user. The API operates in a similar general manner to the payment request API in the sense that it operates as an API between a site and a browser. It could also work for apps as well. The API can communicate any kind of data that can be utilized to tailor that website for user. For example, a body model of the user, the user friend or family member, or other individual could be commuted catered to the site such that no size options need to be presented. Assume the following example as shown in FIG. 19B. The user navigates to a site 1912 in which clothing products are sold or presented. At some point in the navigation process, the user will click on a button or choose an item in a drop-down menu, or even just navigate to the site to arrive at the site. The site 1912, because it sells clothing, can issue a body model request call via the API to the browser. The request is made using a protocol that is configured to enable a standardized description of data about the site and communicate that information to the browser. For example, the site might be exclusive to men's clothing or children's clothing, or women's shoes. Through communication of data between the site and the browser, negotiations can occur in which an appropriate body model associated with the user navigating to the site. For example, the user could set up within the browser, body models for him or herself, a spouse, children, friends, and so forth. Thus, if the site being navigated to is only for children's shoes, the browser may not send the body model for the father or mother to the site but might be able to only send the body model of the children which can include their shoe size as well as shoe or foot shape (i.e., narrow, wide, etc.). Pictures can also be provided of each person in the body model such that as the body model is delivered to the site, the presentation of closer shoes were accessories can be made in a model can be shown to show the user how they will actually look wearing the clothing.

Other data such as the name of the individual can be provided through the API such that there is no longer a choice of M, L, XL, etc. for clothing sizes, but merely a selection of people. For example, if the user is shopping for his family and the body models of his family are communicated to a site, the user can navigate to basketball shoes, and have the option of purchasing shoes for Johnny, Mary and Virginia. These can be the names of his children or his wife or anybody associated with the user. After receiving the personalized data, the site can be modified essentially to be operational as a new site 1914 that is tailored for the individual. FIG. 19B illustrates the default site 1922 in the modified site 1924.

Using the modified site 1924, rather than picking a size, the user chooses the individual that is going to receive the shoes. The body model has shared the shoe size and shape with the site and the site can use. An algorithm, which can match the appropriate sizing of the clothing that it sells to match as closely as possible the proper size with the individual. Different manufacturers have different sizing ratings, and thus this approach can be much more accurate. For example, a size 9 shoe from one manufacturer might not be quite the same as a size 9 shoe from a different manufacturer or from a different country. Thus, the use of the body model eliminates the need to know a shoe size and provides the capability of having much more confidence that a purchase made online will match the recipient's body size and shape.

The W3C "payment request API" standard is incorporated herein by reference as background material and infrastructure/protocol concepts that can be utilized for the body model API. This is not prior art to the present application in that the priority document discloses the API as well as the payment handler API concept.

Social media sites can also be used to share body models. For example, Facebook could store a body model associated with individuals that use the site such that friends could share the underlying data of a body model if a friend is shopping for another friend. Authorizations could be provided in which friends would authorize friends within their network at a certain level of closeness such that if one friend wanted to buy another friend close or shoes or hat, that they could get the right size. The browser can act as the user agent and can retrieve data from a network-based entity for personalizing the site. In one aspect, to navigate or to communicate with the database that can be network-based to retrieve social media based body models of friends that can then be communicated to the site via the API. For example, a user Mary navigating to a site might arrive at a shirt she desires to buy for a friend John. John's body model is not stored in Mary's browser. The optional people that Mary could choose for the short size could include herself, and her kids but not John. A button could be presented which opens up a window for Mary to select from her social media friends that she wants to buy the shirt for. Communication can be made to her browser, to a network-based API database, and/or any other location, in which Mary's friends can be presented and she can choose John from that group of friends. The social media site or some other database could provide John's body model. Either through the API or directly through a network-based communication, to the site, so that it can process the body model, shirt size for John, and then present a button with John's name on it, to enable Mary to select the shirt for John in the appropriate size.

The disclosure also covers the transmitting of a face with the body model that can then be used for 3D modeling using the face to see what people personally would look like. In this regard, via the API configuration or protocol, a browser can send a part of a body model depending on what kind of clothing is sought. Thus, the data associated with the facial recognition component of a device can be transmitted to the site such that such data could be utilized in a virtual reality or augmented reality scenario, in order to enable a buyer to view how they might look in a particular environment which can include clothing, accessories, furniture, homes, outdoors, or any environment.

In another aspect, typically the API disclosed herein for the purpose of managing purchases is implemented after a user lands on a site, navigates to a product, and clicks on a purchasing button. In this scenario, data is communicated via the protocol of the API between the browser and the site, in some scenarios, the user confirms the purchase via facial recognition or fingerprint recognition or other biometric. The browser independently or in connection with the API or a separate API, makes indicate with a network server, which perform some part of the functionality. The browser then can transmit a token, payment data, address data, and so forth for the site to use to process a payment. There are some weaknesses in this approach, however. For example, if the user were to then continue to serve the site for an additional product, they would have to go through the entire process again, clicking on a buy button, and providing a fingerprint for second purchase.

A novel aspect disclosed herein includes the application of the API or multiple APIs closer to the beginning of the user landing on the site. An example scenario is as follows. A user navigates to a site that sells clothing. When the user lands on the site and the basic communications are established between the browser and the site, the site can send an inquiry or request to the browser, identifying data associated with the site. For example, the data may indicate that the site accepts Apple Pay, Google Pay and Paypal. The site may identify that it sells clothing, cars, books, or any data associated with the products. The browser or a network-based entity, or the device, can store personal profile information associated with the user and/or friends or family members of the user. For example, a body model of the user can be stored within the browser, on a secure element of the device, or the network-based location. Personal preferences for various products can be stored as well. Purchasing history data can also be stored as well as payment data in a secure element. Any kind of data that can be helpful in terms of configuring the site for the particular user can be stored and passed in this API. Any use preferences for color, size, style, shape, brands, and so forth can be transmitted via the API as the user lands on the site and which can be used to change the user interface and personalize the user experience.

This process can also be expanded to the secure delivery of any kind of data to any device beyond payments. For example, the data can include healthcare data for a user which needs to be provided to a health care system or a doctor's office, credential data to access data or a site or a building, banking data, government-related data, and so forth. A similar kind of storage of data, retrieval, encryption, and re-encryption, and delivery of data can occur. Where in one case a recipient is a merchant, a merchant identifier and validation process occurs for the payment "session". The system can include beginning a data exchange session to confirm or validate the recipient of the data, a request then can be transmitted having a certain protocol to a software module like a PassKit, browser, or other agent for managing the process. Data can be retrieved from a secure data location, encrypted, and then sent to a server for re-encryption based on a recipient ID such that a one-time token can be used to send the data to the recipient. This works for any data beyond just payment data. There may be various ways of providing encryption or security when using the underlying APIs disclosed herein. In Apple Pay, a merchant ID, payment processing certificate, merchant identity certificate, and a registration of the domain with the network based entity, are all utilized in the process of securely transmitting data. These concepts can be extended to apply to any entity that will receive any type of data through a single-use token or encrypted response. A bank, doctor, attorney, government entity, accountant, merchant, etc. could each register with a service, obtain the proper ID's and certificates which would be relevant to the respective entity, and then perform an entity validation process, create sessions that can be timed out for transmitting data, and upon confirmation, could send a data request to an agent as disclosed herein and ultimately receive a token that can be decrypted or sent to a data processor for decryption to obtain the secure data. The agent APIs disclosed herein (which operate for browsers and software module or agents for use with apps) enable the entire process to transmit secure information of any type between any two types of devices, including nodes, routers, client devices, servers, cameras, etc.

Other data such as a video file, audio file, pictures, or any kind of data could be transmitted as well. For example, a user could request that a photo or a video of them stored on their phone be encrypted into their secure element or retrieved from the device for encryption and deliverance, such that it could be requested and sent securely using this process. An app or a process built into an operating system on a device could enable a user to dynamically add data of any type to their secure element which could then be indexed or cataloged such that a requesting entity could obtain authorization through an authorization sheet for the transmission of the data to the receiving entity using the overall encryption process. An app or a site could perform a check that the device of the user contains the proper data (health care data, photo, etc.) and if so, could present a processing button such as "send Mary's Health Data" which, when clicked, causes a session to be initiated to generate a request to the agent and receive a response with the data, also utilizing an authorization sheet for the user to use biometrics to approve of the transmission. The "canmakepayment" type of query can also identify particular data in a secure element, such as a photo, health data, etc. prior to presenting the selection button. The query can be something like a "cansendXdata" in which the protocol allows "X" to mean health care data, a photo, a video, or any class or type of data. The agent can confirm to the site or app that the software module is properly configured with the programming to utilize the application programming interface protocol and that the requested type of data is available in the secure element or elsewhere on the device or stored locally or on a network and is available. Then the site or app can present the "buy button" or offering button for the user to confirm the data requested. The API can also be used to provide information identifying the data in the secure element to the site as well via an identifier, such as "home photo 0012 available in SE (secure element)". The software module could send information via the API about what data is stored in the secured element or available for transmission using the secure process. The protocol could generically present that one or more of payment data, a photo, a video, a document, healthcare data, a body model, and so forth are available at the client device for transmission to the site/app. The site/app can then determine what kinds of buttons to present for authorization. Combined buttons could be used too, such as "send healthcare record and pay $5". The single use token could combine different types of data efficiently for decryption and processing. The user interface could present users with options on which data to send securely, such that the user can select payment data, plus a picture, plus their health records, and combine the chosen data in a single secure encrypted data package that is sent.

The user might have searched a site or similar sites for vehicles, clothing or toys, etc. The browser can store and compile that information such that when you land on a site, aspects of the historical data can be authorized by the user to be transmitted to the site. Accordingly, if a user has searched sites for a particular vehicle, with particular characteristics such as a year, mileage range, price range, and so forth, when the user lands on a different site, the approach disclosed herein provides a mechanism of data being communicated via an API to the new site such that it perhaps can pre-populate or modify its presentation to the user to focus the experience on similar types of vehicles, for example, or similar types of toys. Users in this scenario should more quickly be able to research and find products that are similar to what they have previously researched. Where an interface might be presented to the user, when the user lands on the site, the user can also indicate that they are looking for a similar vehicle with a look for on cars.com, or they can indicate that they do not want this data communicated to the site. Thus, users can become familiar with the process and recognize the level to which a site might be tailored for their own personal use and can choose whether to have an un-modified site or modified site in a particular way.

In one example, assume a user has searched for an old used truck and a new sports car. These two search histories can be stored at a location, such as the browser, a network-based storage location, or the device. The user lands on cars.com to do some additional research. An interface can be presented, as managed by the browser, which can ask whether the user wants the truck search data or the sports car search data communicated to the site. The user might want to continue with looking for the sports car. The user can then simply select that option, and the search defaults on cars.com might be pre-populated or preconfigured for newer vehicles and sporty vehicles. Of course any product or product history example can be incorporated into this process. In this scenario, the user can then begin their navigation of the site as though the user had entered in search terms such as a year range, a manufacturer, a price range, or any other type of search data on the site. The site can be landed on by the user in a more advanced state that normally would occur in which the user simply went to www.merchant.com and started to navigate from scratch. Sites can also include their default mode in which no data is retrieved and the user must navigate from a beginning point.

Continuing with the example, the sites may request from the browser, a body model and color preferences associated with the user who is just landed on the site. An interface can be presented as part of this initial interaction in which the user authorizes the communication of this personal information to the site. This can be similar to an Apple Pay authorization, or any other type of authorization. Assume in this example, that the browser response to the request by transmitting a body model identifying the user, which can include facial characteristics, as well as optional other types of data such as favorite colors, or data associated with purchasing histories. Any combination of data can be retrieved and prepared for deliverance to the site.

In the payment scenario, a one-time token is used by the site to process a single payment. Similar types of security can be implemented into this "other data" the can be transmitted to the site. For example, the user would not likely want their body model maintained or stored on the site. In this regard, a tokenized version of the body model might be delivered to the site for a single session of the user with the site. In one scenario, a virtualized instance of the site might be generated which utilizes the personal information to personalize the site for the user's interactions. Thus, the user would no longer see a choice of S, M, L, XL shirts but would merely see the option to choose a shirt for John or Mary. The user knew would no longer see an option to buy shoes with a requirement to select a shoe size, amongst ten different sizes. Again, one issue with buying clothes online is that one manufacturers 9.5 male shoe size will differ from another manufacturers 9.5 male show size. By transmitting body model data associated with the user, the site can process that body model data, and convert or compare the body model data to its clothing sizes, and make a determination of the closest or best fit size for the user. Where the body model might not perfectly fit, the site can offer "John large" or "John small" sizes, which can give a hint as to whether the clothing would feel larger or smaller, given their size is. The site can run an algorithm, which can compare data within the body model with their sizes of clothing which can also be modeled. The personal data transmitted to the site of course would include the user's name, emoticons, icons, or any other data that might be incorporated or blended into the user's experience with the site.

In one scenario, information is simply used to modify the site for that user and then the information is discarded after the user makes a purchase or leaves the site. However, where this requires the user to trust the site not to store the personal information, an alternate approach can include one-time use tokenized personalized data which is eliminated or destroyed and which cannot be maintained by the site. For example, the model might have a timing element in which is only usable for ½ hour. If the user is still navigating the site, the model may be enabled for another ½ hour. In another aspect, if the user were navigating the site in the normal manner, the user would be providing a shoe size or shirt size in any event, and thus sharing of such size information may not be worrisome to users.

Where the site is modified, however, for the particular user, the concept of spawning a virtualized version of the site that is modified to provide user names and specific user sizes of products can be implemented. In this scenario, the user interacts with the virtualized site personalized for them and upon leaving the site, the virtualized instance of the site can be deleted. Thus, this scenario include several optional components, such as merely passing body size or other personal information through an API at the beginning of interaction with the site, which causes the sites to be modified according to the personal data such that the site no longer presents size information associated with clothing purchases. Other data that can be eliminated from the site can be color choices as well as some product choices based on the personal information that is passed.

In the payment aspect, this approach can enhance the payment experience. This can primarily be due to the fact that a biometric authorization, or other authorization is provided at the beginning of the process and can be applied across multiple purchases. In this scenario, a fingerprint, for example, has already been recently retrieved from the device and their or can be applied to multiple purchases at different times. This approach can also help in utilizing shopping carts where items can be placed in shopping carts or a shopping cart and a one click purchase, can occur in which the final purchasing and payment process can be essentially preauthorized by the fingerprint or biometric authorization that was provided when the user landed on the site. Thus, imagine a user landing on a www.merchant.com site, and the site requests and receives through an application programming interface that is configured to communicate personal data between the site and the browser, and wherein the user authorizes the communication of data from the browser to the site via a variety of mechanisms including fingerprint or facial recognition.

The user then can then navigate the site to a product 1920, such as a book or a hat, and see a one click purchasing option 1916. The user can click on that buy button to make the purchase 1916. Because the fingerprint authorization has already been provided and maintained, a payment token, or other payment data, or PayPal-like approach can be implemented for making the purchase without the need of a fingerprint authorization at that time. The end result can be a finished purchase 1918 without the need for a separate fingerprint authorization for each purchase on the site. This approach adds a timing element to maintaining a fingerprint authorization to be associated with a session at a site. It is contemplated that if the user navigates to a new site, that the fingerprint authorization would be canceled for the earlier site. If the fingerprint authorization is maintained, the user can browse to a first product, and make a purchase by clicking a buy button without the need of providing a biometric authentication. Items can be placed in a shopping cart and purchased via one or two clicks but all being associated with the same authorization action. By staying on the same site, the user could then purchase a second product by clicking on the buy button, again without needing to provide biometric authorization. In this regard, where multiple purchases are made on a single site, this approach can improve the purchasing experience.

In one aspect, as the user lands on a site, an interface managed by the browser could be presented in which preselected or negotiated sets of data can be transmitted to the site and authorized. For example, a window could be presented (much like a payment request API or Apple Pay window), in which the user can see the body model for them as well as a body model for their wife and color preferences are being communicated to the site as well as a pre-authentication for purchases. Thus, the user can authenticate and authorize the communication of that data and understand that there bio metrics authorization will apply to later purchases on the site.

In another aspect, social media data and/or machine learning data can be utilized to strategically identify what data should be communicated to the site via the API. For example, if it is your wife's birthday, or child's birthday, or a mother's birthday, and so forth, the system may utilize the API or another API that is communicating with a network-based server, or social media site that stores such data to retrieve additional body models, or additional personalized information for specific people in your social group. A manual approach could also be presented in such an interface as one lands on the site in which the user could choose from a contact list for personalized information of friends or family. A social networking site like Facebook could hold such personal information and share that information with friends for the purpose of enabling sites to be modified and personalized for a user. Thus, the site may receive body model data for the user browsing the site, their best friend Mary and their dad Doug. This may be an automatic selection of a group of individuals or might be manual. As the user navigates the site for products, the site could present options to purchase the dress for Mary or the book for Doug and/or Mary. The site might present a pair of jeans with options for the user to buy the pair for Mary or for Doug. The site could present a graphical representation of how individuals would look in the clothing as well. The names presented for selection might be the most probable names of who you are shopping for which can be based on characteristics or data such as the type of site (women's clothes or men's clothes), social media data, calendar data (friend's wedding in two weeks), and so forth. In one example, the user might also be presented with an option to see size options as well on the site.

Body models of families or friends could be retrieved and also stored on a browser or accessed from a network-based source via an API or some other mechanism. Of course, individuals may store a body model on a social networking site, or other site and authorize their friends or family to access the body model, in certain circumstances, such as whether they are purchasing clothing for the individual.

Where gifts might desire be desired to be surprises, the system can enable the user to authorize sharing the body model body model for their friends or family in general and understand or acknowledge that they may not receive a notice of the sharing of the body model as long as it is with someone authorized by the user.

The browser in this scenario essentially acts as an agent between the site, the user, and the user's personal information, as well as family or friends personal information which can include a network-based communication component like the Payment Handler API does for payment services. The site receives the body model data and converts it into their own sizes and then presents clothing by name to the user for a more personalized shopping experience.

In another aspect, the site may transfer some data associated with a product back through the API to the browser. A virtual reality engine, or an augmented reality engine on the device can receive the data associated with the product, and utilize that data to create a virtual reality or augmented reality experience. In the clothing example, the user might be able to access the selfie camera on a mobile device and go into a selfie mode and actually look at themselves utilizing the selfie camera and have the clothing that they are shopping for presented in an augmented reality scenario on them. The user can then see how they might look in the cloths using their own phone, to get a sense of what they would look like in the cloths they are interested in buying. Of course is can apply to jewelry, furniture, or any other item that can be presented visually. You could also see a graphic showing how the individual would look on the clothing or sitting on the furniture. The body model can also be used to show you the furniture might look with the specific user sitting on it or how much a bed might adjust when you lie down on it.

In this regard, there can be extra coordination between the site and the device utilizing the following steps. For example, the site can include a button selectable to view the clothing on the person in selfie mode. If the user were to click on that button, the site could pass information about the particular clothing item through the API to the browser. The browser can initiate a selfie augmented reality module, which could automatically coordinate the received clothing data from the site with the visual data about the user in connection with starting the camera function on the device and placing it automatically in selfie mode. Thus, by a single click on the site by the user, the user can essentially instantly be placed in their camera application in selfie mode where they can view themselves wearing the clothing to get a sense of how it might look. The system can also incorporate a buy button into that interface such that if the user desires to make the purchase after viewing the clothing in their selfie mode, a single click can affirm that they want to purchase the clothing item (or other item). Or the user can add the cloths to a shopping cart.

In such a scenario, where the user is essentially in a camera application on the device, the camera application can identify that the user has confirmed that they would like to purchase the clothing item, and the camera application can communicate with the browser that confirmation. The browser can then communicate the confirmation of the purchase via the API to the site which, in this scenario, has already received the biometric preauthorization for purchases. In other words, the system can coordinate between the browser, the site, and the camera app to enable in each and easy purchasing process after the user views clothing on them in a selfie augmented reality mode.

FIG. 19C further illustrates the use of this API. In this example, assume a browser 1930 is directed to a site.com 1912. Features 1936 represent the user navigating to the site and the site communicating data back to the browser. This communication would occur through the defined syntax of the API. For example, the site may request a confirmation that the browser can communicate personalized data to the site for modifying the site interface. Feature 1938 represents an example where the browser is incompatible or does not have the API functionality. In order to tailor the site for the user. In that case, the site simply communicates in a default mode with the browser 1930.

Feature 1940 and 1944 represent a scenario where the browser is programs to implement the API and is compatible such that data can be sent to the site 1912 for tailoring the site for the user. Feature 1944 represents the browser 1930, reaching out, a requesting data from a network-based database. 1932 which can provide additional data about the user, user's friends or family, or other data which can be communicated through the API to the sites 1912. The gathered data from the browser and/or the network-based site is transmitted to the site 1912 and then transmitted to the new site 1914. The mechanism by which the new site is implemented in which the user is transitioned to the new site 1914 can vary. For example, the original site. 1914 may simply have some graphical and functional elements modified as HTML, data is communicated to the browser 1930. In another aspect, a new site is initiated and the user is transitioned to the new site seamlessly such that the user interacts with the new site, or the new instance of the site. In any event, the site is personalized for the user, as described herein.

When the user decides to make a purchase, the browser payment API can be utilized as well such as the payment request can be transmitted from the sites 1914 to the browser 1930. The browser 1930 can optionally request a payment from a payment service 1934 which can provide payment data or confirmation back to the browser 1930. The browser 1930 can provide data to the upgraded site 1914.

As can be appreciated, there is a timing element with respect to the biometric or other authorization in the above scenario. The biometric authorization can be received at a first time when the user lands on a site. The biometric authorization can be like a preauthorization of a purchase or an authorization to communicate personalized data to the site for modifying the site in a personal way. Then, at a later time after the first time, the user may click on a buy button on the site. It is preferable that it is part of a same session of the user navigating on the site. When the user clicks on the buy button, the previous biometric authorization is applied, such that payment data can be either received by the site for processing or a network-based payment entity can process a payment as though the user had provided the proper authorization at the time of clicking the payment button. Thus, where tokens are used, the same tokenized one use package can be delivered via the API to the site at the time of the user clicking the purchase button, a worthy authorization or biometric indication of the user occurred prior to the user clicking the purchase button.

The profile data can be any kind of personal preferences or data. For example, if the user does not have a Kindle device, such data might be communicated to the site via the API. Kindle options, then, would not likely be presented to the user for selection. The user might prefer hardback books, rather than paperback books. All such preferences can be communicated via the API to the site as the user lands on the site such that modification or tailoring of the site can be made for that user. Using these procedures, less non-relevant options will be presented to users and the user's experience online will be greatly enhanced and less cluttered. This can also include payment choices. For example, at this time, the user could communicate or the browser could communicate that the user only uses Apple pay or Google pay. Only these options can be then presented to the user when a purchasing moment is arrived at when navigating the site. Body models, color choices, size choices, payment options, or any other data, for the user, for friends or family, and so for the user can be communicated to the site via a browser application programming interface, at a timing associated with when the user lands on the site and typically prior to a purchasing decision. The user can then interact with the site and a much more efficient and tailored way.

FIG. 19 D illustrates an example method embodiment. The method can be practiced by the browser or device operating the browser, a network-based entity, or the merchant site. The method includes receiving, at a site and from a browser, a request to access the site (1950), establishing via an API defined between the site and the browser that the browser has personalized data for a user, which can be used to modify the site (1952), modifying a configuration of the site according to the personalized data received via the API to yield a new site (1954) interacting with the browser utilizing the new site (1956) and managing a payment process for product sold from the new site, based on an authorization provided by the user when the user landed on the site (1958).

The pre-authorization of purchases on the site or use a personal data on the site can be limited in time for security purposes. For example, if the user lands on a site and walks away from their computer, having provided authorization for making purchases on a site, the user would not want a second person to jump on the site and make purchases without their knowledge. Machine learning algorithms can be trained to identify user activity, particularly after authorizing communication of personal data to a site and pre-authorizing purchases. A re-authorization might need to occur, after a timeout period, or a trigger based on user interaction, motion detection, facial recognition, and so forth which can identify a risk that a user currently interacting with the site is not the original user that landed on the site and provided the authorization. The data sent to the site via the API can be encrypted, tokenized, parameterized, anonymized, and so forth such that a personalized version of the site can be spun up as a new site and used to interact with the user, after which the new site can be deleted or decommissioned. The site would not store your personal information but it would be one-time use. The tokenized payment data may be sent at the end after a user is checking out of using a shopping cart or interacting with a buy button even though the authorization was provided in terms of timing when the user landed on the site.

In one aspect, as the user lands on the site, a dialog can be initiated to determine which personal information is to be communicated to the site. The construction of the dialog can be based on machine learning or intelligence gathered about the user, life events upcoming for the user, past events (i.e., a death in the family), or other data which can be used to configure a request for a certain set of personalized information that is both relevant to the products or services offered by the site and relevant to the user's current situation. The interface can include a listing of likely body models, anonymizing options (don't send real names but send nicknames or labels like mom or data), and so forth of people that might be relevant to you that you will shop for. An option can be presented as well to just use the default site. All this can operate to enhance the personal experience with any site in particularly for sites where users have to choose a size or color or style of product or service. In one aspect, for example, if the user requests that the site receives a male body model, just for the user, the site might eliminate or render less prominent children's clothing, women's clothing, or other content that is less relevant to the personalized data that was transmitted to the site. This can also include a payment option in which the user selects a payment mechanism, as they land on the site which can then cause the site to only simply present a buy button without payment options throughout inasmuch as Google Pay or Apple Pay or PayPal are requested and a preauthorization is provided at the beginning.

Using Two Apis to Manage a Payment Process

Figure 18D:
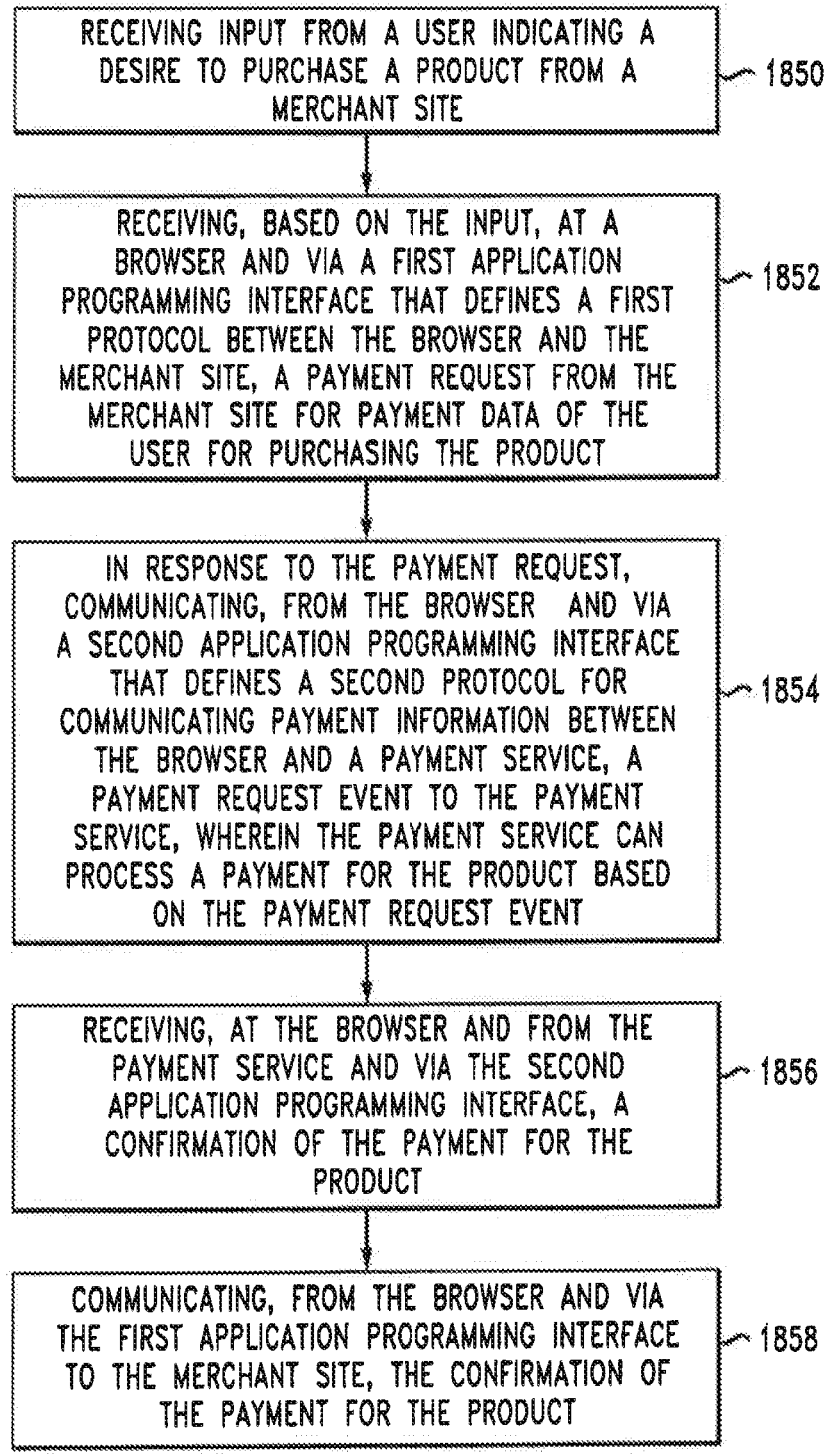
FIG. 18D illustrates another embodiment of using two APIs for managing a payment process from the standpoint of the browser.

Another aspect disclosed herein relates to the coordination between a first API 1818 and a second API 1812, both of which interface with a browser 1806 in a correlated way to manage a payment process. The approach enables purchasing on a site 1816 to be more like an Amazon.com "one-click" purchasing experience when the user is not registered and does not have an account at the site 1816. In some cases, a user can have a Paypal account but they still must login to that account to make a payment. The coordination of the APIs 1812, 1818 and the browser 1806 acting as an agent between the site 1816 and the payment provider 1810 can simplify the purchasing process. A method in this regard is shown in FIG. 18D and includes receiving input from a user indicating a desire to purchase a product from a merchant site 1816 (1850). The input can be a click, voice input as part of a dialog, virtual reality input, or any kind of input. The method includes receiving, based on the input, at a browser 1806 and via a first application programming interface 1818 that defines a first protocol between the browser 1806 and the merchant site 1816, a payment request from the merchant site for payment data of the user for purchasing the product (1852).

In response to the payment request, the method includes communicating, from the browser 1806 and via a second application programming interface 1812 that defines a second protocol for communicating payment information between the browser 1806 and a payment service 1810, a payment request event to the payment service 1810, wherein the payment service 1810 can process a payment for the product based on the payment request event (1854). The method includes receiving, at the browser 1806 and from the payment service 1810 and via the second application programming interface 1812, a confirmation of the payment for the product (1856) and communicating, from the browser 1806 and via the first application programming interface 1818 to the merchant site 1816, the confirmation of the payment for the product (1858). The payment service 1810 can be a service like Paypal, a Google payment service or any other payment service or payment processor. The approach enables a common interface between the merchant 1816 and a payment service 1810 utilizing the browser 1806 and several APIs 1812, 1818 in a new manner to simplify the purchasing process for users that are signed up for such a service or utilize such as service.

The first application programming interface 1818 can define the first protocol for communicating at least one of payment data and address data between the browser 1806 and the merchant site 1816. The second application programming interface 1812 can include the second protocol for communicating data associated with payment of the product between the browser 1806 and the payment service

1810. The payment request further can include a request for an address of the user and/or for other data associated with the user or associated with the purchase. Thus, the payment could be performed by the payment service provider 1810 and the address could be provided by the browser through the first API 1818.

The method can further include, based on the payment request, transmitting from the browser 1806 and through the first application programming interface 1818, the address of the user 1808 to the merchant site 1816 for use in delivering the product to the user. The first application programming interface 1818 can include a browser payment request application programming interface in that it involves a request from the merchant site 1816 for payment data and/or other data associated with the user. The second application programming interface 1812 can be called a payment handler application programming interface in that it more specifically involves payment handling by the payment processor 1810. This aspect of the disclosure can also have embodiments from the standpoint of the merchant as well as from the standpoint of the payment processor.

Figure 18E:
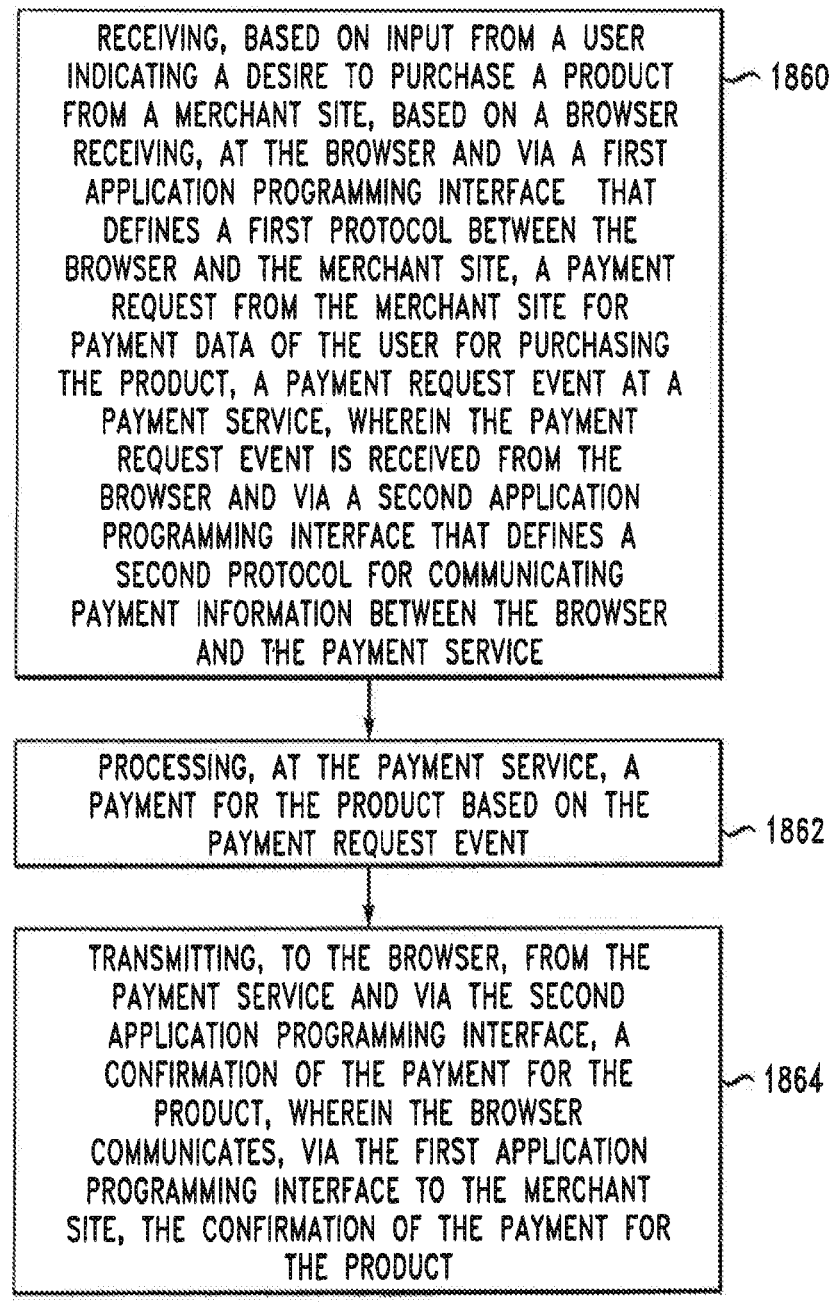
FIG. 18E illustrates another embodiment of using two APIs for managing a payment process from the standpoint of the payment processor.

FIG. 18E illustrates this aspect of the disclosure from the standpoint of the payment processor 1810. A method includes receiving, based on input from a user indicating a desire to purchase a product from a merchant site 1816 and based on a browser 1806 receiving, at the browser 1806 and via a first application programming interface 1818 that defines a first protocol between the browser 1806 and the merchant site 1816, a payment request from the merchant site 1816 for payment data 1808 of the user for purchasing the product, a payment request event at a payment service 1810, wherein the payment request event is received from the browser 1806 and via a second application programming interface 1812 that defines a second protocol for communicating payment information between the browser 1806 and the payment service 1810 (1860), processing, at the payment service 1810, a payment for the product based on the payment request event (1862) and transmitting, to the browser 1806, from the payment service 1810 and via the second application programming interface 1812, a confirmation of the payment for the product, wherein the browser 1806 communicates, via the first application programming interface 1818 to the merchant site 1816, the confirmation of the payment for the product (1864). In this approach, the merchant is not using their own payment processor 1820 as would occur if the merchant 1816 were receiving payment account data or a token for processing the purchase. Since the purchase is being performed by the payment service 1810, the merchant 1816 needs that confirmation that the purchase is complete. The payment service can utilize stored payment data 1814 and/or an account of the user. Thus, payment services like Stripe, Google.com, BrainTree, Amazon.com, Paypal, etc. can be represented by payment services 1810. Because the user can be logged into their browser, or a Google account (email, youtube, etc.), the user's credentials can be utilized to login to any specific account that is used for payment without the user manually entering in their account data.

Figure 18F:
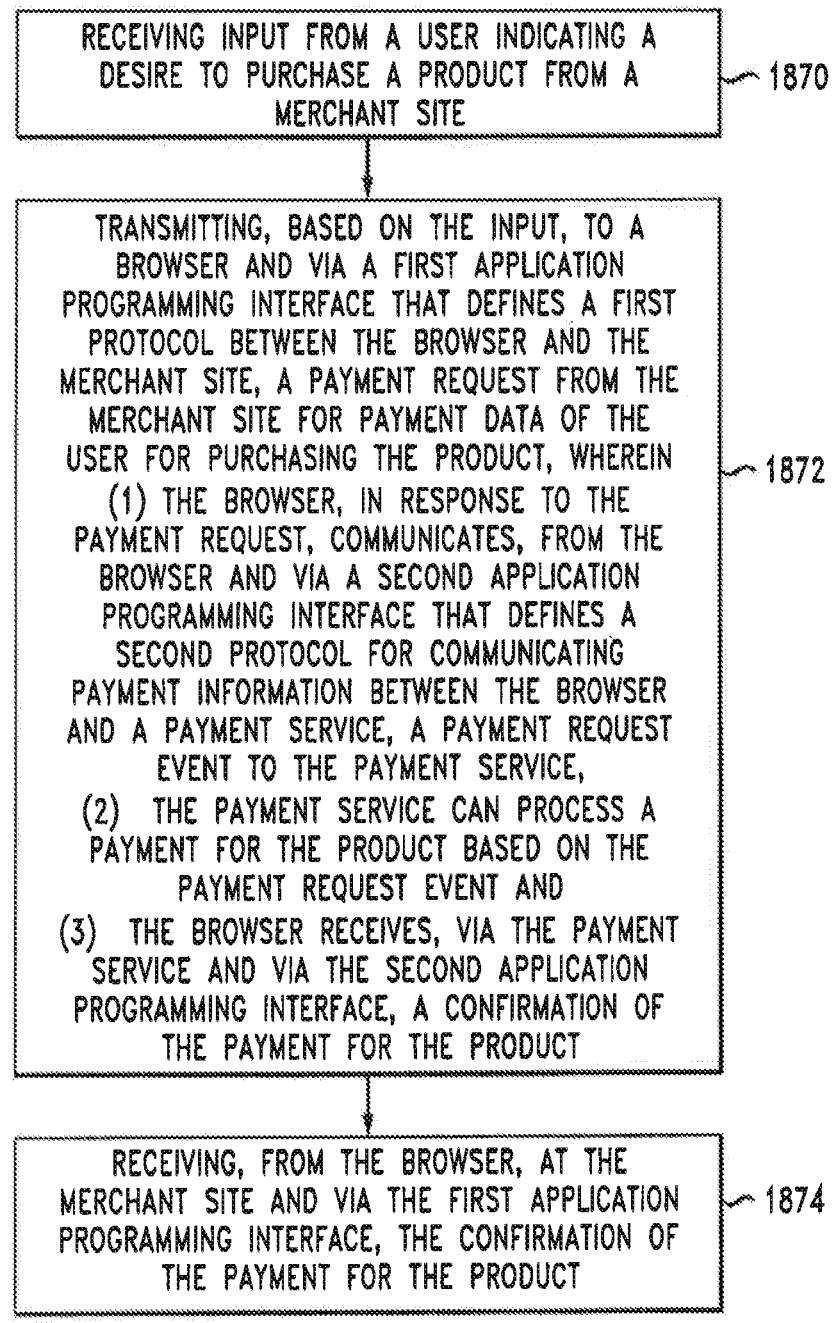
FIG. 18F illustrates another embodiment of using two APIs for managing a payment process from the standpoint of the merchant site.

A method performed from the standpoint of the merchant site is shown in FIG. 18F. The method includes receiving input from a user indicating a desire to purchase a product from a merchant site 1816 (1870) and transmitting, based on the input, to a browser 1806 and via a first application programming interface 1818 that defines a first protocol between the browser 1806 and the merchant site 1816, a payment request from the merchant site 1816 for payment data of the user for purchasing the product (1872), wherein (1) the browser 1806, in response to the payment request, communicates, from the browser 1806 and via a second application programming interface 1812 that defines a second protocol for communicating payment information between the browser 1806 and a payment service 1810, a payment request event to the payment service 1810, (2) the payment service 1810 can process a payment for the product based on the payment request event and (3) the browser 1806 receives, via the payment service 1810 and via the second application programming interface 1812, a confirmation of the payment for the product. The method includes receiving, from the browser 1806, at the merchant site 1816 and via the first application programming interface 1818, the confirmation of the payment for the product (1874).

Any communication amongst the browser, a payment service, and the merchant site using the various APIs disclosed can be part of this disclosure to achieve a one-click type purchasing experience by the user at the merchant site. 1816.

Additional concepts regarding a payment processor processing a payment to a site are discussed next. In one aspect, a method includes receiving, at a browser and via a browser payment request application programming interface that defines a first protocol for communicating information about purchases between a site and the browser, a payment request having data associated with a purchase of a product from the site for a user and, based on the payment request, transmitting, from the browser and via a browser payment handler application programming interface that defines a second protocol for communicating data between the browser and a payment service, a request to process a payment for the product to the payment service. The method according to this aspect can include receiving, at the browser and via the browser payment handler application programming interface, a confirmation, from the payment service, that the payment service has processed the payment for the product to the site.

The method can further include transmitting the confirmation received from the payment service from the browser and via the payment request application programming interface to the site. The method can further include transmitting, from the browser and via the payment request application programming interface, address information for the user to the site for delivering the product to the user.

A method from a viewpoint of a payment processor perspective can include, based on a payment request received at a browser and via a browser payment request application programming interface that defines a first protocol for communicating information about purchases between a site and the browser, the payment request having data associated with a purchase of a product from the site for a user, receiving, from the browser, at a payment service and via a browser payment handler application programming interface that defines a second protocol for communicating data between the browser and the payment service, a request to process a payment for the product and transmitting, to the browser and via the browser payment handler application programming interface, a confirmation, from the payment service, that the payment service has processed the payment for the product to the site.

From the site context, an example method can include transmitting, from a site, to a browser and via a browser payment request application programming interface that defines a first protocol for communicating information about purchases between the site and the browser, a payment request having data associated with a purchase of a product from the site for a user and receiving a payment for the product from a payment service, wherein the payment is received based on the browser transmitting, based on the payment request, from the browser and via a browser payment handler application programming interface that defines a second protocol for communicating data between the browser and the payment service, a request to process the payment for the product to the payment service. The method can also include receiving, from the browser and via the browser payment request application programming interface, a confirmation, initiated from the payment service, that the payment service has processed the payment for the product to the site. The method can also include receiving, from the browser and via the payment request application programming interface, address information for the user at the site for delivering the product to the user.

In an app context, the device 1804 will have an application downloaded and which is programmed to make calls to an API that is configured within a module that controls a user interface 1806. For example, the user interface 1806 might be used to view the app or to view data for the purpose of managing a payment process. Therefore, rather than being between the merchant site 1816 and the browser, the API is configured between an app on the device and a module that is configured to control a user interface 1806. When a user clicks on a buy button in the app, the app transmits a request to the module configured to control the user interface 1806, which then manages the payment process as shown in FIG. 18A. For example, the module configured to control the user interface 1806 could retrieve data from a storage location 1808 on the device, could communicate data from the module configured to control the user interface 1806 according to an API 1812 to a network-based payment service 1810, which can return authorized payment data to the application via the module configured to control the user interface 1806.

The provisional application No. 61/972,879, filed Mar. 31, 2014, explains that product searches can be from websites or applications downloaded on devices. Thus, the "site" 1816 shown in FIG. 18A can also be an application on the device 1804, and the basic operation of the various APIs for obtaining, encrypting, generating, and/or transmitting authorized payment data also apply in an app context.

Multiple Payment Options

Figure 18G:
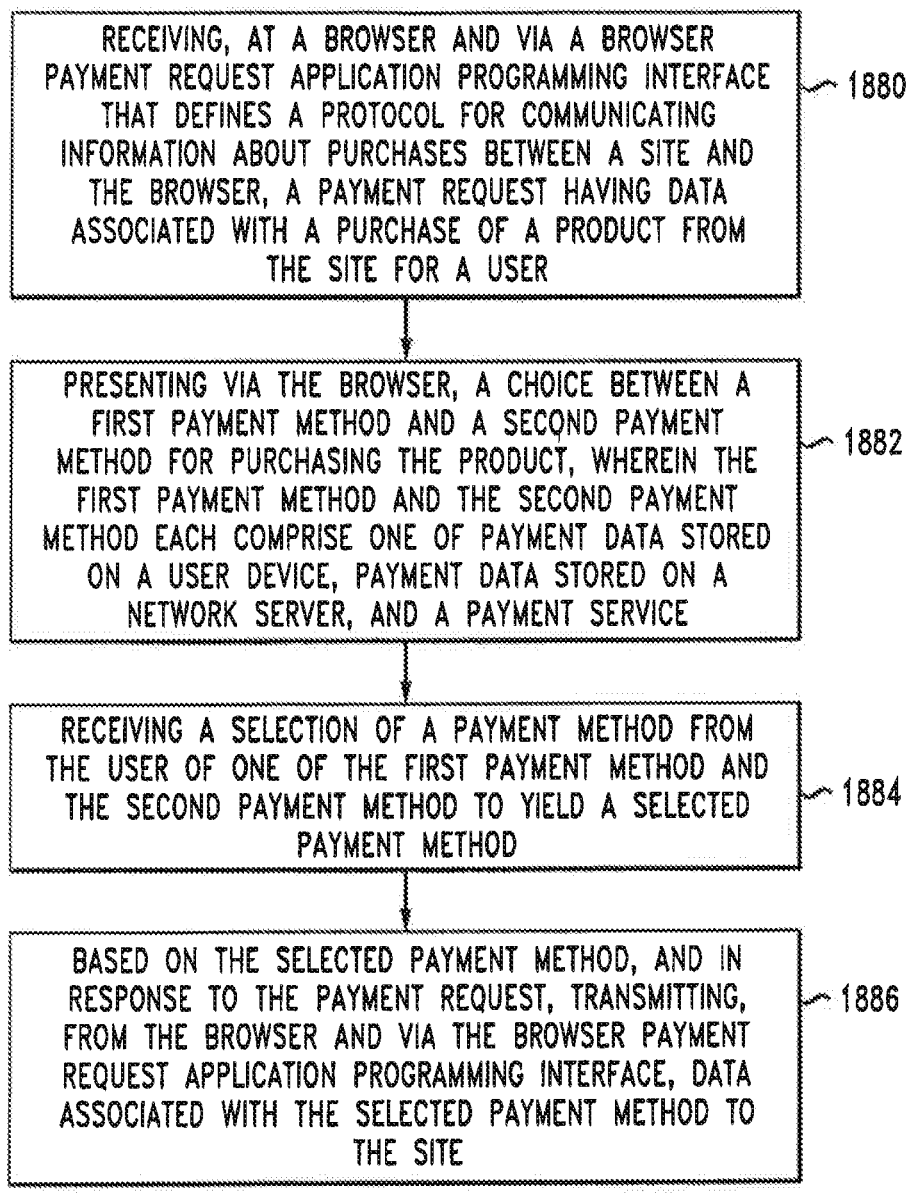
FIG. 18G illustrates another method embodiment for multiple payment method choices.

FIG. 18G discloses another aspect of this disclosure related to providing a choice of payment methods. The method includes, in this aspect, receiving, at a browser and via a browser payment request application programming interface that defines a protocol for communicating information about purchases between a site and the browser, a payment request having data associated with a purchase of a product from the site for a user (1880), presenting via the browser or a browser interface, a choice between a first payment method and a second payment method for purchasing the product, wherein the first payment method and the second payment method each include or require one of payment data stored on a user device, payment data stored on a network server, and a payment service (1882), receiving a selection of a payment method from the user of one of the first payment method and the second payment method to yield a selected payment method (1884) and, based on the selected payment method, and in response to the payment request, transmitting, from the browser and via the browser payment request application programming interface, data associated with the selected payment method to the site (1886).

The method can include, when the selected payment method includes the payment service, the steps of, based on the payment request and the selected payment method, transmitting, from the browser and via a browser payment handler application programming interface that defines a second protocol for communicating data between the browser and a payment service, a request to process a payment for the product to the payment service and receiving, at the browser and via the browser payment handler application programming interface, a confirmation, from the payment service, that the payment service has processed the payment for the product such that the site gets paid.

The method can also include transmitting the confirmation (or other data) received from the payment service from the browser and via the payment request application programming interface to the site. The method can also include, when the selected payment method includes the payment data stored on the user device, performing the step, based on the payment request and the selected payment method, transmitting, from the browser and via the browser payment request application programming interface, responsive data to the site, the responsive data being based on the payment data stored on the user device.

The responsive data can include a token generated based on the payment data stored on the user device, the token being usable to process a purchase of the product by the site. The site can process the payment for the product using the payment data. When the selected payment method includes the payment data stored on the network server, the method can further include, based on the payment request and the selected payment method, transmitting, from the browser and via the browser payment request application programming interface, the payment data stored on the network server to the site. The payment data can be communicated through one or more APIs associated with the browser to the site for processing.

The method can also include transmitting, from the browser and via the payment request application programming interface, address information (or any other information) for the user to the site for delivering the product to the user. In one aspect, the other information could include a clothing size, show size, shirt size, pant size, etc. such that user could simply shop for the shoes they want and buy them. There would be no need to even choose the size even their own size. The shoes would just come in their proper size in that the user's size is passed through the API.

This concept of multiple payment options from the standpoint of the site can include transmitting, to a browser and via a browser payment request application programming interface that defines a protocol for communicating information about purchases between a site and the browser, a payment request having data associated with a purchase of a product from the site for a user, presenting via a browser interface, a choice between a first payment method and a second payment method for purchasing the product, wherein the first payment method and the second payment method each include or require one (or more of) of payment data stored on a user device, payment data stored on a network server, and a payment service, receiving a selection of a payment method from the user of one of the first payment method and the second payment method to yield a selected payment method and, based on the selected payment method, and in response to the payment request, receiving, from the browser and via the browser payment request application programming interface, data associated with the selected payment method to the site.

The data associated with the selected payment method can include one of payment data for the site to process a payment to purchase the product or a confirmation that the payment to purchase the product was performed by a payment service.

From the standpoint of the payment processor, the method can include the following concepts. Based on (1) a payment request received at a browser and via a browser payment request application programming interface that defines a first protocol for communicating information about purchases between a site and the browser, the payment request having data associated with a purchase of a product from the site for a user, and based on (2) a user selection of a payment method from a plurality of payment methods presented via a user device, the payment method requiring a payment processor to process the purchase of the product, the method can include receiving, from the browser, at the payment service and via a browser payment handler application programming interface that defines a second protocol for communicating data between the browser and the payment service, a request to process the payment for the product, processing the payment for the product by the payment service to yield a payment confirmation and transmitting, from the payment service to the browser and via the browser payment handler application programming interface, the payment confirmation.

The browser can transmit the payment confirmation (or related data) to the site via the browser payment request application programming interface. In another variation of this concept form the view of the browser, the method can include receiving, in connection with a purchase of a product, a payment request at a browser and via a browser payment request application programming interface which defines a protocol for communicating data between a merchant site and the browser for managing payments, presenting, via a user interface, a first payment method and a second payment method, receiving a selection via the user interface of the first payment method or the second payment method to yield a chosen payment method and transmitting payment information, in response to the payment request, from the browser and via the browser payment request application programming interface, the payment information being associated with the chosen payment method.

The payment information can include payment data for use by the merchant site for processing a purchase. The payment information can include a confirmation that the payment has been processed by a payment processor.

The method can further include communicating, from the browser and via a browser payment handler application programming interface which defines a protocol for communicating data between the browser and the payment processor, information to the payment processor for processing the payment. The method can also include receiving confirmation information at the browser and via the browser payment handler application programming interface, the confirmation information confirming that the payment processor has successfully made a payment for the product to the merchant site.

Credential Management API

Figure 18H:
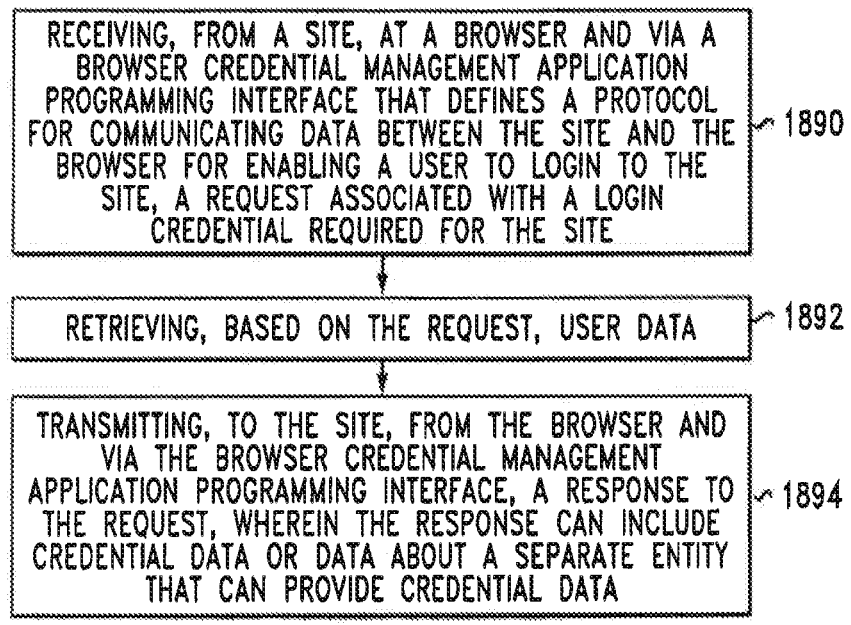
FIG. 18H illustrates a credential management API embodiment.

Next is disclosed an example application programming interface or interfaces for communicating login credentials, such as name and/or password, for a site. FIG. 18H illustrates this example from the standpoint of the browser 1806. A method includes receiving, from a site 1816, at a browser 1806 and via a browser credential management application programming interface 1818 that defines a protocol for communicating data between the site 1816 and the browser 1806 for enabling a user 1802 to login to the site 1816, a request associated with a login credential required for the site (1890), retrieving, based on the request, user data 1808/1814 (1892) and transmitting, to the site 1816, from the browser 1806 and via the browser credential management application programming interface 1818, a response to the request (1894). An example API is disclosed as API 1818 in FIG. 18A. Retrieving the user data can include the browser 1806, retrieving the data from a local storage 1808 or retrieving the user data 1814 using API 1812 between the browser 1806 and a network-based server 1810. The user data could include various accounts or methods of providing user credentials. For example, one method could be to use a username and password stored with the browser or accessible by the browser 1806. Another method could be a credential service, separate account, or network device that could be accessed by the browser 1806 or the site 1816. The user could be presented with an option (visual interface, spoken interface or interaction, text, multi-modal interface, etc.) to choose which approach to use for login. With the chosen approach, the API 1818 could be used to pass credential data from the browser 1806 to the site 1816 or from a network device 1810 to the site 1816, according to the chosen method and according to an API 1818 or any standardized protocol. Such a site 1810 could be an identity provider that will authorize the user and that the site can trust to be correct. Such providers could be, for example, Google, Facebook, or any other entity. The interface could also provide a choice amongst different users as well. The communicated data could be a token or tokens for security or the username and/or password directly.

The purpose of the browser credential management API 1818 is to enable a site 1816 to easily retrieve login credentials such as one or more of a username, a password, a code, or any other data. The authentication of the user could also be performed in connection with receiving bio metrics, such as a fingerprint. The site 1816 communicates through API 1818 for the purpose of retrieving the login credentials. The process of communicating requests and responses and/or other data via the API 1818 can include any combination or coordination between API 1818 as it communicates with the browser 1806 or a network server 1810 as well as any communication between a network server 1810 and the browser 1806 via API 1812. In practice, these APIs will generally involve protocols for the site 1816 to request data, transmit data and receive data in certain formats ultimately for receiving login credentials for a user to log into the site 1816. The site 1816 will use the credentials and/or tokens it receives in its login flow to enable the user to login in with one or a few clicks (or not clicks if it is automatic), thus relieving the user of the need to type in a username, a password, or any other credentials. The site 1816, for example, may authenticate the user on the site or via a call to another server. All of such details associated with such protocols are considered within the scope of this disclosure.

The response can include at least one of a user name and a password, or other data such as an iris scan, a fingerprint, a code, or any combination of such data. At least one of the username and the password, or other data, is stored with the browser, in one aspect. The data could also be stored in a network node. The response can indicate that a network-based entity will provide credential data for logging into the site. In this regard, the site can access, via a second application programming interface between the site and a network based entity, the credential data for the user to login to the site. API 1818 shown in FIG. 18A can represent the API between the site. 1816 and a network server 1810, which stores the user data 1814. API 1812 could also be used, to retrieve login credentials by the browser 1806 and from a network entity 1810. Any combination or coordination of communication of data and information between API 1818, browser 1806, API 1812 and a network entity 1810 is contemplated is within the scope of this disclosure. For example, the site eighteen sixteen may request through API 1818 login credentials, via the browser 1806. However, the user may have a network service 1810 that stores the login credentials 1814. Accordingly, in response to the request, the sites 1816 may be directed to a network credential provider 1810 through an API. 1818 to retrieve the user data 1814.

In one aspect, the method includes receiving a change in a user credential via the browser credential management application programming interface. In this scenario, the user may be seeking to login to the site 1816, and may provide a changed password or updated credentials. The API 1818 can be utilized to transmit the updated login credentials to the browser 1806 for storage and later use. One or more of API 1818 and/or API 1812 could also be used to communicate updated login credentials to a network entity 1810.

The credential management API 1818 could also be viewed from the processing occurring on the sites 1816. In this aspect, a method includes transmitting, from a site 1816, to a browser 1806 and via a browser credential management application programming interface 1818 that defines a protocol for communicating data between the site 1816 and the browser 1806 for enabling a user to login to the site, a request associated with a login credential required for the site and receiving, at the site 1816, from the browser 1806 and via the browser credential management application programming interface 1818, a response to the request.

The response can indicate that a network-based entity 1810 will provide credential data for logging into the site. The method can further include requesting, via a second application programming interface 1818 between the site 1816 and a network based entity 1810, the credential data for the user to login to the site. The secondary API could also include API 1812, which operates and communicates requests and responses, or other data between the browser 1806 and the network entity 1810. The method can include transmitting a change in a user credential via the browser credential management application programming interface.

The response can include at least one of a username, password, and/or other credential data which can be utilized by the site 1816 to apply to a login procedure on the site 1816 to login the user 1802 to the site 1816.

Vehicle/Internet of Things Applications

In another aspect, the browser payment request application programming interface can apply to a vehicle interface. A vehicle can have computer components and a graphical interface (or voice interface) having the browser or interface functionality disclosed herein. For example, a user in a car driving through a drive-through at a restaurant could utilize a touch screen built into the car to handle a payment. Through a near field communication protocol, WiFi protocol, cellular protocol, or any other wireless protocol, the vehicle could communicate with the restaurant and exchange information about a payment, payment capabilities of the restaurant and/or the vehicle, an amount, items ordered, and so forth. The person could order and say the amount of the meal is $15. The user, rather than getting out a wallet, or getting out their mobile device, could interact with a touch screen built into the vehicle to see the items ordered, and a summary of the purchase amount, and confirm the purchase via the user interface. A fingerprint reader could be built into the user interface, or built into a steering wheel or any other easily accessible device within the vehicle, including the user's mobile device, which could be used to confirm the purchase. An interface could be presented to the user, in one aspect, to input the CVV code on the interface for security. Location based services or capabilities could be included to make the process work. One aspect involves providing the entire purchasing process in a manner which does not require the user to pull out or use their mobile device. In another aspect, the payment process utilizes a combination of the computing device of the vehicle and the user's mobile device.

The process could also occur just via the user's mobile device. In this respect, an interactive application or site could follow the user as they enter the range of a Wi-Fi signal for a restaurant or store and start a communication interface which enables easier selection, purchasing and payment. For example, as a family arrives at a restaurant and in range of the Wi-Fi network, and interface could be presented on a mobile device which welcomes into the restaurant and asks how many are in their party. The family could enter three adults and two children into the user interface and be given a timing of when they could be seated. It could even include an opportunity for them to choose seating, such as a booth. Information about the name of the family and other data could be communicated through an API between the browser and the restaurant or the site. The family could be told that there booth would be ready in ten minutes. I the site could provide a media presentation which is tailored for the wait time for that family or of course the family could drive around and come back in ten minutes. The notification of the availability of their booth could be provided via the application. Menus could also be provided during this time, via the mobile device, or user interface or at a predetermined time prior to availability. Machine learning and artificial intelligence could be used for scheduling and managing the predicted availability times. As a family goes into the restaurant and system at their table, location based data could indicate that they are at the booth and a menu could be provided to the user interface. The family could order right via the interface and an estimated time of delivery of their food to the booth could be provided. Following the delivery of the food, the interface could be presented with the option to pay and include any other components, such as a dessert menu, the option to leave a tip, and so forth. The browser API could be utilized between the restaurant site and the browser to handle the payment. Location-based services could be used, to indicate if a mobile device that ordered a meal is leaving the restaurant without having paid. Even at a later date, the user could authorize a payment for the meal. As the mobile device is identified, a call could be made to the user to remind them to authorize a payment. In this scenario, using the payment request API, a user to go to a restaurant or any store or any establishment and be able to purchase goods or services or food via interaction with their mobile device, and without the need to even bring a credit card or cash to make the purchase. In the above scenario, included in this description would be any requests, medications, data, video, images, and so forth would be exchanged between a browser on the mobile device and a site associated with the merchant in order to achieve the ability of selecting items for purchase, retrieving those items, and making a payment through their mobile device.

In yet another aspect, the computing device built into the vehicle could communicate with a user's mobile device, as noted above. For example, the mobile device, through a wireless interface such as BlueTooth, could coordinate browser information and API's with a browser or interface loaded on the computing device of the vehicle, such that the user could interact with the computing device of the vehicle utilizing payment data, login data, user data, or any other data that is on the mobile device. Thus, between an entity such as a restaurant, or a tollbooth, or parking garage, or any entity that requires a payment from a vehicle, the communication and exchange of information, authorization, payment data, or confirmation of a payment, can occur between the entity and a vehicle in the same manner as disclosed herein between a merchant site and a user device having a browser. Other data could be communicated as well, such as in a scenario where a user is going to a shoe store, or a clothing store, or any other type of store, and data could be communicated such as clothing size, shoe size, hat size, clothing or body models, or any other data could be communicated via an API to help streamline the service provided by the entity.

In one scenario of a vehicle application, assume a family is going to a restaurant for dinner. They want to dine in the restaurant. The use of the browser API for enabling them to order and make a purchase can be as follows. The family or vehicle comes within WiFi range for, for example, Panera Bread, or a location-based geo fencing or other application enables the Panera system to know that they are in the parking lot, approaching the restaurant, or is turned "on" in some sense. The idea is to enable an order and purchase without even using a mobile device or in connection with a mobile device. The system (computing device) in the car (this could also be done exclusively with a mobile device as well) will establish the connection which will provide an exchange of information. For example, identification information such as pictures of family members, vehicle description, payment data (payment method accepted by Panera and payment methods available for the user), speech recognition grammars or other speech enabling data, and so forth. Assume in one sense that as the family drives into the parking lot, and before or after the necessary information is exchanged, and perhaps based on the proper exchange of the information, a branded sound is provided in the vehicle. The sound can be for Panera Bread, or can be a generic sound, or an image can be presented on a display. In another aspect, no notice is provided. A person in the vehicle could then say "Panera, we'd like to order." The users could engage in a dialog (spoken or written, graffiti, or any combination thereof) to order their food.

A screen in the vehicle could present options, show text of a dialog exchange, show images of food that can be purchased, and so forth. The vehicle has a "browser" or interface installed on its computing device which acts as the browser disclosed herein. Once the ordering and exchange of data is complete, the entity (Panera bread), can ask if the user is ready to pay. The user can say "yes" and using the browser API between Panera Bread and the browser, and utilizing any of the payment mechanisms disclosed herein, including the secondary API between the browser and a payment service, the payment is processed. The user's system could include images of the family or the vehicle could include a camera used to take a picture of everyone in the car (say a camera by the rear view mirror). The system could ask details like how many in the party and do you need an infant seat. Social media data could be provided such as birthday information. The payment processing would occur as disclosed herein. The family could then just go sit down and the image of the family, names, descriptions, number of people, and so forth could be provided to the restaurant. A worker at the restaurant could then utilize the image to find the family with the food. The restaurant could even say "your order has been paid for, please go to booth 23 on the left as you enter." The system could place families in specific places for bringing the food and for coordinating where they sit. Any special needs to be communicated as well, such as user preferences and desires. As the waiter brings the food to the family's booth, he can say "Welcome Jones Family, and happy birthday to Jenny! Here is your dinner." The food has been paid for, and in one aspect, the users never needed to even utilize their mobile device. In another aspect, all of this processing could be done on a mobile device. The system could also handle a backlog, such that the user could order, pay and be told that they should come back in 25 minutes as their food will be ready and a table will be available.

Where numerous restaurants are in one close area, a WiFi service, or other service, could enable the family to choose from different restaurants served by one parking lot. Different speech grammars could be provided and implemented based on which restaurant is chosen. The system could provide the family with an order number or a password which could also be used to identify them. Perhaps in coordination with their mobile device a number could be presented such that they only need to put their mobile device on the table with the number for waiter ID.

A similar approach could work for the drive through such that car identification information is provided to a restaurant such that workers can see the car, know what the order is, and simply hand it to the user as they drive to the window. There would be no need for the user to hand a credit card over or to pay cash at the window or with a worker with a mobile device. As noted above, a fingerprint reader in the car, which can be provided at any location within the car for any driver or passenger to use, can be implemented for secure purchasing.

Through electronic means, the car could also know that a mobile device from a different family is in the car too. If two couples are going out to dinner and they want to each pay for their respective meals, or any item is to be paid for by a group of people, then the system can handle the option of having two people pay and disambiguation dialogs can occur, coordinating of any kind between mobile devices and a vehicle system can occur such that the proper parties pay for their portion and the users all go in for a meal or an item.

The approach could work for any business where the user may be driving to the business, and engage in a dialog to order and pay for an item. A worker could then be notified of the purchase and the user could go to, say, Walmart and have a worker bring the item to their car (location based data could help) or at a particular pick up location. Or the user could go and find the item and have a worker be able to scan a bar code on a mobile device or have image recognition such that the user can just walk out the door with the item.

As can be appreciated, the browser API can apply in any device and any Internet of Things scenario. For example, a refrigerator could be equipped with a browser or an interface that can communicate with a merchant to order and pay for groceries via a single click and utilize the browser API or combination of API's. A shelf containing stock items, and alarm clock, the utility interface for electricity, water, or gas, or any other kind of device can be equipped to function as disclosed herein in order to achieve a payment to an entity without the user being registered are providing their payment information to that entity. For example, any object, such as an IT device such as a router, switch, server, storage device, could apply a payment approach as disclosed herein. Other examples include environmental monitors, public security vehicles, point-of-sale terminals, vending machines, signs, lights, planes, tollbooths, pumps, valves, conveyors, pipelines, motors, drives, assembly and packing equipment, vessels, surgical equipment, pumps, telemedicine devices, implants, digital cameras, power systems, the readers, washers and dryers, various meters, TVs, MP3 devices, game consoles, turbines, windmills, batteries, generators, fuel cells, drills, HVAC systems, and so forth. Any such device or devices can utilize the browser/user interface payment request API and its associated technologies for handling purchasing information as disclosed herein.

Additional Features Provided Through a Browser API Interface

Using the browser API interface (i.e., the W3C.org payment request API, incorporated herein by reference) is very helpful and efficient in terms of handling payments in a common interface across the Internet. It is revolutionary. In other areas, buy buttons are very common now in social media, Facebook, etc. because they are being presented where people are and where they spend time. Now, with the browser API, the issue is not bringing a buy button to where people are, but what to do in connection with the browser API interface which simplifies the payment process. Now, people all over the web will be using a common interface to buy products and services. The W3C standard payment request API is being implemented by Microsoft, Google, Mozilla, Samsung, Safari (proprietary version), and so forth. This disclosure covers other functionality that makes accessing other services more efficient.

For example, the payment interface can be supplemented with an interactable object such as a button, drop-down menu or hyperlink which, when interacted with, can present to the user their listing of purchases made and the respective processing for each item. This would be similar to the account information presented to users in Amazon.com which lists the status of all their purchases via Amazon.com. In this scenario, the purchases can be reported to a central agent for purchase across different sites, not just amazon. It can include amazon.com as well. Thus, within the browser API interface, a user can see a "manage purchases" object or the like. The user could select an agent within a selection field of their browser. For example, different agents can offer services that can be integrated into the browser API such that standardized calls and responses can be provided. Or the user could hyperlink to receive information from the account/purchases management agent which would integrate with the payment interface and enable the user to gain access into their product purchase history and status in an efficient manner.

Thus, a user interface can be presented which might appear to be at the standard merchant.com website, but is within the browser API, which provides access to user account purchasing history and information. This enables an aggregation of purchases across multiple sites to be managed much more easily. The "account" can encompass all purchases across the Internet for that user or a group of linked users in a family or other linking. Users will demand easy access to all of their purchases as they become more comfortable with using common purchasing techniques such as our becoming available to the browser API. Thus, since users will demand access to control, review, and further management of their purchases, they will desire and demand such easy accessibility.

Merchant sites may provide calls to the browser API to enable such functionality if they desire. For example, a parameter could be set which, when the user goes through a purchasing process, the merchants could turn on or turn off the presentation in the browser API interface of the intractable object which enables access to the user account. Thus, merchants may be able to simplify their purchasing process by not providing such access. Merchants, of course, could also include authorization for the browser API to be able to communicate the basic data associated with the purchase to a service which can store and add the purchased item 2 the purchasing history which can be accessible through such an intractable object. Thus, the browser API, not only can become an agent which connects a payment process, with the user, and a merchant, but also could become the agent to communicate the purchasing data to a service or system which will receive all such purchases, combine them together, into one full account history which can be accessible across many different platforms by the user. In one example, a separate "app" could be provided on a mobile device which simply taps into and accesses such a server and provides the ability of the user to manage all of their purchases. For example, such an "app" or service could pull in all of Amazon.com purchases, as well as purchases across the Internet which are reported to the service, and provide all of the functionality and control that is currently only available either on Amazon.com, or with individual merchant-.com websites.

Additionally, from the state of interacting with the browser API interface, the system knows who the user is, his or her payment information, and information about products purchased. Thus, from this interface, and from any state along the process, the system could advertise, upsell, suggest alternate products, offer discounts, offer additional services, offer warranties, etc. Furthermore, from this interface, social networking opportunities could be presented. Thus, users could be presented with a link to their Facebook page or Pinterest posting that relates to that product. A "deep link" to a social networking site in a particular relevant state could be made and enabled through data retrieved from the browser. For example, if a friend of the buyer purchased the same product the week before and posting something about it, the system could identify that information and present an object after the user completes the purchase on the payment interface which would transition the user to a social networking feed positioned with that friend's posting. For example, sometimes, a Facebook feed can have 10's or 100's of postings and it is hard to find a particular posting of a friend. A transition can be made from the browser API payment interface to a particular social network posting that is relevant to the purchase just made. The system can present a button on the interface before, during or after the purchase, that says "tweet this purchase" or "post this purchase on Facebook." This can occur in any social networking site or even in any other site, such as a merchant site. The particular functionality of any other site is incorporated herein and assumed as part of this disclosure, such as how Twitter works, Facebook, Facebook Messenger, Texting, emailing, Pinterest, Instagram, and so forth. In other words, the system can analyze one or more of the purchase, the user information, payment history, social media data around the buyer and friends/family for data related to the purchase, and so forth, and present a social media object (or any other transitioning object, such as a product purchased account object) at any stage along the payment process (before the payment, as the user initiates the process which leads to interaction through the browser API, after the payment, etc.). For example, the system could present an object which is configured to transition the user to Facebook Messenger in a state as though the user had selected their friend who bought the product last week to send a message. The object could indicate that by pressing this button, the user will be transitioned to Facebook Messenger with John who will receive a message, and it will be ready for you to type.

Further, the object presented could be configured to be a posting on a social networking site. For example, a user who has a Facebook account could authorize an object on the payment interface which can utilize the information about the purchase (item, size, number, description, etc.) and can prepare a posting on their Facebook timeline about the purchase. Thus, by interacting with the object, the system can configure and prepare a posting for Facebook preconfigured with a picture of the product, description, and even a buy button for the posting for followers of the user to perhaps buy. This is a new kind of advertisement in which a user, by purchasing a product, can post an advertisement. The user could even insert his or her own comment. Thus, by clicking on the object, the user could be presented with a posting showing details about the product, an opportunity to type in some text about the purchase "I just got this GoPro version 10—very excited" and have the system transmit the posting to their followers with a buy option included. This would be different because it is a personal posting from a user and not necessarily from a merchant. However, companies like Shopify or Bigcommerce could also provide backend processing services to enable the process. The posting person could even get a discount for posting the purchase. The notice of the discount could come at any stage of the purchasing process. For example, when making the purchase, the merchant could give a 5% discount if the user clicks on the social media button and causes a buyable posting to be transmitted through their social network from them. Inventory tracking can insure that the option to purchase or the purchasing process opportunity is only presented when additional items are in stock (the user just bought an item). If there are no more items, the posting can go through with information about when the product will be restocked.

This process is essentially a non-merchant posting on a social networking site but with a merchant component. It is powerful because people will see that it is a personal posting and not a merchant posting, but it will still be configured for a buyable interaction. It is noted that this kind of posting or object which leads to this kind of posting can also occur outside of the payment request API interface but could work on any site, such as amazon.com or any merchant site using any payment mechanism. At some point the user logs in and the system has enough information to be able to transition to a social networking site for a configured posting. Relationships can be developed between merchants and private posters on a social media site such that at the backend process connects a private posting with the buyable option processing used by many merchants now.

In this regard, the posting from the personal user can be in a sense "co-branded" between the user and the merchant. The presentation can include graphics that couple perhaps the user's profile picture and the logo of the merchant. The process could work where if a user is going to post a buyable posting personally, then the system can dynamically, or in advance, generate a cobranding image that accompanies the posting such that the recipients of the posting can recognize not only that the item is a canon camera, or a product from Macy's, but is also personally posted by their friend and not a business posting. This approach can enhance the trust the recipient can have in making a purchase based on that posting.

The purchase interface could also include an option to transition to something like Facebook Messenger. The user may be in the process of making the purchase and have a question, the messenger can enable an interaction with the merchant about the product. The user may want to confirm that it has a 2 year warranty or is 4 wheel drive, or any question. The system could transition the final purchasing to be done within the messenger application or transition back to the API interface to confirm the purchase. The API could include the appropriate calls and functionality to make such transitions to and/or from the interface. This process of course can incorporate any application for interfacing with the merchant, not just the Facebook Messenger Application.

Other options are available for enabling people to post privately through social networks for products and get deals, discounts, points, credits, a free product, etc. For example, a social network user may see an advertisement for a product such as a cannon 7D camera, posted by amazon.com or canon.com. Currently, there are shop now or buy now buttons or other buttons associated with actions. The proposal is to add another button in which the user could post that product on his or her own with the same structure. In this case, the posting becomes personalized, the user could add comments, or a picture of themselves (perhaps with the product that they bought, or video) and post. What changes is that the posting is through their own social network but it can retain the buy now option such that users can be transitioned to make a purchase of that product. It is a more personal posting because it is from a friend and not a company. The user could get such a posting after they've purchased a product too. So assume the user bought a canon 7D camera. They could see a canon 7D camera posting with a choosable option to repost for $10 off their next purchase. The posting could be configured in their newsfeed as being prepared and configured for them to repost. For example, it may not say "buy this camera" but it may say "Friends, I just bought this camera and love it—Amazon is offering it to you at a discount". Thus, when the user reposts the posting, it is from them, to their followers, and somewhat personalized already. This would make it easy for users to share product and have the posting configured for easy purchase. The purchase could be processed by the social networking site, a separate payment processor, the merchant site, through Apple Pay or Android pay, or through a browser/user interface payment request API, or through Amazon.com or a traditional payment approach. The buyers in this scenario could also get a structured discount such as one discount if they buy it from their friends posting, or if they buy and post it themselves on their social network(s), they can get an additional discount. The additional discount could be credited to their payment account if they post on their social network after the purchase. A "retargeting" approach could also be included in which the buyer may not re post the purchase or the item on their social network(s) at the time they make their purchase, but the system could be programmed to post an opportunity for that user, a day, a week, or some intelligent time later, giving them the opportunity for a refund of $5 or a coupon or discount, or miles, or some other benefit, if they post that they bought this item last week and love it.

The benefit in this example is that once a user buys a product, there is a period of time that the user tests or experiments with the purchased product. A user can then post on a social network their feelings about the product, such as how much they love the camera, or vacuum, for example, and suggest that their friends buy it. The system could obtain some kind of network based feedback on usage of the product, which could trigger the reposting. For example, the user may buy an iphone 7 and the system can determine that after the user has taken 50 pictures they should pick several for a personalized posting. The posting can include a buy option, and personal comments in addition to the picture of the product and the user.

Another aspect of the above concept is how to handle deep link transitions. For example, if John gets an amazon.com posting for a product, he can click on a shop now or buy now (or similar label) to explore and/or shop. In some cases, since the posting is known to John, if he clicks on an object, the system can transition him to a deep link within amazon.com where he is automatically logged in, his payment and delivery information is already stored, and he could one-click purchase right after the transition or with very few clicks make the purchase. The "state" of amazon.com is a deep link associated with the user and the product for an ease of purchase. Accessing data from the browser to enable the deep-link one-click purchasing state may be utilized, such as accessing a one-click purchasing parameter.

Referring back to the personal product posting, there may need to be additional transfer or sharing of information as John may repost a product posting such that his 100 followers see the posting and can also make a purchase. The system will track each recipient such that any recipient who clicks on buy now will also be transitioned to a deep link in amazon.com and in a state in which they are logged in and can one-click or with a few clicks make a purchase without the need of entering manually payment information or delivery information. APIs can be established between social networking sites, merchant sites, the browser, payment processors, and/or any other entity for the purpose of handling the transition and back end processing to achieve the results and processes described above.

In one aspect, the opportunity and concepts include transitioning between social networking structures. For example, a user may get a Facebook advertisement in their newsfeed and want to repost that in their Pinterest account as a buyable pin. The system also can translate postings from one format to another, while retaining the buyable configuration. If a transition from one payment structure to another is needed, that transition can occur as well. For example, an amazon.com posting may be transitioned from a deep link processing for payment to a browser API payment or an Android payment approach as the user reposts the merchant posting as their own on Facebook, Pinterest, Instagram, Twitter, or if they transition from one type of social network to another. User preferences may also be changed and drive what kinds of transitions occur. If amazon.com already has the user payment and address information stored, the transition may still require accessing data in the browser such as a one-click purchasing parameter set.

Another example transition from the browser API payment interface could be a "continue shopping" button or object that could bring the user to a shopping state back in the site. The user could be taken to a new search field as though no searches were done or the user could transition to a partial search that would have been part way along to the final state of the product that they purchased.

The browser API could also be enhanced to provide additional functionality such as the option to buy 2 or more of the product with automatic adjustment of pricing, parameter changes (color or size, volume, etc), and so forth.

The additional functionality can also be independent of the basic purchasing process for which the browser API was developed. A merchant site and/or the browser, user, or other entity can initiate this additional functionality through a call to the API. For example, if the browser API is modified to include the additional feature of connecting the user with their payment history and a management mechanism, and the merchant site would like to provide that functionality on the browser API interface, a parameter can be set, or a call can be made in connection with the other communication with the browser which turns on the purchase history management component. If that feature is turned on, then the browser can interact via another API or other mechanism with a service that stores the payment history across the web for that user and responds with the information and management capability. The browser API can help to format that information and present on the browser API interface, and intractable button, hyperlink, or drop-down menu which, when interacted with by the user, will present the purchase history for review and/or action by the user. The system may also transition to the user, if that feature is selected, to a separate site for managing purchases. The benefit of this approach is that it provides additional functionality for the user at an interface which is going to be standardized across Internet purchases. It reduces the "business value chain" by providing access the services in a manner that requires less clicks or less interactions by the user in that the initiation of access to the respective service can be made right through the browser API, which is an interface that many people will use.

In one aspect, a merchant could provide a report of the kinds of services that it offers. This might be similar in a sense to a merchant providing a list of payment mechanisms that are authorized, such as Visa, Discover, and MasterCard. The browser API, which has access to the user payment mechanism, responds with a match such that the payment can proceed. In this additional context, a merchant could provide a listing of alternate services which are available to be performed through the browser API interface. For example, the merchant may provide the purchase history management access, Facebook posting access, Pinterest access, and a FaceTime access where a personal friend of the user has made a similar purchase. In a user profile, the user can also select the alternate types of services they would or might want to access to the browser API interface. Thus, if the user desires access to their purchase history and is a member of Facebook, through the APIs, it is determined that the browser API interface should present one object for Facebook and another object for the purchase history.

Then, if the user interacts with the Facebook object, the system could perform a number of different functions. The system could simply transfer the user to Facebook and their general newsfeed. The system could generate a preview of a posting on the user's timeline which is connected to and configured for the particular purchase. Options may also be presented such as to confirm such a posting, to accept a 5% discount if the posting can be presented with a shopping button or a buyable button, and so forth. These parameters can be distributed through the API with other data as well that might be connected to the alternate service as necessary.

For example, one object could be presented in the interface which indicates that the user's best friend bought the same hat and would they like to talk about it. The button could initiate a call, FaceTime, Skype interaction, and email, text, and so forth. Any type of communication could be initiated based on the capabilities of the two parties, past history, and so forth. Thus, in one aspect, the browser API is expanded beyond providing communication between the browser and a merchant merely for the purpose of rendering a payment process more simple and uniform. The browser API can be expanded to also be an agent for any other kind of service or information. In the payment process, certain pieces of information are known such as the cost, the product, the user, addresses, email addresses, and so forth.

Any additional service or capability that can draw upon that data can be leveraged through the browser API to add that additional functionality and capability at that point or estate in which the user is. Accordingly, by adding this new functionality which may or may not be directly related to the purchase, the ability of the user to transition to or access these additional services, without needing to leave the merchant site and go to an additional or separate site, to provide a Facebook posting, for example, the user can access and achieve this additional functionality with a minimal number of interactions.

The types of options that may be presented through the browser API interface may also vary depending upon the state of the interaction. Other words, there are different states throughout the process, although the process is brief. There is a state which presents the payment and purchase summary prior to final confirmation. There's a state following the final confirmation, and so forth. Different services can be presented depending on the state of the interaction. If the state is prior to a final confirmation of a purchase, then an object could be presented which offers a summary of comments, or ratings, or information about the product that may be available from a third party service site. This can provide the user with additional information about the product that may not be gained through just the merchant site. Following the purchase, entities might offer warrantees, service plans, options for additional purchases, and so forth which may or may not be affiliated with the merchant. The merchant may coordinate and authorize such additional activities through the API interface. For example, the merchant may set or transmit a parameter which indicates that authorized warranty offering companies can be allowed to present an opportunity for warranty through the browser API interface. In this manner, the merchant can control the level of such additional functionality through the interface.

In some cases, the browser API interface may even add additional pages or interactions depending upon the function that is being performed. Accordingly, beyond merely adding an object which is selectable, depending on the function, the browser API may present an additional interface or more interfaces which enables the user to make additional selections and to achieve or perform the function that is being provided. This functionality can be presented as though it were part of the interface, as though it were part of the merchant site, or can clearly initiate a transition from the merchant site to another environment such as a social networking page, site, application, and so forth. It is important in these contexts for the user to be comfortable with whom they are interacting. Thus, the browser API is presented as part of a payment process on the merchant site. This additional functionality can be presented also on the site, or separately.

Further, the browser API interface can be extended to include other functions. Users can install extensions to the interface, much like they install extensions to the browser. An Amazon Assistant could be installed which would be presented in the interface. Preprocessing could occur using the data obtained from the purchase through the Interface. For example, a user buys a pair of pants. The system knows the user's waist size and the style of pants. An Amazon Assistant could present a pre-populated input field with the term "belt" or "brown leather belt 34 waist" such that an accessory could easily be shopped for on Amazon.com. Other parameters could be set which will cause the search result to be tailored and match with the item just purchased. In one aspect, extensions added to a browser can be accessed through the browser API interface. In other words, the Amazon assistant that is installed on a browser could be accessed from the API interface rather than just the main browser interface.

An object could be presented on the API interface that enables a further search, such as a Google search or an eBay search. Parameters could also be set which narrow or filter search activities based on the purchase made through the API. For example, if the user just purchased an item, a Pinterest search field could be presented which is or is not prepopulated with a term which enables the user to transition from the API interface to Pinterest for searching and viewing accessories or similar items.

Virtual Reality

The browser or software module API can also be utilized in other contexts such as virtual reality. For example, if the user has an opportunity to shop for items, such as clothes, using virtual reality goggles or headsets, then the use of the browser API can be applicable. Modifications to the browser API protocols can be made to particularly provide for that context. For example, providing proper user identification for security purposes has been discussed above. Using fingerprint authorization or security codes to confirm that it is the proper user making the purchase. Virtual reality goggles can be positioned on a user's face. Elements can be built into the goggles to provide a different type of user identification. For example, rather than requiring the user to provide fingerprint authorization, the goggles may have built in a mechanism for scanning and iris of the user. The iris scan can match the user's identity and be mechanism for authorizing a purchase. A particular user gesture or movement can indicate a purchase confirmation. Furthermore, some virtual reality goggles will receive a mobile device for its screen. They provide a configuration such that the user can attach their mobile device, and then where the arrangements as goggles for a virtual reality experience. A mobile device could be configured with a fingerprint scanning component on its backside such that a user, while watching a virtual reality experience, and simply reach up and touch the fingerprint scanner to confirm a purchase. Typically, the fingers print scanner is on the front side of the mobile device for easy access by the user. However, when a mobile device is mounted in a goggle configuration, the fingerprint scanner will likely be on the inside of the goggles and not easily accessible by the user. In another aspect, a fingerprint scanner could be placed on the goggles such that either through Bluetooth, near field communication, a wired connection, or any other mechanism, the data from the fingerprint scan on the goggles can be communicated to the mobile device for further processing to authorize a purchase. A mobile device in this respect could have two fingerprint scanners—one on the front for normal use and one on the back for use for purchases made in a virtual reality headset.

Other aspects could also include the goggle configuration being able to identify a forehead shape, a nose shape, DNA data for the user, temperature data, movement patterns, speech, facial recognition, and so forth, to identify an individual for security purposes for a purchase or other reasons. For example, a particular blinking pattern may be established to confirm the identity of the user. These various approaches can confirm or replace a fingerprint or security code to confirm the purchase using the browser API. Using these approaches in a virtual reality context can reduce the number of clicks or interactions required by the user to accomplish a purchase in a virtual reality context. Thus, one aspect of this disclosure can include electronic coordination between goggles and a mobile device configured with the goggles to present a virtual out reality experience for user, in which the mobile device utilizes a browser API to accomplish simplified purchasing process as disclosed herein. Of course any headset for virtual reality can include a browser component which can incorporate the browser API whether it is part of a separable mobile device or a built in screen. In one example, using a VR Headset like the HTC Vibe can include the ability of a user to interact with in a virtual reality world as though they are in a store making a purchase. The interactions within the virtual environment can include trying on cloths or playing with a toy. The user can make the purchase within the virtual environment and the VR Headset and/or a coordinated computing device can process a payment made from the virtual world through the browser API. Sensors within the VR headset which sense head movements or gestures can translate that movement into a purchasing interaction which can lead to a purchase. Further, any coordination between a VR headset and another device such as a computer or gaming device can be utilized to complete purchases using the browser API. Thus, any step or any process can be divided between as VR headset and any other device to accomplish an improved approach to making purchases.

The issue is how to you incorporate the browser API into a virtual reality environment. With Apple Pay, you must use a fingerprint to confirm the purchase. Other methods may require a CVC code or voice authentication and so forth. For a fingerprint environment like Apple Pay, the solution is to receive a fingerprint when the user begins a virtual reality session. As the user mounts a mobile device into a headset or with a complete headset without a separable mobile device, the headset can include a fingerprint reader. By receiving the fingerprint in advance, the user can utilize the stored authentication while making a purchase in a virtual environment. The user could shop and virtually make a purchase, even using hand gestures or providing a fingerprint on a virtual fingerprint reader. When the indication is provided within the virtual environment that the purchase should be made, the headset or mobile device can access the fingerprint authorization provided at the beginning of the session and apply that authentication to complete the purchase. The user in the virtual environment can even truly use a one-click purchase to pay since they don't need to authorize the purchase using a fingerprint. The earlier fingerprint authorization that is recorded can be used for any virtual payment no matter how in the virtual reality environment the user indicates a desire to pay. For example, the environment might simulate the user giving cash to someone and buying an item, but in the background, the systems could process an Apple Pay, or Google Wallet or Android payment. In the virtual environment, any necessary authentication such as a CVC code, or speech, gesture or any other confirmation data can be provided virtually, or in advance of a VR session for use to make purchases. For example, the user may provide a CVC code before starting the session or may provide payment information, address information etc. for enabling the virtual reality environment to utilize the browser API for requesting and receiving payment data for processing a payment.

In one example, Apple pay, utilizes a browser API by correlating two devices. The user shopping a laptop computer that does not have a fingerprint authorization mechanism, the laptop communicates with an iPhone that includes a secure element which stores the payment information associated with the user, and which has a fingerprint authorization object. When the user makes purchase of the laptop computer, the user confirms the purchase via a fingerprint authorization on the separate mobile device. In a virtual reality scenario, a virtual reality headset, being worn by a user and through which the user is having a virtual reality experience, could include a browser (or similar agent software) configured to communicate requests and responses, or any other communication between a merchant and the browser via the browser API. When a purchase is to be made in the virtual environment, the headset could communicate wirelessly with a mobile device that has a fingerprint authorization mechanism. In this scenario, the virtual reality headset could also be configured, when that time comes to need the fingerprint authorization, to provide instructions orally, visually, or in any other manner, directing the user to the physical mobile device that the user needs to touch to provide the fingerprint authorization. This aspect could be included to provide a physical component to the virtual reality environment to enable the user to make the purchase securely.

Again, when using the browser API in the context of virtual reality purchases, the headset or other device used can act as the agent or browser. If a mobile device is used as part of the headset to create the VR environment, it can function as disclosed herein to provide a storage facility for payment and user data, and the browser (Mozilla, Chrome, Safari, Opera, etc.) can be configured to receive payment requests from a merchant and respond according to the protocol. If the headset does not use a removable mobile device, but is a self-contained system, it can be loaded with a browser or similar software that also is configured with the browser API and also can store in a similar fashion payment and user data (as well as any other data referenced herein). The functionality can be provided within the self contained headset, including a fingerprint reader or other biometric reader for user identification. Then, as the user engages in the virtual reality environment, if they go to a store, or purchase an item virtually, the system can treat that purchase as they would a purchase on a merchant site where a user clicks on a buy button. The user may virtually give a credit card, or virtually use Apple Pay, or virtually give cash at a point of sale in a virtual store. The user may virtually be at a computer making on on-line purchase. Any virtual situation in which a purchase is made can be applicable to the browser API made available in the headset. At some point in the virtual interaction, a confirmation will occur where money is exchanged or payment is confirmed, at this point, a site or entity representing the merchant or seller can initiate a payment request to the browser API associated with the headset and provide, according to the protocol, the available payment mechanisms for that entity, and receive payment data, address data, a one-time use token for processing a payment, and so forth as disclosed herein, through the browser API, for processing the purchase. In this scenario, a user, for example, could walk through a virtual mall and try on cloths, look at toys or books, and make purchases, and literally physical objects purchased in the virtual world can be purchased and shipped to the user's home.

Protocols associated with the browser API might be modified for a virtual environment. For example, a parameter might be set in a communication through the browser API from a merchant to the browser indicating that the merchant is a virtual merchant and that no buy button will be clicked on but a different type of trigger many initiate the process. A parameter may be set indicating that because the user is in a virtual environment, that a fingerprint authorization will be received and is stored when the user began using the virtual environment which will be accessed if the user makes a purchase during the virtual experience, to alleviate the need for a real-time fingerprint authorization, as normally happens with, say, Apple Pay, but which would not be convenient or possible in the virtual environment. Thus, a response from the headset as part of the browser API protocol might indicate that a fingerprint authorization is stored and current for use to make a purchase. Any parameters or information necessary or helpful to achieve an efficient use of the browser API in a virtual reality environment can be communicated through a modified version of the browser API for a virtual reality context.

This approach can also be used to further simplify the process with normal mobile devices. For example, the system could require the user to apply a fingerprint when they start their device and for a period of time that fingerprint could be accessed for Apple Pay or the like purchases. Normally, users have to click on an "Apple Pay" button and then provide a fingerprint authorization. But if the authorization has previously been made, that authorization can be applied in connection with the click on the apple pay button and remove the need to use the fingerprint after clicking on Apple Pay to complete the purchase. If the timing is set for say 30 minutes of use under a fingerprint authorization, the system could present a notice that the need to reauthorize is approach and that the user has say 5 minutes left to make a purchase without a fingerprint authorization.

The browser in a virtual reality environment could also include or have access to other data such as clothing size, shoe size and so forth, particularly if the user is cloths shopping in the virtual reality environment. That data can help drive what is presented to the user such that it fits the user's size or other preferences. All of the concepts above could also apply to app usage through a software module API communicating with an app.

Browser Download

Another aspect of this disclosure includes a server storing the necessary data to transmit or download a browser update, a software module, or a complete browser over a network to a client device. The process includes receiving or identifying a request to provide a browser or an updated browser, and downloading or transmitting the browser or browser update to the client device for installation on the client device. The browser that is downloaded includes the necessary functionality to receive and process payment requests through the payment request API. The process thus includes downloading the browser or browser update containing or configured with the payment request API capability. Once installed, sites can initiate payment request calls to the browser, which will carry out the process of communicating payment information through the payment request API for enabling the site to process a purchase without the need of the user entering in payment account information, delivery information, and so forth.

One method includes downloading data or code from a server to a client such that the data, when installed on the client, installs, or updates, a browser. The browser is configured, when activated, to perform operations including any of the functions disclosed in the application. The functions include operating the browser/user interface payment request API, or providing the communication between the browser and a second site for transitioning to the second site using a drop-down menu which is presented after user input is received and which, when an object is selected, transitions the user from a general input field to the second site preprocessed in a state where the user is transitioned to the second site with search results presented based on processing the user input as though it had been entered into a second input field at the second site.

Transitioning from a First Site to a Second Site

Figure 20A:
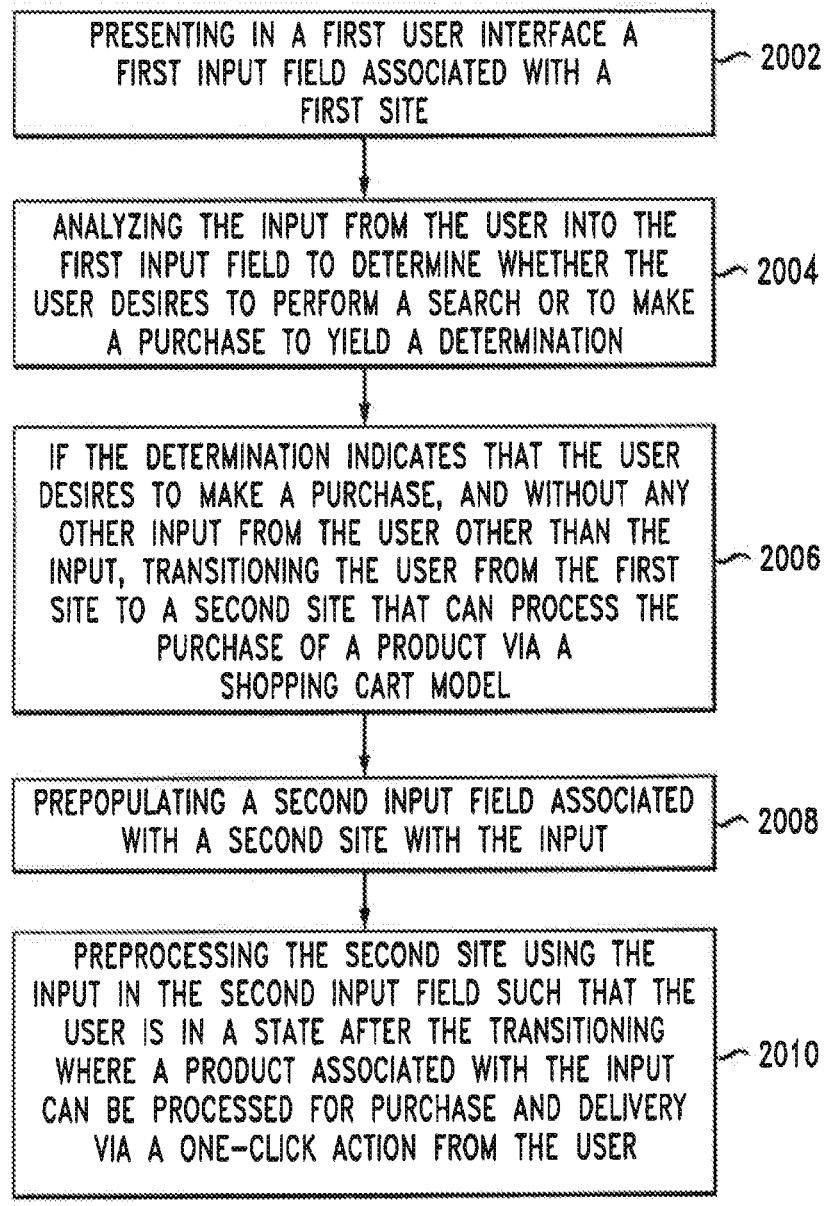
FIG. 20A illustrates an example method relating to pre-populating a merchant shopping cart.

FIG. 20A illustrates a method example for transitioning from one site to another site. The steps in the method example can be performed in any order, can be performed in other combinations or permutations that include additional steps or exclude all or part of some of the described steps. The system can present in a first user interface a first input field associated with a first website processed via a browser (2002), and analyze the input from the user into the first input field to determine whether the user desires to perform a search or to make a purchase to yield a determination (2004). If the determination indicates that the user desires to make a purchase, and without any other input from the user other than the input, the system can transition the user from the first website to a second website that can process the purchase of a product via a shopping cart model (2006). The system can prepopulate a second input field associated with a second website with the input (2008).

The system can preprocess the second website using the input in the second input field such that the user is in a state after the automatic transitioning where a product associated with the input can be processed for purchase and delivery via a one-click action from the user (2010). Preprocessing the second web site can include transmitting user data from one of the first web site and a browser to the second website, or automatically navigating through the shopping cart model of the second website to yield the state where the product can be processed for purchase and delivery via the one-click action. The system can further preprocess a third website using the input in a third input field such that the user is in a state after the automatic transitioning where a product associated with the input can be processed for purchase and delivery via a one-click action from the user, and present the third website as an option for the user to choose in the browser.

The preprocessing can be according to a user profile with various preferences. For example, in a user profile associated with the first website, or with a browser. The user profile can utilize information such as payment account data, delivery data, preferences such as not to click on receiving any email notifications, and any other possible choices that can be made in processing a shopping cart model. The application, browser, or website, via an API, can then communicate in the background and can perform all of those navigations and inputs necessary so that such input can be automatically handled to the extent that the user is presented with the second website in a state where they are ready to "one-click" and make the final purchase and delivery. The API can include all of the information necessary for the second website that is necessary the fill in and enter all of the necessary data to finalize the purchase. For example, the first site can process a payment and the second site can finalize the order by filling it and handling delivery. The first website or browser or application can hold all possible information that various shopping cart models can and do request in processing the purchase. As a particular second website is chosen as the one to which or through which the user is likely to make a purchase from. The first website or browser establishes via an API a connection to the second website with the various information necessary for preprocessing the input. The first site could also communicate via a browser API to receive instructions from the merchant site to process a payment if the first site is a payment service. The data such as the user input identifying the product that they want to buy and any other generated data that helps to narrow down and disambiguate which product to present for purchase via a one-click input. For example, the user may input "iPhone 5S 32 GB" but not a color. The system can choose a most popular color and provide that data to the second website to enable a narrowing down of which model to present. The system can also present secondary options such that alternate choices can be easily made accessible via the second website for potential selection if the primary choice is the wrong color or is not the desired product to buy.

Further enhancements also are described next. The following relates to the concept of transitioning from one site (social media site, or browser search field, or search engine, or any site or state) to another or for payment processing on a site. In one aspect, the system uses a deep link at a destination site configured to a state as though the user had searched for the product, logged in, and/or entered in payment information, whereby the user can complete a purchasing process without entering payment information or logging in. Where the destination site already stores payment and address data for a user, the transition can include retrieving other data from the browser, such as one-click purchasing parameters or other data, to utilize for transitioning to a one-click purchasing state.

An aspect also covers steps from the destination site, such as amazon.com advertising on Facebook. When a site like amazon.com submits a posting to a recipient on a social networking site, it has information about the recipient's identification. If that recipient has registered with amazon.com, and provided their payment information to amazon.com, then, when the recipient clicks on a buy now object or an object that indicates a desire to make a purchase in a posting on Facebook (any social networking site) as an advertisement or in their newsfeed, the recipient can transition from the social networking site posting associated with a product to the posting site, such as amazon.com, with a "deep link" in which the user is transitioned to the site in a state as though the user had searched for the product and the site is in a state where the user can "one click" purchase the product. This is possible because the transition from the social networking posting to the site includes enabling the user to be logged in to the site and presenting the user an interface in which they can purchase the product with minimal further clicks. Browser stored information can be utilized to achieve the deep link destination landing.

In another aspect, the first site could be a social networking site, and a destination site could be a merchant site. The one-click approach to landing on the destination site in a deep link state such that the user can engage in a one-click interaction (or perhaps two clicks or other minor confirmation interactions, but without manually entering payment, address, etc.) to achieve a purchase can be made through the browser payment require application programming interface being called once the user lands on the destination site. A method in this aspect can include receiving a posting of an item through a social networking site, wherein the social networking site receives and transmits posted items from posting entities to receiving entities and when the posting is not associated with a product for purchase in a product database, the method can include transmitting the posting through the social networking site without an option to buy. This is simply a normal posting say on a newsfeed. When the posting references the product in the product database, and thus indicating a sale-related intent, the method can include inserting, by the social networking site, a payment process initiation object into the posting to yield a product posting, the payment process initiation object, when interacted with by a user, indicating an intent by the user to initiate a process to purchase a product in the product posting, transmitting the product posting through the social networking site with the payment process initiation object associated with the product, wherein the payment process initiation object can include one of a button, a drop-down menu, or a hyperlink, and receiving an interaction associated with the payment process initiation object. In one aspect, the posting entity can include the buy option object when the posting occurs. The buy option object can be configured to cause the deep link transition from the social networking site back to the posting entity site.

Based on the interaction, the method can include transitioning the user from the social networking site to a merchant site associated with the product posting. Based on a buy interaction by the user with a pay object on the merchant site, the method can include receiving a payment request, from the merchant site, via a browser application programming interface between a browser that presents the merchant site to the user and the merchant site. In response to the payment request, the method can include communicating payment data for the user through the browser application programming interface to the merchant site to enable the merchant site to use the payment data to complete a purchase of the product. As can be appreciated, in one aspect, the functionality at the social networking site with respect to presenting a buy option or shop button can vary as long as one generally transitions to the destination site such that the destination site can call the browser API to accomplish the payment process.

Once the user lands on a destination site or navigates to a destination site to make a purchase, the system could provide a payment service to process a payment using a first browser API between the merchant site and a browser and a second API between the browser and a payment service. The various communications could occur according to the protocols of the respective API's to complete the payment by the payment service, and notify the merchant site, such that the merchant site could receive payment and deliver the product to the user.

Figure 20B:
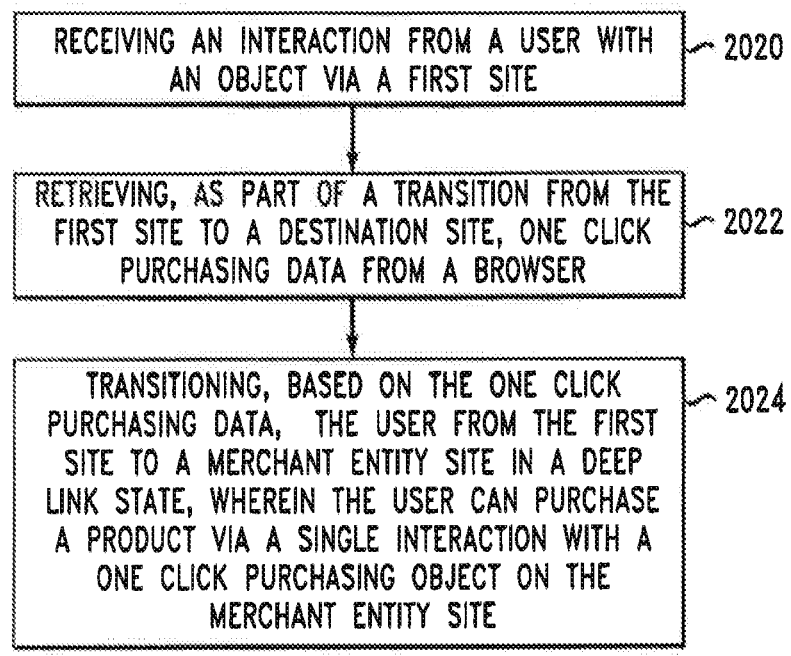
FIG. 20B illustrates an example method for transitioning from a first site to a merchant entity site and a deep link state.

FIG. 20B illustrates another aspect of transitioning, that of transitioning from one site to another. The server represented as feature 1810 of FIG. 18A can represent any site in the respective functionality of that site can be applicable to the present disclosure. A social media site will be discussed by way of example, but any functionality of any site is included within this disclosure.

Assume server 1810 represents a social media site such as Facebook, Instagram, Pinterest, and so forth. The site of course can be any site and the interaction with an object on the site can depend on the functionality of the site. The respective functionality of each site is included within this disclosure and any interaction with the site can trigger the transition to a secondary site according to this disclosure. Assume, by way of example, the site is a social media site and the social media site receives a posting, or an advertisement associated with an item for purchase. For other sites the data could be a game interaction or a video conference call interface, or any other site functionality. The advertisement can be within a newsfeed or on the site generally. The question is how would one transition from the first site 1810 to a merchant site 1816 such that the user lands in a one click purchasing state for the object without the need of entering in payment information, login information, address information, and/or passwords and so forth. The method involves receiving an interaction from a user with an object (which can be associated with an advertisement in this example or any other object in any other context for other site functionality) for a product via the social networking site (2020) and presented within the browser 1806. For example, an advertisement on the social media site for a toaster could have a "buy now" button. When the user clicks the "buy now" button or otherwise interacts with the advertisement from a merchant entity, a series of events are initiated to transition to the user to a site associated with the merchant entity in a particular state. The series of events includes retrieving, as part of a transition from the social networking site (or any first site) one click purchasing data from a browser 1806 (2022). The method uses the data from the browser to enable the user to transition from the first site to the destination merchant site in the deep link state. The data from the browser is not just hyperlink data that is found say on a web site with a hyperlink. The data is preferably, in one aspect, data stored within the browser such as in a user profile or a stored user parameter, one-click purchasing parameter, payment data, and so forth. The deep link state enables the user to purchase the product via a single interaction with a purchase object (either right after the transition, without any other interaction, or after continued shopping of choosing a different product) without manually entering payment account data or user address data. The one click purchasing data represents any data that enables the user to land at the destination merchant entity site in a one click purchasing state. One click purchasing data can include payment data, delivery data, name, address, a browser setting, a one-click purchasing setting, user profile options, preferences, one click purchasing parameters, registration information, email addresses, and so forth. The transitioning process includes retrieving the one click purchasing data from the browser 1806. This can be done through an API 1818 or through some other mechanism of retrieving the data. The data is retrieved in the background such that no other user interaction is needed to retrieve the date or other than interacting with the "buy now" object or other object indicating an intent to purchase.

Next, the system utilizes the one click purchasing data and transitions, based on the one click purchasing data, the user from the social media site to the merchant entity site in a deep link state wherein the user can purchase the product via a single interaction with a one click purchasing object presented on the merchant entity site (2024). The deep link state has some certain characteristics. Example characteristics, one or more which can apply, include a state in which the product or item that is associated with the notice or advertisement on the social media site is shown in a merchant entity interface. The merchant entity interface is on the merchant site and includes a one click purchasing object. Payment information, address delivery information, shipping methods, and so forth are already available to the merchant entity site. The one click purchasing data, retrieved from the browser and provided to the merchant entity site enables the user to land at the destination merchant site. In such a state where the next interaction after the first click on the buy button at the social media site can be a one click purchase interaction on the merchant site. The merchant site utilizes the one click purchasing data from the browser to enable this deep link state. In another aspect, the user may land at the destination merchant entity site and be able to continue shopping or change parameters of the product, and thus have other interactions at the merchant entity site, and when the user arrives at a product they desire to purchase, the user can make the purchase via one click as a purchaser would amazon.com. In this manner, the transition from the first site to the merchant site reduces the number of clicks or interactions necessary in order to arrive at a purchase.

Figure 20C:
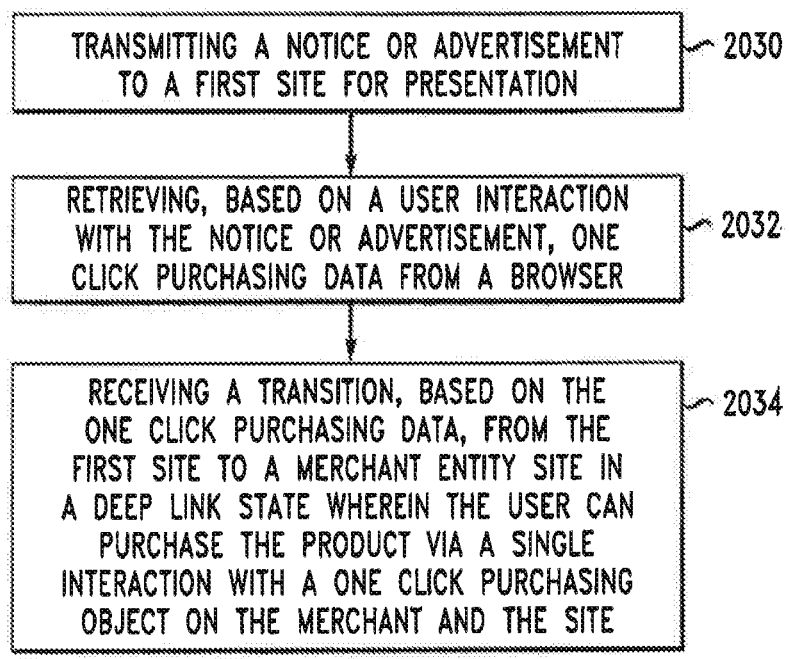
FIG. 20C illustrates another example method for transitioning from a first site to a merchant site and a deep link state from the standpoint of the merchant site.

The process from the standpoint of the merchant entity site is presented in FIG. 20C. From the standpoint of the merchant entity site, the merchant entity transmits a notice or advertisement to a first site for presentation (2030). This can be an advertisement generally on the site or an advertisement, linked to inventory, for presenting, on the newsfeed or other social network posting. Based on an interaction from the user with an object associated with the advertisement on the first site, the method includes retrieving one click purchasing data from a browser (2032) and receiving a transition, based on the one click purchasing data, from the first site to a merchant entity site in a deep link state wherein the user can purchase the product via a single interaction with a one click purchasing object on the merchant and the site (2034). At this stage, the user is positioned at the merchant site and continues normal interactions with the merchant entity site, such as continuing to shop for other products, and so forth.

Figure 20D:
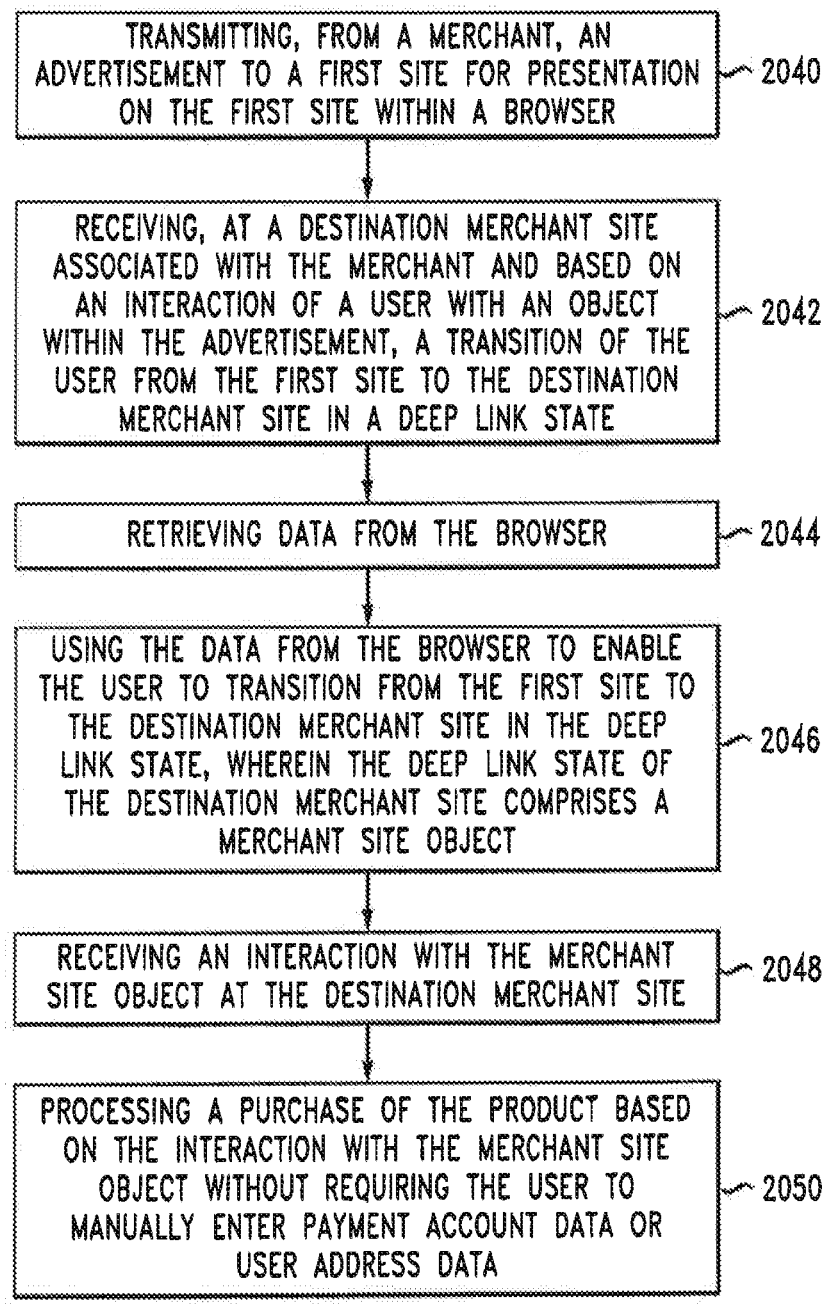
FIG. 20D illustrates an example method from a standpoint of a merchant site for receiving a transition from a first site.

FIG. 20D illustrates another aspect from the standpoint of a merchant site. The method includes transmitting, from a merchant, an advertisement to a first site for presentation on the first site within a browser (2040) and receiving, at a destination merchant site associated with the merchant and based on an interaction of a user with an object within the advertisement, a transition of the user from the first site to the destination merchant site in a deep link state (2042). The transition can utilize several steps including: retrieving data from the browser (2044) and using the data from the browser to enable the user to transition from the first site to the destination merchant site in the deep link state, wherein the deep link state of the destination merchant site can include a merchant site object (2046). The merchant site object can enable further navigation and browsing for products or can be a single click object for purchasing the product identified in the advertisement. The method further includes receiving an interaction with the merchant site object at the destination merchant site (2048) and processing a purchase of the product based on the interaction with the merchant site object without requiring the user to manually enter payment account data or user address data (2050).

Determining Whether User Input is a Generalized Non-Purchasing Query or a Query with Intent to Purchase A system, method and computer-readable storage devices are disclosed which enable any input field in a website or in some other computer-based user interface to act as a unified input field. A unified input field allows a user to provide input that can lead not only to a listing of search results, but can cause any of a number of other actions to be performed on behalf of the user, such as directly navigating to a merchant shopping cart prepopulated with a desired item, or even automatically executing a purchase and placing an order for a desired item. Using such a unified input field can save significant time, effort, and clicks for a user. However, such unified input fields may not be implemented in every website or other user interface the user desires. The user may become accustomed to a particular workflow or set of capabilities when dealing with unified input fields, and may feel restricted or limited when using a traditional limited input field.

In one example, if the user is directed from a unified input field enabled site such as one-search.com to Apple.com, then that user's interaction with Apple.com could be modified such that the search field of Apple.com (or any website, such as Google.com or Amazon.com) becomes like a one-search.com unified input field. For example, a JavaScript script or browser plugin can intercept text entered into text fields on non-unified input field enabled sites or non-unified input fields, and redirect that input to one-search.com to implement these features and present the autocomplete options, and the one-click purchase options. In other words, the options to do any number of different processing options outside of the particular website can be made available to the user. In this manner, any search field, text field, or input field can be adapted to be a unified input field as disclosed herein. Of course, all of the functionality disclosed herein could be built into any search or input field on any website, application, or user interface.

Functionality of the browser can be modified directly or via a plug-in, script, or extension, to implement a unified input field in place of an existing input field. The user can activate the input field enhancer, such as by checking a checkbox in a menu, clicking a button, logging in with a username and password, or providing some other user identifying credentials. The input field enhancer can then identify the user, and retrieve personal data about the user, such as a profile stored in a browser cache or a profile stored on a server. The system can identify user preferences from the profile data, which may provide rules or preferences for when and how to modify certain input fields to be unified input fields. For example, a user profile may indicate not to modify input fields on craigslist.org, but to modify input fields everywhere else. Another user profile may indicate to modify all text input fields located within the top 10% of a website. Another user profile may indicate not to modify text input fields on mobile devices such as smartphones and tablets, but to modify text input fields on desktop or laptop computers. The user can log in to a user profile that is stored on a server, so that the user's preferences and other personal data are not limited to one local machine, but instead are accessible from any such enabled machine. Thus, the user can log in to a browser on a work computer to enable unified input fields and can do the same on a home computer, while using the same personal profile, preferences, and history. This personal information can be important for a classifier when determining intent based on a relatively short input string, and can provide a sense of consistency for the user when unified input fields behave similarly across multiple devices.

The enhancer can be triggered when a new page is loaded in the browser, or when the page is refreshed or updated, such as by an Ajax call that dynamically loads or modifies page elements. The enhancer can operate in conjunction with a rendering engine or web browser engine to identify input fields while rendering the page. In this variation, the enhancer can modify the code for a page as the page is being parsed and/or rendered. The enhancer can operate as a post-loading operation that goes back and revises an already loaded and rendered page. In either way, the enhancer modifies the functionality of an identified input field to capture and redirect the input to a local or remote server to provide similar or the same functionality as a unified input field. Then, the server can communicate with the browser to implement the various benefits and functionalities of the unified input field, such as presenting previews of one-click purchase actions as tears on the webpage, as new tabs or windows, expose such one-click purchase actions via the "search" button or some other button, and so forth.

The system can mark an input field or present some kind of visual or audible indication that the input field has been modified or enabled as a unified input field. For example, when the system detects a standard text input field, such as the search field at the top of ebay.com, the system can determine whether that standard text input field is suitable for repurposing as a unified input field. If the system makes a positive determination, then the system can modify the standard text input field's functionality as well as its appearance. For example, the system can render a different color border around the text field, or can make a noise when focus moves on to or in the text input field or when a mouse or text cursor enters the text field. The system can apply a change in size, font, appearance, or even introduce an animation highlighting the modified text field. User preferences can also dictate how the system highlights the modified text field.

Then, when the user enters text into the modified text field, the system can process the input via the classifier to determine an intent, and generate one or more actions which can be taken based on the intent. In some cases, if the classifier is unable to determine an intent above a certainty threshold, then the system may not present any actions based on the input, and may choose to wait for additional input which may change the intent and/or the certainty threshold. How the system determines to present the one-click actions based on the determined intent may vary based on the browser displaying the page, or the layout of the page hosting the modified text field. For example, if the text field has sufficient adjacent white space, the system can render one-click buttons proximate to the text field for performing the various actions. The system can present drop-down menus with one-click actions as part of the browser, outside the rendered web page containing the modified text field. The system can use JavaScript to modify or rearrange certain page elements to temporarily or permanently (for the life the page as rendered) accommodate user interface elements for the one-click actions. The system can use JavaScript to overlay new user interface elements on top of the rendered page for providing access to the one-click actions. In one example, the system presents user interface elements that look like "tears" that peek through the rendered page to show a portion of a page that appears to be beneath the rendered page.

However, even when a text field has been modified, the system can still preserve the original functionality of an input field, while extending the input field to also act as a unified input field. For example, the user can toggle between the modified functionality and the original functionality by pressing shift in the beginning of the input field. The system can also toggle the appearance of the modified input field to indicate to which function of the modified input field the user is directing input.

The system can identify text fields which are candidates to be modified, but can leave them untouched until receiving some user command or input requesting the unified input field functionality. For example, the system can provide access to unified input field functionality, upon the user activating or requesting the functionality by pressing a key or key combination, or double clicking in the input field. The user can, in this manner, toggle between different functionalities for the input field. This can be beneficial to avoid breaking some websites that rely on specific functionality of the input field. However, the system can overlay the unified input functionality over the existing, original functionality of the input field, without hindering its operation. For example, the system can implement the unified input field one-click actions in a different region of the user interface, while allowing the original functionality to proceed unchanged. Or the system can incorporate the original functionality as one of the one-click actions presented via the unified input functionality. For example, if the user entered the text "iPhone 5C 32 GB yellow" in a modified input field on eBay.com, the system can generate a set of buttons overlaid on top of the page via JavaScript: a first one-click action button for purchasing the indicated iPhone 5C via Amazon.com, a second one-click action button for purchasing the indicated iPhone 5C via Apple.com, a third one-click action button for purchasing the indicated iPhone 5C via attwireless.com, and a fourth one-click action button for implementing the original input field functionality of executing a search of auctions on eBay.com.

The system can further adapt the functionality of the unified input field based on the detected type of browser or available space on the interface. For instance, the system can present a user interface that is consistent with the look and feel of the page hosting the modified input field. If the page hosting the modified input field has advertisements, the system can position the one-click action buttons or other user interface elements in such a way to avoid obscuring those advertisements. This setting can be dictated by code or settings in the page hosting the modified input field, such as a token or instruction intended to guide the behavior of a modified input field.

In one example, a website can pre-modify an input field by making it unified input field aware. In cases when the website detects that the user does not participate in or use unified input fields, the input field can retain its original functionality. However, when the website detects that the user does participate in or uses unified input fields, such as by detecting a cookie in the user's browser, the website can preemptively modify or activate the unified input field to provide a more familiar interface for that user. The website can interact with a server for managing such unified input field requests via an established application programming interface (API).

Figure 21:
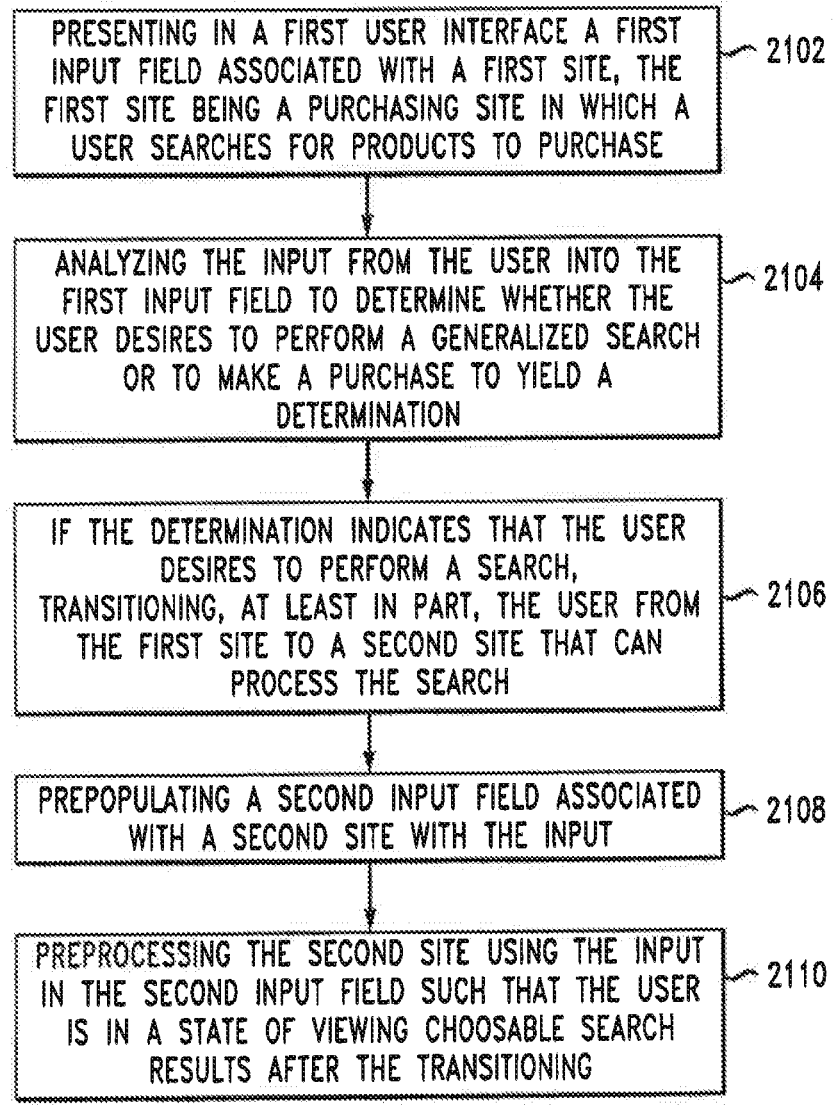
FIG. 21 illustrates a method example for determining user intent as one of a generalized non-purchasing search or a search with intent to purchase.

FIG. 21 illustrates a method example. The steps in the method example can be performed in any order, can be performed in other combinations or permutations that include additional steps or exclude all or part of some of the described steps. The system can present in a first user interface a first input field associated with a first website processed via a browser, the first website being a purchasing website in which a user searches for products to purchase (2102). The system can analyze the input from the user into the first input field to determine whether the user desires to perform a generalized search or to make a purchase to yield a determination (2104). An example of a generalized search is one that a person might do on Google.com. For example, the user might search using the term "North Dakota." In that case, they are looking for information on that state. However, if the user is at the URL for Amazon.com, entering in "North Dakota" would not necessarily mean that they desire to make a real estate purchase of the entire state. That user input has a strong indication that they do not want to make a purchase but rather to perform a generalized search in contrast to searching for products to purchase on Amazon-.com. If the determination indicates that the user desires to perform a search, and without any other input from the user other than the input, the system can transition, at least in part, the user from the first website to a second website that can process the search (2106). Transitioning the user from the first website to a second website can include presenting the second website via a tear in the first user interface revealing at least a portion of the second website. Then the user can provide an indication through the tear that the user desires to navigate to the second website, and based on the indication, the system can navigate the user to the second website. The system can select a position of the tear in the first website based on an analysis of a structure of the first website. The system can prepopulate a second input field associated with a second website with the input (2108), and can preprocess the second website using the input in the second input field such that the user is in a state of viewing selectable search results after the transitioning (2110).

Figure 22:
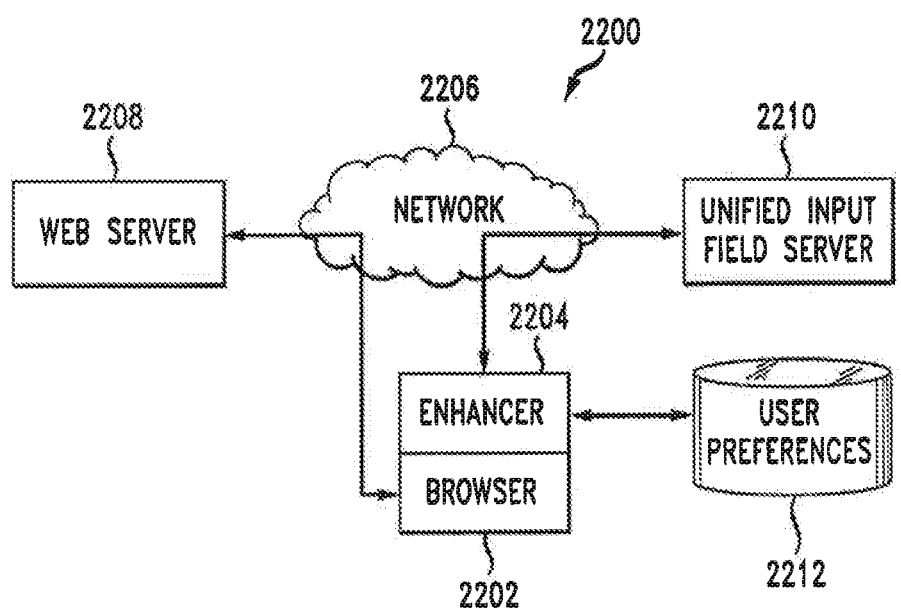
FIG. 22 illustrates some of the components that can be used with the method example shown in FIG. 21.

FIG. 22 illustrates some of the basic components 2200 of this example. An application like a browser 2202 or smartphone app can have an enhancer 2204 which is a module or a component that can communicate with a database of user preferences 2212 for helping to improve the processing of input via any input field. The browser 2202 can communicate via a network 2206 with a web server 2208 which serves up a website or application such as amazon.com. The browser and/or enhancer 2204 can also communicate with a unified input field server 2210 via a network 2206. This unified input field server 2210 can also communicate with the database of user preferences 2212 as instructed by the browser 2202 to tailor the processing of user input accordingly. Using this approach, the system can process and turn any input field served up from any web server 2208, into a unified input field by virtue of connecting the processing to the unified input field server 2210. In this manner, while the user may be on a web site such as Amazon.com, which has input fields that typically expect items of purchase, and that input field can be turned into a more unified input field for jumping to other places and performing other functions as well. Thus, utilizes the connection to the unified input field server 2210, that amazon.com input field can become the jumping off point for a generalized search, a phone call, a Skype-type call, a video conference, or any other purpose which can be achieved through a more flexible and open input field processing approach as disclosed herein.

Searching Via an Application-Based Portal Rather than a Website

Figure 23:
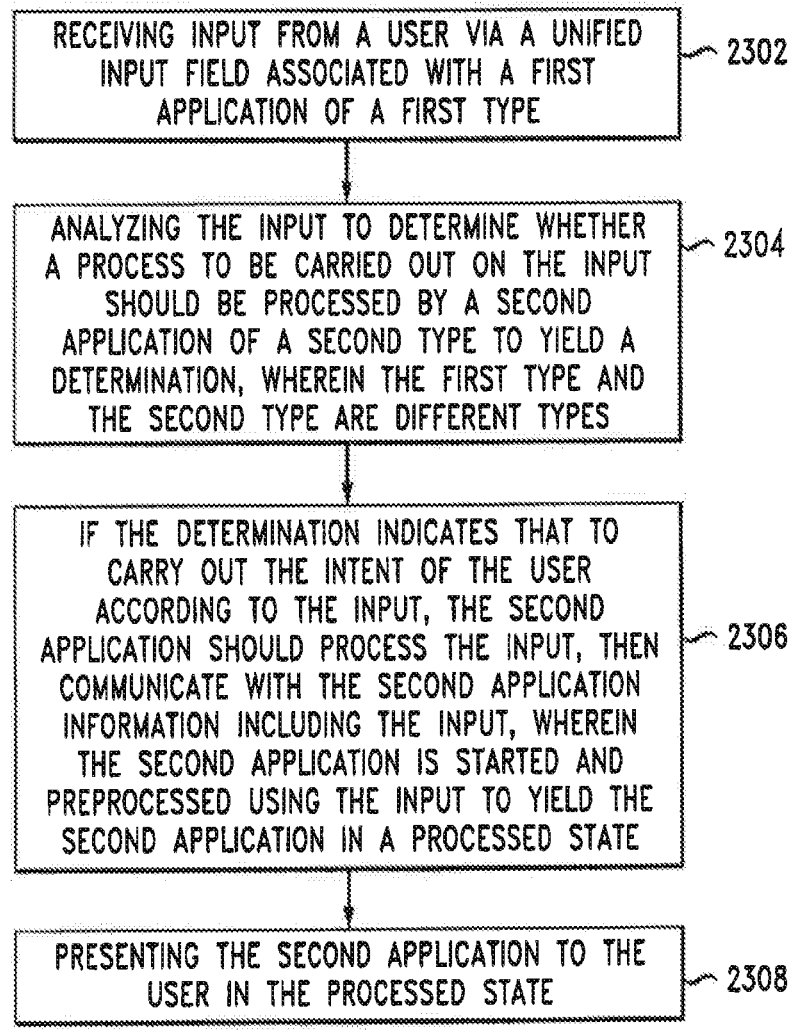
FIG. 23 illustrates a method example for an application-based search portal instead of a search via a website.

FIG. 23 illustrates a method example. This example focuses more on applications communication one with another rather than websites. The basic concepts are similar, however, for searching and including the payment processes and APIs used between the app and a module configured for managing a user interface. For example, a user having a tablet or a smartphone may have an application for performing searches. This is different from a browser on the device that enables the user to just navigate to a search engine URL. The application, which again can be anything such as a search app, or a Skype or FaceTime app, a banking application, etc. Any application of a first type can have an input field. The point here is to turn that input field which traditionally is associated with a particular purpose of the application, into a more generalized input field that can process the input and determine whether the user should automatically be transitioned to another app. Switching between a browser and an application is also possible. For example, the user could be on a smartphone using a browser application with the URL positioned on www.google.com. The user, however, may enter in a product into the search field. The system (locally, on a server, or via processing using a combination of both) determines that the user desires to make a purchase based on the input. The system could automatically launch an Amazon.com application (rather than transitioning to amazon.com via the browser), pre-negotiate such that the input and the "state" of the amazon.com application is positioned using the input to either present search results as though the user had already launched the application and search, or could position the application in a "one-click" state where the user simply makes the purchase.

A method includes receiving input from a user via a unified input field associated with a first application of a first type (2302) and analyzing the input to determine whether a process to be carried out on the input should be processed by a second application of a second type to yield a determination, wherein the first type and the second type are different types (2304). If the determination indicates that to carry out the intent of the user according to the input, the second application should process the input, then the system communicates with the second application information including the input, wherein the second application is started and preprocessed using the input to yield the second application in a processed state (2306). Finally, the system presents the second application to the user in the processed state (2308).

The presenting occurs without any additional input from the user to navigate to the second application. Communicating with the second application can further include communicating at least one of the following to the second application: user identification information, payment account information, delivery address information, and user preferences. As noted above, the process can involve switching between browsers at particular websites to apps on a smartphone or tablet, or other devices. An application in this case is generally known. It is a software product purchased or downloaded for free that performs typically a single general purpose task like enabling purchases through Amazon, or handling video and audio calls like Skype. Such applications of course differ from the URL which can be associated with the same company but provide different mechanisms of accessing the services of that company.

The first application and the second application are one of smartphone applications and tablet applications. Again, in another aspect, this disclosure provides a description of switching between a URL (website) and an application. The system can automatically close the first application and start and present the second application in the processed state on a user interface. This enables the user to avoid the process of closing one app and manually launching the desired application. In one example, the first type is a search type and the second type is a product purchasing type. The first type can, for example, be a type not associated with purchasing products and the second type can be associated with purchasing products. This provides an example of switching between contexts, types, applications purpose and so forth, but while using a single input field. This approach reduces the interactions necessary for a user to get a function performed (search, purchase, delivery, call, etc.) because it eliminates the need to navigate to a separate URL or a separate application that performs the desired function. In one example, the first application can process a payment for an item and coordinate with the second application for delivery of the item to a buyer.

The payment processes disclosed herein also apply to apps such that the various ways that a website can obtain payment can also apply to apps and the functionality that is built into the app and into a module configured to manage a user interface can be implemented to simplify the payment process within an app.

Selecting a Transition Type Between Search Interfaces

Figure 24:
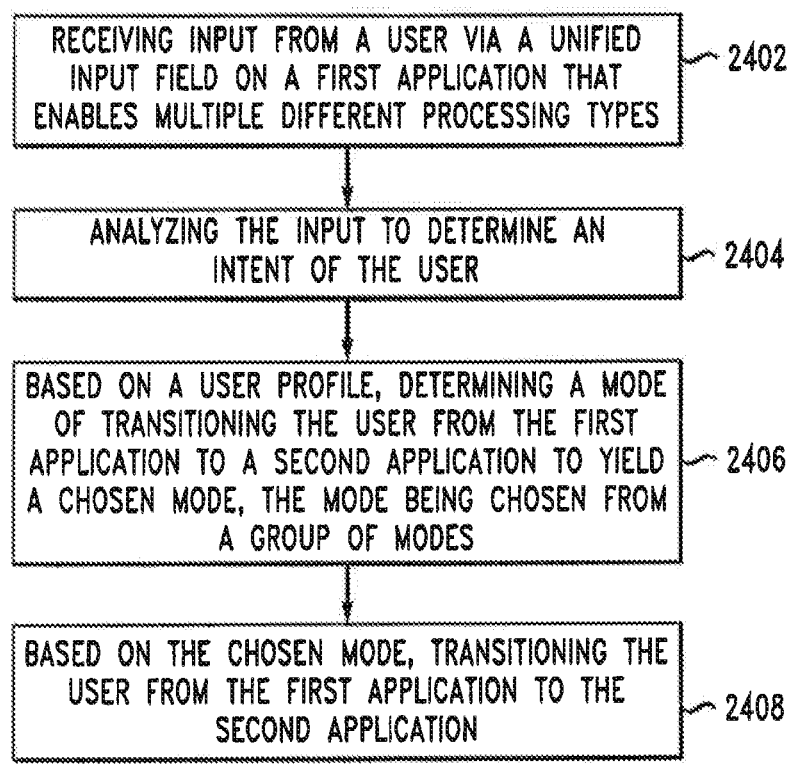
FIG. 24 illustrates a method example for selecting a transition type between interfaces.

FIG. 24 illustrates a method example. This example focuses on choosing the mode of transitioning from one interface to another. A method includes receiving input from a user via a unified input field on a first application that enables multiple different processing types (2402) and analyzing the input to determine an intent of the user (2404). Based on a user profile, the method includes determining a mode of transitioning the user from the first application to a second application to yield a chosen mode (2406), the mode being chosen from a group of modes and, based on the chosen mode, transitioning the user from the first application to the second application (2408).

The first application can be one of a first website and a first smartphone/tablet application and the second application is one of a second website and a second smartphone/tablet application. The group of modes can include: a tear, an autochange, a search button morph, a drop up menu, a drop-down menu, a processing indictor morph and multiple reduced size one-click enabled windows. A "tear" represents an opening in a first interface that makes it appear that the first interface is tearing open to reveal another interface below it. So if the first application was google.com, and the user entered a search term that was determined to indicate that the user desires to make a purchase, an opening or a tear in the white space of the google.com page could appear and through that opening would appear a portion of an amazon.com webpage, preprocessed with the search term, such that the user can click on the opening space and easily transition from google.com to amazon.com with the input field data also transitioning as well. This approach reduces the number of necessary clicks. The autochange feature automatically replaces the URL from google.com to amazon.com (or whatever the two different websites are) without user input such that when the system determines that a switch is needed, it automatically does it and perhaps further processing to place the destination website in a one-click purchasing state based on the user input. The search button (the button that indicates what process is performed if a user clicks "enter") can morph in its functionality based on the user input. A notification of the function to be processed can also morph as well. Drop up, drop-down, extension menus can also be provided which not only do auto complete but also present one-click purchasing options, calling options, video conferencing options, etc. These various modes present alternate mechanisms of transitioning automatically to a new webpage, application or function. However, given that there are different ways of making such a transition, the user can present and store preferences of how to make that transition. Alternately, various options could be presented and user history, previous searching and internet or application usage or other factors outside of or in connection with the user profile could be used to make the decision of the chosen mode.

The "tear" open to another page can include a one-click option that the user can click to make a one-click purchase. The system can maintain that tear view of the other page on the search interface while executing additional searches, exploring other search results, or browsing to other websites. For example, the user can "pin" the tear in place so it remains available while the user conducts additional browsing activity. Thus, the user could hold the one-click-purchase tear while reviewing, studying, searching around the web, and the user can still use the tear to make a purchase later on.

Transitioning the user can include transitioning the user without the user navigating manually to the second application. Transitioning the user can be achieved through the user performing a single click action to initiate and complete the transitioning. Transitioning the user from the first application to the second application can further include preprocessing the second application using at least one of the input, user identification, user account information, user delivery information and user preferences, to yield the second application in a one-click purchasing state. For example, the first application can process the payment and coordinate necessary data to the second application for delivery. Determining the mode can further be based on a screen configuration of a device running the first application. The mode may also be changing from one type of application (like a website accessed via a browser) to another type of application, like a smartphone/tablet application. All of the preprocessing and so forth can occur in any transition such that the user is positioned in a state within the destination that enables them to either browse search results (say on Amazon where the input provided on google.com is used to present search results) or in a one-click state where the user can just click to purchase an item.

Advertisements

Figure 25:
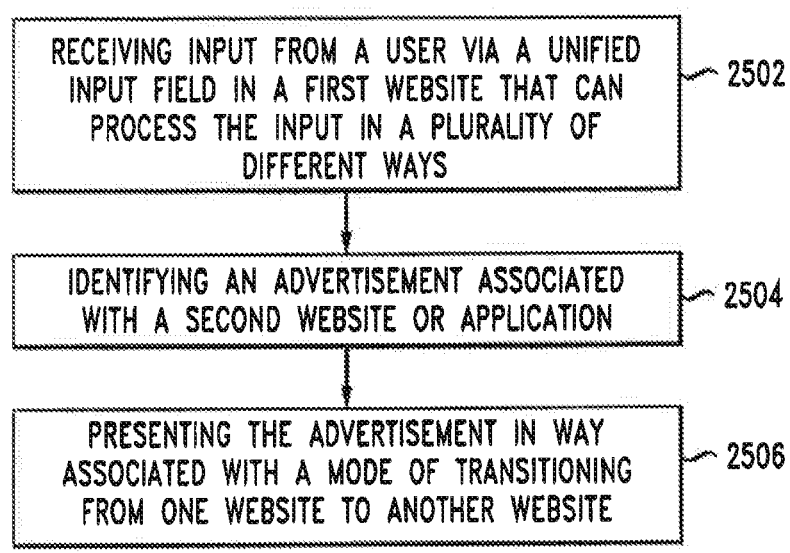
FIG. 25 illustrates a method example for presenting advertisements.

FIG. 25 illustrates a method example. This example relates to how various advertisements can be presented in connection with the use of a unified input field disclosed herein. A method includes receiving input from a user via a unified input field in a first website that can process the input in a number of different ways (2502). The first website could also be a first application or first user interface. The method includes identifying an advertisement associated with a second website or application (2504) and presenting the advertisement in a way associated with a mode of transitioning from one web site (application) to another web site (application). There are various ways of transitioning smoothly and the advertising can be tailored to the mode of transition. For example, the ad can be presented one of the following ways or associated with one of the following transitions: a tear within the first website that reveals at least a portion of the second website, in a manner associated with an extension menu identifying the second website and available for selection by the user, in a manner associated with a morphed search button that alternates its function based on an intent identified from the input, in a manner associated with an automatic transition from the first website to the second website without user direct navigation and in a manner associated with a negotiated version of the second website which places the second website into a one-click purchasing state for selection by the user (2506).

There are a number of different ways of transitioning from a first input field context or environment to another without the need of the user actively navigating to the destination environment. In this example, since the system knows the intent of the user based on the analysis of the input data of the user, the system can use that intent and the knowledge of the destination site to present advertisements at some point during the transition.

For example, if the user is on google.com and enters "iPhone 5s 64 GB silver" the system may determine that the intent is to make a purchase. A tear could open up in the white space of the webpage revealing a portion of an amazon.com page in a purchase state where the user can just "one-click" and buy the iPhone and have it delivered. However, elsewhere on the white space, the system could present a Samsung device advertisement, which also could be positioned in a one-click state to tempt the user to purchase a different product or to explore a different product. Presenting the advertisement could be based on a price paid for the advertisement. A position within an extension menu of the second website or application of the advertisement could also be based on a negotiated price. In this case, when an extension menu is presented, a highest paid advertiser could be positioned closest to the input field. Presenting the advertisement in one of the ways identified can be chosen based on a negotiated price. The method can include transitioning the user from the first website (or application) to the second website (or application) based on an intent identified from the input and without manual user navigation.

Presenting Previews of Destination Web Sites in a Universal Search Interface

Figure 26:
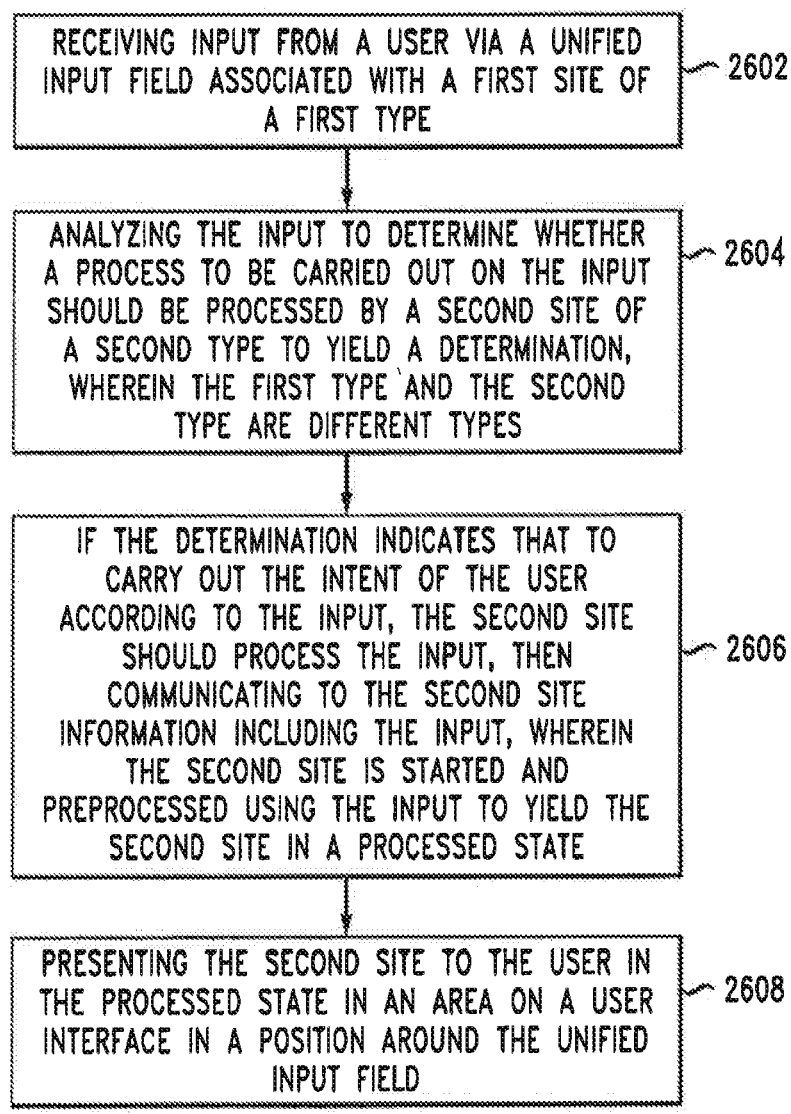
FIG. 26 illustrates a method example for presenting miniature versions of destination websites.

FIG. 26 illustrates a method example. This example focuses on presenting one or more miniature versions of destination websites or modified versions of other websites as a result of processing the input of the unified input field. For example, presenting a small version of amazon.com featuring the product associated with the input and preprocessed such that the user can touch a "one-click" button and make a purchase. A method example includes receiving input from a user via a unified input field associated with a first website of a first type (2602) and analyzing the input to determine whether a process to be carried out on the input should be processed by a second website of a second type to yield a determination, wherein the first type and the second type are different types (2604). If the determination indicates that to carry out the intent of the user according to the input, the second website should process the input, then the method causes a processor to perform the operation of communicating to the second website information including the input, wherein the second website is started and preprocessed using the input to yield the second website in a processed state (2606). The processed state could be a search results state which is the equivalent of the user navigating to the other website and entering in the input and searching for products. The processed state can be a best and most likely resulting product that the user desires to buy, based on their input and other factors, in connection with a one-click option to purchase that product. The buy option, when interacted with by a user, can result in the system processing a payment via payment data stored with the first application and coordinating delivery of the item via a second application. The method includes presenting the second website to the user in the processed state in an area on a user interface in a position around the unified input field (2608).

Figure 27:
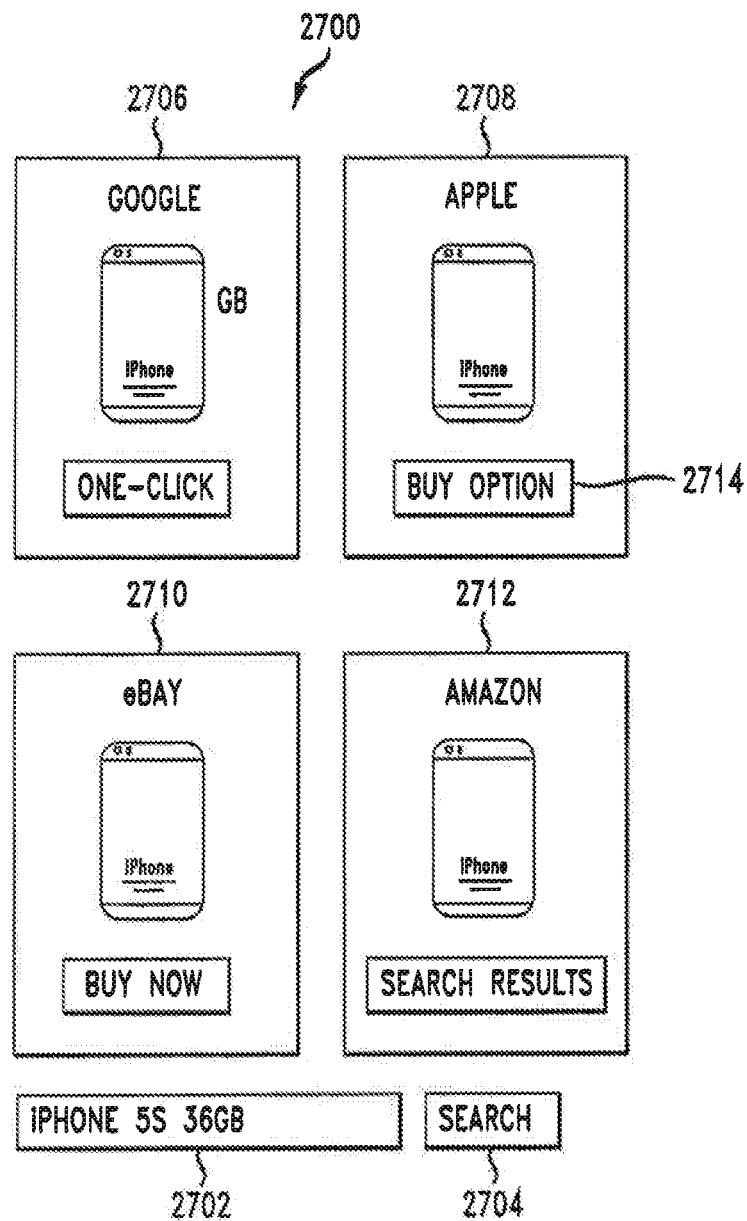
FIG. 27 illustrates a user interface with various destination sites in a preprocessed state.

The presenting can occur without any additional input from the user to navigate to the second website. In other words, the user just types in the input into the input field and the preprocessing of the other websites and presentation of those websites in one of a number of possible preprocessed states is performed automatically and without any navigation input from the user. The number of alternate websites presented in processed states could be also done based on the amount of disambiguation information needed. If the user only puts in "iPhone 5s" then many alternate preprocessed websites could be presented for 32 GB one-click purchase, gold 64 GB one-click purchase, etc. The user can see these various offerings and disambiguate by simply typing in disambiguation data such as "32" and "silver". The presentation then of the other website can automatically morph such that it narrows down the offerings to perhaps a one-click from Amazon and a one-click from Apple. FIG. 27 illustrates the interface 2700 with the search field 2702, search button 2704 and various alternate destination sites such as one from Amazon or Google 2706 for a one-click purchase, and Apple website 2708 for a one-click purchase. In this case, feature 2706 can represent a type of advertisement of a plurality of advertisements in which a one-click or a simplified payment process is available in which the user does not transition away from the search entity but in which a payment is handled using payment data stored at the search entity. Apple one this scenario of course can represent any merchant that communicates via an API with the search engine/social media/non-merchant site. The one-click or buy option button 2714 can be an indication that the advertisement 2708 is configured to enable an improved payment processing in which stored payment information at the site, a search entity related site, or via a server like Apple Pay can be used to process the payment and the delivery is managed and completed by the merchant. Thus, the user may click on the ad 2706 or 2708 or the button 2714 and be asked to complete the purchasing process according to this improved set of steps which reduces the pain of fully being transferred to the merchant website to again enter in payment information. Thus, in this sense, the "one-click" button 2714 can mean literally one-click or an indication that the user desires to make the purchase using this new payment processing/delivery approach disclosed herein. A few more clicks might be necessary, including biometric identification, but the user does not have to enter credit card, address or other purchase related information. This can represent a first type of purchasing in a search result of a plurality of search results in which the user is not transitioned to a merchant site but remains with the search engine entity which handles the payment to simplify the payment process. The search entity then notifies the merchant of the sale and delivery details.

An eBay website 2710 with a one-click purchase or a one-click bid button and an Amazon search results offering 2712 wherein if the user click that button, the URL switches to amazon.com and is preprocessed as though the user had entered in "iPhone 5s 32 GB" and hit "search" directly on Amazon.com. This represents a different type or a second type of search result in the plurality of search results in which the user is transitioned in the more traditional fashion to the merchant site for completing the purchase. As can be appreciated, preprocessing the input in this way reduces the number of interactions necessary by the user to navigate from a search website like Google.com to a product purchasing website like Amazon.com and then provide input to search and make a purchase. In another aspect, the transitioning to the second site like Amazon.com can utilize data stored in a browser such as one-click settings such that the user lands on the destination site in a deep link state where they can purchase the produce in one click. The approach disclosed in FIG. 27 provides the improvement of presenting multiple different types of search results in which one type enables the user to not transition to the merchant site but process a payment for a product using payment data stored with the search entity. Another type of search result for a product can, when clicked on, transition the user to the merchant site for completing or finalizing the purchase. These multiple results are returned simultaneously from the same search input on a generalized search input field or other field. Some search results may be accessed as well by clicking on an object which produces additional search results. For example, there may be 8 product results from the search in FIG. 27 with results 1-4 shown. The user may need to click on an arrow or "additional results" object to view the other results.

The processed state can include one of a state wherein the user could perform a single click which would cause a purchase and delivery of an item associated with the input without transitioning to a merchant site (such as, for example, staying with the search entity site for managing the purchase) or wherein the user could perform a single click and view search results on the second website as though the user had navigated to the second website and entered in the input for a search. The method can include identifying a third web site that could process the input and presenting the third web site in the area on the user interface in a second position around the unified input field. FIG. 27 illustrates this approach. The second website and the third website can be in different states. Further, a position of the second website and the third website relative to the unified input field can be dependent on which of the second website and the third website has a most likely intent based on the input. Clicking on the "one-click" or the "search" button in one of the destination sites not only causes the purchase and delivery but also causes an automatic transitioning from the first website URL (such as www.google.com) to the chosen website URL (such as www.amazon.com). In other words, clicking on the "one-click" button (or other function button such as "search results") not only processes the purchase and delivery but also, in some cases, causes the transition to the other web site. In other cases, the user does not transition to the merchant site but has the purchase processed by the search entity using stored payment data at the search entity. If a user had navigated to www.amazon.com initially and searched until they click on the one-click purchasing button, then they would see at www.amazon.com the notice "Thank you for your 1-click purchase, it is being processed." At that stage, the user could go to their account and change or cancel the order, track the order etc. Feature 2706 can represent a transition to a merchant site or can represent a maintenance of the user at the search entity site for processing the payment. In one example, by clicking on the one-click button, presented in feature 2706 of FIG. 27, which is presented on the URL www.google.com, the system automatically causes the URL to change to www.amazon.com in such a processed states as to present that message: "Thank you for your 1-click purchase, it is being processed." At that stage, there is no difference in essence between the initial navigation to www.amazon.com and this automatic transition from www.google.com. Of course, the navigation can be from any website or application to any other website or application. The transition can also include separating the processing of payment and managing delivery. For example, google.com could handle payment for an item without transitioning the user to the merchant site (i.e., maintaining the user at a google.com site or related site to google.com for processing the payment) but coordinate at the back end with www.merchant.com for delivery of the order. The search entity might also have another web site used for processing payments but that is related to and managed by Google. In this manner, the user can have a choice in their search result advertisement options between ads that enable them to stay within a Google environment and make a simple payment (without the need of manually inputting data at a merchant site) using payment data stored with Google, or they can choose an advertisement of a traditional type in which they are transitioned to the merchant website. Both types of advertisements can be presented in the same search result set. Some of the results may be also not shown initially because of the number of search results and thereby retrieved through a user interaction with the user interface to see additional search results. In some cases, the additional search results include advertisements of a particular type or both types. At least one of a first product advertisement and a second product advertisement can be viewed by the user on a user interface after the user interacts with the user interface to view additional advertisements from an initial set of advertisements presented to the user in direct response to the user input. In order to achieve the coordination between merchants and the generalized search entity to provide the alternate payment approach, the merchants can coordinate via APIs, contracts, and other technical mechanisms to make their products available to the search entity to present search results with these different types of configurations. Search results and also be presented in more than two types of configurations, such as traditional transitions, payment processes managed by the search entity, payment request API payment processes, app-based processes, cryptocurrency processes, and so forth.

Figure 28A:
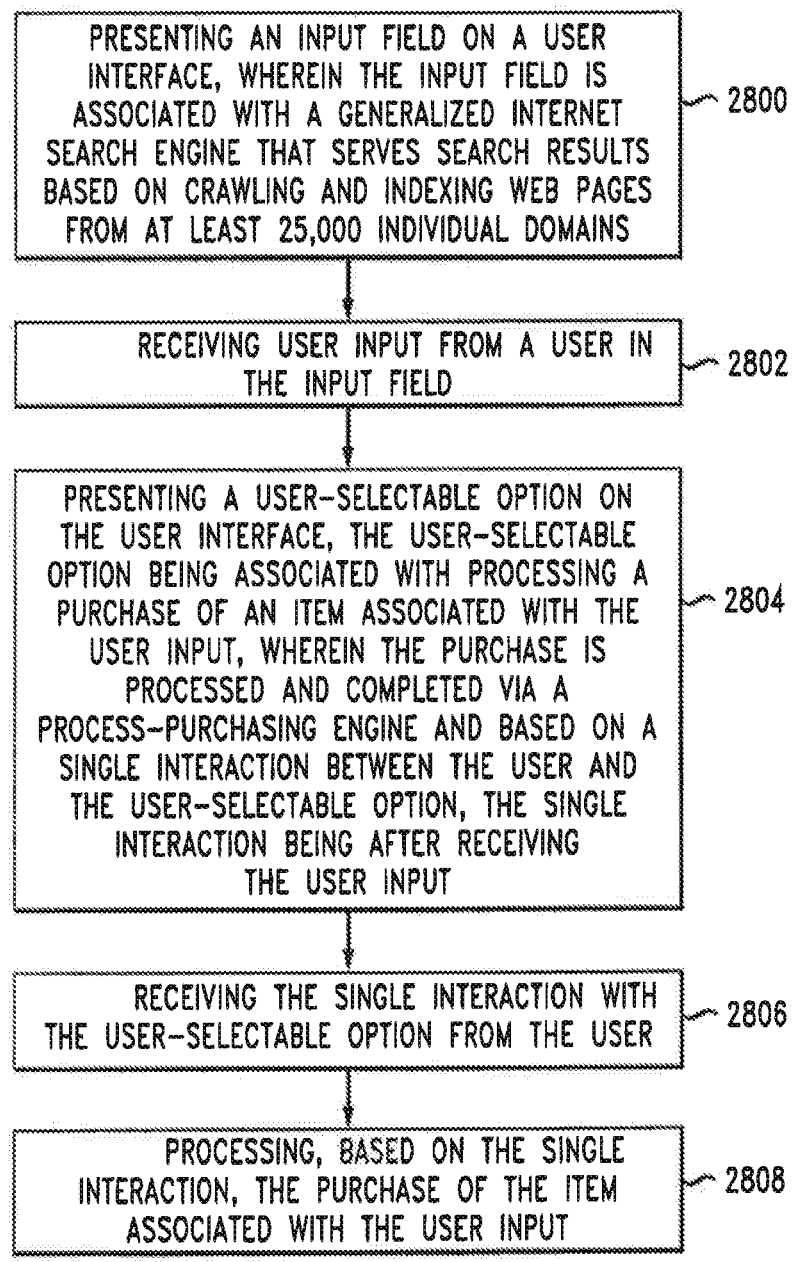
FIG. 28A illustrates another method example.

FIG. 28A illustrates another example related to the processing disclosed herein. A system can present an input field on a user interface, wherein the input field is associated with a generalized Internet search engine that serves search results based on crawling and indexing web pages from at least 25,000 individual domains (2800). This number of course can change but it is meant to distinguish between an Internet search via Google or Yahoo versus a search on a single website like searching www.newyorktimes.com. The method includes receiving user input from a user in the input field (2802) and presenting a user-selectable option on the user interface, the user-selectable option being associated with processing a purchase of an item associated with the user input, wherein the purchase is processed and completed via a process-purchasing engine (which can be operated by the input field entity) and based on a single interaction between the user and the user-selectable option, the single interaction being a first interaction after receiving the user input (2804). The delivery of the item can be accomplished via a separate merchant from the input field entity.

As an example, a user enters in the iPhone 6 into the search field, thus the "user input" is "iPhone 6". The user types in the text and hits "enter" or "search". The system processes that input and constructs an interaction for the user that enables the user, without performing any further interactions after hitting "enter" (i.e., no need to navigate to another website or jump to another application), such that the next interaction can be (does not have to be but is structured such that it can be) a user interaction with the user-selectable option to buy (purchase and/or deliver) the iPhone 6. Thus, the method includes receiving the single interaction with the user-selectable option from the user (2806) and processing, based on the single interaction, the purchase of the item associated with the user input (2808). Of course the processing can include purchase and delivery. Other options available to the user of course could include tailoring the purchasing process to be a delivery to a relative or friend (someone other than the purchaser), or to pay in a different way that is preferable set on the user profile. Much like purchasing processes and capabilities with outlets like Amazon.com, the present disclosure encompasses all such functionality at this stage as well. For example, the interaction with the buy option can result in the first entity associated with the unified input field processing a payment of an item and coordinating with a separate merchant for filling or finalizing the order by delivering the item to the buyer. The first entity would then handle making a payment to the merchant.

Figure 28B:
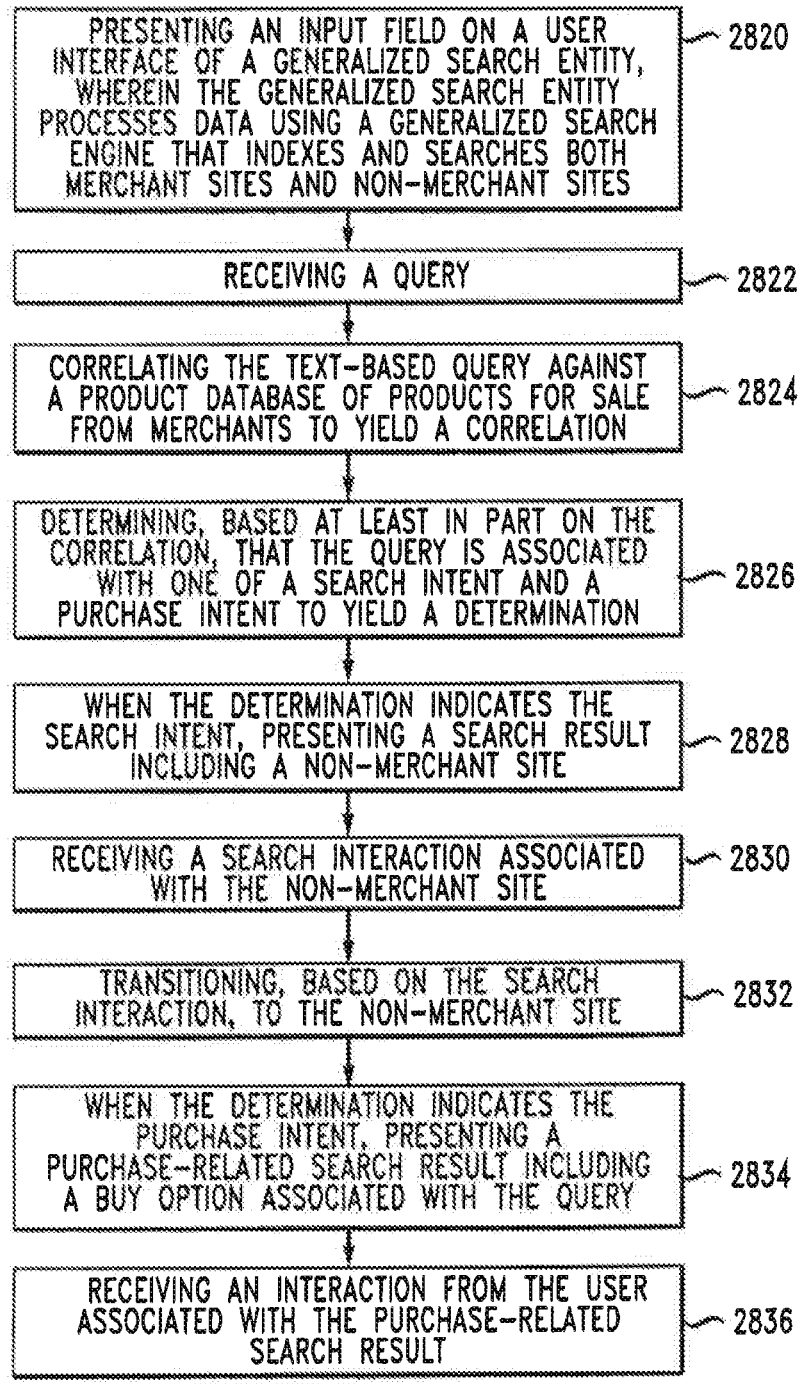
FIG. 28B illustrates yet another example method.

FIG. 28B illustrates another example which does not require the user to actually make a purchase. A method includes presenting an input field on a user interface of a generalized search entity, wherein the generalized search entity processes data using a generalized search engine that indexes and searches both merchant sites and non-merchant sites (2820), receiving a query (such as, for example, a text-based query, although other input modes are contemplated) in the input field (2822), and correlating the text-based query against a product database of products for sale from merchants to yield a correlation (2824). The correlation can simply mean accessing a database of products to determine whether a product is in inventory which could be presented as part of a search result with a buy option.

The method includes determining, based at least in part on the correlation, that the query is associated with one of a search intent and a purchase intent to yield a determination (2826). When the determination indicates the search intent, the method includes presenting a search result including a non-merchant site (2828), receiving a search interaction associated with the non-merchant site (2830) and transitioning, based on the search interaction, to the non-merchant site (2832). When the determination indicates the purchase intent, the method includes presenting a purchase-related search result including a buy option associated with the query (2834). The purchase-related search result can be configured such that when a user interacts with the purchase-related search result and confirms a purchase via interacting with the buy option, the generalized search entity (or a separate payment service, separate from the merchant) initiates processing of the purchase of an item. The method can include optionally receiving an interaction from the user associated with the purchase-related search result (2836). The structure of the search result having the buy option is part of this aspect. The user interacting with the search result and/or completing a purchasing transaction are optional features.

The method can include receiving, from the user, an interaction with the buy option and managing the purchase of the item based on payment information stored at the generalized search entity, a browser, or another payment service, wherein delivery of the item is handled via a merchant site separate from the generalized search entity. The user can have a pre-existing account storing preferences governing how one of the search result, the purchase-related search result and the buy option is presented. The purchase-related search result can include an option selectable by a user to receive further search results. The user interface can in one aspect be on a mobile device. In another aspect, the purchase-related search result can be further configured such that when the user interacts with the purchase-related search result indicating a desire to transition to a merchant site, the method further includes transitioning to the merchant site associated with the purchase-related search result. In this case, typically the merchant would proceed with processing the payment. In other words, the search result can include a buy option but can also include an option of transitioning to the merchant site for continued searching and/or to make the purchase. The generalized search entity and the merchant site can communicate via an application programming interface for managing the purchase and delivery of the item.

In another aspect, the steps can be performed by the merchant. In this case, the merchant establishes, from a merchant site, communication between the merchant site and a generalized search entity via a communication interface. The generalized search entity processes inquiries in the manner set forth above. The merchant provides access to product inventory and through an API will provide product offerings and receive payments from the generalized search entity or other payment service as well as data about purchases such that the merchant can process and manage delivery.

Social Media

The disclosure now returns to social media or search sites functionality. FIG. 29 illustrates a general example of a method which can apply across different sites between a search site like www.google.com and social networking sites. The concept is to change the conventional processing of any of these sites to technically determine through the use of unconventional steps whether the user has included in the input to the site (text, image, video, tweet, etc.) that has a purchase/sale intent. The first step is to receive user input into the site (2902). The system evaluates the user input for data that points to a product database (2904). The system may determine that no intent exists or may not identify a link to a product database or any reference to a product that may match products listed in a product database. When there is no reference to a product database, the system processes the user input in the conventional fashion for the respective site (Google, Twitter, Facebook, Instagram, Pinterest) (2906). When there is some kind of data within the user input that links to a product database, the system changes to unconventional processing to present a buy option associated with recipients of the further processing of the user input (2908). Recipients of tweets, Facebook posts, Instagram pictures, results of a Google search, etc., and the like, will see a buy option and be enabled to purchase the product within the site through a service like Apple Pay or through the site storing and processing payment data for a user. When the user interacts with the buy option, new processing occurs to process the payment and/or delivery of the item. For example, a smooth transition from the site to a deep-link into a merchant or seller site that posted the user input can occur such that the user can easily purchase the item from the merchant site (2910). Alternately, the site can store payment information or a separate payment service can be utilized to process payment generally at the site and not by the merchant directly or through the merchant site.

Another aspect of this concept is characterized by a method including presenting, via a processor, an input field on a user interface of a generalized search entity, wherein the generalized search entity processes data using a generalized search engine that indexes to enable searching of non-merchant sites. The method includes receiving user input in the input field and when the user input does not correspond to data in a product database that is provided to the generalized search entity, (1) presenting a search result including a non-merchant site, (2) receiving a search interaction associated with the non-merchant site and (3) transitioning to the non-merchant site.

When the user input corresponds to a product in the product database, the method includes presenting a purchase-related search result. The purchase-related search result can be configured such that when a user interacts with the purchase-related search result and confirms a purchase associated with the purchase-related search result, the generalized search entity initiates a purchasing process for the product. The method can further include correlating the user input against the product database to yield a correlation, wherein the correlation is included when determining whether the user input corresponds to the product in the product database.

The method can also further include receiving an interaction associated with the purchase-related search result to confirm the purchase of the product and processing the purchase of the product by the generalized search entity using user payment data stored with the generalized search entity. The merchant associated with the purchase-related search result can provide the product database associated with products available at the merchant available to the generalized search entity for generating the purchase-related search result. In one aspect, the method includes receiving an interaction with a buy option associated with the purchase-related search result and managing a purchase of the product based on payment information stored at the generalized search entity, wherein delivery of the product is handled via a merchant site separate from the generalized search entity. The generalized search entity can receive a payment for initiating the purchasing process. In another aspect, the purchase-related search result can be viewable when the user selects a set of additional search results after being presented with a first set of search results. This can occur when there are too many search results to show at a same time on a viewing screen of a device.

In another aspect, from the merchant standpoint, a method can include providing, via a processor, a database of products from a merchant to a generalized search entity and receiving a payment for a product sold by the merchant. In this scenario, the product can be purchased on-line or in-app by a user, wherein the product is found and purchased by the user by operations performed by the generalized search entity. The operations performed by the generalized search entity include presenting an input field on a user interface, wherein the generalized search entity processes data using a generalized search engine that indexes to enable searching non-merchant sites, and receiving, in the input field, user input from the user. When the user input does not correspond to data in the database of products, the operations include (1) presenting a search result including a non-merchant site, (2) receiving a search interaction associated with the non-merchant site and (3) transitioning to the non-merchant site. When the user input corresponds to a product in the database of products, the operations include presenting a purchase-related search result for the product. The purchase-related search result can be configured such that when a user interacts with the purchase-related search result and confirms the payment associated with the product in the purchase-related search result, the generalized search entity initiates a purchasing process for the product.

In another aspect, a method includes presenting an input field on a user interface of a generalized search entity, wherein the generalized search entity processes data using a generalized search engine that indexes and searches both merchant sites and non-merchant sites, receiving user input in the input field, wherein the user input includes a text-based query, correlating the text-based query against a product database of products for sale from merchants to yield a correlation, and determining, via a processor and based on the correlation, that the user input into one of a search intent and a purchase intent to yield a determination. When the determination indicates the search intent, the method includes presenting a search result including a non-merchant site, receiving a search interaction associated with the non-merchant site and transitioning to the non-merchant site.

When the determination indicates the purchase intent, the method includes presenting a purchase-related search result including a buy option associated with the user input, wherein the purchase-related search result is configured such that when a user interacts with the purchase-related search result and confirms a purchase via interacting with the buy option, the generalized search engine initiates processing of a purchase of an item and receiving an interaction associated with the purchase-related search result.

Another aspect of this disclosure relates to how to present a group of search results in order to take into account this new structure for presenting search results as well as how to present a more traditional advertisement. A method in this regard includes receiving a user input at an input field of a generalized search engine operated by a generalized search entity, and in response to the user input, presenting a plurality of search results. The plurality of search results includes a first product advertisement configured according to a first type of advertisement. The first product advertisement, when selected by a user, can be configured to transition the user to a merchant site associated with the first product advertisement such that the user interacts with the merchant site to receive a payment for a first product. In response to the user input, the method includes presenting, as part of the plurality of search results, a second product advertisement configured according to a second type of advertisement. The second product advertisement, when selected by the user, can be configured to enable a purchase of a second product. The purchase of the second product is initiated by the generalized search entity using payment data for the user that is stored with the generalized search entity, a network-based payment entity, or on a user device. In this case the user does not transition to the merchant site but the generalized search entity handles the initiation of the payment process. This reduces friction and provides a more amazon.com type of experience although the user initiated the search on a generalized search entity. The purchase of the second product being initiated by the generalized search entity includes not transitioning the user to the merchant site as part of the purchase of the second product. When the user selects the second product advertisement and the purchase of the second product is managed by the generalized search entity, the method includes notifying a merchant who sold the second product of a sale and providing delivery information for the user to the merchant from the generalized search entity.

The first product and the second product can represent a same product or a different product. At least one of the first product advertisement and the second product advertisement are viewed by the user on a user interface after the user interacts with the user interface to request to view additional advertisements from a set of advertisements initially presented to the user in direct response to the user input. This is the case where there are too many search results to show them all on a same user interface.

The plurality of search results can further include a third product advertisement having a third type of advertisement, wherein the first type of advertisement, the second type of advertisement, and the third type of advertisement each have a different payment process.

The first type of advertisement and the second type of advertisement can differ with respect to whether selecting the first product advertisement or the second product advertisement, to yield a selected advertisement, transitions the user to a merchant associated with the selected advertisement.

In another aspect, a method includes receiving a user input at an input field of a generalized search engine operated by a generalized search entity and in response to the user input, presenting a plurality of search results. The plurality of search results can include a first product advertisement configured according to a first type of advertisement, wherein the first product advertisement, when selected by a user, is configured to transition the user to a merchant site associated with the first product advertisement such that the user interacts with the merchant site to manage a payment for a first product. In response to the user input, the method can include presenting, as part of the plurality of search results, a second product advertisement configured according to a second type of advertisement, wherein the second product advertisement, when selected by the user, is configured to enable a purchase of a second product, wherein the purchase of the second product is initiated by the generalized search entity using payment data for the user that is stored with the generalized search entity or on a user device.

From the standpoint of a merchant entity, a method can include providing a database of products associated with a first merchant site to a generalized search entity, and receiving a communication from the generalized search entity that a user purchased a first product from the database of products associated with the first merchant site through operations managed by the generalized search entity. The operations can include (1) receiving a user input from the user at an input field of a generalized search engine operated by the generalized search entity, and (2) in response to the user input, presenting a plurality of search results. The plurality of search results an include a first product advertisement configured according to a first type of advertisement, wherein the first product advertisement, when selected by the user, is configured to enable a purchase of the first product from the first merchant site, wherein the purchase of the first product is initiated by the generalized search entity using payment data for the user that is stored with the generalized search entity, a network based entity or on a user device. The operations can include (3) in response to the user input, presenting, as part of the plurality of search results, a second product advertisement configured according to a second type of advertisement, wherein the second product advertisement, when selected by the user, is configured to transition the user to a second merchant site associated with the second product advertisement such that the user interacts with the second merchant site to manage a payment for a second product.

FIG. 30 illustrates an example related to social media and particularly to Facebook. An example method includes receiving a posting of at least one of text, an image or a video through a social networking site, wherein the social networking site receives and transmits posted items from a posting entity to receiving entities (3000), and identifying data associated with the posting (3002), determining whether the data identifies a product within a database of products for sale from the posting entity to yield a determination (3004). When the determination indicates that there is no reference to the product in the database of products, the method includes transmitting the posting through the social networking site without an option to buy (3006). When the determination indicates that the posting references the product in the database of products (which can indicate a sale-related intent), the method includes transmitting the posting through the social networking site with a buy option associated with the product and receiving a purchase interaction from a buyer associated with the buy option (3008). This can simply include a user or recipient viewing or clicking on a posting to cause further processing to occur. Optionally, the method includes processing a purchase of the product based on the purchase interaction, such that processing the purchase occurs within the social networking site or a webview presented version of the site. Processing the purchase within the social networking site can be accomplished through payment information stored at the social media site or through another payment service like PayPal® or Apple Pay®. The browser API could also be used to process a payment via a user interface. These services are integrated with the site such that user interaction with the buy button triggers a payment from one of the services which is integrated into the process between the social media site and the merchant.

Determining whether the posting can be associated with the product in the database of products from the posting entity can further include communicating between the social networking site and the database of products via an application programming interface. The step of processing delivery of the product can include informing the posting entity selling the product through an application programming interface to ship the product. A user can have a pre-existing account storing preferences governing how the image or the video and the buy option are presented and processed.

The process can also include with respect to a product database, a step wherein when a correlation exists between a product identified in a posting from a posting entity and a product database, then providing by the social media entity a payment or purchasing process in which the user stays within the social media entity (i.e., is not transitioned to the merchant site) to manage a payment process or initiate a payment process. The coordination between the social media entity and the product database enables the user to view and confirm a purchase of the product all while in the social media entity. The user can then easily go back to looking through a newsfeed or at other postings and the purchasing process has much less friction. This aspect does not require a separate determining step but takes certain actions when there is a correlation to a product database. When there is no product listing or shown in a posting that is correlated to a product database, the posting is handled in a traditional fashion.

In another aspect, rather than processing the payment at the site as described above, the method can include transitioning the buyer from the social networking site to a deep link in a site operated by the posting entity. In this manner, the merchant can receive the user at a preconfigured position and state within the merchant site for viewing and purchasing a product through the merchant site directly.

In another aspect, the method is practiced from the standpoint of the merchant. The merchant submits, as a posting entity, at least one of text, an image or a video through a social networking site to yield a posting. The site then processes the posting as outlined above. If a user clicks on the posting or initiates processing towards a purchase of an item in the posting, then the processing can include processing, by the posting entity, a delivery of the product based on the purchase interaction. The posting entity can also receive the deep link transition from the social media site to its own site for continuing to shop, process the payment and delivery of the item, and so forth. This process outlined above provides various aspects for managing buy buttons through social media sites like Facebook and others.

FIG. 31 illustrates another example social media aspect which can be applicable to such media as Pinterest, Instagram, Youtube, etc. The social networking site can be one of a video or image sharing site, or a pinboard site. The method includes receiving, from a posting entity, a posting of an image or a video through a social networking site, wherein the social networking site receives and transmits posted items from the posting entity to receiving entities (3100), analyzing, via a processor, the posting of the image or the video for associated text-based data (3102), and determining whether the associated text-based data identifies a product within a product database for sale from the posting entity to yield a determination (3104). When the determination indicates that there is no reference to the product in the product database, the method includes transmitting the posting of the image or the video through the social networking site without a buy now button (3106). When the determination indicates that the posting of the image or the video references the product in the product database (which can indicate a sale-related intent), the method includes transmitting the posting of the image or the video through the social networking site with a buy option associated with the posting of the image or the video, wherein the buy option can include one of a button, a drop-down menu, or a hyperlink (3108) and receiving a purchase interaction associated with the buy option (3110). Optionally, the method can include processing a purchase of an item based on the purchase interaction. This occurs when the recipient actually clicks on the posting and completes the purchase. Notably, the concept here generally involves the novel structure of the posting and not necessarily the payment processing when a user makes a purchase. The posting with a buy button could also simply be initiated by the posting entity as an advertisement type posting with a buy button as part of the posting.

Determining whether the posting of the image or the video is associated with the product in the product database from the posting entity can include communicating between the social networking site and the product database via an application programming interface. Processing delivery of the item can include managing a payment for the item via a payment account associated with the social networking site (i.e., stored at the site or integrated with a separate payment service) in which the payment account is not stored with the posting entity and informing the posting entity selling the item through an application programming interface to ship the item. The user can have a pre-existing account storing preferences governing how the posting of the image or the video and the buy option are presented.

As with the Facebook example above, another aspect of the method can be practiced from the standpoint of the merchant. The merchant submits, as a posting entity, at least one of text, an image or a video through a social networking site to yield a posting. The site then processes the posting as outlined above. If a user clicks on the posting or initiates processing towards a purchase of an item in the posting, then the processing can include processing, by the posting entity, a delivery of the product based on the purchase interaction. The posting entity can also receive the deep link transition from the social media site to its own site for continuing to shop, process the payment and delivery of the item, and so forth. This process outlined above provides various aspects for managing buy buttons through social media sites like Pinterest, Instagram, Twitter, YouTube and others.

Another aspect of this social networking payment process can include the following method. A method can include one or more of the following steps from the standpoint of the social networking entity: receiving, from a posting entity and at a social networking entity, a posting of at least one of text, an image or a video. The social networking entity can receive and transmit posted items from the posting entity to receiving entities. The method includes determining, via a processor, whether the posting is associated with a product within a product database, the product being for sale from the posting entity, to yield a determination. When the determination indicates that there is no reference to the product in the product database, the method includes transmitting the posting through the social networking entity without an option to buy. When the determination indicates that the posting references the product in the product database (which can indicate a sale-related intent), the method includes transmitting the image or the video through the social networking entity with a buy option associated with the product, wherein the buy option includes on of a buy button, a drop-down menu, or a hyperlink.

Other steps can include receiving a purchase interaction associated with the buy option and processing a purchase of an item based on the purchase interaction, wherein initiating a process associated with the purchase occurs within the social networking entity.

The social networking entity can store payment and address data as well as other data for the user or it can retrieve them using one or more of the APIs disclosed herein. Determining whether the posting is associated with the product in the product database from the posting entity can include communicating between the social networking entity and the product database via an application programming interface. The social networking entity can notify the posting entity selling the product through an application programming interface to ship the product. In one aspect, a user can have a pre-existing account storing preferences governing how the image or the video and the buy option are presented. For example, the user can designate crypto currency payments or Apple Pay payment processes and so forth.

The social networking entity can include a website or an application downloaded on a user device which enables users to perform one or more of register, create a user profile, add friends, and exchange messages and posts of text, images, and videos. The buy interaction is received from a recipient of the posting.

The approach can also be described from the standpoint of a merchant who posts postings on the social networking entity. In this aspect, a method includes transmitting, from a posting entity, a posting of at least one of text, an image or a video to a social networking entity, wherein the social networking entity receives and transmits posted items from the posting entity to receiving entities. The method includes providing, from the posting entity to the social networking entity, a product database. When the posting references a product in the product database, the social networking entity can transmit the posting through the social networking entity with a buy option associated with the product. When the posting does not reference the product in the product database, the social networking entity can transmit the image or the video through the social networking entity without the buy option associated with the product. The buy option can be one of a buy button, a drop-down menu, or a hyperlink.

When a user interacts with the buy option, and based on a process of purchasing of the product being initiated within the social networking entity, the method includes receiving a notification from the social networking entity that the user has purchased the product and delivering the product to the user. The merchant receives a payment for the product based on the process of purchasing of the product initiated within the social networking entity. One benefit of this approach is that the user is not transitioned to a posting entity site associated with the posting entity as part of the process of purchasing of the product. This reduces friction in the payment process for the user and retains the user at the social networking entity.

Another aspect includes a method including transmitting, from a posting entity, a posting of at least one of text, an image or a video to a social networking entity, wherein the social networking entity receives and transmits posted items from the posting entity to receiving entities and providing, from the posting entity to the social networking entity, a product database. When the posting references a product in the product database, the social networking entity can transmit the posting through the social networking entity with a buy option associated with the product, wherein the buy option includes one of a buy button, a drop-down menu, or a hyperlink. When a user interacts with the buy option (while still within the context of the social media entity), and based on a process of purchasing of the product being initiated within the social networking entity, the method includes receiving a notification from the social networking entity that the user has purchased the product and delivering the product to the user. When the posting does not reference the product in the product database or there is no correlation between a product in a product database, the social networking entity transmits the image or the video through the social networking entity. This could occur because there is no product in the posting, or because there is no correlation of a product database with the social media entity. The posting then is handled in a more traditional way such as without any product, or with a link to enable the user to transition to the merchant site rather than remain within the social media site to confirm a payment.

In another aspect, the correlation can be determined to exist between the product associated with the posting and the product database via a link between the social media entity and the product database operated by the posting entity. For example, the posting entity can register with the social media entity and provide a link or connection of its product database to the social media entity through a protocol, API, or other means. The social media entity can then efficiently manage a payment process or initiating a payment process where the user can view products from a posting, purchase those products, all without leaving the social media entity environment. In other words, the user does not have to transition to the posting entity site or app to view and purchase products. This reduces friction and enables the user to purchase an item (without leaving the social media entity site or app) and then continue looking at other postings by the social media entity.

There can therefore be an integration between product inventory of a merchant and the social media entity such that products in postings that are in the product inventory that is integrated with the social media entity can be sold to users while remaining within the social media entity environment. The products can be tagged or identified by the posting entity and that information can be utilized to enable the purchase process. The user's payment data can be stored at the social media entity the first time and then used for later purchases, or other API-based methods or alternative payment methods can be used for the purchase process. In this scenario, users can also make purchases from stories, profile data for the posting entity, and any other location within the social media entity and not just postings per se. Users might also be transitioned to other products besides those formally within a posting, and be able to choose and purchase them all within the social media entity environment as well. Merchants may set up product catalogs directly on the social media entity as well, in which case there is no correlation to an outside product catalog that is needed. The correlation may also be between one social media environment to another.

Product Management Engine

This disclosure now turns to a product management engine, purchase manager or an engine that manages product purchase across multiple platforms.

Figure 32:
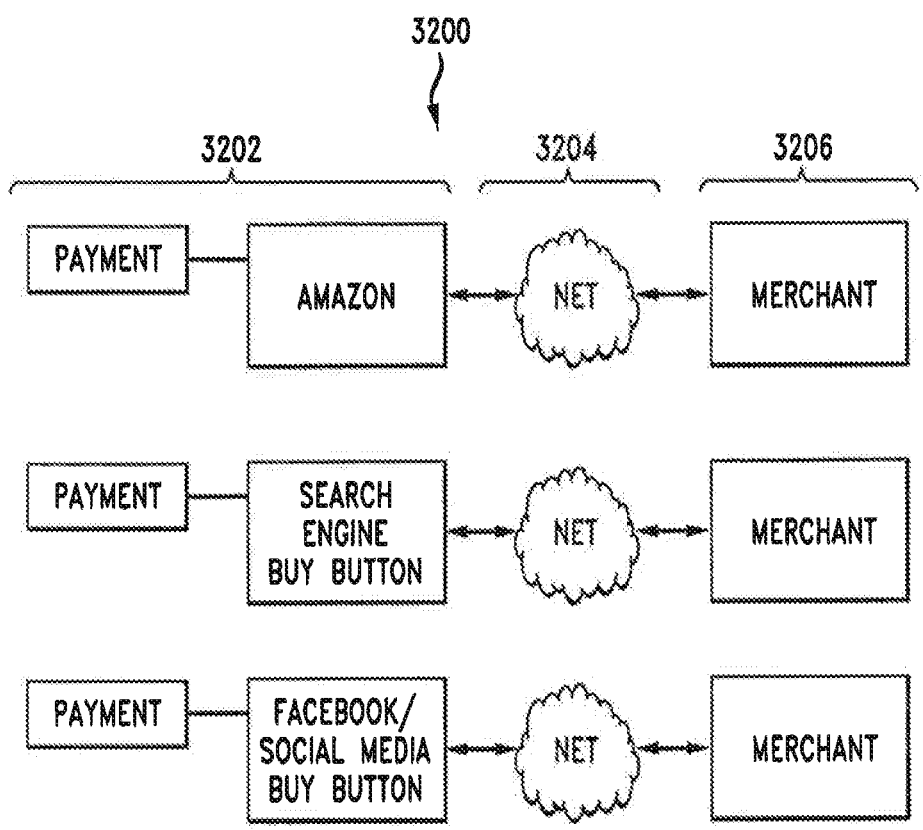
FIG. 32 illustrates an example environment for a purchase manager.

FIG. 32 illustrates a general environment 3200 which the present disclosure addresses. Feature 3202 illustrates various systems for making purchases. For example, Amazon.com can provide purchases through the Internet 3204 from merchants 3206 using a payment method as is shown. Similarly, as disclosed above, other entities such as search engines or social media applications can provide buy buttons in which payments can be processed 3202 and communications via the Internet 3204 with merchant 3202 can enable the delivery of such purchased products. Similarly, social media sites such as Facebook can also provide buy buttons in which payments are processed 3202 and communication through the Internet 3204 with merchant 3206. As is illustrated, however, in FIG. 2, there is no coordination between these various types of methodologies in which purchases can be made by users over the Internet. Because of the disparate offerings of the ability to buy products across multiple platforms on the Internet and mobile applications, people can easily forget what they bought and where they bought it from. For example, a person may have bought an umbrella off of a one-click offering a week ago, it may not have arrived, and they may not remember whether they bought it off Twitter, Google.com, or Facebook. With one system like Amazon.com, it is easy to go to the user's account and manage the purchase history. With the new buy button environment, accessing the purchase history becomes much more difficult. Accordingly, the present disclosure addresses this issue and seeks to provide an enhanced user account via a product purchase managing system or engine.

Figure 33:
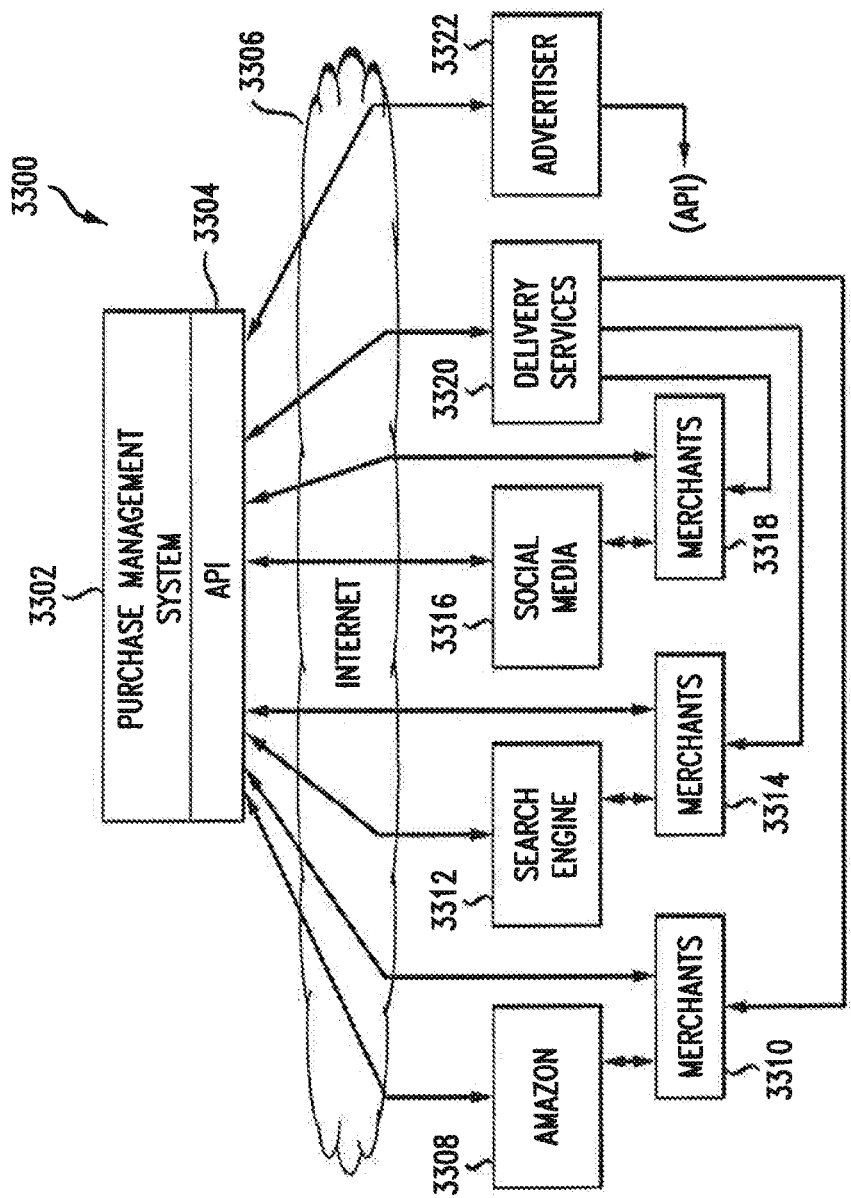
FIG. 33 illustrates a further interaction between the purchase manager and various entities.

FIG. 33 illustrates this approach. The overall ecosystem 3300 involves a purchase management system 3302 or a product purchase history management engine. An API 3304 is provided which enables communication from a number of disparate entities with a goal of harmonizing and receiving various purchasing data, correlating that data and harmonizing that data, and presenting a unified purchase history and management user account such that is accessible through a number of disparate purchasing platforms.

For example, the API 3304 can communicate information to and from a merchant aggregator site 3308 such as Amazon.com and the like. Thus, consider that all of the information found in a user's account and purchase history can be communicated through the API 3304. Amazon sells products for merchants 3310. Such merchants in a similar manner to which they communicate with Amazon.com 3308 their purchases, prices products and so forth, can also communicate through API 3304 with the purchase management system 3302.

In a similar manner, with the advent of the buy button and various different environments, when purchases are made through a search engine 3302, the search engine can communicate via the API 3304 with the purchase managing system 3302. Similarly, the merchants 3314 that sell products through a search engine 3312, can communicate information through the API. In a similar way, purchases made on social media 3316 through their respective merchants 3318 can also communicate via the Internet 3306 and the API 3304 with the purchase management system 3302. Delivery services 3320 also are integrated with various merchants 3310, 3314, 3318 and can also communicate via the API 3304 with the purchase managing system 3302. Furthermore, advertisers 3322 can communicate through the API 3304 or through other means with the purchase managing system 3302 to receive valuable purchasing behavior information which can enable improvements to providing advertisements through any of the outlet or for any of the merchants. Thus, any of the merchants 3310, 3314, 3318 can have not only access to sell their products through the various means shown in FIG. 33 but may also have their own separate websites and the business intelligent data 3322 can be utilized and provided to any of these avenues for making purchases and improving the advertisements for users. The API can be structured such that standardized calls and communication protocols can be used to identify and exchange between the engine or other agent handling the aggregation and management and merchants or users all of the various types of data needed to perform this process. This can include such data as product purchased, delivery address, whether the product is a gift, messages associated with delivery, delivery scheduled time, current delivery status, predicated delivery time, warranty information, payment status, backorder status, return status and/or information, and so forth. These and any other data useful for managing purchases can be requested, transmitted, received or otherwise communicated between the API and any of the components communicating through the API.

The API can also include such features as when and how to present an interactive button or graphic for accessing the engine. For example, the use of this management engine is in the context of users making one-click or other purchases across disparate applications or websites. A payment request API is also disclosed herein. A merchant may, for example, request when submitting a call to a payment request API, or other API or through its own processing, that a produce purchase management access button be also presented in the interaction. In this manner, the ability to access the user's account is presented where the user is—on a social media site, making a purchase at any location, and so forth. The call to request the access button could include a request for an analysis or the results of an analysis about the user's account which could indicate that there is a probability that the user might desire to make some kind of change or check their account. For example, a merchant may request that if the users had regular account access and/or changes and the timing is such that the user might be accessing their account again soon, that an account access button be presented while or after they make a buy button purchase. Then the user could see the current purchase and review their other purchases while they are "in the zone" of making purchases. The analysis could determine that the user has in their account a similar product to what they are about to purchase or have just purchased and they might want to review their overall account to insure that they are not double buying. Thus, the system can provide an intelligent consideration of whether to include an access button to the purchase history and management engine for the user purchases. This access button can be offered up by request from the merchant, by user profile considerations, or via a separate entity. For example, the user may place in their profile indicators that they don't want to see the access button every time unless the purchase they are about to make conflicts with or is a duplicate of a previous purchase. The user may desire to see the purchase history after every purchase or have an option presented to them to access their account history. The access button can be visually and/or audibly configured (i.e., brighter, flashing, making a certain sound) to give notice if there might be something abnormal (a double purchase just happened, or a late delivery is expected of an item) in the purchase history and that the user should check. In this scenario, given the limited display space for example in mobile purchasing, the system can more intelligently determine when to present an access button (or other access mechanism such as audibly) to the user such that its display is connected to a likely need for the user to review or make changes in the purchase history.

Machine learning engines can also be applied to the user's actual usage and accessing of their account. Thus, the system could start by offering up the button every time or every other time or under some other strategy and learn how and when the user accesses their account. For example, the system may learn that the user only accesses their account through Amazon.com and thus the system stops presenting access buttons on social media or search engine sites. Or the system may learn that usually within 2 weeks of any purchase the user accesses their account to check the status. Thus, the machine learning algorithm learns and applies new rules for presenting the access button within two weeks after a purchase and for 3 days and if the user does not access their account, the access button disappears. Of course, access can always be achieved through a tab or account button which is always available but the "one-click" access to their purchase history and management system can be managed as disclosed herein. Alternately, the access to the purchase history management system can be offered through other means as well, such as through a link in a text or an email, or a voice activated system, and so forth. The user profile, machine learning algorithm, or through other triggering events can cause, for example, the system to notify the user that they should access their account to check something. If, for example, a package that is scheduled for delivery the next day is going to be late, the system can provide a notification through any outlets such as email, text, social media message or posting, or a notification to where the user "is" such as when they are making a Google.com search or on Facebook.

Furthermore, FIG. 33 shows communication in both directions between the API 3304 and the respective purchasing avenues. Thus, an example shall illustrate the point. Assume that a user has an Amazon account and has made three purchases from different merchants through Amazon.com 3308. That user could go into their account and handle various matters associated with their purchases such as tracking, delivery, cancelling the purchase and so forth. However, that account is limited to only purchases made on Amazon. Using the principles disclosed herein, if a user were to purchase a widget via a search engine 3312 from a merchant 3314, that information would be provided through API 3304 to the purchase management system 3302 and then combined with the existing purchases on the Amazon.com user account. In this account, a user could go into their user account on Amazon.com 3308 and be able to also view the widget purchase via the search engine 3312 and manage that purchase as well. Additionally, that correlated data could also be presented to all of the outlets 3312 and 3316. Thus, via the search engine or a social media site or some other site that perhaps does not even sell products, a correlated user account can be accessed in which the three Amazon purchases and the one search engine purchase could all be viewed and managed completely or near completely, thus simplifying the overall process for the end users.

Figure 34A:
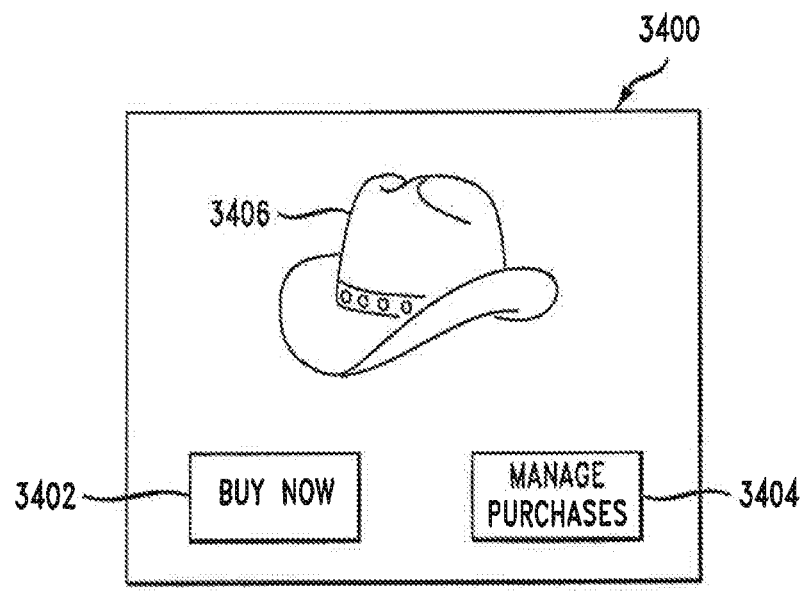
FIG. 34A illustrates a buy now advertisement with a manage purchase access button.

FIG. 34A illustrates an interface 3400 which includes a presentation of a product 3406 (a hat) and a buy now button 3402 and a "manage purchases" button 3404. This interface 3400 can represent any interface on any of the approaches for buying products. Thus, the interface 3400 could represent a buy now advertisement as a part of search results on Google.com, or a Pinterest post which enables a user to buy the present product, and so forth. In any of these outlets, a manage purchases button 3404 can be interacted with by the user to access their user account.

Figure 34B:
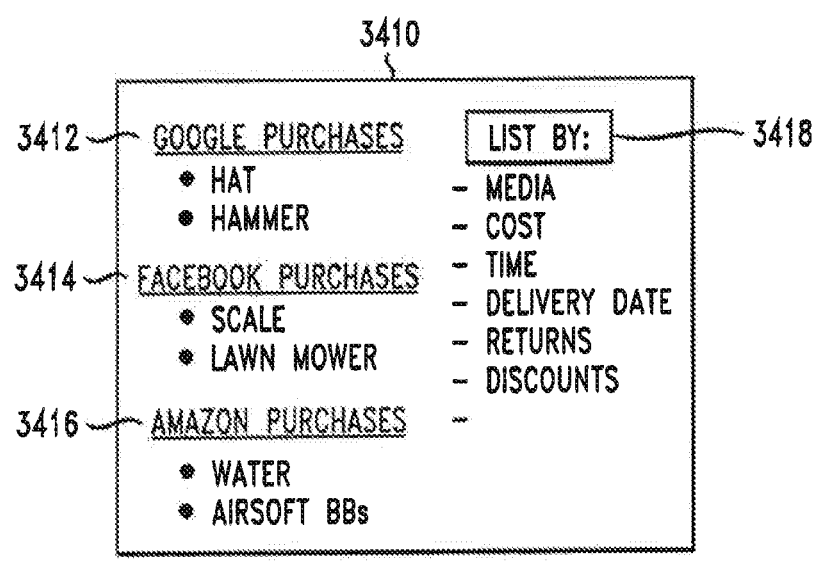
FIG. 34B illustrates an account interface for a purchase manager.

FIG. 34B illustrates an example user account 3410. Here, an illustration of Google purchases 3412, Facebook purchases 3414 and Amazon purchases 3416 are presented in a simplified manner. The user is given the option to list these purchases 3418 in various ways. The user could, for example, organize these purchases by virtue of media, cost, time, delivery date, returns, discounts, and so forth.

FIG. 35 illustrates a more detailed user account 3500. Here, various tabs 3502 are presented for the user to be able to review orders, open orders, digital orders, or cancel orders. Various options 3504 enable the user to manage their orders placed in the last six months (or any period of time), by media, by cost, by merchant, by delivery date, and so on. Information 3506 can include such information as the purchases made by Google and the merchant is Joe's Sporting Goods. The user has the option to buy the product again 3510 or includes other options 3508 such as tracking the package, returning or replacing the items, leaving package feedback, writing a product review, archiving the order, and so forth. As can be appreciated, the addition of purchase details from other traditionally non-merchant sites provides an improvement over the previous operating and management of user accounts to enable users to more easily manage their purchases. The data for the listing of orders could be stored on the browser or local user device as well and received and/or transmitted via a browser interface or API as is shown in FIG. 17I. In other words, the browser API of FIG. 17I could be also implemented not just to store a shopping cart of items across multiple sites but also to maintain a persistent listing of products purchased for later retrieval and processing or tracking of progress. Such a retrieval could also then occur just from a browser object if all of the purchasing history data is stored in the browser.

Figure 36A:
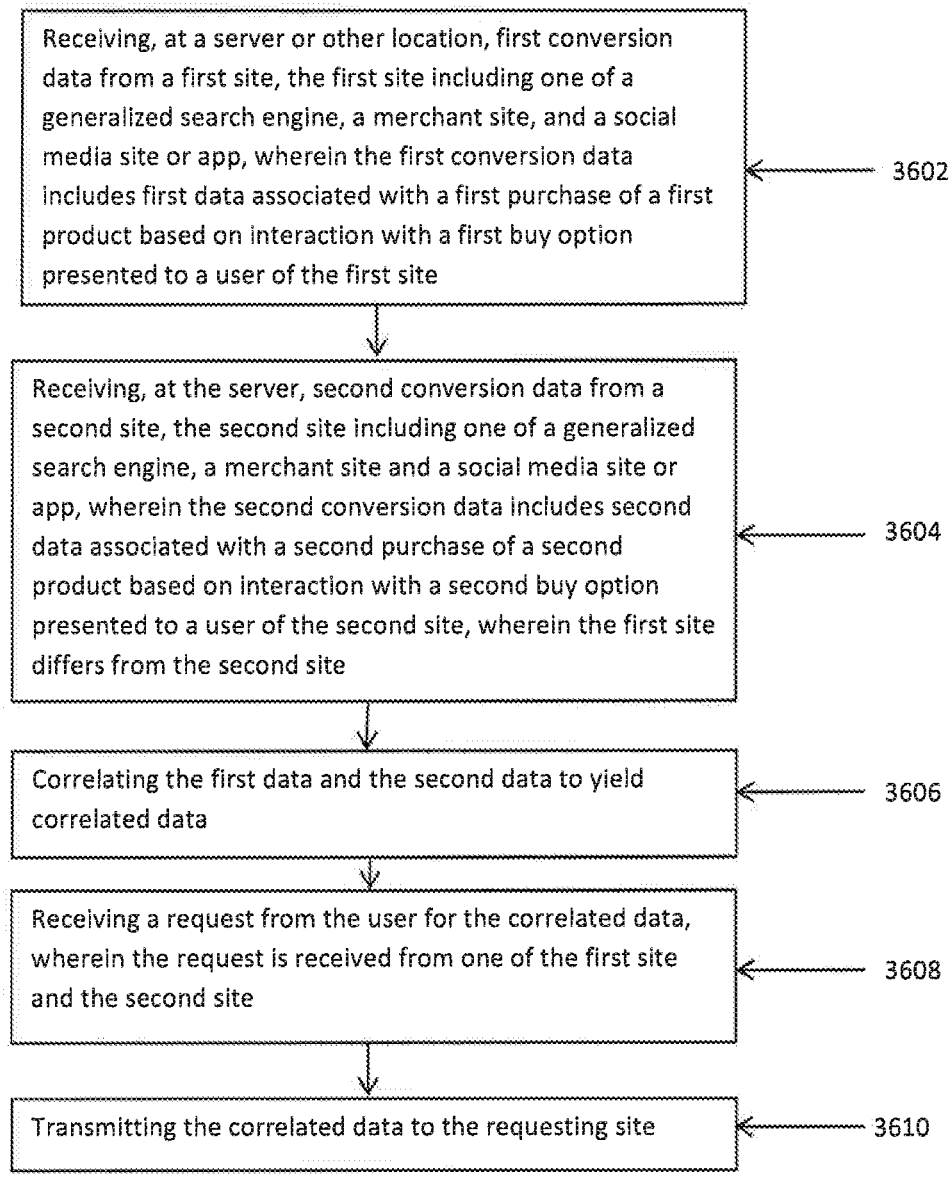
FIG. 36A illustrates another method example.

FIG. 36A illustrates a method aspect of the product management engine. The method includes receiving, at a server or other location, first conversion data from a first site, the first site including one of a generalized search engine, a merchant site, and a social media site, wherein the first conversion data can include first data associated with a first purchase of a first product based on interaction with a first buy option presented to a user of the first site (3602), receiving, at the server, second conversion data from a second site, the second site including one of a generalized search engine, a merchant site and a social media site, wherein the second conversion data can include second data associated with a second purchase of a second product based on interaction with a second buy option presented to a user of the second site, wherein the first site differs from the second site (3604). The method includes correlating the first data and the second data to yield correlated data (3606) and receiving a request from the user for the correlated data, wherein the request is received from one of the first site and the second site to yield a requesting site (3608). The method can include transmitting the correlated data to the requesting site (3610). As can be appreciated, this approach enables the "micro-moments" to not only encompass purchasing decisions but purchase history management decisions. This disclosure places access to a broad user purchasing account at the fingertips of users wherever they happen to be—whether on Facebook, Instagram, Pinterest, Twitter, etc. The transmission of the user account data does not have to only be to a purchasing site but could be to any location, any application. Thus, the user might be using their outlook for emails and have an option to access their purchasing account via an API and accessible to an option selectable via the Outlook application, even if no "buy now" buttons or options are available to Outlook. Even if outlets like Twitter were to pull away from the buy button feature, users still spend time on such social networking sites and the access to the purchase history management engine could be granted there.

The social media site can include one of a site for exchanging images, a site for posting images and comments, a site for exchanging short text messages, and a site for posting videos. The first site mentioned above can include a generalized search engine that determines an intent of a user by analyzing textual user input as being one of a purchase intent and a search intent. When the intent of the user is the purchase intent, the generalized search engine can respond to the textual user input with a response including a buy option associated with the first product. Transmitting the correlated data to the requesting site further can further include transmitting an interface to the requesting site that enables the user to perform one or more of the following operations: (1) cancel the first purchase of the first product or the second purchase of the second product; (2) replace the first purchase of the first product or the second purchase of the second product; (3) track a shipment of the first product or the second product; (4) read reviews of the first product or the second product; (5) purchase more of the first product or the second product; (6) modify a purchasing account used to purchase the first product or the second product; (7) modify an address to which the first product or the second product will be delivered; (8) modify a date upon which the first product or the second product should be delivered to a recipient address; (9) write a product review for the first product or the second product; (10) organize a respective presentation of the first product and the second product by one of (1) which respective site was used to purchase the first product and the second product; (2) a respective cost of the first product and the second product; (3) a respective merchant that sold or delivered the first product and the second product; (4) a respective date of purchase of the first product and the second product; (5) a respective delivery data associated with the first product and the second product; (6) a discount rate or percentage of the first product and the second product; (7) cancelled orders; (8) digital orders; (9) open orders; and (10) a user customizable category. The user could also purchase a warranty for one of the first product and the second product.

The correlated data can be made available to the first site and the second site via receiving an interaction from the user with an option to access a user account that maintains the correlated data and manages purchase across multiple different types of sites including at least the first site and the second site. The option to access the user account can include a button or drop-down menu presented on the first site and the second site. The server can communicate with the first site and the second site via an application programming interface. The user account in one aspect can be correlated with a merchant aggregation site having a merchant aggregation site user account that manages purchases from the merchant aggregation site.

The method can also include receiving, at the server, third conversion data from a merchant site, wherein the correlated data further includes the third conversion data. The merchant site can be not a merchant aggregator site but an individual merchant site. In other words, Amazon.com aggregates many merchants for managing the sale of products, but individual merchants can also provide and receive data from the product management engine.

Cryptocurrency

It is noted that any of the APIs or financial transactions disclosed herein could be implemented through blockchain technology. Thus, any communication between a buyer and a seller or products could be implemented through a contract on a blockchain and payment could be submitted through user addresses according to blockchain technology. For example, a smart contract programmed and implemented on a blockchain could receive and implement items in the transactions.

Another aspect of this disclosure is how to implement a "one-click" or buy button purchasing opportunity on a search engine result, an interface to a merchant site where a purchase can be made, or a buy button posting on a social network. The concept could also work simply from any application or website where a purchase of an item or service is possible. In these contexts, to make the purchasing process more efficient, the payment/delivery information is stored at the search entity, social networking entity, a separate agent, a browser, or in any other location so that the data can be applied to a purchasing transaction in such a way that the user does not need to manually fill out fields (such as address, credit card number, etc.) to complete a purchase. Filling out these fields prevent more purchasing conversions. The approach disclosed herein can be done through APIs or other protocols to request data, retrieve the data, and fill in the payment forms and give the user a more "one-click" type of experience. This is implemented for example through the W3C Payment Request API or Android Pay API, the details of which are described in the priority applications to the present application. The browser or the payment API can also communicate with a payment app on the user's device to handle the payment process as well according to the payment app's functionality.

However, with a blockchain approach used for altcoin payments, there is no entity that "holds" the payment account like a credit card. There are three elements to the blockchain and using cryptocurrency to make purchases. There is an address, a private key and wallet software. The address is where others can send bit coin to the person or entity. The private key is the cryptographic secret by which a person can send Bitcoin (or any altcoin) to others. Whenever a particular altcoin like "Bitcoin" is referenced, it could apply to any type of cryptocurrency. The wallet can also store a record of the amount of altcoin you control on the blockchain ledger. The ledger is distributed as well across the nodes in the network.

Wallet software is the software that a person runs on their own computer to manage their Bitcoin. Wallet projects are provided by companies such as ChromaWallet, CoinSpark and CounterWallet. Other companies include Coinprism, Melotic and OneWallet. Typically, to send someone or an entity an altcoin, the sender scans the wallet address QR code or otherwise obtains the address characters for the recipient via email or other means. The sender uses the wallet application to enter additional information about the transaction such as the amount, fee, delivery costs, etc. When the sender confirms the transaction using their private key, a message is broadcast from the owner of the sending address to the network that x number of coins from that address now belong to the new address. It is authorized by the sender's private key. After a few minutes, the transaction will be inscribed in the blockchain per blockchain miners and a confirmation notice can be sent. An altcoin address as well as a public and private key is generated automatically when a user set up their wallet. The altcoin address is typically an identifier of 26-34 alphanumeric characters, beginning with 1 or 3, the represents a possible destination for an altcoin payment. Sometimes the address is represented as a QR code. It can operate like an email address. People with a user's public-key wallet address can send the person altcoins.

The present disclosure incorporates this functionality and simplifies it in the context of making purchases on the web or a mobile application. What will occur when using Bitcoin, Litecoin (or any cryptocurrency) is, in one example, a new API that coordinates the altcoin payment through an individual's wallet stored on their device and the purchasing interface (i.e., a buy button search result, a purchase option on a merchant site or a buy now item posted on a social media site). Components such as storage, messaging, wallet interactions, mobile payments, identity confirmation, security, and reputation can be managed using tokens and proper communication protocols of the necessary information to integrate altcoin payments into the Payment Request API widely adopted.

It is assumed that a merchant will accept cryptocurrency in this scenario. Thus, when the circumstances disclosed herein are applicable, and a buy button is presented to a user, the user will be enabled to make the purchase using their private key to access their altcoin, and the address of the merchant to be able to receive the payment of the altcoin. The wallet software can keep a copy of the blockchain—the record of all the transactions that have occurred in the particular currency—as part of the decentralized scheme by which coin transactions are verified. The wallet can be browser-based, application based, or can be a separate application or smartphone wallet from Blockchain.info, Mycelium, Coinbased, Electrum or other provider. In other words, one aspect of this disclosure is to incorporate the wallet into a browser such that the user's credit/debit/other payment account is stored, their address, as well as their altcoin wallet. Alternately, a protocol can communicate data between a browser (which uses the API between the browser and the merchant) and the altcoin wallet. For example, the wallet may share the address and the private key to perform a payment but then receive the details to add the payment to the blockchain.

As noted above, for a user to send altcoins to a merchant to make a purchase of an item, the user needs the address of the merchant and the private-key part of the buyer's wallet where the software will check that they have control over the altcoins to be paid to the merchant. In some cases people scan a QR code for the wallet address. Usually, the sender (buyer) scans the QR code of the recipient's address and uses the wallet application to enter additional information about the transaction, such as amount, transaction fee (affirming an amount prespecified by the wallet software), or any other parameters. When the sender submits the transaction, a message is broadcast from the owner of the sending address to the network that x number of coins from that address now belong to the new address. The operating is authorized by the sender's private key. The sender may enter in their private key or a password or fingerprint, voiceprint, or other authorization may be used to retrieve the sender's private key. The transaction is received almost immediately at the receiver's wallet application, with an "unconfirmed" status and after about 10 minutes, the transaction is confirmed and can be inscribed in the blockchain per blockchain miners.

Applying the basic altcoin operation to the current scenario, several modifications and novel features must be implemented. The goal is to enable in a simple and easy fashion the ability of a user to choose an altcoin payment as though it was a Visa payment or a Mastercard payment managed through the payment request API, although the altcoin is processed in a completely separate way. Currently, for example, in a user's Amazon.com account, several credit cards can be listed and one can be chosen for a payment. This approach will enable an altcoin payment for a purchase as well.

Enabling a simple "one-click" ability to choose an altcoin payment process and then handle the payment has some issues. If a user is on a mobile device and wants to make a purchase, they will not be able to scan a QR code of the merchant address. Plus, not all buyers will have bitcoin type wallets. Thus, through an API a merchant advertising or posting an interface that a user can ultimately interact with to make a purchase can receive data that the person viewing the advertisement or interface has a cybercurrency wallet set up and has a profile that indicates that they might make the purchase through bitcoin or other currency. An API can exchange the necessary requirements and data such that in the context of an advertisement or other interface in which the user is in a state in which a purchase intent is indicated or can take place, the same kind of authentication used by the buyer's altcoin wallet can be integrated into the interface such that the user will just need to perform the same kind of function to access their private key. This might be through biometrics, a password, and so forth. The integration can include retrieving an amount of money, address of delivery, date, merchant, and all of such data with the application and retrieval or receipt of the buyer's private key and use of their cryptocurrency wallet so that the payment can be made in cryptocurrency but the delivery, management of the life cycle of the product purchase and delivery and potential return, etc. is handled in the normal fashion by the merchant.

In this regard, assuming that the data indicates that a wallet exists or a user preference notifies a merchant that altcoins will/can be used to buy products, the advertisement or the graphical presentation will include as part of its data the merchant address to which altcoins can be addressed. In one scenario, the "buy button" could include options to use a stored credit/debit card or any other traditional payment account or the user could choose a cryptocurrency account. If a traditional payment account is chosen, then the processes disclosed herein to utilize the payment account stored at the search entity, social media site, browser, other payment agent or other location to either process the purchase or transmit payment data to the merchant site through the API for providing the necessary data for the merchant to process the payment (i.e., so the user does not have to fill in the forms). The various requests and responses exchanged through the API enables the payment information/delivery information and/or other information to be communicated to the merchant site such that the purchasing process is simply and does not require the user to fill out fields in a payment form.

The process disclosed herein adds the cryptocurrency payment opportunity. If an altcoin payment is chosen, then the interface interacts through an API or other protocol with the user's wallet to retrieve the user's private key or enable the user to enter the private key so that the cryptocurrency transaction can occur and the merchant can be paid. For example, a one-time use token could be generated which provides the address and/or private key to the merchant site such that it can perform the payment function. Or, the API can receive from the merchant site the amount, merchant address, any other data such as tax, fees, etc., and the API can receive that data and communicate with the wallet or browser to process the payment from the user's altcoin wallet. The altcoin wallet could be integrated into the browser such that the processing is performed by Chrome, Mozilla, Internet Explorer, etc. If the API is between the merchant and the browser, a separate API or protocol could communicate the data between the browser and a user's altcoin wallet on their device. Again, the actual transfer of altcoin to the merchant can occur in any component that is workable. It could be through the user's altcoin wallet, an instance of the altcoin wallet incorporated into a browser, or through the merchant making the transfer.

Typically, the amount of the purchase in altcoin will have to be calculated because it originally will likely be set in dollars but will need to be converted into the corresponding value of the respective cryptocurrency that the buyer will use. The process in this regard could include accessing a data feed which provides a current value of the cryptocurrency in terms of dollars (or any other currency that the merchant is using). This access could be done in real time or near real time such that when the buyer makes the purchase, the proper value of the cryptocurrency is applied to the purchase. That value and data feed could be presented to the user at the time of purchase and could be part of the buying interface.

The buy button and follow on screens that are part of the purchasing process can include a blending of the interface with access to the cyptocurrency wallet for the buyer. Thus, the interface could include a portion that is connected to or triggers payment through a traditional payment account, and another portion that is associated with the buyer's wallet for cryptocurrency. The user could be presented with a buy option to pay with Visa, Mastercard or Bitcoin. If the user chooses the cryptocurrency, then the system enables the interaction with the wallet such that through accessing automatically or manually, the user's private key is provided or accessed. Passwords, fingerprint authorization, or manual entry of the private key can occur through the purchasing interface for the item, whether is it part of a merchant site, an advertisement, a Google Shopping graphic, a Purchases on Google interface (or any search entity interface), any browser image or application interface, or the use of a Payment Request API developed by W3C.org. The merchant can provide their address and once the buyer provides their private key, the transmission of the cryptocurrency from the buyer to the seller for the appropriate amount for the product can be achieved. All of the processes then can follow for the product as normal, such as tracking, product delivery, communication of delivery information, cancellation, modification, etc. can occur.

In one example, to maintain the user's private key on their device in their wallet, the process could include receiving a confirmation that the user wants to provide the payment through bitcoin. Through an API, the merchant application can provide cost information, a transaction ID, merchant ID, merchant address, delivery charges, taxes, and/or discount data, etc. The API can communicate the data to the user's wallet directly or through a browser or a combination of both. The wallet can confirm and populate its fields necessary for a transaction such as the merchant address, the amount, notes, etc. The typical wallet can be modified to include transaction ID, merchant ID, user preferences (2 day shipping) etc. Much of this information, however, can also be provided through the API from an agent, the browser, a search engine, etc. Once the user's wallet is populated with the data for performing a transaction, the interface at the merchant site or app that the user is interacting with can then request a password or biometric confirmation to complete the transaction. Alternately, although less secure, the user could opt for just an automatic processing when the user clicks "pay" or a similarly styled button. With this interaction with the buying interface, through the API, a confirmation command instructs the wallet to carry out the transaction and transfer the altcoin(s) to the merchant or recipient.

Currently, the payment processing systems for credit cards, debit cards and so forth are set up for use by merchants. Thus, in the standard payment approach through the API, the payment account information is passed from the browser or other agent to the merchant site through the API for payment processing. The payment account data can be transmitted to the merchant in a secure, one-time use fashion and configured such that the payment can be processed but the merchant cannot store the user's payment account data. However, if the user chooses an altcoin payment approach, it is unlikely they will want to send their private key to the merchant. Processing the altcoin payment differs from a standard Visa/Mastercard type of transaction. Accordingly, in one aspect, the API will receive from the merchant their address, amount, and/or any other data needed to complete an altcoin payment. The API can then provide that data to the user's altcoin wallet, whether the wallet is separate from a browser or other agent or integrated into the browser or other agent. The altcoin wallet then can make a payment to the merchant address of the amount of altcoin to pay for the product/service. A transaction ID can be associated with the product purchased. Notifications can then proceed to be communicated through the API back to the merchant. The user through the interface can be notified of the progress and of what is happening at the back end ("Amazon is sending data to your Bitcoin wallet for processing a payment" . . . "Payment confirmed of 1.2 Bitcoin for the Television"). If the user has multiple different altcoin wallets, they could be processed in a similar fashion in parallel. I.e., the user may be able to choose whether to pay with Bitcoin or Litecoin (or any other altcoins that they own). Depending on which is chosen, the particular processing to access that respective altcoin wallet is carried out for payment.

The above approach enables an integration of the use of cryptocurrency, even with its completely separate blockchain based payment process, with other standard forms of payment and payment processing through an API such as the Payment Request API which simplifies the purchasing process by removing the need of a user to fill in payment form fields with name, address, payment account data, etc.

An example method of this approach can include receiving an indication that a purchaser has an altcoin account, presenting an option to make a payment using an altcoin account, and receiving a confirmation to use altcoin. The method includes communicating from a merchant site through an API with a browser or agent to provide information about a purchase of an item. The altcoin wallet can be configured as a separate application or integrated into a browser or other agent process or component. The altcoin wallet receives the data about the purchase and processes the payment to the merchant. The wallet can populate its data fields with the information received through the API from the merchant. The altcoin wallet can include the ability to communicate the payment details through a protocol to the browser or through an API back to the merchant. The merchant site interface can communicate updates to the purchaser of the success/failure of using their altcoin account to make the purchase. A data feed can be accessed to provide current pricing in terms of dollars. If the item is $20 to buy, then at the time of the purchase, the user can see that it would cost say 0.02 Bitcoin to make the purchase and they have 5 Bitcoin currently. The embodiments can include the processing as disclosed herein from the viewpoint of the altcoin wallet, the browser, an agent, a smart contract, either side of the API or APIs, and/or the merchant site. Therefore, claims can be directed to any component in this process and in any configuration (i.e, the altcoin wallet separate, or integrated into the browser, etc.). The ultimate goal is to make payment through altcoin as easy as a "one-click" purchase is for a Visa type payment.

The processing for such payments could also be achieved through the use of a smart contract. The smart contract is a program that can be implemented on the blockchain and that performs certain actions in a trustless manner. In other words, it performs its operations in a known and transparent way using the distributed approach of the blockchain technology. Smart contracts are autonomous, self-sufficient and decentralized. They automatically run and perform the programmed functions. There is no need to "trust" a human to perform one part of the contract. In one example, a smart contract can be used for all or part of the processing disclosed herein. For example, assume that the user interface of a merchant site provides an option for a user to buy an item using their altcoin. The user confirms the purchase with a "pay" button. The amount say is 1 Bitcoin. The instruction or confirmation of that commitment by the purchaser can be transmitted with 1 Bitcoin to a smart contract, operating on a blockchain technology. The seller of the item can perhaps confirm that they have the product and can deliver tomorrow. The smart contract can transfer the 1 Bitcoin to the merchant and send a notice to the buyer that the item is on the way. Or, the smart contract could be programmed to deliver the 1 bitcoin to the merchant when a delivery confirmation occurs. At some stage, the communication and tracking of the packet can transition to a normal tracking and notification process such as is operated by Amazon.com for managing purchases made, return policies, etc. If a return is to be made, the merchant can transfer 1Bitcoin to the smart contract which can then make a payment according to its protocol to the purchaser. Thus, in this respect, the disclosure covers all communications, requests, responses, and data communicated between a merchant site, through an API, to a browser, altcoin wallet, smart contract and/or other agent to achieve a one-click purchasing option of using altcoins for payment in the same fashion as a regular payment account. Because of the different way that altcoins are used, current API's like the Payment Request API must be modified to accommodate the alternate payment structure of altcoins. By extending the API and including the components of the altcoin wallet and/or smart contract to carry out functions in the process, an improvement to the way purchases are made can be implemented to add the ability to pay through altcoins.

Yet another aspect of this approach could be payments to the user's altcoins wallet. For example, with the altcoins structure in place which can include the buyer's address and the merchant address, altcoins payments could flow both ways. Thus, small incentives could flow to users. Currently, if an advertisement is clicked on as part of a search engine result, the search engine gets paid. Integrating the user's wallet into the process could enable the advertiser to pay the buyer that clicks on their advertisement some altcoin. Graphics could show for example how much altcoins a user generates by clicking on the advertisement and browsing content on the merchant's site. When the user arrived at the state in the navigation where a purchase is made, the user could apply the altcoins they made via browsing to the purchase or keep them. All balances and adjustments at the conclusion of the purchase could be implemented in any fashion, including through submission to a smart contract. Special rates, discounts, incentives, etc. could be provided through credits to the user's altcoins wallet which are completed or finalized at the conclusion of a sale. Such credits could also automatically be made throughout the process. Thus, when a user clicks on an advertisement, altcoins could be transferred to their altcoin wallet automatically through the integration of their address with the browser/agent, or a promise to transfer altcoins of a certain amount could exist or be presented such that the final actual transfer occurs if the user clicks through and buys a product on the site. The transfer could even occur if the user does not buy with altcoins but with dollars or some other currency. This aspect covers all the variations on how a merchant would provide altcoins back to buyers as they interact with their site or through other means such as texting, emailing, social media interactions, and so forth. If a user likes a merchant or non-merchant site, that site can send altcoins to the user's wallet. This will enhance the user's experience and encourage them to engage more with the merchant or other site.

Another aspect could be using the blockchain to store and maintain knowledge about browser API transactions. A blockchain is a distributed database that maintains a continuously growing list of ordered records called blocks. Each block contains a timestamp and a link to a previous block. By design, blockchains are inherently resistant to modification of the data—once recorded, the data in a block cannot be altered retroactively. Through the use of a peer-to-peer network and a distributed timestamping server, a blockchain database is managed autonomously. Blockchains are "an open, distributed ledger that can record transactions between two parties efficiently and in a verifiable and permanent way. The ledger itself can also be programmed to trigger transactions automatically."

Blockchains are secure by design and an example of a distributed computing system with high byzantine fault tolerance. Decentralized consensus can therefore be achieved with a blockchain. This makes blockchains suitable for the recording of events such as purchasing transactions as disclosed herein.

Consensus protocols applied with blockchain networks are some of the most important and revolutionary aspects of blockchain technology. These protocols create an irrefutable system of agreement between various devices across a distributed network, whilst preventing exploitation of the system. Here we will explore how these systems work and how various protocols differ from one another. Blockchain consensus protocols are what keep all the nodes on a network synchronized with each other, while providing an answer to the question of how do the nodes all make sure that they agree on what the truth is. Anyone can submit information to be stored onto a blockchain and therefore it is important that there is review and confirmation, in the form of a consensus about whether to add that information. As a term, 'consensus' means that the nodes on the network agree on the same state of a blockchain, in a sense making it a self-auditing ecosystem. This is an important aspect of the technology, carrying out two key functions. First, consensus protocols allow a blockchain to be updated, while ensuring that every block in the chain is true as well as keeping participants incentivized. Secondly, it prevents any single entity from controlling or derailing the whole blockchain system. The aim of consensus rules is to guarantee a single chain is used and followed.

Consensus rules are a specific set of rules that nodes on the network will ensure a block follows when validating that block and the transactions within it. The key requirement to achieve a consensus is a unanimous acceptance between nodes on the network for a single data value, even in the event of some of the nodes failing or being unreliable in any way.

Every cryptocurrency must have a way of securing its blockchain against attacks. For example, an attacker may attempt to spend some money and then reverse the transaction by broadcasting their own version of that blockchain, not including the transaction. This is known as a double spend. As blockchain technology does not rely on a central authority for security, users have no prior knowledge which version of the record is valid.

The first blockchain was conceptualized by Satoshi Nakamoto in 2008 and implemented the following year as a core component of the digital currency bitcoin, where it serves as the public ledger for all transactions. The invention of the blockchain for bitcoin made it the first digital currency to solve the double spending problem, without the use of a trusted authority or central server. The bitcoin design has been the inspiration for other applications.

For example, one could develop a blockchain record of all purchases made through a particular browser, for a particular user. The blockchain could also be narrowed down to tracking transactions using one payment account available through the browser API. So if a user has a VISA account available and Apple Pay, all payments using the visa account could be maintained on the blockchain. Or it could be purchases made through the API that are stored. In this regard, the API could be modified so that the data associated with the transaction, which could use one or more of the pieces of information associated with the transaction (name, address, payment account, product, price, discounts provided, time of order, time of delivery, taxes paid, etc., whether it was a gift, returned items, follow on history of the purchase, context of purchase such as advertisement on Facebook, or transition from a Google ad, etc.) The structure of such a blockchain could be accessible to other services. The management system that utilizes information about purchases to help a user can draw upon information in the blockchain for that transaction or for that browser. Other transactions such as Amazon.com purchases could also be input to the blockchain for that user or that account.

The claim could cover receiving information about a purchase made via the Internet and creating a blockchain record utilizing the information. As later purchases are made using the account, API, browser, PWA, App., person, etc. can be added to that blockchain to record and make available the information.

The problem to be solved is as a person buys products across the web using the browser API, how does one access the ease of managing those purchases, tracking the purchases, cancelling a purchase, changing parameters (shipping model), and so forth. There is no mechanism for a person to go to one place where they can see all of their various purchases. If each purchase for a user is added to a blockchain, private or public, and there is an API or mechanism for reporting purchases across the internet to a blockchain that is continually built based on each purchase then this disclosure also provides the ability to then access that data for an individual. Access to the blockchain for that individual could be granted as part of the authorization for a purchase (fingerprint for Apple Pay or CVC code for a VISA purchase), an agreement could include that when the user authorizes the payment that includes an authorization to add to or access their blockchain of purchases.

If the user is basically accessing their purchase history to make changes or track a purchase, the user could authorize access to their data through a user interface and when that access is granted, information on the block chain can be converted into a user interface similar to the listing of products purchased on Amazon.com but across merchants and/or apps. In one aspect, too, a user could sell access to their blockchain. Users may make money by offering people access to their blockchain. Some information in that case could be anatomized such as their name and address. The data could be provided on an anonymous basis such that the data is provided for product, time, context, and zip code but not name, address, account number, etc.

In one aspect, a merchant site will receive the payment information through the API as a tokenized payment or as a payment account number, name, expiration date, etc. The process with the blockchain can use that information in whatever form it is to identify which blockchain to access to append the data of the current transaction. It could also be accessed through some other mechanism like the user's name or another ID number associated with the browser.

Further, the blockchain may be identified by the user identity and thus multiple accounts could be associated with the user and stored on the same blockchain. Other data such as the user's body model which stores their shirt, pants, shoe sizes and other body related data can also be stored in the blockchain.

The blockchain could be built from browser API purchases or any other purchase including brick and mortar purchases. A user could sign up for a service that would cause each purchase using their various accounts that they use to be reported to a blockchain service such that the user can access all of those purchases from a single user interface, similar to how users can access and manage the history of purchases. A blockchain service can be established with an API that companies interact with whenever the user makes a purchase, whether it is on line, at Amazon.com, through the browser API, etc. A parameter could be set associated with the payment account or user account such that a certain set of details associated with the purchase are communicated to the blockchain service API. Thus, if a person purchases a book on Amazon.com using their stored VISA account, the details of that purchased can be communicated through an API to a blockchain service provider who creates a block for that purchase. Next, the person buys a hammer at Home Depot using the VISA card. Because the parameter is set, the details of the purchase including one or more of the purchase of the hammer, the time, the location, etc. can be communicated to the service via the API and that purchase can be added to the blockchain. Next, the question is how does the user gain access to the data of all those purchases? The user may want to go back and return the book. Where people are making purchases across different merchants and different payment approaches (some merchants will use a shopping cart, others will use the browser API, Amazon.com, in person, etc.) users will desire to have all of their purchases available for management at one location. The blockchain service can offer a management user interface which presents to the user the purchasing history and status. The blockchain service can also receive tracking information from distribution entities (FedEX, UPS, etc.) through an API that can associate a tracking status with the particular product and include updated data on the block chain. Thus, in this respect, the blockchain can be continually updated. The blockchain service can present the information via the user interface. The access to the user interface can be via a website, an app, a browser API interface, a selectable object or a selectable menu via social media, in a digital wallet interface, or an Apple Pay interface or Android pay interface, etc. In other words, at any virtual location where the user "is", a selectable object can be presented which enables the user access to the purchase management interface. The selectable object can also be presented at multiple locations available to the user including options within the browser. For example, in Amazon Assistant or another plugin to a browser, the service can provide an updated listing of previous purchases and their status. The underlying data for this status update can be based on the blockchain.

Further, the information that can be stored in the browser, such as payment account, address, etc., can be stored on the blockchain and accessed from the browser. A separate API could also be called to a service which stores that information on the blockchain and returns the payment account data, a token, address information, name, etc. Thus, the blockchain could hold the information rather than the browser, and once the browser receives an API request for payment information and/or other information associated with a purchase, the browser can access from the blockchain the necessary information. This can occur in several steps as well. Further, the merchant site could also access the information from the blockchain as well through an API directly to the blockchain rather than through the browser functionality.

Using this approach, an individual could store in one blockchain their payment information, address, etc. and any site that needed that payment information could securely access it through the appropriate API. A digital wallet on a device could be the mechanism to access the blockchain with the information. The browser (any time "browser" is used it also can cover a user interface or an agent for the merchant), once it receives an API request, could identify that rather than having a visa account stored in the browser, that the blockchain digital wallet (or access agent) is to be used to obtain the information. The browser communicates with the access agent to retrieve the information from the blockchain and return it to the browser. The browser communicates the information through the browser API to the merchant site for payment processing.

Figure 36B:
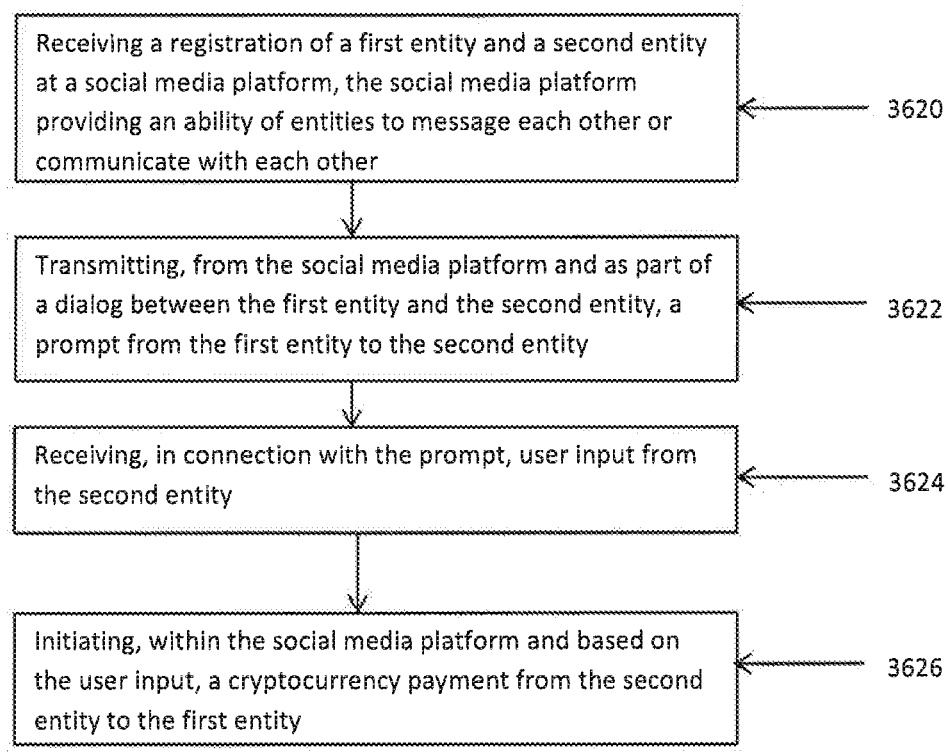
FIG. 36B illustrates a method example related to social media.

Another aspect relates to social media entities or applications that can enable a cryptographic payment between members of the social media entity. This aspect is illustrated in FIG. 36B. The social media entity or platform can apply to a website like www.facebook.com or to apps such as Whatsapp or messenger applications. Any social media entity can implement the following method. A method includes receiving a registration of a first entity and a second entity at a social media platform, the social media platform providing an ability of entities to message each other or communicate with each other (3620), transmitting, from the social media platform and as part of a dialog between the first entity and the second entity, a prompt from the first entity to the second entity (3624), receiving, in connection with the prompt, user input from the second entity (3626) and initiating, within the social media platform and based on the user input, a cryptocurrency payment from the second entity to the first entity (3628).

The social media platform can include a messaging application on a user device. The method can further include transmitting, from the messaging application, to a software module on the user device, and via a software module application programming interface that defines a protocol for communicating data between the social media platform and the software module, a payment request for the software module to authorize transmission of authorized payment data of the second entity and, in response to the payment request, receiving, from the software module and via the software module application programming interface, the authorized payment data. The payment process can be achieved through the use of one or more of the APIs disclosed herein, such as the payment request API and the payment handler API.

The software module authorizes the authorized payment data by (1) retrieving, based on the payment request and via the software module application programming interface, the authorized payment data for the payment from one of the user device operating the software module or a network-based entity separate from the user device and (2) communicating, to the messenger application, from the software module and via the software module application programming interface, the authorized payment data.

The authorized payment data can either confirm that the network-based entity processed the payment or the authorized payment data can be used by the messenger application to process the payment. The cryptocurrency payment can be associated with a purchase of a product by the second entity from the first entity. In another aspect, the cryptocurrency payment can be performed as part of a transfer of value from the second entity to the first entity. The first entity can be one of a user and a merchant and the second entity can confirm the authorized payment data via one of a graphical user interface or a biometric interaction with the user device.

The social media platform can include an on-line site. In this case, the method further includes transmitting, from the on-line site, to a browser on the user device, and via a browser application programming interface that defines a protocol for communicating data between the on-line site and the browser, a payment request for the browser to authorize transmission of authorized payment data of the second entity and, in response to the payment request, receiving, from the browser and via the browser application programming interface, the authorized payment data. The browser authorizes the authorized payment data by: (1) retrieving, based on the payment request and via the browser application programming interface, the authorized payment data for the payment from one of the user device operating the browser or a network-based entity separate from the user device and (2) communicating, to the on-line site, from the browser and via the browser application programming interface, the authorized payment data.

Figure 36C:
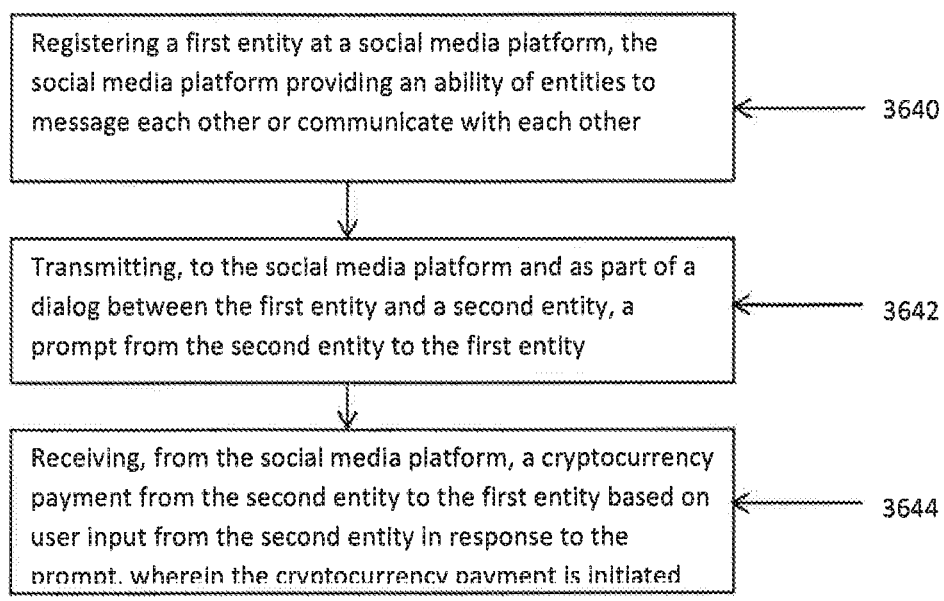
FIG. 36C illustrates another method example related to social media.

Another aspect of the social media context relates to a method from the standpoint of a user, merchant or other entity participating in the social media platform. This is shown in FIG. 36C. In this regard, a method includes registering a first entity at a social media platform, the social media platform providing an ability of entities to message each other or communicate with each other (3640), transmitting, to the social media platform and as part of a dialog between the first entity and a second entity, a prompt from the second entity to the first entity (3642) and receiving, from the social media platform, a cryptocurrency payment from the second entity to the first entity based on user input from the second entity in response to the prompt, wherein the cryptocurrency payment is initiated within the social media platform (3644).

The social media platform can include at least in part a messaging application on a user device. The cryptocurrency payment can be initiated at least in part according to operations including transmitting, from the messaging application, to a software module on the user device, and via a software module application programming interface that defines a protocol for communicating data between the social media platform and the software module, a payment request for the software module to authorize transmission of authorized payment data of the second entity and, in response to the payment request, receiving, from the software module and via the software module application programming interface, the authorized payment data. The software module authorizes the authorized payment data by: (1) retrieving, based on the payment request and via the software module application programming interface, the authorized payment data for the payment from one of the user device operating the software module or a network-based entity separate from the user device and (2) communicating, to the messenger application, from the software module and via the software module application programming interface, the authorized payment data.

The authorized payment data either confirms that the network-based entity processed the payment or the authorized payment data can be used by the messenger application to process the payment. In one aspect, the cryptocurrency payment is associated with a purchase of a product by the second entity from the first entity. The cryptocurrency payment can also be performed as part of a transfer of value from the second entity to the first entity.

When the social media platform is an on-line site, the method further can include transmitting, from the on-line site, to a browser on the user device, and via a browser application programming interface that defines a protocol for communicating data between the on-line site and the browser, a payment request for the browser to authorize transmission of authorized payment data of the second entity and, in response to the payment request, receiving, from the browser and via the browser application programming interface, the authorized payment data. The browser authorizes the authorized payment data by: (1) retrieving, based on the payment request and via the browser application programming interface, the authorized payment data for the payment from one of the user device operating the browser or a network-based entity separate from the user device and (2) communicating, to the on-line site, from the browser and via the browser application programming interface, the authorized payment data.

In yet another example, a method can include receiving, from an application, at a software module on a device and via an application programming interface that defines a protocol for communicating data between the application and the software module, a request associated with a potential purchase, wherein the request includes an identification of a cryptocurrency payment method accepted by the application, transmitting, to the application, from the software module and via the application programming interface, data indicating that a user of the application can pay for the potential purchase via the cryptocurrency payment method accepted by the application and receiving, via the application programming interface, authorized payment data for the potential purchase to be made using the cryptocurrency payment method. The method can include populating a cryptocurrency wallet with the authorized payment data to enable the cryptocurrency wallet to make a payment and/or initiating, via the application programming interface, the cryptocurrency wallet. The software module and application programming interface can be full client components configured on a client device and not on a server.

The authorized payment data can be cryptocurrency payment information that includes at least one of a site address for receiving the payment, a private key of a buyer, a public key of a recipient, an email address, recipient identification information, a payment amount, and a user comment.

The cryptocurrency wallet can include at least one of a wallet stored locally on a device that is running the software module and a web-based wallet. When the cryptocurrency wallet is the web-based wallet, the method further can include transmitting the authorized payment data to the web-based wallet via an application programming interface for processing the payment. This can be the same API or a separate API.

The request can identify a supported payment method used by the application in addition to the cryptocurrency payment method. In one aspect, the authorized payment data includes a private key that is used to sign a transaction with the cryptocurrency wallet. The method of authorizing payment data via the software module can further include transmitting, via the application programming interface, data to the application for use by an application cryptocurrency wallet to receive a payment. The authorized payment data can be stored at the device, accessed by the software module from a separate entity, received from the application via the application programming interface, received from a third party, or delivered to the application from the third party as instructed by the software module.

In one aspect, when the cryptocurrency payment method is selected by the user for a purchase, the method further can include generating a blended user interface via the application programming interface which blends a payment interaction interface and a cryptocurrency wallet interface for use by the user to confirm a payment.

Another aspect of this disclosure relates to application use and a method in this regard includes transmitting, from an application, to a software module and via an application programming interface that defines a protocol for communicating data between the application and the software module, a request associated with a potential purchase, wherein the request includes an identification of a cryptocurrency payment method accepted by the application, receiving, at the application, from the software module and via the application programming interface, data indicating that a user of the software module or application can pay for the potential purchase via the cryptocurrency payment method accepted by the application and receiving, based on a confirmation from the user to process the potential purchase using the cryptocurrency payment method via the application programming interface, a payment using the cryptocurrency payment method.

Another example method includes transmitting, from an application, to a software module and via an application programming interface that defines a protocol for communicating data between the application and the software module, a request associated with a potential purchase, wherein the request includes an identification of a payment method accepted by the application, wherein the payment method uses a cryptocurrency and receiving, at the application, the payment according to the payment method, wherein the payment method uses the cryptocurrency according to a cryptocurrency payment process initiated based on the request transmitted via the application programming interface.

Another aspect is from the standpoint of a wallet. A method in this regard includes receiving, at a cryptocurrency wallet, authorized payment information associated with a purchase, wherein the authorized payment information is generated based on a software module receiving, from an application, at the software module and via an application programming interface that defines a protocol for communicating data between the application and the browser, a request associated with a potential purchase, wherein the request includes an identification of a cryptocurrency payment method accepted by the application, processing the payment using a cryptocurrency from the cryptocurrency wallet and based on the authorized payment information and transmitting, to the software module, confirmation data associated with the processing of the payment using the cryptocurrency.

Yet another aspect is from the standpoint of a payment service. A method of operating a payment service includes receiving, at the payment service, authorized payment information associated with a purchase, wherein the authorized payment information is generated based on a software module receiving, from an application, and via an application programming interface that defines a protocol for communicating data between the application and the software module, a request associated with a potential purchase, wherein the request includes an identification of a payment process that utilizes at least in part a cryptocurrency, processing a payment using the cryptocurrency and based on the authorized payment information and transmitting, to the software module, confirmation data associated with the processing of the payment using the cryptocurrency.

Another aspect applies to an example method including receiving, from an application, based on a user interacting with the application, at a software module and via a first application programming interface that defines a first protocol for communicating data between the software module and the application, a request associated with a purchase, receiving, from the user and via the first application programming interface, a choice of a payment method supported by the application, wherein the payment method utilized at least in part a cryptocurrency and wherein a payment transaction is managed at least in part by a payment service and, in response to the request and the choice of the payment method, communicating, from the software module and via a second application programming interface that defines a second protocol for communicating data between the software module and the payment service, a payment request event to the payment service, the payment request event including data for use by the payment service to handle the purchase utilizing at least in part the cryptocurrency.

Another example method includes receiving a payment request event at a payment service, wherein receiving the payment request event at the payment service is based on: (1) a software module receiving, via a first application programming interface that defines a first protocol for communicating data between the full client and an application, a payment request from the application for payment data associated with a purchase of a product, wherein the payment request is based on input from a user indicating a desire to purchase the product and includes information about the purchase; and (2) receiving, from the user and via the first application programming interface, a choice of the payment service, wherein the payment request event is received from the software module and via a second application programming interface that defines a second protocol for communicating data between the software module and the payment service and processing, at the payment service, the payment request event to initiate a payment process including at least in part use of a cryptocurrency.

Another example method includes transmitting, from an application, based a user interaction with the application, at a software module and via a first application programming interface that defines a first protocol for communicating data between the software module and the application, a payment request, transmitting, via the first application programming interface, a choice of a payment method supported by the application, wherein the payment method utilizes at least in part a cryptocurrency and wherein a payment transaction is managed at least in part by a payment service, wherein, in response to the payment request and the choice of the payment method, a second application programming interface that defines a second protocol for communicating data between the software module and the payment service communicates a payment request event to the payment service, the payment request event including data for use by the payment service to handle a payment via a payment process that utilizes at least in part the cryptocurrency and receiving the payment via the payment process.

Dynamic Buy Buttons

The concept of a dynamic object or a dynamic button above is discussed above. A concept of a dynamic button or a dual purpose button can be provided. This concept addresses the scenario where one user with the first account, which can be associated with a first browser type, navigates to a merchant site to purchase a product. The merchant site can be programmed to detect one or more of the browser type, a browser characteristic, a payment request API type, and/or an account type for that user and present a corresponding dynamic buy button. Thus, the buy button presented to the user can be tailored to one or more of these factors. If a second user, using a second browser type, or a second account type, or based on some other factor, navigates to the same merchant site, the merchant site can dynamically adapt the object that is presented to that user such that the buy button can be tailored for their characteristics. A benefit of this approach is that each user can have a recognizable and personalized and dynamically modified or dynamically presented buy button which they are familiar with and trust in terms of branding or a consistent experience across websites. In an app context, an app can be programmed to enable calls using an API protocol to a module configured to control a user interface to request and then receive authorized payment data. The following discussion relates to several concepts related to reducing clicks in the context of using the payment request API and providing dynamic buy buttons.

The concept disclosed herein relates to how to reduce clicks in the context of the browser/user interface payment request API. The current process is that the user is on the merchant.com website (any site, or app), and clicks on a "buy" button, add to shopping cart button, or gives some other input like voice to initiate a purchase. The merchant-.com site will communicate with the browser through which the site is being viewed to coordinate the payment methods accepted by the site and the payment methods available to the user. Let's assume Bitcoin and Visa are available to both the user and the merchant. The browser API, once the overlap of payment methods is determined, will present an interface (or speak or other modalities) from which the user can choose bitcoin or Visa. The key is how can at this stage the user only need to make one click or one command to both choose the payment method and initiate the payment process. There are several ways to do this. One could be a dynamic button that is coordinated with the payment type the user wants to use or a dual-purpose button.

The browser API can be programmed to present a dual-purpose button in which the user can both choose and initiate the payment process. The button may be dynamic as well and tailored to the payment type or browser type the user is using. For bitcoin or any cryptocurrency payment method, the user could click on the bitcoin object in the API interface which will accept the selection of the method as well as initiate the payment process without the need of clicking again on a "pay" button. The API would, based on the clicking of the "choose and pay" button, initiate the communication of data between merchant.com and the browser and the buyer wallet. For example, after clicking on bitcoin in the API interface, the API could request from the merchant.com site the public key or data to identify the merchant.com wallet. This could be a package of data that include a public key, a transaction ID, user search history at the site, social media data, dynamic public key data, or any other data. Included within the data however should be the identification of the merchant.com wallet. That data can be communicated to a buy wallet with the amount of the purchase in the cryptocurrency, and any other data. The cryptocurrency wallets are programmed to receive data and functional instructions from the browser API such that the process of opening the wallet, populating data, initiating a transaction and so forth, are performed under the covers and automatically based on the user selection of the cryptocurrency from the browser API interface.

One way to enable a more efficient use of a button within a browser API interface is to make the user interface, and not just a button outside of the interface, capable of reading a fingerprint. If the whole interface or selected parts of the interface are capable of reading a fingerprint for confirming a purchase, then a "choose bitcoin and pay" button could receive a finger press that selects bitcoin while the user interface reads the finger print of that finger press to confirm the user's identity and initiate the payment process with the same interaction. The fingerprint reader as well outside of the user interface could have a graphical component in which the user could see "bitcoin" or "Apple Pay" such that the user only needs to click on that button with their fingerprint to both choose the payment method and confirm with a level of security the buyer. The location of the fingerprint sensing component can vary in location on a touch screen based on a location of an object to be selected by a user.

Facial recognition could also be used in connection with the selection of a payment method. The user could select or say bitcoin and then simply look at the interface for a facial recognition step which would then confirm and carry out the functions disclosed herein.

In one aspect, only a region of the graphical display may include a finger print reader. In this case, the presentation of the graphical interface could be coordinated with the finger print reader such that the "choose and pay" object could be presented over the fingerprint reader region. The graphical display could include several regions such that the user, if they are given an option to either pick Bitcoin or Apple Pay on the graphical interface, either one picked with a finger touch would also cause the fingerprint to be read and the user identity affirmed for payment processing. The region can change or move to different locations on the touch sensitive screen based on a position of a buy button.

In another aspect, one company might want to pay in a currency or cryptocurrency that the other party does not use. There might be scenarios where there is no overlap between accepted payment methods. A service could be provided in which if both parties are signed up for the service, they could coordinate a payment through the API although it is in a different currency. For example, the buyer may want to pay in dollars but the seller might not want to be paid in dollars or may only have a cryptocurrency wallet. A service could be provided as a payment method option for the payment request API transaction such that the payor can accept, say VISA, for payment through the API, but the payment would go to the service provider who would convert the payment from VISA to bitcoin, and then pay the seller or merchant in bitcoin. In one scenario, both parties do not need to be signed up for this approach but perhaps only one party would need to be. In this scenario, if a merchant only accepts bitcoin, and they are registered with the service, the merchant site can be programmed to provide the following functionality.

Assume that the merchant accepts bitcoin and a buyer can pay in Visa, Mastercard or PayPal. Assume that the service is set up to receive Visa and Mastercard payment methods. The merchant site can be programmed to present via the payment request API that they can receive Visa or Mastercard (or bitcoin). This is like a proxy notification through the API. The approach then enables the API to coordinate the payment methods that work for both buyer and seller. Because the merchant site will present Visa and Mastercard, the buyer can select Visa for the payment and confirm the payment. A button can dynamically change based on these account types. The payment can be made to the site or to the service provider, who then converts the payment to bitcoin and transfers the bitcoin to the merchant wallet. The buyer may have no idea that the ultimate payment is in bitcoin but should not care as long as the payment process is "one-click" in nature.

For example, the site may receive a token via the API with the payment data for the transaction. The site, since it does not accept VISA or credit card payments, can forward the token to a service provider that processes the payment and returns a different currency from the original currency to the site. Thus, a visa payment can be processed and bitcoin returned. This processing can be done in whole or in part at the merchant site or by a separate service provider. In the above scenario, where the merchant accepts bitcoin and the buyer can pay in bitcoin, there is no need for a proxy presentation or the service provider to convert dollars to bitcoin. The transaction can occur in the standard fashion. However, if there is no currency match for the parties, then a proxy approach can be utilized where a currency conversion can occur for one or both of the parties through a proxy presentation via the API that enables a payment to be made in a payment method that works for the buyer such that the payment can be received, converted to a new currency acceptable to the seller, and then transmitted or provided to the seller. The process could include a directive through the API that the buyer's payment should be transmitted to a URL identified location or network based payment processor rather than through the API as in a token. Any rail could be used to transmit data, a token, public/private keys, etc.

Figure 37:
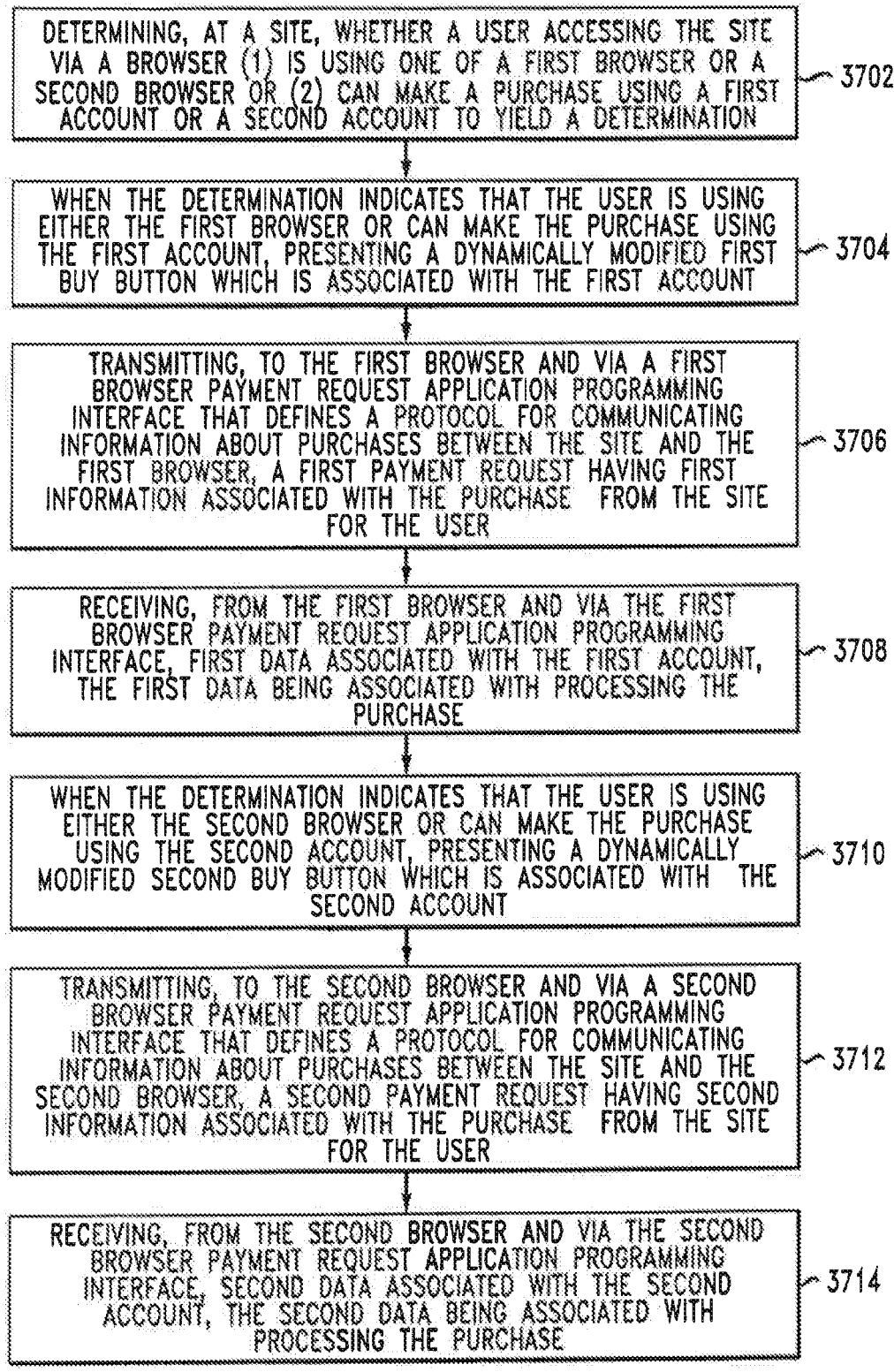
FIG. 37 illustrates a method example of modifying a buy button based on a browser type or account type.

FIG. 37 illustrates an aspect of this method with respect to dynamically modifying the buy button. A method includes determining, at a site, whether a user accessing the site via a browser (1) is using one of a first browser or a second browser or (2) can make a purchase using a first account or a second account to yield a determination (3702). When the determination indicates that the user is using either the first browser or can make the purchase using the first account, the method includes presenting a dynamically modified first buy button which is associated with the first account (3704), transmitting, to the first browser and via a first browser application programming interface that defines a protocol for communicating information about purchases between the site and the first browser, a first payment request having first information associated with the purchase from the site for the user (3706) and receiving, from the first browser and via the first browser application programming interface, first data associated with the first account, the first data being associated with processing the purchase (3708). The data can be a confirmation that a payment service processed the data or can be a token or account data for the site to process the purchase or submit the data to a payment processor. The data can be also non-currency data but something of value.

When the determination indicates that the user is using either the second browser or can make the purchase using the second account, the method includes presenting a dynamically modified second buy button which is associated with the second account (3710), transmitting, to the second browser and via a second browser application programming interface that defines a protocol for communicating information about purchases between the site and the second browser, a second payment request having second information associated with the purchase from the site for the user (3712) and receiving, from the second browser and via the second browser application programming interface, second data associated with the second account, the second data being associated with processing the purchase (3714).

The first browser and the second browser can be different browser types and the first browser can operate on a first device and the second browser can operate on a second device. The first browser application programming interface and the second browser application programming interface can each be associated with operations of the first browser and the second browser, respectively. The second data associated with the second account can include payment data that confirms that a payment to purchase a product was performed by a payment service. The first data associated with the first account can include payment data that confirms that a payment to purchase a product was performed by a payment service.

The method can further include receiving a communication, from the first browser and based on data communicating via a browser payment handler application programming interface which defines a protocol for communicating data between the first browser and a payment service, information confirming that the payment service processed the payment.

Figure 38:
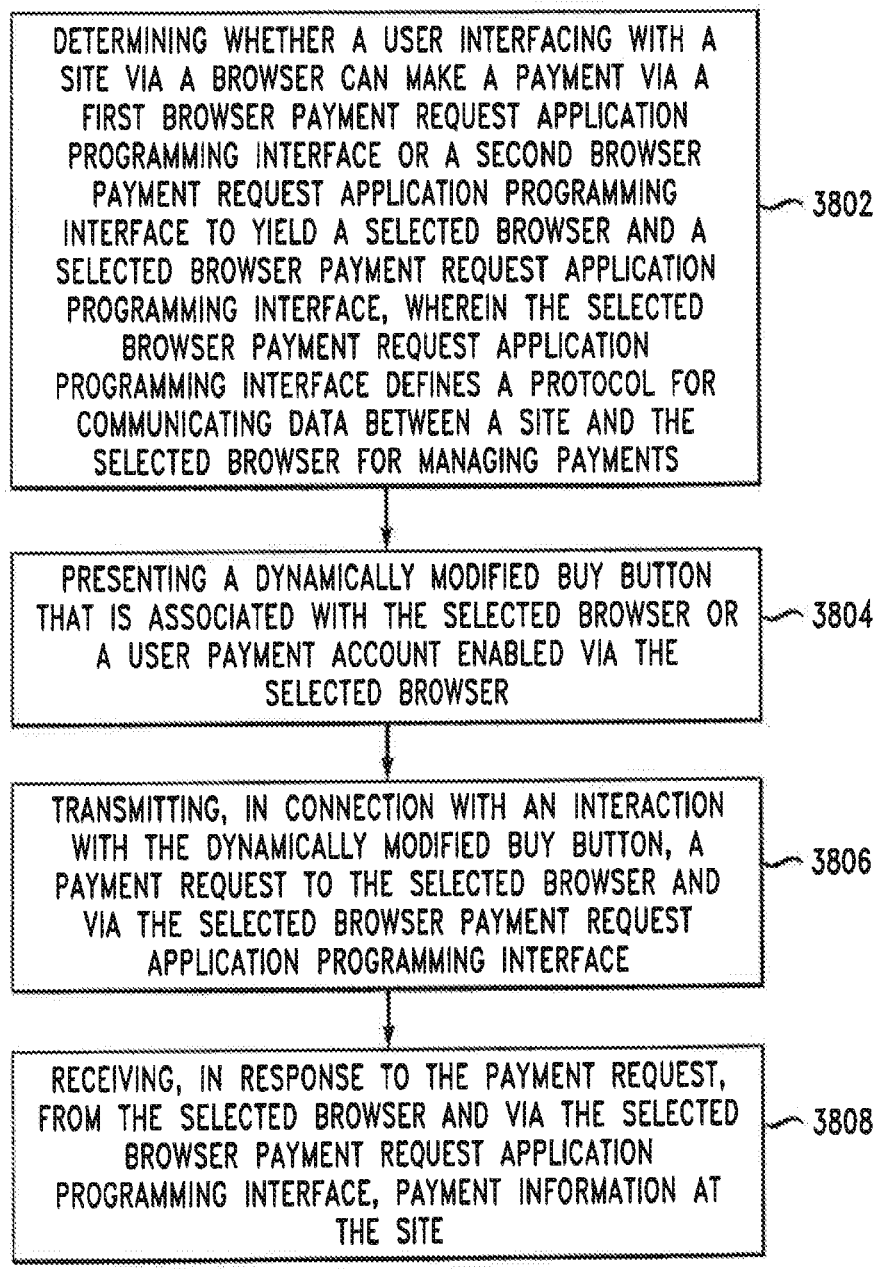
FIG. 38 illustrates another example of modifying a buy button.

FIG. 38 can illustrate another method aspect of this disclosure. A method can include determining whether a user interfacing with a site via a browser can make a payment via a first browser application programming interface or a second browser payment request application programming interface to yield a selected browser and a selected browser application programming interface, wherein the selected browser application programming interface defines a protocol for communicating data between a site and the selected browser for managing payments (3802), presenting a dynamically modified buy button that is associated with the selected browser or a user payment account enabled via the selected browser (3804), transmitting, in connection with an interaction with the dynamically modified buy button, a payment request to the selected browser and via the selected browser application programming interface (3806) and receiving, in response to the payment request, from the selected browser and via the selected browser application programming interface, payment information at the site (3808).

Dynamically modified buy button can be associated with the user payment account. The site programming can be configured to accept, say, different payment mechanisms and the API simply identifies from the browser which ones the user has available. The payment information can include a confirmation that the payment has been processed by a payment service or a payment app on the device. The method can also include receiving confirmation information from the selected browser and via the selected browser application programming interface. The confirmation can confirm that a payment service has successfully made a payment for a product to the site. Coupons, discounts, points, and so forth can be also incorporated into payments through these APIs.

These embodiments can be described in terms of methods, systems, and computer readable media and can occur from the standpoint of the merchant site, the browser, the browser maker, and a service provider as well.

Other APIs can provide a site with data about the particular user that is browsing to make a purchase as well. For example, location, age, income level, purchasing habits, social media data, browsing history, types of accounts the user uses, how much money is in a user account or accounts, or other information about the user can be provided to a site such that the data can be incorporated into the decision making process of how to present a payment button or how to modify the payment flow for that user. Machine learning, artificial intelligence, rule-based logic, or any other such approach can utilize training data with respect to how users react to payment flows to dynamically present a particular flow for a particular user such that their experience can be consistent across payment platforms. This can include NFC POS purchases, on-line, in-app, and mobile purchasing. Embodiments can include claims from the standpoint of a merchant site sending and receiving data as described above, claims from the standpoint of a server or cloud-based service that receives requests and provides responses to help sites configure their payment interface for users, browser-based claims where the API is updated to receive requests and provide responses from the browser acting as an agent to give parameters or data to a site to improve the interface for less friction in the purchasing process. The browser can also use another API that communicates with a network based application to send data back to the browser, which can then send data back to the site for dynamically presenting the interface.

In-App Purchases

As noted above, another aspect of this disclosure is how to use the APIs in the context of apps that a user has downloaded to a device. The same general principles described above with respect to the flow of requests, responses and providing authorized payment data apply in the same manner. The provisional application 61/972,879, filed Mar. 31, 2014, explains that the user can be performing a product search from any location such as a website or an application downloaded on a user device. Much of the discussion above focuses on the website aspect of the disclosure. The following focuses on applying the concepts disclosed to applications.

The principles disclosed herein related to browser APIs used for communicating with sites can also be applied in terms of the basic functionality to a software module that is programmed to interface with an application on a user device. In the app scenario, a browser might not be used to view the application as the visual aspects of the experience are built into the application itself. In such a case, a software module that may or may not control some aspects of a visual experience with the application can be programmed to perform all of the functionality disclosed herein with respect to payments, clothing or body models, etc. The application communicates with the software module in the same or similar basic way as the site communicates with the browser in that scenario. The software module can handle requests from the application, obtain payment data from the device, from the software module, from a network-based entity, or any combination thereof, and receive authorized payment data such as a one-time use token, encrypted payment credentials, or other payment or confirmation data. The software module and manage the process and provide through the protocol of the API, the authorized payment data for use in making a payment, confirming a payment or completing a payment. The app can process the data or provide the data to its payment processor for handling the payment.

One example method in this regard is a method that includes transmitting, from an application operating on a device, to a module (such as a software module acting as an agent to manage the process) on the device and according to an application programming interface that defines a protocol for communicating data between the application and the module on the device, a request associated with a potential purchase, wherein the request includes information about the potential purchase. The method includes receiving, at the application, from the module and according to the application programming interface, authorized payment data, wherein the module retrieved, based on the request, the authorized payment data for the potential purchase from one or more of the module, the device operating the module or a network-based entity separate from the device. This method is from the standpoint of the application operating on the device and the steps that it performs. The software module may or may not that control a user interface. For example, an authorization sheet or user interface might be presented to enable the user to confirm the purchase and pass the payment data according to the protocol of the API to the application.

Another aspect is from the standpoint of the device or the software module. The method includes receiving, at a module operating on a device, from an application operating on the device, and according to an application programming interface that defines a protocol for communicating data between the application and the module, a request associated with a potential purchase, wherein the request includes information about the potential purchase and transmitting, from the module and to the application, according to the application programming interface, authorized payment data, wherein the module retrieved, based on the request, the authorized payment data for the potential purchase from one of the module, the device operating the module or a network-based entity separate from the device.

Yet another aspect includes the process from the standpoint of a payment service or a network-based server that participates in the payment process. A method in this regard includes receiving, at a network-based server, from a module operating on a device and according to an application programming interface that defines a protocol for communicating data between the module and the network-based server, a communication associated with a potential purchase within an application operating on the device, wherein the communication includes information about the potential purchase based on a request transmitted from the application operating on the device to the module. The method further includes transmitting, from the network-based server and to the module, according to the application programming interface, authorized payment data, wherein the module transmits the authorized payment data for the potential purchase to the application. All of the other aspects of the disclosure with respect to a browser-based approach can also apply, where possible, in an app context, where a user downloads an app which is programmed to take advantage of the APIs described herein for a simplified, secure and safe payment process in connection with a module. The app may operate exclusively on the local client device or may have a portion of the presentation of data from a local app and a portion from a web-based app.

In another example, a device can include a processor, a computer-readable storage device and a software module stored on the computer-readable storage device. The software module can be configured with a software module application programming interface programmed that defines a protocol for communicating data between an application on the device and the software module. In one aspect, this can be termed a full client API in that it is built into a software module operating on the device. This can be built into a browser, into the operating system or be a separate module for managing the flow of requests and responses for providing payment data to apps. The software module further can be configured to utilize the software module application programming interface to manage (1) a request from the application on the device for authorized payment data for a purchase associated with the application, (2) operations including receiving first data from the device and second data from a network-based entity to yield the authorized payment data and (3) deliverance of the authorized payment data to the application.

The software module, when executed by the processor, causes the processor perform operations including receiving, from the application operating on the device, the request associated with the purchase, wherein the request includes information about the purchase, transmitting, according to the software module application programming interface and to the application, the authorized payment data. The application can manage the purchase by transmitting the authorized payment data to a server for processing a payment. The authorized payment data can be represented by an encrypted token. The authorized payment data is encrypted based on one or more of the first data and the second data.

In another aspect, a device includes a processor, a computer-readable storage device and a software module stored on the computer-readable storage device. The software module can be configured with a software module application programming interface programmed that defines a protocol for communicating data between an application on the device and the software module. The software module, when executed by the processor, causes the processor perform operations including receiving, from the application operating on the device, a request associated with a purchase from the application, wherein the request includes information about the purchase, receiving first data from the device and receiving second data from a network-based entity to yield authorized payment data and transmitting, via the software module application programming interface and to the application, the authorized payment data. The authorized payment data can be the first data or the second data and can be based on one or more of the first data and/or the second data.

Method examples can also be implemented using the operations described above. The operations can include one or more of the software module retrieving data from the device such as a secure memory location and/or receiving encrypted data from a network device for security purposes.

An example method includes transmitting, from an application, to a software module and via or according to a user interface application programming interface that defines a protocol for communicating data between the application and the software module, a request associated with a payment to the application, wherein the request includes information about the payment and receiving, at the application, from the software module and according to the user interface application programming interface, authorized payment data, wherein the software module accesses or receives, based on the request, the authorized payment data for the potential purchase from a device operating the software module, a network-based entity, or the software module.

The software module can further include a full client software module which is programmed to enable implementation of the user interface application programming interface.

Another device example can include a processor and a computer-readable storage device storing instructions which, when executed by the processor, cause the processor perform operations including transmitting, from an application operating on the device, to a software module and via a user interface application programming interface that defines a protocol for communicating data between the application and the software module, a request associated with a payment to the application, wherein the request includes information about the payment and receiving, at the application, from the software module and via the user interface application programming interface, authorized payment data, wherein the software module accesses or receives, based on the request, the authorized payment data for the potential purchase from the device or the software module. The authorized data can be an encrypted token for one time use of a re-encryption of an encrypted token.

The processes or software module can also present an authorization interface enabling the user to confirm a purchase (or any other data transmitted as disclosed above).

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim. Notably, any feature described in any example or embodiment can be combined with any other feature of any example of embodiment. For example, any feature discussed with respect to a search engine example can be applicable and interchangeable with a social media example, or a product purchase management engine example.

We claim:

1. A method comprising:
   synchronizing a product database between a merchant computing device and a payment engine configured on a non-search/non-commerce application or website;
   transmitting product data in the product database from the merchant computing device to the payment engine, wherein the payment engine of the non-search/non-commerce application or website:
   stores, in a user profile, payment data for a user to enable purchases of products from merchants independent of the non-search/non-commerce application or website while the user is interacting with the non-search/non-commerce application or website;
   determines, by the payment engine of the non-search/non-commerce application or website, if a product is included in the product database having product details received from the merchant computing device;
   receives, at the non-search/non-commerce application or website and based on the product being included in the product database, an interaction from the user with a buy option configured on a piece of content presented on a user interface of the non-search/non-commerce application or website, wherein the buy option is for the product and comprises one of a buy button, a drop-down menu, or a hyperlink; and
   manages, based on the interaction, a purchase of the product using the payment data; and
   receiving, from the payment engine of the non-search/non-commerce application or website and at the merchant computing device, data regarding the purchase of the product.

2. The method of claim 1, wherein the non-search/non-commerce application or website comprises a social media application or website.

3. The method of claim 1, wherein the piece of content comprises one of an advertisement, a post on the non-search/non-commerce application or website, data associated with the product, or an image with a tag associated with the product.

4. The method of claim 1, wherein data from the product database accessed by the payment engine via an application programming interface between the payment engine and the merchant computing device.

5. The method of claim 1, wherein the piece of content is chosen to be presented to the user based on one or more of social media data, historical data, a time of year, user profile data, data about friends or family of the user, weather data, and/or other websites or applications where the user has made purchases, messaging data, calendar information for the user, location-based data, recent purchases or other transactions.

6. The method of claim 1, wherein the piece of content is chosen based on which merchant the user is likely to want to purchase the product from.

7. The method of claim 1, wherein the piece of content comprises an advertisement from a merchant that is presented in a news feed of the user on the non-search/non-commerce application or web site.

8. The method of claim 7, wherein the advertisement is selected based on one or more of social media data, historical data, a time of year, user profile data, data about friends or family of the user, weather data, and/or other websites or applications where the user has made purchases.

9. The method of claim 1, wherein the piece of content is chosen to be presented to the user based on an output of an intent classifier and further based on one or more of social media data, historical data, a time of year, user profile data, data about friends or family of the user, weather data, and/or other websites or applications where the user has made purchases.

10. The method of claim 1, further comprising:
delivering the product to the user.

11. A system comprising:
at least one processor; and
a computer-readable storage device storing instructions which, when executed by the at least one processor, cause the at least one processor to:
synchronize a product database between the system and a payment engine configured on a non-search/non-commerce application or website;
transmit product data associated with the product database from the system to the payment engine, wherein the payment engine of the non-search/non-commerce application or website:
stores, in a user profile, payment data for a user to enable purchases of products from merchants independent of the non-search/non-commerce application or website while the user is interacting with the non-search/non-commerce application or website;
determines, by the payment engine of the non-search/non-commerce application or website, if a product is included in the product database having product details;
receives, at the non-search/non-commerce application or website and based on the product being included in the product database, an interaction from the user with a buy option configured on a piece of content presented on a user interface of the non-search/non-commerce application or website, wherein the buy option is for the product and comprises one of a buy button, a drop-down menu, or a hyperlink; and
manages, based on the interaction, a purchase of the product using the payment data; and
receive, from the payment engine of the non-search/non-commerce application or website, data regarding the purchase of the product.

12. The system of claim 11, wherein the non-search/non-commerce application or web site comprises a social media application or website.

13. The system of claim 11, wherein the piece of content comprises one of an advertisement, a post on the non-search/non-commerce application or website, data associated with the product, or an image with a tag associated with the product.

14. The system of claim 11, wherein data from the product database accessed by the payment engine via an application programming interface between the payment engine and the system.

15. The system of claim 11, wherein the piece of content is chosen to be presented to the user based on one or more of social media data, historical data, a time of year, user profile data, data about friends or family of the user, weather data, and/or other websites or applications where the user has made purchases, messaging data, calendar information for the user, location-based data, recent purchases or other transactions.

16. The system of claim 11, wherein the piece of content is chosen based on which merchant the user is likely to want to purchase the product from.

17. The system of claim 11, wherein the piece of content comprises an advertisement from a merchant that is presented in a news feed of the user on the non-search/non-commerce application or website.

18. The system of claim 17, wherein the advertisement is selected based on one or more of social media data, historical data, a time of year, user profile data, data about friends or family of the user, weather data, and/or other websites or applications where the user has made purchases.

19. The system of claim 11, wherein the piece of content is chosen to be presented to the user based on an output of an intent classifier and further based on one or more of social media data, historical data, a time of year, user profile data, data about friends or family of the user, weather data, and/or other websites or applications where the user has made purchases.

* * * * *